(12) United States Patent
Sanefuji et al.

(10) Patent No.: US 12,084,574 B2
(45) Date of Patent: Sep. 10, 2024

(54) FLEXIBLE POLYURETHANE FOAM, AUTOMOBILE SEAT PAD, AND FLEXIBLE POLYURETHANE FOAM PRODUCTION METHOD

(71) Applicants: BRIDGESTONE CORPORATION, Tokyo (JP); SPIBER INC., Yamagata (JP)

(72) Inventors: Koji Sanefuji, Tokyo (JP); Hideharu Seguchi, Tokyo (JP); Toshiki Takizawa, Tokyo (JP); Naoko Nisikita, Tokyo (JP)

(73) Assignees: BRIDGESTONE CORPORATION, Tokyo (JP); Spiber Inc., Yamagata (JP)

( * ) Notice: Subject to any disclaimer, the term of this patent is extended or adjusted under 35 U.S.C. 154(b) by 843 days.

(21) Appl. No.: 17/258,059

(22) PCT Filed: Jul. 5, 2019

(86) PCT No.: PCT/JP2019/026899
§ 371 (c)(1),
(2) Date: Jan. 5, 2021

(87) PCT Pub. No.: WO2020/009240
PCT Pub. Date: Jan. 9, 2020

(65) Prior Publication Data
US 2021/0230424 A1   Jul. 29, 2021

(30) Foreign Application Priority Data

Jul. 6, 2018 (JP) ................................. 2018-129437
Feb. 6, 2019 (JP) ................................. 2019-020096

(51) Int. Cl.
C08L 75/04   (2006.01)
C08G 18/00   (2006.01)
(Continued)

(52) U.S. Cl.
CPC .............. C08L 75/04 (2013.01); C08G 18/08 (2013.01); C08G 18/7621 (2013.01);
(Continued)

(58) Field of Classification Search
CPC ......... C08L 75/04; C08L 89/00; C08G 18/00; C08G 18/08; C08K 7/02
See application file for complete search history.

(56) References Cited

U.S. PATENT DOCUMENTS 4,683,246 A    7/1987  Davis
10,377,868 B2 * 8/2019  Kumar .............. C08G 18/4208
(Continued)

FOREIGN PATENT DOCUMENTS

CN    102634041 A    8/2012
EP    3 502 169 B1    8/2021
(Continued)

OTHER PUBLICATIONS

Search Report dated Apr. 22, 2022 from the China National Intellectual Property Administration in CN Application No. 201980045259.9.

(Continued)

Primary Examiner — Michael L Leonard
(74) Attorney, Agent, or Firm — Sughrue Mion, PLLC

(57) ABSTRACT

Provided is a flexible polyurethane foam having high hardness required for weight reduction of members and having low stress relaxation. A flexible polyurethane foam comprises a structural protein fiber having a length of 0.1 mm to 5 mm.

15 Claims, 6 Drawing Sheets
Specification includes a Sequence Listing.

(51) Int. Cl.
  *C08G 18/08* (2006.01)
  *C08G 18/76* (2006.01)
  *C08K 7/02* (2006.01)
  *C08K 11/00* (2006.01)
  *C08G 101/00* (2006.01)

(52) U.S. Cl.
  CPC ............ *C08G 18/7657* (2013.01); *C08K 7/02* (2013.01); *C08K 11/00* (2013.01); *C08G 2101/00* (2013.01); *C08G 2110/0008* (2021.01)

(56) References Cited

U.S. PATENT DOCUMENTS

| | | | | |
|---|---|---|---|---|
| 11,401,451 | B2* | 8/2022 | Peterson | C08K 9/04 |
| 2010/0305227 | A1* | 12/2010 | Parker | C08H 1/00 |
| | | | | 435/68.1 |
| 2017/0226674 | A1* | 8/2017 | Jerez | B32B 3/12 |
| 2018/0251501 | A1 | 9/2018 | Sugahara et al. | |
| 2020/0256009 | A1* | 8/2020 | Altman | D06M 15/15 |

FOREIGN PATENT DOCUMENTS

| | | |
|---|---|---|
| JP | 2003-063913 A | 3/2003 |
| JP | 2005-008743 A | 1/2005 |
| JP | 2006-265538 A | 10/2006 |
| JP | 2008-024773 A | 2/2008 |
| JP | 2009-242618 A | 10/2009 |
| JP | 2009-298879 A | 12/2009 |
| TW | 201726807 A | 8/2017 |
| WO | 2015/035068 A1 | 3/2015 |
| WO | 2017/047503 A1 | 3/2017 |
| WO | 2017/105459 A1 | 6/2017 |
| WO | 2018/034111 A1 | 2/2018 |

OTHER PUBLICATIONS

Extended European Search Report dated Mar. 4, 2022 in European Application No. 19830431.3.
International Search Report of PCT/JP2019/026899 dated Oct. 9, 2019 [PCT/ISA/210].
International Preliminary Report on Patentability with the translation of Written Opinion dated Jan. 12, 2021, from the International Bureau in International Application No. PCT/JP2019/026899.

* cited by examiner

SEQUENCE LISTING

<160> NUMBER OF SEQ ID NOS: 52

<210> SEQ ID NO 1
<211> LENGTH: 50
<212> TYPE: PRT
<213> ORGANISM: Araneus diadematus

```
<400> SEQUENCE: 1

Ser Gly Cys Asp Val Leu Val Gln Ala Leu Leu Glu Val Val Ser Ala
1               5                   10                  15

Leu Val Ser Ile Leu Gly Ser Ser Ile Gly Gln Ile Asn Tyr Gly
                20                  25                  30

Ala Ser Ala Gln Tyr Thr Gln Met Val Gly Gln Ser Val Ala Gln Ala
                35                  40                  45

Leu Ala
    50

<210> SEQ ID NO 2
<211> LENGTH: 30
<212> TYPE: PRT
<213> ORGANISM: Araneus diadematus

<400> SEQUENCE: 2

Ser Gly Cys Asp Val Leu Val Gln Ala Leu Leu Glu Val Val Ser Ala
1               5                   10                  15

Leu Val Ser Ile Leu Gly Ser Ser Ile Gly Gln Ile Asn
                20                  25              30

<210> SEQ ID NO 3
<211> LENGTH: 21
<212> TYPE: PRT
<213> ORGANISM: Araneus diadematus

<400> SEQUENCE: 3

Ser Gly Cys Asp Val Leu Val Gln Ala Leu Leu Glu Val Val Ser Ala
1               5                   10                  15

Leu Val Ser Ile Leu
                20

<210> SEQ ID NO 4
<211> LENGTH: 1154
<212> TYPE: PRT
<213> ORGANISM: Artificial Sequence
<220> FEATURE:
<223> OTHER INFORMATION: Synthetic sequence, recombinant spider silk
      protein ADF3KaiLargeNRSH1

<400> SEQUENCE: 4

Met His His His His His His His His Ser Ser Gly Ser Ser
1               5                   10                  15

Leu Glu Val Leu Phe Gln Gly Pro Ala Arg Ala Gly Ser Gly Gln Gln
                20                  25                  30

Gly Pro Gly Gln Gln Gly Pro Gly Gln Gln Gly Pro Gly Gln Gln Gly
            35                  40                  45

Pro Tyr Gly Pro Gly Ala Ser Ala Ala Ala Ala Ala Gly Gly Tyr
    50                  55                  60

Gly Pro Gly Ser Gly Gln Gln Gly Pro Ser Gln Gln Gly Pro Gly Gln
65                  70                  75                  80

Gln Gly Pro Gly Gly Gln Gly Pro Tyr Gly Pro Gly Ala Ser Ala Ala
                85                  90                  95

Ala Ala Ala Ala Gly Gly Tyr Gly Pro Gly Ser Gly Gln Gln Gly Pro
                100                 105                 110

Gly Gly Gln Gly Pro Tyr Gly Pro Gly Ser Ser Ala Ala Ala Ala Ala
            115                 120                 125

Ala Gly Gly Asn Gly Pro Gly Ser Gly Gln Gln Gly Ala Gly Gln Gln
            130                 135                 140
```

Gly Pro Gly Gln Gln Gly Pro Gly Ala Ser Ala Ala Ala Ala Ala
145                 150                 155                 160

Gly Gly Tyr Gly Pro Gly Ser Gly Gln Gln Gly Pro Gly Gln Gln Gly
            165                 170                 175

Pro Gly Gly Gln Gly Pro Tyr Gly Pro Gly Ala Ser Ala Ala Ala
            180                 185                 190

Ala Ala Gly Gly Tyr Gly Pro Gly Ser Gly Gln Gly Pro Gly Gln Gln
        195                 200                 205

Gly Pro Gly Gly Gln Gly Pro Tyr Gly Pro Gly Ala Ser Ala Ala Ala
    210                 215                 220

Ala Ala Ala Gly Gly Tyr Gly Pro Gly Ser Gly Gln Gln Gly Pro Gly
225             230                 235                 240

Gln Gln Gly Pro Gly Gln Gly Pro Gly Gln Gly Pro Tyr Gly
            245                 250                 255

Pro Gly Ala Ser Ala Ala Ala Ala Ala Gly Gly Tyr Gly Pro Gly
            260                 265                 270

Tyr Gly Gln Gln Gly Pro Gly Gln Gln Gly Pro Gly Gln Gly Pro
        275                 280                 285

Tyr Gly Pro Gly Ala Ser Ala Ala Ser Ala Ala Ser Gly Gly Tyr Gly
    290                 295                 300

Pro Gly Ser Gly Gln Gln Gly Pro Gly Gln Gln Gly Pro Gly Gly Gln
305                 310                 315                 320

Gly Pro Tyr Gly Pro Gly Ala Ser Ala Ala Ala Ala Ala Gly Gly
            325                 330                 335

Tyr Gly Pro Gly Ser Gly Gln Gln Gly Pro Gly Gln Gln Gly Pro Gly
            340                 345                 350

Gln Gln Gly Pro Gly Gln Gln Gly Pro Gly Gln Gly Pro Tyr Gly
        355                 360                 365

Pro Gly Ala Ser Ala Ala Ala Ala Ala Gly Gly Tyr Gly Pro Gly
    370                 375                 380

Ser Gly Gln Gln Gly Pro Gly Gln Gln Gly Pro Gly Gln Gln Gly Pro
385                 390                 395                 400

Gly Gln Gln Gly Pro Gly Gln Gln Gly Pro Gly Gln Gln Gly Pro Gly
            405                 410                 415

Gln Gln Gly Pro Gly Gln Gln Gly Pro Gly Gln Gln Gly Pro Gly Gly
        420                 425                 430

Gln Gly Ala Tyr Gly Pro Gly Ala Ser Ala Ala Ala Gly Ala Ala Gly
            435                 440                 445

Gly Tyr Gly Pro Gly Ser Gly Gln Gln Gly Pro Gly Gln Gln Gly Pro
    450                 455                 460

Gly Gln Gln Gly Pro Gly Gln Gln Gly Pro Gly Gln Gln Gly Pro Gly
465                 470                 475                 480

Gln Gln Gly Pro Gly Gln Gln Gly Pro Gly Gln Gln Gly Pro Tyr Gly
            485                 490                 495

Pro Gly Ala Ser Ala Ala Ala Ala Ala Gly Gly Tyr Gly Pro Gly
        500                 505                 510

Ser Gly Gln Gln Gly Pro Gly Gln Gln Gly Pro Gly Gln Gln Gly Pro
    515                 520                 525

Gly Gly Gln Gly Pro Tyr Gly Pro Gly Ala Ala Ser Ala Ala Val Ser
530                 535                 540

Val Ser Arg Ala Arg Ala Gly Ser Gly Gln Gln Gly Pro Gly Gln Gln
545                 550                 555                 560

-continued

Gly Pro Gly Gln Gln Gly Pro Gly Gln Gln Gly Pro Tyr Gly Pro Gly
              565                 570                 575

Ala Ser Ala Ala Ala Ala Ala Gly Gly Tyr Gly Pro Gly Ser Gly
        580                 585                 590

Gln Gln Gly Pro Ser Gln Gln Gly Pro Gly Gln Gln Gly Pro Gly Gly
            595                 600                 605

Gln Gly Pro Tyr Gly Pro Gly Ala Ser Ala Ala Ala Ala Ala Gly
        610                 615                 620

Gly Tyr Gly Pro Gly Ser Gly Gln Gln Gly Pro Gly Gln Gln Gly Pro
625                 630                 635                 640

Tyr Gly Pro Gly Ser Ser Ala Ala Ala Ala Ala Gly Gly Asn Gly
            645                 650                 655

Pro Gly Ser Gly Gln Gln Gly Ala Gly Gln Gln Gly Pro Gly Gln Gln
        660                 665                 670

Gly Pro Gly Ala Ser Ala Ala Ala Ala Ala Gly Gly Tyr Gly Pro
        675                 680                 685

Gly Ser Gly Gln Gln Gly Pro Gly Gln Gln Gly Pro Gly Gly Gln Gly
    690                 695                 700

Pro Tyr Gly Pro Gly Ala Ser Ala Ala Ala Ala Ala Gly Gly Tyr
705                 710                 715                 720

Gly Pro Gly Ser Gly Gln Gly Pro Gln Gln Gly Pro Gly Gln
            725                 730                 735

Gly Pro Tyr Gly Pro Gly Ala Ser Ala Ala Ala Ala Ala Gly Gly
            740                 745                 750

Tyr Gly Pro Gly Ser Gly Gln Gln Gly Pro Gly Gln Gln Gly Pro Gly
    755                 760                 765

Gln Gln Gly Pro Gly Gly Gln Gly Pro Tyr Gly Pro Gly Ala Ser Ala
        770                 775                 780

Ala Ala Ala Ala Gly Gly Tyr Gly Pro Gly Tyr Gly Gln Gln Gly
785                 790                 795                 800

Pro Gly Gln Gln Gly Pro Gly Gln Gly Pro Tyr Gly Pro Gly Ala
            805                 810                 815

Ser Ala Ala Ser Ala Ala Ser Gly Gly Tyr Gly Pro Gly Ser Gly Gln
        820                 825                 830

Gln Gly Pro Gly Gln Gln Gly Pro Gly Gly Gln Gly Pro Tyr Gly Pro
            835                 840                 845

Gly Ala Ser Ala Ala Ala Ala Ala Gly Gly Tyr Gly Pro Gly Ser
    850                 855                 860

Gly Gln Gln Gly Pro Gly Gln Gln Gly Pro Gly Gln Gln Gly Pro Gly
865                 870                 875                 880

Gln Gln Gly Pro Gly Gly Gln Gly Pro Tyr Gly Pro Gly Ala Ser Ala
            885                 890                 895

Ala Ala Ala Ala Gly Gly Tyr Gly Pro Gly Ser Gly Gln Gln Gly
        900                 905                 910

Pro Gly Gln Gln Gly Pro Gly Gln Gln Gly Pro Gly Gln Gln Gly Pro
    915                 920                 925

Gly Gln Gln Gly Pro Gly Gln Gln Gly Pro Gly Gln Gln Gly Pro Gly
930                 935                 940

Gln Gln Gly Pro Gly Gln Gln Gly Pro Gly Gln Gly Ala Tyr Gly
945                 950                 955                 960

Pro Gly Ala Ser Ala Ala Ala Gly Ala Ala Gly Gly Tyr Gly Pro Gly
            965                 970                 975

Ser Gly Gln Gln Gly Pro Gly Gln Gln Gly Pro Gly Gln Gln Gly Pro

```
              980             985             990
Gly Gln Gln Gly Pro Gly Gln Gln  Gly Pro Gly Gln Gln  Gly Pro Gly
                 995            1000             1005

Gln Gln  Gly Pro Gly Gln Gln  Gly Pro Tyr Gly Pro  Gly Ala Ser
    1010             1015                 1020

Ala Ala  Ala Ala Ala Ala Gly  Gly Tyr Gly Pro Gly  Ser Gly Gln
    1025             1030                 1035

Gln Gly  Pro Gly Gln Gln Gly  Pro Gly Gln Gln Gly  Pro Gly Gly
    1040             1045                 1050

Gln Gly  Pro Tyr Gly Pro Gly  Ala Ala Ser Ala Ala  Val Ser Val
    1055             1060                 1065

Gly Gly  Tyr Gly Pro Gln Ser  Ser Ser Val Pro Val  Ala Ser Ala
    1070             1075                 1080

Val Ala  Ser Arg Leu Ser Ser  Pro Ala Ala Ser Ser  Arg Val Ser
    1085             1090                 1095

Ser Ala  Val Ser Ser Leu Val  Ser Ser Gly Pro Thr  Lys His Ala
    1100             1105                 1110

Ala Leu  Ser Asn Thr Ile Ser  Ser Val Val Ser Gln  Val Ser Ala
    1115             1120                 1125

Ser Asn  Pro Gly Leu Ser Gly  Cys Asp Val Leu Val  Gln Ala Leu
    1130             1135                 1140

Leu Glu  Val Val Ser Ala Leu  Val Ser Ile Leu
    1145             1150

<210> SEQ ID NO 5
<211> LENGTH: 24
<212> TYPE: PRT
<213> ORGANISM: Artificial Sequence
<220> FEATURE:
<223> OTHER INFORMATION: Synthetic sequence, His tag and start codon

<400> SEQUENCE: 5

Met His His His His His His His His His Ser Ser Gly Ser Ser
1               5                   10                  15

Leu Glu Val Leu Phe Gln Gly Pro
                20

<210> SEQ ID NO 6
<211> LENGTH: 597
<212> TYPE: PRT
<213> ORGANISM: Artificial Sequence
<220> FEATURE:
<223> OTHER INFORMATION: Synthetic sequence, Met-PRT380

<400> SEQUENCE: 6

Met Gly Pro Gly Gln Gln Gly Pro Tyr Gly Pro Gly Ala Ser Ala Ala
1               5                   10                  15

Ala Ala Ala Gly Gln Asn Gly Pro Gly Ser Gly Gln Gln Gly Pro Gly
                20                  25                  30

Gln Ser Ala Ala Ala Ala Ala Gly Gln Tyr Gly Pro Gly Gln Gln Gly
        35                  40                  45

Pro Gly Gln Gln Gly Pro Gly Ser Ser Ala Ala Ala Ala Gly Pro
    50                  55                  60

Gly Gln Tyr Gly Pro Gly Gln Gln Gly Pro Ser Ala Ser Ala Ala Ala
65                  70                  75                  80

Ala Ala Gly Pro Gly Ser Gly Gln Gln Gly Pro Gly Ala Ser Ala Ala
                85                  90                  95
```

Ala Ala Ala Gly Gln Tyr Gly Pro Gly Gln Gln Gly Pro Gly Gln Gln
                100                 105                 110

Gly Pro Gly Ser Ser Ala Ala Ala Ala Gly Gln Tyr Gly Ser Gly
            115                 120                 125

Pro Gly Gln Gln Gly Pro Tyr Gly Ser Ala Ala Ala Ala Gly Pro
            130                 135                 140

Gly Ser Gly Gln Tyr Gly Gln Gly Pro Tyr Gly Pro Gly Ala Ser Ala
145                 150                 155                 160

Ala Ala Ala Ala Gly Pro Gly Gln Tyr Gly Pro Gly Gln Gln Gly Pro
                165                 170                 175

Ser Ala Ser Ala Ala Ala Ala Gly Ser Gly Gln Gln Gly Pro Gly
            180                 185                 190

Gln Tyr Gly Pro Tyr Ala Ser Ala Ala Ala Ala Gly Gln Tyr Gly
            195                 200                 205

Ser Gly Pro Gly Gln Gln Gly Pro Tyr Gly Pro Gly Gln Ser Ala Ala
            210                 215                 220

Ala Ala Ala Gly Ser Gly Gln Gln Gly Pro Gly Gln Gln Gly Pro Tyr
225                 230                 235                 240

Ala Ser Ala Ala Ala Ala Gly Pro Gly Gln Gln Gly Pro Tyr Gly
            245                 250                 255

Pro Gly Ser Ser Ala Ala Ala Ala Gly Gln Tyr Gly Tyr Gly Pro
            260                 265                 270

Gly Gln Gln Gly Pro Tyr Gly Pro Gly Ala Ser Ala Ala Ala Ala
            275                 280                 285

Gly Gln Asn Gly Pro Gly Ser Gly Gln Tyr Gly Pro Gly Gln Gln Gly
            290                 295                 300

Pro Gly Gln Ser Ala Ala Ala Ala Gly Pro Gly Gln Gln Gly Pro
305                 310                 315                 320

Tyr Gly Pro Gly Ala Ser Ala Ala Ala Gly Gln Tyr Gly Pro
            325                 330                 335

Gly Gln Gln Gly Pro Gly Gln Tyr Gly Pro Gly Ser Ser Ala Ala Ala
            340                 345                 350

Ala Ala Gly Pro Gly Gln Gln Gly Pro Tyr Gly Pro Gly Ser Ser Ala
            355                 360                 365

Ala Ala Ala Gly Gln Tyr Gly Pro Gly Gln Gln Gly Pro Tyr Gly
370                 375                 380

Pro Gly Gln Ser Ala Ala Ala Ala Gly Gln Tyr Gln Gln Gly Pro
385                 390                 395                 400

Gly Gln Gln Gly Pro Tyr Gly Pro Gly Ala Ser Ala Ala Ala Ala
            405                 410                 415

Gly Pro Gly Gln Gln Gly Pro Tyr Gly Pro Gly Ala Ser Ala Ala Ala
            420                 425                 430

Ala Ala Gly Pro Gly Gln Tyr Gly Pro Gly Gln Gln Gly Pro Ser Ala
            435                 440                 445

Ser Ala Ala Ala Ala Gly Gln Tyr Gly Ser Gly Pro Gly Gln Tyr
            450                 455                 460

Gly Pro Tyr Gly Pro Gly Gln Ser Ala Ala Ala Ala Gly Pro Gly
465                 470                 475                 480

Ser Gly Gln Gln Gly Gly Pro Tyr Gly Pro Gly Ala Ser Ala Ala
            485                 490                 495

Ala Ala Ala Gly Gln Tyr Gly Pro Gly Gln Gln Gly Pro Tyr Gly Pro
            500                 505                 510

Gly Gln Ser Ala Ala Ala Ala Ala Gly Pro Gly Ser Gly Gln Tyr Gly

```
            515                 520                 525
Pro Gly Ala Ser Ala Ala Ala Ala Gly Gln Asn Gly Pro Gly Ser
            530                 535                 540
Gly Gln Tyr Gly Pro Gly Gln Gly Pro Gln Ser Ala Ala Ala
545                 550                 555                 560
Ala Ala Gly Gln Tyr Gln Gly Pro Gln Gly Pro Tyr Gly
                565                 570                 575
Pro Gly Ala Ser Ala Ala Ala Ala Gly Pro Gly Ser Gly Gln Gln
            580                 585                 590
Gly Pro Gly Ala Ser
        595

<210> SEQ ID NO 7
<211> LENGTH: 590
<212> TYPE: PRT
<213> ORGANISM: Artificial Sequence
<220> FEATURE:
<223> OTHER INFORMATION: Synthetic sequence, Met-PRT410

<400> SEQUENCE: 7

Met Gly Pro Gly Gln Gln Gly Pro Tyr Gly Pro Gly Ala Ser Ala
1               5                   10                  15
Ala Ala Ala Gly Gln Asn Gly Pro Gly Ser Gly Gln Gln Gly Pro Gly
            20                  25                  30
Gln Ser Gly Gln Tyr Gly Pro Gly Gln Gly Pro Gly Gln Gln Gly
            35                  40                  45
Pro Gly Ser Ser Ala Ala Ala Ala Gly Pro Gly Gln Tyr Gly Pro
50                  55                  60
Gly Gln Gln Gly Pro Ser Ala Ser Ala Ala Ala Ala Gly Pro Gly
65                  70                  75                  80
Ser Gly Gln Gln Gly Pro Gly Ala Ser Gly Gln Tyr Gly Pro Gly Gln
                85                  90                  95
Gln Gly Pro Gly Gln Gln Gly Pro Gly Ser Ser Ala Ala Ala Ala
            100                 105                 110
Gly Gln Tyr Gly Ser Gly Pro Gly Gln Gln Gly Pro Tyr Gly Ser Ala
            115                 120                 125
Ala Ala Ala Ala Gly Pro Gly Ser Gly Gln Tyr Gly Gln Gly Pro Tyr
            130                 135                 140
Gly Pro Gly Ala Ser Gly Pro Gly Gln Tyr Gly Pro Gly Gln Gln Gly
145                 150                 155                 160
Pro Ser Ala Ser Ala Ala Ala Ala Gly Ser Gly Gln Gln Gly Pro
                165                 170                 175
Gly Gln Tyr Gly Pro Tyr Ala Ser Ala Ala Ala Ala Gly Gln Tyr
            180                 185                 190
Gly Ser Gly Pro Gly Gln Gln Gly Pro Tyr Gly Pro Gly Gln Ser Gly
            195                 200                 205
Ser Gly Gln Gln Gly Pro Gly Gln Gln Gly Pro Tyr Ala Ser Ala Ala
            210                 215                 220
Ala Ala Ala Gly Pro Gly Gln Gln Gly Pro Tyr Gly Pro Gly Ser Ser
225                 230                 235                 240
Ala Ala Ala Ala Gly Gln Tyr Gly Tyr Gly Pro Gly Gln Gln Gly
                245                 250                 255
Pro Tyr Gly Pro Gly Ala Ser Gly Gln Asn Gly Pro Gly Ser Gly Gln
            260                 265                 270
Tyr Gly Pro Gly Gln Gln Gly Pro Gly Gln Ser Ala Ala Ala Ala Ala
```

```
                275                 280                 285
Gly Pro Gly Gln Gln Gly Pro Tyr Gly Pro Gly Ala Ser Ala Ala Ala
            290                 295                 300
Ala Ala Gly Gln Tyr Gly Pro Gly Gln Gln Gly Pro Gly Gln Tyr Gly
305                 310                 315                 320
Pro Gly Ser Ser Gly Pro Gly Gln Gln Gly Pro Tyr Gly Pro Gly Ser
                325                 330                 335
Ser Ala Ala Ala Ala Gly Gln Tyr Gly Pro Gly Gln Gln Gly Pro
            340                 345                 350
Tyr Gly Pro Gly Gln Ser Ala Ala Ala Gly Gln Tyr Gln Gln
                355                 360                 365
Gly Pro Gly Gln Gln Gly Pro Tyr Gly Pro Gly Ala Ser Gly Pro Gly
            370                 375                 380
Gln Gln Gly Pro Tyr Gly Pro Gly Ala Ser Ala Ala Ala Ala Gly
385                 390                 395                 400
Pro Gly Gln Tyr Gly Pro Gly Gln Gln Gly Pro Ser Ala Ser Ala Ala
                405                 410                 415
Ala Ala Ala Gly Gln Tyr Gly Ser Gly Pro Gly Gln Tyr Gly Pro Tyr
            420                 425                 430
Gly Pro Gly Gln Ser Gly Pro Gly Ser Gly Gln Gln Gly Gln Gly Pro
                435                 440                 445
Tyr Gly Pro Gly Ala Ser Ala Ala Ala Ala Gly Gln Tyr Gly Pro
450                 455                 460
Gly Gln Gln Gly Pro Tyr Gly Pro Gly Gln Ser Ala Ala Ala Ala
465                 470                 475                 480
Gly Pro Gly Ser Gly Gln Tyr Gly Pro Gly Ala Ser Gly Gln Asn Gly
                485                 490                 495
Pro Gly Ser Gly Gln Tyr Gly Pro Gly Gln Gly Pro Gly Gln Ser
                500                 505                 510
Ala Ala Ala Ala Gly Gln Tyr Gln Gln Gly Pro Gly Gln Gln Gly
            515                 520                 525
Pro Tyr Gly Pro Gly Ala Ser Ala Ala Ala Ala Gly Gln Tyr Gly
            530                 535                 540
Ser Gly Pro Gly Gln Gln Gly Pro Tyr Gly Pro Gly Gln Ser Gly Ser
545                 550                 555                 560
Gly Gln Gln Gly Pro Gly Gln Gly Pro Tyr Ala Ser Ala Ala Ala
                565                 570                 575
Ala Ala Gly Pro Gly Ser Gly Gln Gln Gly Pro Gly Ala Ser
            580                 585                 590

<210> SEQ ID NO 8
<211> LENGTH: 565
<212> TYPE: PRT
<213> ORGANISM: Artificial Sequence
<220> FEATURE:
<223> OTHER INFORMATION: Synthetic sequence, Met-PRT525

<400> SEQUENCE: 8

Met Gly Pro Gly Gln Gln Gly Pro Tyr Gly Pro Gly Ala Ser Ala Ala
1               5                   10                  15
Ala Ala Ala Ala Ala Gly Ser Asn Gly Pro Gly Ser Gly Gln Gln Gly
                20                  25                  30
Pro Gly Gln Ser Gly Gln Tyr Gly Pro Gly Gln Gln Gly Pro Gly Gln
            35                  40                  45
Gln Gly Pro Gly Ser Ser Ala Ala Ala Ala Ala Ala Gly Pro Gly
```

```
            50                  55                  60
Gln Tyr Gly Pro Gly Gln Gly Pro Ser Ala Ser Ala Ala Ala Ala
 65                  70                  75                  80

Ala Ala Ala Gly Pro Gly Ser Gly Gln Gln Gly Pro Gly Ala Ser Gly
                 85                  90                  95

Gln Tyr Gly Pro Gly Gln Gln Gly Pro Gly Gln Gln Gly Pro Gly Ser
                100                 105                 110

Ser Ala Ala Ala Ala Ala Ala Gly Ser Tyr Gly Ser Gly Pro Gly
         115                 120                 125

Gln Gln Gly Pro Tyr Gly Ser Ala Ala Ala Ala Ala Ala Gly Pro
130                 135                 140

Gly Ser Gly Gln Tyr Gly Gln Gly Pro Tyr Gly Pro Gly Ala Ser Gly
145                 150                 155                 160

Pro Gly Gln Tyr Gly Pro Gly Gln Gln Gly Pro Ser Ala Ser Ala Ala
                165                 170                 175

Ala Ala Ala Ala Ala Gly Ser Gly Gln Gln Gly Pro Gly Gln Tyr Gly
            180                 185                 190

Pro Tyr Ala Ser Ala Ala Ala Ala Ala Ala Gly Ser Tyr Gly Ser
        195                 200                 205

Gly Pro Gly Gln Gln Gly Pro Tyr Gly Pro Gly Ser Gly Ser Gly
210                 215                 220

Gln Gln Gly Pro Gly Gln Gln Gly Pro Tyr Ala Ser Ala Ala Ala Ala
225                 230                 235                 240

Ala Ala Ala Gly Pro Gly Gln Gln Gly Pro Tyr Gly Pro Gly Ser Ser
                245                 250                 255

Ala Ala Ala Ala Ala Ala Ala Gly Ser Tyr Gly Tyr Gly Pro Gly Gln
            260                 265                 270

Gln Gly Pro Tyr Gly Pro Gly Ala Ser Gly Gln Asn Gly Pro Gly Ser
        275                 280                 285

Gly Gln Tyr Gly Pro Gly Gln Gln Gly Pro Gly Ser Ala Ala Ala
        290                 295                 300

Ala Ala Ala Ala Gly Pro Gly Gln Gln Gly Pro Tyr Gly Pro Gly Ala
305                 310                 315                 320

Ser Ala Ala Ala Ala Ala Ala Gly Ser Tyr Gly Pro Gly Gln Gln
        325                 330                 335

Gly Pro Gly Gln Tyr Gly Pro Gly Ser Ser Gly Pro Gly Gln Gln Gly
            340                 345                 350

Pro Tyr Gly Pro Gly Ser Ser Ala Ala Ala Ala Ala Ala Gly Ser
        355                 360                 365

Tyr Gly Pro Gly Gln Gln Gly Pro Tyr Gly Pro Gly Pro Ser Ala Ala
        370                 375                 380

Ala Ala Ala Ala Ala Gly Ser Tyr Gln Gln Gly Pro Gly Gln Gln Gly
385                 390                 395                 400

Pro Tyr Gly Pro Gly Ala Ser Gly Pro Gly Gln Gln Gly Pro Tyr Gly
                405                 410                 415

Pro Gly Ala Ser Ala Ala Ala Ala Ala Ala Gly Pro Gly Gln Tyr
        420                 425                 430

Gly Pro Gly Gln Gln Gly Pro Ser Ala Ser Ala Ala Ala Ala Ala
        435                 440                 445

Ala Gly Ser Tyr Gly Ser Gly Pro Gly Gln Tyr Gly Pro Tyr Gly Pro
        450                 455                 460

Gly Gln Ser Gly Pro Gly Ser Gly Gln Gln Gly Gln Gly Pro Tyr Gly
465                 470                 475                 480
```

-continued

Pro Gly Ala Ser Ala Ala Ala Ala Ala Gly Ser Tyr Gly Pro
                485                 490                 495

Gly Gln Gln Gly Pro Tyr Gly Pro Gly Pro Ser Ala Ala Ala Ala
            500                 505                 510

Ala Ala Gly Pro Gly Ser Gly Gln Tyr Gly Pro Gly Ala Ser Gly Gln
            515                 520                 525

Asn Gly Pro Gly Ser Gly Gln Tyr Gly Pro Gly Gln Gln Pro Gly
            530                 535                 540

Pro Ser Ala Ala Ala Ala Ala Ala Gly Pro Gly Ser Gln Gln
545                 550                 555                 560

Gly Pro Gly Ala Ser
            565

<210> SEQ ID NO 9
<211> LENGTH: 2364
<212> TYPE: PRT
<213> ORGANISM: Artificial Sequence
<220> FEATURE:
<223> OTHER INFORMATION: Synthetic sequence, Met-PRT799

<400> SEQUENCE: 9

Met Gly Pro Gly Gln Gln Gly Pro Tyr Gly Pro Gly Ala Ser Ala Ala
1               5                   10                  15

Ala Ala Ala Gly Gln Asn Gly Pro Gly Ser Gln Gln Gly Pro Gly
            20                  25                  30

Gln Ser Gly Gln Tyr Gly Pro Gly Gln Gln Gly Pro Gly Gln Gln Gly
        35                  40                  45

Pro Gly Ser Ser Ala Ala Ala Ala Gly Pro Gly Gln Tyr Gly Pro
50                  55                  60

Gly Gln Gln Gly Pro Ser Ala Ser Ala Ala Ala Ala Gly Pro Gly
65                  70                  75                  80

Ser Gly Gln Gln Gly Pro Gly Ala Ser Gly Gln Tyr Gly Pro Gly Gln
            85                  90                  95

Gln Gly Pro Gly Gln Gln Gly Pro Ser Ser Ala Ala Ala Ala
        100                 105                 110

Gly Gln Tyr Gly Ser Gly Pro Gly Gln Gln Gly Pro Tyr Gly Ser Ala
        115                 120                 125

Ala Ala Ala Ala Gly Pro Gly Ser Gly Gln Tyr Gly Gln Gly Pro Tyr
            130                 135                 140

Gly Pro Gly Ala Ser Gly Pro Gly Gln Tyr Gly Pro Gly Gln Gln Gly
145                 150                 155                 160

Pro Ser Ala Ser Ala Ala Ala Ala Gly Ser Gly Gln Gln Gly Pro
            165                 170                 175

Gly Gln Tyr Gly Pro Tyr Ala Ser Ala Ala Ala Ala Gly Gln Tyr
        180                 185                 190

Gly Ser Gly Pro Gly Gln Gln Gly Pro Tyr Gly Pro Gly Gln Ser Gly
        195                 200                 205

Ser Gly Gln Gln Gly Pro Gly Gln Gln Gly Pro Tyr Ala Ser Ala Ala
        210                 215                 220

Ala Ala Ala Gly Pro Gly Gln Gln Gly Pro Tyr Gly Pro Gly Ser Ser
225                 230                 235                 240

Ala Ala Ala Ala Ala Gly Gln Tyr Gly Tyr Gly Pro Gly Gln Gln Gly
            245                 250                 255

Pro Tyr Gly Pro Gly Ala Ser Gly Gln Asn Gly Pro Gly Ser Gly Gln
        260                 265                 270

Tyr Gly Pro Gly Gln Gln Gly Pro Gln Ser Ala Ala Ala Ala
    275                 280             285

Gly Pro Gly Gln Gln Gly Pro Tyr Gly Pro Gly Ala Ser Ala Ala Ala
        290                 295             300

Ala Ala Gly Gln Tyr Gly Pro Gly Gln Gln Gly Pro Gly Gln Tyr Gly
305             310                 315                 320

Pro Gly Ser Ser Gly Pro Gly Gln Gln Gly Pro Tyr Gly Pro Gly Ser
            325                 330                 335

Ser Ala Ala Ala Ala Ala Gly Gln Tyr Gly Pro Gly Gln Gln Gly Pro
            340                 345                 350

Tyr Gly Pro Gly Gln Ser Ala Ala Ala Ala Gly Gln Tyr Gln Gln
        355                 360                 365

Gly Pro Gly Gln Gln Gly Pro Tyr Gly Pro Gly Ala Ser Gly Pro Gly
    370                 375                 380

Gln Gln Gly Pro Tyr Gly Pro Gly Ala Ser Ala Ala Ala Ala Gly
385             390                 395                 400

Pro Gly Gln Tyr Gly Pro Gly Gln Gly Pro Ser Ala Ser Ala Ala
            405                 410                 415

Ala Ala Ala Gly Gln Tyr Gly Ser Gly Pro Gly Gln Tyr Gly Pro Tyr
        420                 425                 430

Gly Pro Gly Gln Ser Gly Pro Gly Ser Gly Gln Gln Gly Gln Gly Pro
        435                 440                 445

Tyr Gly Pro Gly Ala Ser Ala Ala Ala Ala Gly Gln Tyr Gly Pro
        450                 455                 460

Gly Gln Gln Gly Pro Tyr Gly Pro Gly Gln Ser Ala Ala Ala Ala Ala
465             470                 475                 480

Gly Pro Gly Ser Gly Gln Tyr Gly Pro Gly Ala Ser Gly Gln Asn Gly
            485                 490                 495

Pro Gly Ser Gly Gln Tyr Gly Pro Gly Gln Gln Gly Pro Gly Gln Ser
            500                 505                 510

Ala Ala Ala Ala Gly Gln Tyr Gln Gln Gly Pro Gly Gln Gln Gly
        515                 520                 525

Pro Tyr Gly Pro Gly Ala Ser Ala Ala Ala Ala Gly Gln Tyr Gly
    530                 535                 540

Ser Gly Pro Gly Gln Gln Gly Pro Tyr Gly Pro Gly Gln Ser Gly Ser
545                 550                 555                 560

Gly Gln Gln Gly Pro Gly Gln Gly Pro Tyr Ala Ser Ala Ala
            565                 570                 575

Ala Ala Gly Pro Gly Ser Gly Gln Gln Gly Pro Gly Ala Ser Gly Gln
        580                 585                 590

Gln Gly Pro Tyr Gly Pro Gly Ala Ser Ala Ala Ala Ala Gly Gln
    595                 600                 605

Asn Gly Pro Gly Ser Gly Gln Gln Gly Pro Gly Gln Ser Gly Gln Tyr
    610                 615                 620

Gly Pro Gly Gln Gln Gly Pro Gly Gln Gln Gly Pro Gly Ser Ser Ala
625                 630                 635                 640

Ala Ala Ala Gly Pro Gly Gln Tyr Gly Pro Gly Gln Gln Gly Pro
        645                 650                 655

Ser Ala Ser Ala Ala Ala Ala Gly Pro Gly Ser Gly Gln Gln Gly
        660                 665                 670

Pro Gly Ala Ser Gly Gln Tyr Gly Pro Gly Gln Gln Gly Pro Gly Gln
        675                 680                 685

Gln Gly Pro Gly Ser Ser Ala Ala Ala Ala Gln Tyr Gly Ser
690                 695                 700

Gly Pro Gly Gln Gly Pro Tyr Gly Ser Ala Ala Ala Ala Gly
705                 710                 715                 720

Pro Gly Ser Gly Gln Tyr Gly Gln Gly Pro Tyr Gly Pro Gly Ala Ser
                725                 730                 735

Gly Pro Gly Gln Tyr Gly Pro Gly Gln Gly Pro Ser Ala Ser Ala
                740                 745                 750

Ala Ala Ala Ala Gly Ser Gly Gln Gln Gly Pro Gly Tyr Gly Pro
            755                 760                 765

Tyr Ala Ser Ala Ala Ala Ala Gly Gln Tyr Gly Ser Gly Pro Gly
770                 775                 780

Gln Gln Gly Pro Tyr Gly Pro Gly Gln Ser Gly Ser Gly Gln Gln Gly
785                 790                 795                 800

Pro Gly Gln Gln Gly Pro Tyr Ala Ser Ala Ala Ala Ala Gly Pro
                805                 810                 815

Gly Gln Gln Gly Pro Tyr Gly Pro Gly Ser Ser Ala Ala Ala Ala
                820                 825                 830

Gly Gln Tyr Gly Tyr Gly Pro Gly Gln Gln Gly Pro Tyr Gly Pro Gly
                835                 840                 845

Ala Ser Gly Gln Asn Gly Pro Gly Ser Gly Gln Tyr Gly Pro Gly Gln
850                 855                 860

Gln Gly Pro Gly Gln Ser Ala Ala Ala Ala Gly Pro Gly Gln Gln
865                 870                 875                 880

Gly Pro Tyr Gly Pro Gly Ala Ser Ala Ala Ala Ala Gly Gln Tyr
                885                 890                 895

Gly Pro Gly Gln Gln Gly Pro Gly Gln Tyr Gly Pro Gly Ser Ser Gly
                900                 905                 910

Pro Gly Gln Gln Gly Pro Tyr Gly Pro Gly Ser Ser Ala Ala Ala
                915                 920                 925

Ala Gly Gln Tyr Gly Pro Gly Gln Gln Gly Pro Tyr Gly Pro Gly Gln
            930                 935                 940

Ser Ala Ala Ala Ala Ala Gly Gln Tyr Gln Gln Gly Pro Gly Gln Gln
945                 950                 955                 960

Gly Pro Tyr Gly Pro Gly Ala Ser Gly Pro Gly Gln Gln Gly Pro Tyr
                965                 970                 975

Gly Pro Gly Ala Ser Ala Ala Ala Ala Gly Pro Gly Gln Tyr Gly
                980                 985                 990

Pro Gly Gln Gln Gly Pro Ser Ala Ser Ala Ala Ala Ala Gly Gln
                995                 1000                1005

Tyr Gly Ser Gly Pro Gly Gln Tyr Gly Pro Tyr Gly Pro Gly Gln
1010                1015                1020

Ser Gly Pro Gly Ser Gly Gln Gln Gly Gln Gly Pro Tyr Gly Pro
1025                1030                1035

Gly Ala Ser Ala Ala Ala Ala Gly Gln Tyr Gly Pro Gly Gln
1040                1045                1050

Gln Gly Pro Tyr Gly Pro Gly Gln Ser Ala Ala Ala Ala Ala Gly
1055                1060                1065

Pro Gly Ser Gly Gln Tyr Gly Pro Gly Ala Ser Gly Gln Asn Gly
1070                1075                1080

Pro Gly Ser Gly Gln Tyr Gly Pro Gly Gln Gln Gly Pro Gly Gln
1085                1090                1095

Ser Ala Ala Ala Ala Ala Gly Gln Tyr Gln Gln Gly Pro Gly Gln

```
            1100                1105                1110

Gln Gly Pro Tyr Gly Pro Gly Ala Ser Ala Ala Ala Ala Gly
    1115                1120                1125

Gln Tyr Gly Ser Gly Pro Gly Gln Gln Gly Pro Tyr Gly Pro Gly
    1130                1135                1140

Gln Ser Gly Ser Gly Gln Gln Gly Pro Gly Gln Gln Gly Pro Tyr
    1145                1150                1155

Ala Ser Ala Ala Ala Ala Ala Gly Pro Gly Ser Gly Gln Gln Gly
    1160                1165                1170

Pro Gly Ala Ser Gly Gln Gln Gly Pro Tyr Gly Pro Gly Ala Ser
    1175                1180                1185

Ala Ala Ala Ala Ala Gly Gln Asn Gly Pro Gly Ser Gly Gln Gln
    1190                1195                1200

Gly Pro Gly Gln Ser Gly Gln Tyr Gly Pro Gly Gln Gln Gly Pro
    1205                1210                1215

Gly Gln Gln Gly Pro Gly Ser Ser Ala Ala Ala Ala Gly Pro
    1220                1225                1230

Gly Gln Tyr Gly Pro Gly Gln Gln Gly Pro Ser Ala Ser Ala Ala
    1235                1240                1245

Ala Ala Ala Gly Pro Gly Ser Gly Gln Gln Gly Pro Gly Ala Ser
    1250                1255                1260

Gly Gln Tyr Gly Pro Gly Gln Gln Gly Pro Gly Gln Gln Gly Pro
    1265                1270                1275

Gly Ser Ser Ala Ala Ala Ala Gly Gln Tyr Gly Ser Gly Pro
    1280                1285                1290

Gly Gln Gln Gly Pro Tyr Gly Ser Ala Ala Ala Ala Gly Pro
    1295                1300                1305

Gly Ser Gly Gln Tyr Gly Gln Gly Pro Tyr Gly Pro Gly Ala Ser
    1310                1315                1320

Gly Pro Gly Gln Tyr Gly Pro Gly Gln Gln Gly Pro Ser Ala Ser
    1325                1330                1335

Ala Ala Ala Ala Ala Gly Ser Gly Gln Gln Gly Pro Gly Gln Tyr
    1340                1345                1350

Gly Pro Tyr Ala Ser Ala Ala Ala Ala Gly Gln Tyr Gly Ser
    1355                1360                1365

Gly Pro Gly Gln Gln Gly Pro Tyr Gly Pro Gly Gln Ser Gly Ser
    1370                1375                1380

Gly Gln Gln Gly Pro Gly Gln Gly Pro Tyr Ala Ser Ala Ala
    1385                1390                1395

Ala Ala Ala Gly Pro Gly Gln Gly Pro Tyr Gly Pro Gly Ser
    1400                1405                1410

Ser Ala Ala Ala Ala Gly Gln Tyr Gly Tyr Gly Pro Gly Gln
    1415                1420                1425

Gln Gly Pro Tyr Gly Pro Gly Ala Ser Gly Gln Asn Gly Pro Gly
    1430                1435                1440

Ser Gly Gln Tyr Gly Pro Gly Gln Gln Gly Pro Gly Gln Ser Ala
    1445                1450                1455

Ala Ala Ala Gly Pro Gly Gln Gln Gly Pro Tyr Gly Pro Gly
    1460                1465                1470

Ala Ser Ala Ala Ala Ala Gly Gln Tyr Gly Pro Gly Gln Gln
    1475                1480                1485

Gly Pro Gly Gln Tyr Gly Pro Gly Ser Ser Gly Pro Gly Gln Gln
    1490                1495                1500
```

```
Gly Pro Tyr Gly Pro Gly Ser Ser Ala Ala Ala Ala Gly Gln
    1505                1510                1515

Tyr Gly Pro Gly Gln Gln Gly Pro Tyr Gly Pro Gly Gln Ser Ala
    1520                1525                1530

Ala Ala Ala Ala Gly Gln Tyr Gln Gln Gly Pro Gly Gln Gln Gly
    1535                1540                1545

Pro Tyr Gly Pro Gly Ala Ser Gly Pro Gly Gln Gln Gly Pro Tyr
    1550                1555                1560

Gly Pro Gly Ala Ser Ala Ala Ala Ala Gly Pro Gly Gln Tyr
    1565                1570                1575

Gly Pro Gly Gln Gln Gly Pro Ser Ala Ser Ala Ala Ala Ala Ala
    1580                1585                1590

Gly Gln Tyr Gly Ser Gly Pro Gly Gln Tyr Gly Pro Tyr Gly Pro
    1595                1600                1605

Gly Gln Ser Gly Pro Gly Ser Gly Gln Gln Gly Gln Gly Pro Tyr
    1610                1615                1620

Gly Pro Gly Ala Ser Ala Ala Ala Ala Gly Gln Tyr Gly Pro
    1625                1630                1635

Gly Gln Gln Gly Pro Tyr Gly Pro Gly Gln Ser Ala Ala Ala Ala
    1640                1645                1650

Ala Gly Pro Gly Ser Gly Gln Tyr Gly Pro Gly Ala Ser Gly Gln
    1655                1660                1665

Asn Gly Pro Gly Ser Gly Gln Tyr Gly Pro Gly Gln Gln Gly Pro
    1670                1675                1680

Gly Gln Ser Ala Ala Ala Ala Ala Gly Gln Tyr Gln Gln Gly Pro
    1685                1690                1695

Gly Gln Gln Gly Pro Tyr Gly Pro Gly Ala Ser Ala Ala Ala Ala
    1700                1705                1710

Ala Gly Gln Tyr Gly Ser Gly Pro Gly Gln Gln Gly Pro Tyr Gly
    1715                1720                1725

Pro Gly Gln Ser Gly Ser Gly Gln Gln Gly Pro Gly Gln Gln Gly
    1730                1735                1740

Pro Tyr Ala Ser Ala Ala Ala Ala Ala Gly Pro Gly Ser Gly Gln
    1745                1750                1755

Gln Gly Pro Gly Ala Ser Gly Gln Gln Gly Pro Tyr Gly Pro Gly
    1760                1765                1770

Ala Ser Ala Ala Ala Ala Ala Gly Gln Asn Gly Pro Gly Ser Gly
    1775                1780                1785

Gln Gln Gly Pro Gly Gln Ser Gly Gln Tyr Gly Pro Gly Gln Gln
    1790                1795                1800

Gly Pro Gly Gln Gln Gly Pro Gly Ser Ser Ala Ala Ala Ala Ala
    1805                1810                1815

Gly Pro Gly Gln Tyr Gly Pro Gly Gln Gln Gly Pro Ser Ala Ser
    1820                1825                1830

Ala Ala Ala Ala Ala Gly Pro Gly Ser Gly Gln Gln Gly Pro Gly
    1835                1840                1845

Ala Ser Gly Gln Tyr Gly Pro Gly Gln Gln Gly Pro Gly Gln Gln
    1850                1855                1860

Gly Pro Gly Ser Ser Ala Ala Ala Ala Ala Gly Gln Tyr Gly Ser
    1865                1870                1875

Gly Pro Gly Gln Gln Gly Pro Tyr Gly Ser Ala Ala Ala Ala Ala
    1880                1885                1890
```

```
Gly Pro Gly Ser Gly Gln Tyr Gly Gln Gly Pro Tyr Gly Pro Gly
    1895                1900                1905

Ala Ser Gly Pro Gly Gln Tyr Gly Pro Gly Gln Gln Gly Pro Ser
    1910                1915                1920

Ala Ser Ala Ala Ala Ala Ala Gly Ser Gly Gln Gln Gly Pro Gly
    1925                1930                1935

Gln Tyr Gly Pro Tyr Ala Ser Ala Ala Ala Ala Gly Gln Tyr
    1940                1945                1950

Gly Ser Gly Pro Gly Gln Gln Gly Pro Tyr Gly Pro Gly Gln Ser
    1955                1960                1965

Gly Ser Gly Gln Gln Gly Pro Gly Gln Gln Gly Pro Tyr Ala Ser
    1970                1975                1980

Ala Ala Ala Ala Ala Gly Pro Gly Gln Gln Gly Pro Tyr Gly Pro
    1985                1990                1995

Gly Ser Ser Ala Ala Ala Ala Ala Gly Gln Tyr Gly Tyr Gly Pro
    2000                2005                2010

Gly Gln Gln Gly Pro Tyr Gly Pro Gly Ala Ser Gly Gln Asn Gly
    2015                2020                2025

Pro Gly Ser Gly Gln Tyr Gly Pro Gly Gln Gln Gly Pro Gly Gln
    2030                2035                2040

Ser Ala Ala Ala Ala Ala Gly Pro Gly Gln Gln Gly Pro Tyr Gly
    2045                2050                2055

Pro Gly Ala Ser Ala Ala Ala Ala Ala Gly Gln Tyr Gly Pro Gly
    2060                2065                2070

Gln Gln Gly Pro Gly Gln Tyr Gly Pro Gly Ser Ser Gly Pro Gly
    2075                2080                2085

Gln Gln Gly Pro Tyr Gly Pro Gly Ser Ser Ala Ala Ala Ala Ala
    2090                2095                2100

Gly Gln Tyr Gly Pro Gly Gln Gly Pro Tyr Gly Pro Gly Gln
    2105                2110                2115

Ser Ala Ala Ala Ala Ala Gly Gln Tyr Gln Gln Gly Pro Gly Gln
    2120                2125                2130

Gln Gly Pro Tyr Gly Pro Gly Ala Ser Gly Pro Gly Gln Gln Gly
    2135                2140                2145

Pro Tyr Gly Pro Gly Ala Ser Ala Ala Ala Ala Gly Pro Gly
    2150                2155                2160

Gln Tyr Gly Pro Gly Gln Gln Gly Pro Ser Ala Ser Ala Ala Ala
    2165                2170                2175

Ala Ala Gly Gln Tyr Gly Ser Gly Pro Gly Gln Tyr Gly Pro Tyr
    2180                2185                2190

Gly Pro Gly Gln Ser Gly Pro Gly Ser Gly Gln Gln Gly Gln Gly
    2195                2200                2205

Pro Tyr Gly Pro Gly Ala Ser Ala Ala Ala Ala Gly Gln Tyr
    2210                2215                2220

Gly Pro Gly Gln Gln Gly Pro Tyr Gly Pro Gly Gln Ser Ala Ala
    2225                2230                2235

Ala Ala Ala Gly Pro Gly Ser Gly Gln Tyr Gly Pro Gly Ala Ser
    2240                2245                2250

Gly Gln Asn Gly Pro Gly Ser Gly Gln Tyr Gly Pro Gly Gln Gln
    2255                2260                2265

Gly Pro Gly Gln Ser Ala Ala Ala Ala Ala Gly Gln Tyr Gln Gln
    2270                2275                2280

Gly Pro Gly Gln Gln Gly Pro Tyr Gly Pro Gly Ala Ser Ala Ala
```

```
                     2285                2290                2295

Ala Ala  Ala Gly Gln Tyr Gly  Ser Gly Pro Gly Gln  Gln Gly Pro
    2300                2305                2310

Tyr Gly Pro Gly Gln Ser Gly  Ser Gly Gln Gln Gly  Pro Gly Gln
    2315                2320                2325

Gln Gly  Pro Tyr Ala Ser Ala  Ala Ala Ala Gly  Pro Gly Ser
    2330                2335                2340

Gly Gln  Gln Gly Ser Ser Val  Asp Lys Leu Ala Ala  Ala Leu Glu
    2345                2350                2355

His His  His His His His
    2360

<210> SEQ ID NO 10
<211> LENGTH: 597
<212> TYPE: PRT
<213> ORGANISM: Artificial Sequence
<220> FEATURE:
<223> OTHER INFORMATION: Synthetic sequence, Met-PRT313

<400> SEQUENCE: 10

Met Gly Pro Gly Gly Gln Gly Pro Tyr Gly Pro Gly Ala Ser Ala Ala
1               5                   10                  15

Ala Ala Ala Gly Gly Asn Gly Pro Gly Ser Gly Gln Gln Gly Pro Gly
            20                  25                  30

Gly Ser Ala Ala Ala Ala Gly Gly Tyr Gly Pro Gly Gln Gly
        35                  40                  45

Pro Gly Gln Gln Gly Pro Gly Ser Ser Ala Ala Ala Ala Gly Pro
50                  55                  60

Gly Gly Tyr Gly Pro Gly Gln Gly Pro Ser Ala Ser Ala Ala
65                  70                  75                  80

Ala Ala Gly Pro Gly Ser Gly Gln Gln Gly Pro Gly Ala Ser Ala Ala
                85                  90                  95

Ala Ala Ala Gly Gly Tyr Gly Pro Gly Gly Gln Gly Pro Gly Gln Gln
                100                 105                 110

Gly Pro Gly Ser Ser Ala Ala Ala Ala Ala Gly Gly Tyr Gly Ser Gly
            115                 120                 125

Pro Gly Gln Gln Gly Pro Tyr Gly Ser Ala Ala Ala Ala Gly Pro
    130                 135                 140

Gly Ser Gly Gly Tyr Gly Gln Gly Pro Tyr Gly Pro Gly Ala Ser Ala
145                 150                 155                 160

Ala Ala Ala Gly Pro Gly Gly Tyr Gly Pro Gly Gly Gln Gly Pro
                165                 170                 175

Ser Ala Ser Ala Ala Ala Ala Gly Ser Gly Gln Gln Gly Pro Gly
            180                 185                 190

Gly Tyr Gly Pro Tyr Ala Ser Ala Ala Ala Ala Gly Gly Tyr Gly
        195                 200                 205

Ser Gly Pro Gly Gln Gln Gly Pro Tyr Gly Pro Gly Gly Ser Ala Ala
    210                 215                 220

Ala Ala Ala Gly Ser Gly Gln Gln Gly Pro Gly Gln Gln Gly Pro Tyr
225                 230                 235                 240

Ala Ser Ala Ala Ala Ala Gly Pro Gly Gly Gln Gly Pro Tyr Gly
                245                 250                 255

Pro Gly Ser Ser Ala Ala Ala Ala Gly Gly Tyr Gly Tyr Gly Pro
            260                 265                 270

Gly Gly Gln Gly Pro Tyr Gly Pro Gly Ala Ser Ala Ala Ala Ala Ala
```

-continued

```
                    275                 280                 285
Gly Gly Asn Gly Pro Gly Ser Gly Tyr Gly Pro Gly Gln Gln Gly
        290                 295                 300
Pro Gly Gly Ser Ala Ala Ala Ala Gly Pro Gly Gln Gly Pro
305                 310                 315                 320
Tyr Gly Pro Gly Ala Ser Ala Ala Ala Gly Gly Tyr Gly Pro
                325                 330                 335
Gly Gly Gln Gly Pro Gly Tyr Gly Pro Gly Ser Ser Ala Ala
            340                 345                 350
Ala Ala Gly Pro Gly Gly Gln Gly Pro Tyr Gly Pro Gly Ser Ser Ala
            355                 360                 365
Ala Ala Ala Gly Gly Tyr Gly Pro Gly Gln Gln Gly Pro Tyr Gly
            370                 375                 380
Pro Gly Gly Ser Ala Ala Ala Ala Gly Gly Tyr Gln Gln Gly Pro
385                 390                 395                 400
Gly Gly Gln Gly Pro Tyr Gly Pro Gly Ala Ser Ala Ala Ala Ala
                405                 410                 415
Gly Pro Gly Gly Gln Gly Pro Tyr Gly Pro Gly Ala Ser Ala Ala Ala
                420                 425                 430
Ala Ala Gly Pro Gly Gly Tyr Gly Pro Gly Gln Gly Pro Ser Ala
            435                 440                 445
Ser Ala Ala Ala Ala Gly Gly Tyr Gly Ser Gly Pro Gly Gly Tyr
            450                 455                 460
Gly Pro Tyr Gly Pro Gly Gly Ser Ala Ala Ala Ala Gly Pro Gly
465                 470                 475                 480
Ser Gly Gln Gln Gly Gln Pro Tyr Gly Pro Gly Ala Ser Ala Ala
                485                 490                 495
Ala Ala Ala Gly Gly Tyr Gly Pro Gly Gln Gln Gly Pro Tyr Gly Pro
                500                 505                 510
Gly Gly Ser Ala Ala Ala Ala Gly Pro Gly Ser Gly Gly Tyr Gly
            515                 520                 525
Pro Gly Ala Ser Ala Ala Ala Ala Gly Gly Asn Gly Pro Gly Ser
            530                 535                 540
Gly Gly Tyr Gly Pro Gly Gln Gln Gly Pro Gly Gly Ser Ala Ala Ala
545                 550                 555                 560
Ala Ala Gly Gly Tyr Gln Gln Gly Pro Gly Gln Gly Pro Tyr Gly
                565                 570                 575
Pro Gly Ala Ser Ala Ala Ala Ala Gly Pro Gly Ser Gly Gln Gln
            580                 585                 590
Gly Pro Gly Ala Ser
        595
```

<210> SEQ ID NO 11
<211> LENGTH: 12
<212> TYPE: PRT
<213> ORGANISM: Artificial Sequence
<220> FEATURE:
<223> OTHER INFORMATION: Synthetic sequence, HisTag

<400> SEQUENCE: 11

```
Met His His His His His Ser Ser Gly Ser Ser
1               5                   10
```

<210> SEQ ID NO 12
<211> LENGTH: 608
<212> TYPE: PRT

<213> ORGANISM: Artificial Sequence
<220> FEATURE:
<223> OTHER INFORMATION: Synthetic sequence, PRT380

<400> SEQUENCE: 12

```
Met His His His His His Ser Ser Gly Ser Ser Gly Pro Gly Gln
1               5                   10                  15

Gln Gly Pro Tyr Gly Pro Gly Ala Ser Ala Ala Ala Ala Gly Gln
                20                  25                  30

Asn Gly Pro Gly Ser Gly Gln Gly Pro Gly Gln Ser Ala Ala Ala
                35                  40                  45

Ala Ala Gly Gln Tyr Gly Pro Gly Gln Gln Pro Gly Gln Gln Gly
        50                  55                  60

Pro Gly Ser Ser Ala Ala Ala Ala Gly Pro Gly Gln Tyr Gly Pro
65                  70                  75                  80

Gly Gln Gln Gly Pro Ser Ala Ser Ala Ala Ala Ala Gly Pro Gly
                85                  90                  95

Ser Gly Gln Gln Gly Pro Gly Ala Ser Ala Ala Ala Ala Gly Gln
                100                 105                 110

Tyr Gly Pro Gly Gln Gln Gly Pro Gln Gln Gly Pro Gly Ser Ser
        115                 120                 125

Ala Ala Ala Ala Ala Gly Gln Tyr Gly Ser Gly Pro Gly Gln Gln Gly
        130                 135                 140

Pro Tyr Gly Ser Ala Ala Ala Ala Ala Gly Pro Ser Gly Gln Tyr
145                 150                 155                 160

Gly Gln Gly Pro Tyr Gly Pro Gly Ala Ser Ala Ala Ala Ala Gly
                165                 170                 175

Pro Gly Gln Tyr Gly Pro Gly Gln Gln Gly Pro Ser Ala Ser Ala Ala
        180                 185                 190

Ala Ala Ala Gly Ser Gly Gln Gln Gly Pro Gly Gln Tyr Gly Pro Tyr
        195                 200                 205

Ala Ser Ala Ala Ala Ala Ala Gly Gln Tyr Gly Ser Gly Pro Gly Gln
        210                 215                 220

Gln Gly Pro Tyr Gly Pro Gly Gln Ser Ala Ala Ala Ala Gly Ser
225                 230                 235                 240

Gly Gln Gln Gly Pro Gly Gln Gln Gly Pro Tyr Ala Ser Ala Ala Ala
                245                 250                 255

Ala Ala Gly Pro Gly Gln Gln Gly Pro Tyr Gly Pro Gly Ser Ser Ala
                260                 265                 270

Ala Ala Ala Gly Gln Tyr Gly Tyr Gly Pro Gly Gln Gln Gly Pro
        275                 280                 285

Tyr Gly Pro Gly Ala Ser Ala Ala Ala Ala Gly Gln Asn Gly Pro
        290                 295                 300

Gly Ser Gly Gln Tyr Gly Pro Gly Gln Gln Gly Pro Gly Gln Ser Ala
305                 310                 315                 320

Ala Ala Ala Gly Pro Gly Gln Gln Gly Pro Tyr Gly Pro Gly Ala
                325                 330                 335

Ser Ala Ala Ala Ala Gly Gln Tyr Gly Pro Gly Gln Gln Gly Pro
                340                 345                 350

Gly Gln Tyr Gly Pro Gly Ser Ser Ala Ala Ala Ala Gly Pro Gly
        355                 360                 365

Gln Gln Gly Pro Tyr Gly Pro Gly Ser Ser Ala Ala Ala Ala Gly
        370                 375                 380

Gln Tyr Gly Pro Gly Gln Gln Gly Pro Tyr Gly Pro Gly Gln Ser Ala
```

-continued

```
            385                 390                 395                 400
Ala Ala Ala Ala Gly Gln Tyr Gln Gly Pro Gly Gln Gly Pro
                405                 410                 415

Tyr Gly Pro Gly Ala Ser Ala Ala Ala Ala Gly Pro Gly Gln Gln
                420                 425                 430

Gly Pro Tyr Gly Pro Gly Ala Ser Ala Ala Ala Ala Gly Pro Gly
                435                 440                 445

Gln Tyr Gly Pro Gly Gln Gly Pro Ser Ala Ser Ala Ala Ala
        450                 455                 460

Ala Gly Gln Tyr Gly Ser Gly Pro Gly Gln Tyr Gly Pro Tyr Gly Pro
465                 470                 475                 480

Gly Gln Ser Ala Ala Ala Ala Gly Pro Gly Ser Gly Gln Gln Gly
                485                 490                 495

Gln Gly Pro Tyr Gly Pro Gly Ala Ser Ala Ala Ala Ala Gly Gln
                500                 505                 510

Tyr Gly Pro Gly Gln Gln Gly Pro Tyr Gly Pro Gly Gln Ser Ala Ala
                515                 520                 525

Ala Ala Ala Gly Pro Gly Ser Gly Gln Tyr Gly Pro Gly Ala Ser Ala
        530                 535                 540

Ala Ala Ala Gly Gln Asn Gly Pro Gly Ser Gly Gln Tyr Gly Pro
545                 550                 555                 560

Gly Gln Gln Gly Pro Gly Gln Ser Ala Ala Ala Ala Gly Gln Tyr
                565                 570                 575

Gln Gln Gly Pro Gly Gln Gln Pro Tyr Gly Pro Gly Ala Ser Ala
                580                 585                 590

Ala Ala Ala Gly Pro Gly Ser Gly Gln Gln Gly Pro Gly Ala Ser
                595                 600                 605

<210> SEQ ID NO 13
<211> LENGTH: 601
<212> TYPE: PRT
<213> ORGANISM: Artificial Sequence
<220> FEATURE:
<223> OTHER INFORMATION: Synthetic sequence, PRT410

<400> SEQUENCE: 13

Met His His His His His Ser Ser Gly Ser Ser Gly Pro Gly Gln
1               5                   10                  15

Gln Gly Pro Tyr Gly Pro Gly Ala Ser Ala Ala Ala Ala Gly Gln
                20                  25                  30

Asn Gly Pro Gly Ser Gly Gln Gln Gly Pro Gln Ser Gly Gln Tyr
                35                  40                  45

Gly Pro Gly Gln Gln Gly Pro Gln Gln Gly Pro Gly Ser Ser Ala
        50                  55                  60

Ala Ala Ala Gly Pro Gly Gln Tyr Gly Pro Gly Gln Gln Gly Pro
65                  70                  75                  80

Ser Ala Ser Ala Ala Ala Ala Gly Pro Gly Ser Gly Gln Gln Gly
                85                  90                  95

Pro Gly Ala Ser Gly Gln Tyr Gly Pro Gly Gln Gln Gly Pro Gly Gln
                100                 105                 110

Gln Gly Pro Gly Ser Ser Ala Ala Ala Ala Gly Tyr Gly Ser
        115                 120                 125

Gly Pro Gly Gln Gln Pro Tyr Gly Ser Ala Ala Ala Ala Ala Gly
        130                 135                 140

Pro Gly Ser Gly Gln Tyr Gly Gln Gly Pro Tyr Gly Pro Gly Ala Ser
```

-continued

```
            145                 150                 155                 160
        Gly Pro Gly Gln Tyr Gly Pro Gly Gln Gln Gly Pro Ser Ala Ser Ala
                        165                 170                 175
        Ala Ala Ala Ala Gly Ser Gly Gln Gln Gly Pro Gly Gln Tyr Gly Pro
                        180                 185                 190
        Tyr Ala Ser Ala Ala Ala Ala Ala Gly Gln Tyr Ser Gly Pro Gly
                        195                 200                 205
        Gln Gln Gly Pro Tyr Gly Pro Gly Gln Ser Ser Gly Gln Gln Gly
        210                 215                 220
        Pro Gly Gln Gln Gly Pro Tyr Ala Ser Ala Ala Ala Ala Gly Pro
        225                 230                 235                 240
        Gly Gln Gln Gly Pro Tyr Gly Pro Gly Ser Ser Ala Ala Ala Ala
                        245                 250                 255
        Gly Gln Tyr Gly Tyr Gly Pro Gly Gln Gln Gly Pro Tyr Gly Pro Gly
                        260                 265                 270
        Ala Ser Gly Gln Asn Gly Pro Gly Ser Gly Gln Tyr Gly Pro Gly Gln
                        275                 280                 285
        Gln Gly Pro Gly Gln Ser Ala Ala Ala Ala Gly Pro Gly Gln Gln
                        290                 295                 300
        Gly Pro Tyr Gly Pro Gly Ala Ser Ala Ala Ala Ala Gly Gln Tyr
        305                 310                 315                 320
        Gly Pro Gly Gln Gln Gly Pro Gly Gln Tyr Gly Pro Gly Ser Ser Gly
                        325                 330                 335
        Pro Gly Gln Gln Gly Pro Tyr Gly Pro Gly Ser Ser Ala Ala Ala Ala
                        340                 345                 350
        Ala Gly Gln Tyr Gly Pro Gly Gln Gln Gly Pro Tyr Gly Pro Gly Gln
                        355                 360                 365
        Ser Ala Ala Ala Ala Gly Gln Tyr Gln Gly Pro Gly Gln Gln
                        370                 375                 380
        Gly Pro Tyr Gly Pro Gly Ala Ser Gly Pro Gly Gln Gln Gly Pro Tyr
        385                 390                 395                 400
        Gly Pro Gly Ala Ser Ala Ala Ala Ala Gly Pro Gly Gln Tyr Gly
                        405                 410                 415
        Pro Gly Gln Gln Gly Pro Ser Ala Ser Ala Ala Ala Ala Gly Gln
                        420                 425                 430
        Tyr Gly Ser Gly Pro Gly Gln Tyr Gly Pro Tyr Gly Pro Gly Gln Ser
                        435                 440                 445
        Gly Pro Gly Ser Gly Gln Gln Gly Gln Gly Pro Tyr Gly Pro Gly Ala
                        450                 455                 460
        Ser Ala Ala Ala Ala Ala Gly Gln Tyr Gly Pro Gly Gln Gln Gly Pro
        465                 470                 475                 480
        Tyr Gly Pro Gly Gln Ser Ala Ala Ala Ala Gly Pro Gly Ser Gly
                        485                 490                 495
        Gln Tyr Gly Pro Gly Ala Ser Gly Gln Asn Gly Pro Gly Ser Gly Gln
                        500                 505                 510
        Tyr Gly Pro Gly Gln Gln Gly Pro Gln Ser Ala Ala Ala Ala
                        515                 520                 525
        Gly Gln Tyr Gln Gly Pro Gly Gln Gln Gly Pro Tyr Gly Pro Gly
                        530                 535                 540
        Ala Ser Ala Ala Ala Ala Ala Gly Gln Tyr Ser Gly Pro Gly Gln
        545                 550                 555                 560
        Gln Gly Pro Tyr Gly Pro Gly Gln Ser Gly Ser Gly Gln Gln Gly Pro
                        565                 570                 575
```

```
Gly Gln Gln Gly Pro Tyr Ala Ser Ala Ala Ala Ala Gly Pro Gly
            580                 585                 590

Ser Gly Gln Gln Gly Pro Gly Ala Ser
        595                 600

<210> SEQ ID NO 14
<211> LENGTH: 576
<212> TYPE: PRT
<213> ORGANISM: Artificial Sequence
<220> FEATURE:
<223> OTHER INFORMATION: Synthetic sequence, PRT525

<400> SEQUENCE: 14

Met His His His His His Ser Ser Gly Ser Ser Gly Pro Gly Gln
1               5                   10                  15

Gln Gly Pro Tyr Gly Pro Gly Ala Ser Ala Ala Ala Ala Ala Ala
            20                  25                  30

Gly Ser Asn Gly Pro Gly Ser Gly Gln Gln Gly Pro Gln Ser Gly
            35                  40                  45

Gln Tyr Gly Pro Gly Gln Gln Gly Pro Gly Gln Gln Gly Pro Gly Ser
50                  55                  60

Ser Ala Ala Ala Ala Ala Ala Gly Pro Gly Gln Tyr Gly Pro Gly
65                  70                  75                  80

Gln Gln Gly Pro Ser Ala Ser Ala Ala Ala Ala Ala Ala Gly Pro
            85                  90                  95

Gly Ser Gly Gln Gln Gly Pro Gly Ala Ser Gly Gln Tyr Gly Pro Gly
            100                 105                 110

Gln Gln Gly Pro Gly Gln Gln Gly Pro Gly Ser Ser Ala Ala Ala
            115                 120                 125

Ala Ala Ala Gly Ser Tyr Gly Ser Gly Pro Gly Gln Gln Gly Pro Tyr
            130                 135                 140

Gly Ser Ala Ala Ala Ala Ala Ala Gly Pro Gly Ser Gly Gln Tyr
145                 150                 155                 160

Gly Gln Gly Pro Tyr Gly Pro Gly Ala Ser Gly Pro Gly Gln Tyr Gly
            165                 170                 175

Pro Gly Gln Gln Gly Pro Ser Ala Ser Ala Ala Ala Ala Ala Ala
            180                 185                 190

Gly Ser Gly Gln Gln Gly Pro Gly Gln Tyr Gly Pro Tyr Ala Ser Ala
            195                 200                 205

Ala Ala Ala Ala Ala Gly Ser Tyr Gly Ser Gly Pro Gly Gln Gln
            210                 215                 220

Gly Pro Tyr Gly Pro Gly Gln Ser Gly Ser Gly Gln Gln Gly Pro Gly
225                 230                 235                 240

Gln Gln Gly Pro Tyr Ala Ser Ala Ala Ala Ala Ala Ala Gly Pro
            245                 250                 255

Gly Gln Gln Gly Pro Tyr Gly Pro Gly Ser Ser Ala Ala Ala Ala
            260                 265                 270

Ala Ala Gly Ser Tyr Gly Tyr Gly Pro Gly Gln Gln Gly Pro Tyr Gly
            275                 280                 285

Pro Gly Ala Ser Gly Gln Asn Gly Pro Gly Ser Gly Gln Tyr Gly Pro
            290                 295                 300

Gly Gln Gln Gly Pro Gly Pro Ser Ala Ala Ala Ala Ala Ala Gly
305                 310                 315                 320

Pro Gly Gln Gln Gly Pro Tyr Gly Pro Gly Ala Ser Ala Ala Ala Ala
            325                 330                 335
```

```
Ala Ala Ala Gly Ser Tyr Gly Pro Gly Gln Gln Gly Pro Gly Gln Tyr
            340                 345                 350

Gly Pro Gly Ser Ser Gly Pro Gly Gln Gln Gly Pro Tyr Gly Pro Gly
            355                 360                 365

Ser Ser Ala Ala Ala Ala Ala Ala Gly Ser Tyr Gly Pro Gly Gln
        370                 375                 380

Gln Gly Pro Tyr Gly Pro Gly Pro Ser Ala Ala Ala Ala Ala Ala
385                 390                 395                 400

Gly Ser Tyr Gln Gln Gly Pro Gly Gln Gln Gly Pro Tyr Gly Pro Gly
                405                 410                 415

Ala Ser Gly Pro Gly Gln Gln Gly Pro Tyr Gly Pro Gly Ala Ser Ala
            420                 425                 430

Ala Ala Ala Ala Ala Gly Pro Gly Gln Tyr Gly Pro Gly Gln Gln
        435                 440                 445

Gly Pro Ser Ala Ser Ala Ala Ala Ala Ala Gly Ser Tyr Gly
            450                 455                 460

Ser Gly Pro Gly Gln Tyr Gly Pro Tyr Gly Pro Gly Gln Ser Gly Pro
465                 470                 475                 480

Gly Ser Gly Gln Gln Gly Gln Gly Pro Tyr Gly Pro Gly Ala Ser Ala
                485                 490                 495

Ala Ala Ala Ala Ala Gly Ser Tyr Gly Pro Gly Gln Gln Gly Pro
            500                 505                 510

Tyr Gly Pro Gly Pro Ser Ala Ala Ala Ala Ala Ala Gly Pro Gly
                515                 520                 525

Ser Gly Gln Tyr Gly Pro Gly Ala Ser Gly Gln Asn Gly Pro Gly Ser
            530                 535                 540

Gly Gln Tyr Gly Pro Gly Gln Gly Pro Gly Pro Ser Ala Ala Ala
545                 550                 555                 560

Ala Ala Ala Ala Gly Pro Gly Ser Gly Gln Gln Gly Pro Gly Ala Ser
                565                 570                 575

<210> SEQ ID NO 15
<211> LENGTH: 2375
<212> TYPE: PRT
<213> ORGANISM: Artificial Sequence
<220> FEATURE:
<223> OTHER INFORMATION: Synthetic sequence, PRT799

<400> SEQUENCE: 15

Met His His His His His Ser Ser Gly Ser Gly Pro Gly Gln
1               5                   10                  15

Gln Gly Pro Tyr Gly Pro Gly Ala Ser Ala Ala Ala Ala Gly Gln
                20                  25                  30

Asn Gly Pro Gly Ser Gly Gln Gln Gly Pro Gly Gln Ser Gly Gln Tyr
            35                  40                  45

Gly Pro Gly Gln Gln Gly Pro Gly Gln Gln Gly Pro Gly Ser Ser Ala
        50                  55                  60

Ala Ala Ala Gly Pro Gly Gln Tyr Gly Pro Gly Gln Gln Gly Pro
65              70                  75                  80

Ser Ala Ser Ala Ala Ala Ala Gly Pro Gly Ser Gly Gln Gln Gly
                85                  90                  95

Pro Gly Ala Ser Gly Gln Tyr Gly Pro Gly Gln Gln Gly Pro Gly Gln
            100                 105                 110

Gln Gly Pro Gly Ser Ser Ala Ala Ala Ala Ala Gly Gln Tyr Gly Ser
        115                 120                 125
```

Gly Pro Gly Gln Gln Gly Pro Tyr Gly Ser Ala Ala Ala Ala Gly
            130                 135                 140

Pro Gly Ser Gly Gln Tyr Gly Gln Gly Pro Tyr Gly Pro Gly Ala Ser
145                 150                 155                 160

Gly Pro Gly Gln Tyr Gly Pro Gly Gln Gln Gly Pro Ser Ala Ser Ala
            165                 170                 175

Ala Ala Ala Ala Gly Ser Gly Gln Gln Gly Pro Gly Gln Tyr Gly Pro
            180                 185                 190

Tyr Ala Ser Ala Ala Ala Ala Gly Gln Tyr Gly Ser Gly Pro Gly
            195                 200                 205

Gln Gln Gly Pro Tyr Gly Pro Gly Gln Ser Gly Ser Gly Gln Gln Gly
210                 215                 220

Pro Gly Gln Gln Gly Pro Tyr Ala Ser Ala Ala Ala Ala Gly Pro
225                 230                 235                 240

Gly Gln Gln Gly Pro Tyr Gly Pro Gly Ser Ser Ala Ala Ala Ala
            245                 250                 255

Gly Gln Tyr Gly Tyr Gly Pro Gly Gln Gln Gly Pro Tyr Gly Pro Gly
            260                 265                 270

Ala Ser Gly Gln Asn Gly Pro Gly Ser Gly Gln Tyr Gly Pro Gly Gln
            275                 280                 285

Gln Gly Pro Gly Gln Ser Ala Ala Ala Ala Gly Pro Gly Gln Gln
            290                 295                 300

Gly Pro Tyr Gly Pro Gly Ala Ser Ala Ala Ala Ala Gly Gln Tyr
305                 310                 315                 320

Gly Pro Gly Gln Gln Gly Pro Gly Gln Tyr Gly Pro Gly Ser Ser Gly
            325                 330                 335

Pro Gly Gln Gln Gly Pro Tyr Gly Pro Gly Ser Ser Ala Ala Ala Ala
            340                 345                 350

Ala Gly Gln Tyr Gly Pro Gly Gln Gln Gly Pro Tyr Gly Pro Gly Gln
            355                 360                 365

Ser Ala Ala Ala Ala Ala Gly Gln Tyr Gln Gln Gly Pro Gly Gln Gln
370                 375                 380

Gly Pro Tyr Gly Pro Gly Ala Ser Gly Pro Gly Gln Gln Gly Pro Tyr
385                 390                 395                 400

Gly Pro Gly Ala Ser Ala Ala Ala Ala Gly Pro Gly Gln Tyr Gly
            405                 410                 415

Pro Gly Gln Gln Gly Pro Ser Ala Ser Ala Ala Ala Ala Gly Gln
            420                 425                 430

Tyr Gly Ser Gly Pro Gly Gln Tyr Gly Pro Gly Tyr Gly Pro Gly Gln Ser
            435                 440                 445

Gly Pro Gly Ser Gly Gln Gln Gly Gln Gly Pro Tyr Gly Pro Gly Ala
            450                 455                 460

Ser Ala Ala Ala Ala Ala Gly Gln Tyr Gly Pro Gly Gln Gln Gly Pro
465                 470                 475                 480

Tyr Gly Pro Gly Gln Ser Ala Ala Ala Ala Gly Pro Gly Ser Gly
            485                 490                 495

Gln Tyr Gly Pro Gly Ala Ser Gly Gln Asn Gly Pro Gly Ser Gly Gln
            500                 505                 510

Tyr Gly Pro Gly Gln Gln Gly Pro Gly Gln Ser Ala Ala Ala Ala Ala
            515                 520                 525

Gly Gln Tyr Gln Gln Gly Pro Gly Gln Gln Gly Pro Tyr Gly Pro Gly
            530                 535                 540

```
Ala Ser Ala Ala Ala Ala Gly Gln Tyr Gly Ser Gly Pro Gly Gln
545                 550                 555                 560

Gln Gly Pro Tyr Gly Pro Gly Gln Ser Gly Ser Gly Gln Gln Gly Pro
                565                 570                 575

Gly Gln Gln Gly Pro Tyr Ala Ser Ala Ala Ala Ala Gly Pro Gly
            580                 585                 590

Ser Gly Gln Gln Gly Pro Gly Ala Ser Gly Gln Gln Gly Pro Tyr Gly
        595                 600                 605

Pro Gly Ala Ser Ala Ala Ala Ala Gly Gln Asn Gly Pro Gly Ser
610                 615                 620

Gly Gln Gln Gly Pro Gly Gln Ser Gly Gln Tyr Gly Pro Gly Gln Gln
625                 630                 635                 640

Gly Pro Gly Gln Gln Gly Pro Gly Ser Ser Ala Ala Ala Ala Gly
            645                 650                 655

Pro Gly Gln Tyr Gly Pro Gly Gln Gln Gly Pro Ser Ala Ser Ala Ala
            660                 665                 670

Ala Ala Ala Gly Pro Gly Ser Gly Gln Gln Gly Pro Gly Ala Ser Gly
        675                 680                 685

Gln Tyr Gly Pro Gly Gln Gln Gly Pro Gly Gln Gln Gly Pro Gly Ser
690                 695                 700

Ser Ala Ala Ala Ala Gly Gln Tyr Gly Ser Gly Pro Gly Gln Gln
705                 710                 715                 720

Gly Pro Tyr Gly Ser Ala Ala Ala Ala Gly Pro Gly Ser Gly Gln
            725                 730                 735

Tyr Gly Gln Gly Pro Tyr Gly Pro Gly Ala Ser Gly Pro Gly Gln Tyr
            740                 745                 750

Gly Pro Gly Gln Gln Gly Pro Ser Ala Ser Ala Ala Ala Ala Gly
            755                 760                 765

Ser Gly Gln Gln Gly Pro Gly Gln Tyr Gly Pro Tyr Ala Ser Ala Ala
        770                 775                 780

Ala Ala Ala Gly Gln Tyr Gly Ser Gly Pro Gly Gln Gln Gly Pro Tyr
785                 790                 795                 800

Gly Pro Gly Gln Ser Gly Ser Gly Gln Gln Gly Pro Gly Gln Gln Gly
            805                 810                 815

Pro Tyr Ala Ser Ala Ala Ala Ala Gly Pro Gly Gln Gln Gly Pro
            820                 825                 830

Tyr Gly Pro Gly Ser Ser Ala Ala Ala Ala Gly Gln Tyr Gly Tyr
835                 840                 845

Gly Pro Gly Gln Gln Gly Pro Tyr Gly Pro Gly Ala Ser Gly Gln Asn
850                 855                 860

Gly Pro Gly Ser Gly Gln Tyr Gly Pro Gly Gln Gln Gly Pro Gly Gln
865                 870                 875                 880

Ser Ala Ala Ala Ala Gly Pro Gly Gln Gln Gly Pro Tyr Gly Pro
            885                 890                 895

Gly Ala Ser Ala Ala Ala Ala Gly Gln Tyr Gly Pro Gly Gln Gln
            900                 905                 910

Gly Pro Gly Gln Tyr Gly Pro Gly Ser Ser Gly Pro Gly Gln Gln Gly
            915                 920                 925

Pro Tyr Gly Pro Gly Ser Ser Ala Ala Ala Ala Gly Gln Tyr Gly
            930                 935                 940

Pro Gly Gln Gln Gly Pro Tyr Gly Pro Gly Gln Ser Ala Ala Ala Ala
945                 950                 955                 960

Ala Gly Gln Tyr Gln Gln Gly Pro Gly Gln Gln Gly Pro Tyr Gly Pro
```

-continued

```
                965                 970                 975
Gly Ala Ser Gly Pro Gly Gln Gln Gly Pro Tyr Gly Pro Gly Ala Ser
                980                 985                 990
Ala Ala Ala Ala Ala Gly Pro Gly Gln Tyr Gly Pro Gly Gln Gln Gly
                995                1000                1005
Pro Ser Ala Ser Ala Ala Ala Ala Gly Gln Tyr Gly Ser Gly
        1010                1015                1020
Pro Gly Gln Tyr Gly Pro Tyr Gly Pro Gly Gln Ser Gly Pro Gly
        1025                1030                1035
Ser Gly Gln Gln Gly Gln Gly Pro Tyr Gly Pro Gly Ala Ser Ala
        1040                1045                1050
Ala Ala Ala Ala Gly Gln Tyr Gly Pro Gly Gln Gln Gly Pro Tyr
        1055                1060                1065
Gly Pro Gly Gln Ser Ala Ala Ala Ala Ala Gly Pro Gly Ser Gly
        1070                1075                1080
Gln Tyr Gly Pro Gly Ala Ser Gly Gln Asn Gly Pro Gly Ser Gly
        1085                1090                1095
Gln Tyr Gly Pro Gly Gln Gln Gly Pro Gly Gln Ser Ala Ala Ala
        1100                1105                1110
Ala Ala Gly Gln Tyr Gln Gln Gly Pro Gly Gln Gln Gly Pro Tyr
        1115                1120                1125
Gly Pro Gly Ala Ser Ala Ala Ala Ala Gly Gln Tyr Gly Ser
        1130                1135                1140
Gly Pro Gly Gln Gln Gly Pro Tyr Gly Pro Gly Gln Ser Gly Ser
        1145                1150                1155
Gly Gln Gln Gly Pro Gly Gln Gln Gly Pro Tyr Ala Ser Ala Ala
        1160                1165                1170
Ala Ala Ala Gly Pro Gly Ser Gly Gln Gln Gly Pro Gly Ala Ser
        1175                1180                1185
Gly Gln Gln Gly Pro Tyr Gly Pro Gly Ala Ser Ala Ala Ala Ala
        1190                1195                1200
Ala Gly Gln Asn Gly Pro Gly Ser Gly Gln Gln Gly Pro Gly Gln
        1205                1210                1215
Ser Gly Gln Tyr Gly Pro Gly Gln Gln Gly Pro Gly Gln Gln Gly
        1220                1225                1230
Pro Gly Ser Ser Ala Ala Ala Ala Gly Pro Gly Gln Tyr Gly
        1235                1240                1245
Pro Gly Gln Gln Gly Pro Ser Ala Ser Ala Ala Ala Ala Gly
        1250                1255                1260
Pro Gly Ser Gly Gln Gln Gly Pro Gly Ala Ser Gly Gln Tyr Gly
        1265                1270                1275
Pro Gly Gln Gln Gly Pro Gly Gln Gln Gly Pro Gly Ser Ser Ala
        1280                1285                1290
Ala Ala Ala Gly Gln Tyr Gly Ser Gly Pro Gly Gln Gln Gly
        1295                1300                1305
Pro Tyr Gly Ser Ala Ala Ala Ala Gly Pro Gly Ser Gly Gln
        1310                1315                1320
Tyr Gly Gln Gly Pro Tyr Gly Pro Gly Ala Ser Gly Pro Gly Gln
        1325                1330                1335
Tyr Gly Pro Gly Gln Gln Gly Pro Ser Ala Ser Ala Ala Ala Ala
        1340                1345                1350
Ala Gly Ser Gly Gln Gln Gly Pro Gly Gln Tyr Gly Pro Tyr Ala
        1355                1360                1365
```

```
Ser Ala Ala Ala Ala Ala Gly Gln Tyr Gly Ser Gly Pro Gly Gln
    1370                1375                1380

Gln Gly Pro Tyr Gly Pro Gly Gln Ser Gly Ser Gly Gln Gln Gly
    1385                1390                1395

Pro Gly Gln Gln Gly Pro Tyr Ala Ser Ala Ala Ala Ala Ala Gly
    1400                1405                1410

Pro Gly Gln Gln Gly Pro Tyr Gly Pro Gly Ser Ser Ala Ala Ala
    1415                1420                1425

Ala Ala Gly Gln Tyr Gly Tyr Gly Pro Gly Gln Gln Gly Pro Tyr
    1430                1435                1440

Gly Pro Gly Ala Ser Gly Gln Asn Gly Pro Gly Ser Gly Gln Tyr
    1445                1450                1455

Gly Pro Gly Gln Gln Gly Pro Gly Gln Ser Ala Ala Ala Ala Ala
    1460                1465                1470

Gly Pro Gly Gln Gln Gly Pro Tyr Gly Pro Gly Ala Ser Ala Ala
    1475                1480                1485

Ala Ala Ala Gly Gln Tyr Gly Pro Gly Gln Gln Gly Pro Gly Gln
    1490                1495                1500

Tyr Gly Pro Gly Ser Ser Gly Pro Gly Gln Gln Gly Pro Tyr Gly
    1505                1510                1515

Pro Gly Ser Ser Ala Ala Ala Ala Ala Gly Gln Tyr Gly Pro Gly
    1520                1525                1530

Gln Gln Gly Pro Tyr Gly Pro Gly Gln Ser Ala Ala Ala Ala Ala
    1535                1540                1545

Gly Gln Tyr Gln Gln Gly Pro Gly Gln Gln Gly Pro Tyr Gly Pro
    1550                1555                1560

Gly Ala Ser Gly Pro Gly Gln Gln Gly Pro Tyr Gly Pro Gly Ala
    1565                1570                1575

Ser Ala Ala Ala Ala Ala Gly Pro Gly Gln Tyr Gly Pro Gly Gln
    1580                1585                1590

Gln Gly Pro Ser Ala Ser Ala Ala Ala Ala Ala Gly Gln Tyr Gly
    1595                1600                1605

Ser Gly Pro Gly Gln Tyr Gly Pro Tyr Gly Pro Gly Gln Ser Gly
    1610                1615                1620

Pro Gly Ser Gly Gln Gln Gly Gln Gly Pro Tyr Gly Pro Gly Ala
    1625                1630                1635

Ser Ala Ala Ala Ala Ala Gly Gln Tyr Gly Pro Gly Gln Gln Gly
    1640                1645                1650

Pro Tyr Gly Pro Gly Gln Ser Ala Ala Ala Ala Ala Gly Pro Gly
    1655                1660                1665

Ser Gly Gln Tyr Gly Pro Gly Ala Ser Gly Gln Asn Gly Pro Gly
    1670                1675                1680

Ser Gly Gln Tyr Gly Pro Gly Gln Gln Gly Pro Gly Gln Ser Ala
    1685                1690                1695

Ala Ala Ala Ala Gly Gln Tyr Gln Gln Gly Pro Gly Gln Gln Gly
    1700                1705                1710

Pro Tyr Gly Pro Gly Ala Ser Ala Ala Ala Ala Ala Gly Gln Tyr
    1715                1720                1725

Gly Ser Gly Pro Gly Gln Gln Gly Pro Tyr Gly Pro Gly Gln Ser
    1730                1735                1740

Gly Ser Gly Gln Gln Gly Pro Gly Gln Gln Gly Pro Tyr Ala Ser
    1745                1750                1755
```

| | | | | | | | | | | | |
|---|---|---|---|---|---|---|---|---|---|---|---|
|Ala|Ala|Ala|Ala|Ala|Gly|Pro|Gly|Ser|Gly|Gln|Gln|
|1760| | | | |1765| | | |1770| | |
|  |  |  |  |  |  |  |  |  |  |Gly|Pro|Gly|
|Ala|Ser|Gly|Gln|Gln|Gly|Pro|Tyr|Gly|Pro|Gly|Ala|Ser|Ala|Ala|
|1775| | | | |1780| | | |1785| | | | | |
|Ala|Ala|Ala|Gly|Gln|Asn|Gly|Pro|Gly|Ser|Gly|Gln|
|1790| | | | |1795| | | |1800| | |
|  |  |  |  |  |  |  |  |  |  |Gln|Gly|Pro|
|Gly|Gln|Ser|Gly|Gln|Tyr|Gly|Pro|Gly|Gln|Gln|Gly|
|1805| | | | |1810| | | |1815| | |
|  |  |  |  |  |  |  |  |  |  |Pro|Gly|Gln|
|Gln|Gly|Pro|Gly|Ser|Ser|Ala|Ala|Ala|Ala|Gly|Pro|Gly|Gln|
|1820| | | | |1825| | | |1830| | | | |
|Tyr|Gly|Pro|Gly|Gln|Gln|Gly|Pro|Ser|Ala|Ser|Ala|Ala|Ala|Ala|
|1835| | | | |1840| | | |1845| | | | | |
|Ala|Gly|Pro|Gly|Ser|Gly|Gln|Gln|Gly|Pro|Gly|Ala|Ser|Gly|Gln|
|1850| | | | |1855| | | |1860| | | | | |
|Tyr|Gly|Pro|Gly|Gln|Gln|Gly|Pro|Gly|Gln|Gln|Gly|Pro|Gly|Ser|
|1865| | | | |1870| | | |1875| | | | | |
|Ser|Ala|Ala|Ala|Ala|Ala|Gly|Gln|Tyr|Gly|Ser|Gly|Pro|Gly|Gln|
|1880| | | | |1885| | | |1890| | | | | |
|Gln|Gly|Pro|Tyr|Gly|Ser|Ala|Ala|Ala|Ala|Gly|Pro|Gly|Ser|
|1895| | | | |1900| | | |1905| | | | |
|Gly|Gln|Tyr|Gly|Gln|Gly|Pro|Tyr|Gly|Pro|Gly|Ala|Ser|Gly|Pro|
|1910| | | | |1915| | | |1920| | | | | |
|Gly|Gln|Tyr|Gly|Pro|Gly|Gln|Gln|Gly|Pro|Ser|Ala|Ser|Ala|Ala|
|1925| | | | |1930| | | |1935| | | | | |
|Ala|Ala|Ala|Gly|Ser|Gly|Gln|Gln|Gly|Pro|Gly|Gln|Tyr|Gly|Pro|
|1940| | | | |1945| | | |1950| | | | | |
|Tyr|Ala|Ser|Ala|Ala|Ala|Ala|Gly|Gln|Tyr|Gly|Ser|Gly|Pro|
|1955| | | | |1960| | | |1965| | | | |
|Gly|Gln|Gln|Gly|Pro|Tyr|Gly|Pro|Gly|Gln|Ser|Gly|Ser|Gly|Gln|
|1970| | | | |1975| | | |1980| | | | | |
|Gln|Gly|Pro|Gly|Gln|Gln|Gly|Pro|Tyr|Ala|Ser|Ala|Ala|Ala|Ala|
|1985| | | | |1990| | | |1995| | | | | |
|Ala|Gly|Pro|Gly|Gln|Gln|Gly|Pro|Tyr|Gly|Pro|Gly|Ser|Ser|Ala|
|2000| | | | |2005| | | |2010| | | | | |
|Ala|Ala|Ala|Ala|Gly|Gln|Tyr|Gly|Tyr|Gly|Pro|Gly|Gln|Gln|Gly|
|2015| | | | |2020| | | |2025| | | | | |
|Pro|Tyr|Gly|Pro|Gly|Ala|Ser|Gly|Gln|Asn|Gly|Pro|Gly|Ser|Gly|
|2030| | | | |2035| | | |2040| | | | | |
|Gln|Tyr|Gly|Pro|Gly|Gln|Gln|Gly|Pro|Gly|Gln|Ser|Ala|Ala|Ala|
|2045| | | | |2050| | | |2055| | | | | |
|Ala|Ala|Gly|Pro|Gly|Gln|Gln|Gly|Pro|Tyr|Gly|Pro|Gly|Ala|Ser|
|2060| | | | |2065| | | |2070| | | | | |
|Ala|Ala|Ala|Ala|Gly|Gln|Tyr|Gly|Pro|Gly|Gln|Gln|Gly|Pro|
|2075| | | | |2080| | | |2085| | | | |
|Gly|Gln|Tyr|Gly|Pro|Gly|Ser|Ser|Gly|Pro|Gly|Gln|Gln|Gly|Pro|
|2090| | | | |2095| | | |2100| | | | | |
|Tyr|Gly|Pro|Gly|Ser|Ser|Ala|Ala|Ala|Ala|Gly|Gln|Tyr|Gly|
|2105| | | | |2110| | | |2115| | | | |
|Pro|Gly|Gln|Gln|Gly|Pro|Tyr|Gly|Pro|Gly|Gln|Ser|Ala|Ala|Ala|
|2120| | | | |2125| | | |2130| | | | | |
|Ala|Ala|Gly|Gln|Tyr|Gln|Gln|Gly|Pro|Gly|Gln|Gln|Gly|Pro|Tyr|
|2135| | | | |2140| | | |2145| | | | | |
|Gly|Pro|Gly|Ala|Ser|Gly|Pro|Gly|Gln|Gln|Gly|Pro|Tyr|Gly|Pro|

```
                    2150                2155                2160

Gly Ala Ser Ala Ala Ala  Ala Gly Pro Gly Gln  Tyr Gly Pro
    2165                2170                2175

Gly Gln Gln Gly Pro Ser  Ala Ser Ala Ala Ala  Ala Gly Gln
    2180                2185                2190

Tyr Gly Ser Gly Pro Gly  Gln Tyr Pro Tyr Gly  Pro Gly Gln
    2195                2200                2205

Ser Gly Pro Gly Ser Gly  Gln Gly Gln Gly Pro  Tyr Gly Pro
    2210                2215                2220

Gly Ala Ser Ala Ala Ala  Ala Gly Gln Tyr Gly  Pro Gly Gln
    2225                2230                2235

Gln Gly Pro Tyr Gly Pro  Gly Gln Ser Ala Ala  Ala Ala Gly
    2240                2245                2250

Pro Gly Ser Gly Gln Tyr  Gly Pro Gly Ala Ser  Gly Gln Asn Gly
    2255                2260                2265

Pro Gly Ser Gly Gln Tyr  Gly Pro Gly Gln Gln  Gly Pro Gly Gln
    2270                2275                2280

Ser Ala Ala Ala Ala Gly  Gln Tyr Gln Gln Gly  Pro Gly Gln
    2285                2290                2295

Gln Gly Pro Tyr Gly Pro  Gly Ala Ser Ala Ala  Ala Ala Gly
    2300                2305                2310

Gln Tyr Gly Ser Gly Pro  Gly Gln Gln Gly Pro  Tyr Gly Pro Gly
    2315                2320                2325

Gln Ser Gly Ser Gly Gln  Gly Pro Gly Gln Gln  Gly Pro Tyr
    2330                2335                2340

Ala Ser Ala Ala Ala Ala  Gly Pro Gly Ser Gly  Gln Gln Gly
    2345                2350                2355

Ser Ser Val Asp Lys Leu  Ala Ala Ala Leu Glu  His His His
    2360                2365                2370

His His
    2375

<210> SEQ ID NO 16
<211> LENGTH: 608
<212> TYPE: PRT
<213> ORGANISM: Artificial Sequence
<220> FEATURE:
<223> OTHER INFORMATION: Synthetic sequence, PRT313

<400> SEQUENCE: 16

Met His His His His His Ser Ser Gly Ser Ser Gly Pro Gly Gly
1               5                   10                  15

Gln Gly Pro Tyr Gly Pro Gly Ala Ser Ala Ala Ala Ala Gly Gly
                20                  25                  30

Asn Gly Pro Gly Ser Gly Gln Gln Gly Pro Gly Gly Ser Ala Ala
                35                  40                  45

Ala Ala Gly Gly Tyr Gly Pro Gly Gln Gly Pro Gln Gln Gly
        50                  55                  60

Pro Gly Ser Ser Ala Ala Ala Ala Gly Pro Gly Gly Tyr Gly Pro
65                  70                  75                  80

Gly Gly Gln Gly Pro Ser Ala Ser Ala Ala Ala Ala Gly Pro Gly
                    85                  90                  95

Ser Gly Gln Gln Gly Pro Gly Ala Ser Ala Ala Ala Ala Gly Gly
                    100                 105                 110

Tyr Gly Pro Gly Gly Gln Gly Pro Gly Gln Gln Gly Pro Gly Ser Ser
```

```
                115                 120                 125
Ala Ala Ala Ala Ala Gly Gly Tyr Gly Ser Gly Pro Gly Gln Gln Gly
            130                 135                 140

Pro Tyr Gly Ser Ala Ala Ala Ala Gly Pro Gly Ser Gly Gly Tyr
145                 150                 155                 160

Gly Gln Gly Pro Tyr Gly Pro Gly Ala Ser Ala Ala Ala Ala Gly
                165                 170                 175

Pro Gly Gly Tyr Gly Pro Gly Gln Gly Pro Ser Ala Ser Ala Ala
                180                 185                 190

Ala Ala Ala Gly Ser Gly Gln Gln Gly Pro Gly Gly Tyr Gly Pro Tyr
            195                 200                 205

Ala Ser Ala Ala Ala Ala Gly Gly Tyr Gly Ser Gly Pro Gly Gln
            210                 215                 220

Gln Gly Pro Tyr Gly Pro Gly Ser Ala Ala Ala Ala Gly Ser
225                 230                 235                 240

Gly Gln Gln Gly Pro Gly Gln Gln Gly Pro Tyr Ala Ser Ala Ala Ala
                245                 250                 255

Ala Ala Gly Pro Gly Gly Gln Gly Pro Tyr Gly Pro Gly Ser Ser Ala
                260                 265                 270

Ala Ala Ala Ala Gly Gly Tyr Gly Tyr Gly Pro Gly Gln Gly Pro
            275                 280                 285

Tyr Gly Pro Gly Ala Ser Ala Ala Ala Ala Gly Gly Asn Gly Pro
290                 295                 300

Gly Ser Gly Gly Tyr Gly Pro Gly Gln Gln Gly Pro Gly Gly Ser Ala
305                 310                 315                 320

Ala Ala Ala Gly Pro Gly Gly Gln Gly Pro Tyr Gly Pro Gly Ala
                325                 330                 335

Ser Ala Ala Ala Ala Gly Gly Tyr Gly Pro Gly Gln Gly Pro
                340                 345                 350

Gly Gly Tyr Gly Pro Gly Ser Ser Ala Ala Ala Ala Gly Pro Gly
            355                 360                 365

Gly Gln Gly Pro Tyr Gly Pro Gly Ser Ser Ala Ala Ala Ala Gly
            370                 375                 380

Gly Tyr Gly Pro Gly Gln Gln Gly Pro Tyr Gly Pro Gly Ser Ala
385                 390                 395                 400

Ala Ala Ala Gly Gly Tyr Gln Gln Gly Pro Gly Gly Gln Gly Pro
                405                 410                 415

Tyr Gly Pro Gly Ala Ser Ala Ala Ala Ala Gly Pro Gly Gly Gln
                420                 425                 430

Gly Pro Tyr Gly Pro Gly Ala Ser Ala Ala Ala Ala Gly Pro Gly
            435                 440                 445

Gly Tyr Gly Pro Gly Gly Gln Gly Pro Ser Ala Ser Ala Ala Ala Ala
            450                 455                 460

Ala Gly Gly Tyr Gly Ser Gly Pro Gly Gly Tyr Gly Pro Tyr Gly Pro
465                 470                 475                 480

Gly Gly Ser Ala Ala Ala Ala Ala Gly Pro Gly Ser Gly Gln Gln Gly
                485                 490                 495

Gln Gly Pro Tyr Gly Pro Gly Ala Ser Ala Ala Ala Ala Gly Gly
                500                 505                 510

Tyr Gly Pro Gly Gln Gln Gly Pro Tyr Gly Pro Gly Ser Ala Ala
                515                 520                 525

Ala Ala Ala Gly Pro Gly Ser Gly Gly Tyr Gly Pro Gly Ala Ser Ala
                530                 535                 540
```

Ala Ala Ala Ala Gly Gly Asn Gly Pro Gly Ser Gly Gly Tyr Gly Pro
545                 550                 555                 560

Gly Gln Gln Gly Pro Gly Gly Ser Ala Ala Ala Ala Gly Tyr
            565                 570                 575

Gln Gln Gly Pro Gly Gly Gln Pro Tyr Gly Pro Gly Ala Ser Ala
        580                 585                 590

Ala Ala Ala Ala Gly Pro Gly Ser Gly Gln Gln Gly Pro Gly Ala Ser
            595                 600                 605

<210> SEQ ID NO 17
<211> LENGTH: 590
<212> TYPE: PRT
<213> ORGANISM: Artificial Sequence
<220> FEATURE:
<223> OTHER INFORMATION: Synthetic sequence, Met-PRT399

<400> SEQUENCE: 17

Met Gly Pro Gly Gly Gln Gly Pro Tyr Gly Pro Gly Ala Ser Ala Ala
1               5                   10                  15

Ala Ala Ala Gly Gly Asn Gly Pro Gly Ser Gly Gln Gln Gly Pro Gly
            20                  25                  30

Gly Ser Gly Gly Tyr Gly Pro Gly Gln Gly Pro Gly Gln Gln Gly
        35                  40                  45

Pro Gly Ser Ser Ala Ala Ala Ala Gly Pro Gly Gly Tyr Gly Pro
    50                  55                  60

Gly Gly Gln Gly Pro Ser Ala Ser Ala Ala Ala Ala Gly Pro Gly
65                  70                  75                  80

Ser Gly Gln Gln Gly Pro Gly Ala Ser Gly Gly Tyr Gly Pro Gly Gly
                85                  90                  95

Gln Gly Pro Gly Gln Gln Gly Pro Gly Ser Ser Ala Ala Ala Ala Ala
                100                 105                 110

Gly Gly Tyr Gly Ser Gly Pro Gly Gln Gln Pro Tyr Gly Ser Ala
        115                 120                 125

Ala Ala Ala Gly Pro Gly Ser Gly Gly Tyr Gly Gln Gly Pro Tyr
        130                 135                 140

Gly Pro Gly Ala Ser Gly Pro Gly Gly Tyr Gly Pro Gly Gly Gln Gly
145                 150                 155                 160

Pro Ser Ala Ser Ala Ala Ala Ala Gly Ser Gly Gln Gln Gly Pro
                165                 170                 175

Gly Gly Tyr Gly Pro Tyr Ala Ser Ala Ala Ala Ala Gly Gly Tyr
        180                 185                 190

Gly Ser Gly Pro Gly Gln Gln Gly Pro Tyr Gly Pro Gly Gly Ser Gly
        195                 200                 205

Ser Gly Gln Gln Gly Pro Gly Gln Gln Gly Pro Tyr Ala Ser Ala Ala
        210                 215                 220

Ala Ala Ala Gly Pro Gly Gly Gln Gly Pro Tyr Gly Pro Gly Ser Ser
225                 230                 235                 240

Ala Ala Ala Ala Ala Gly Gly Tyr Gly Tyr Gly Pro Gly Gln Gly
            245                 250                 255

Pro Tyr Gly Pro Gly Ala Ser Gly Gly Asn Gly Pro Ser Gly Gly
        260                 265                 270

Tyr Gly Pro Gly Gln Gln Gly Pro Gly Ser Ala Ala Ala Ala
        275                 280                 285

Gly Pro Gly Gly Gln Gly Pro Tyr Gly Pro Gly Ala Ser Ala Ala Ala
        290                 295                 300

```
Ala Ala Gly Gly Tyr Gly Pro Gly Gly Gln Gly Pro Gly Tyr Gly
305                 310                 315                 320

Pro Gly Ser Ser Gly Pro Gly Gly Gln Gly Pro Tyr Gly Pro Gly Ser
            325                 330                 335

Ser Ala Ala Ala Ala Gly Gly Tyr Gly Pro Gly Gln Gln Gly Pro
        340                 345                 350

Tyr Gly Pro Gly Gly Ser Ala Ala Ala Ala Gly Tyr Gln Gln
            355                 360                 365

Gly Pro Gly Gly Gln Gly Pro Tyr Gly Pro Gly Ala Ser Gly Pro Gly
    370                 375                 380

Gly Gln Gly Pro Tyr Gly Pro Gly Ala Ser Ala Ala Ala Ala Gly
385                 390                 395                 400

Pro Gly Gly Tyr Gly Pro Gly Gly Gln Gly Pro Ser Ala Ser Ala Ala
            405                 410                 415

Ala Ala Ala Gly Gly Tyr Gly Ser Gly Pro Gly Gly Tyr Gly Pro Tyr
        420                 425                 430

Gly Pro Gly Gly Ser Gly Pro Gly Ser Gly Gln Gln Gly Gln Gly Pro
            435                 440                 445

Tyr Gly Pro Gly Ala Ser Ala Ala Ala Ala Gly Tyr Gly Pro
    450                 455                 460

Gly Gln Gln Gly Pro Tyr Gly Pro Gly Gly Ser Ala Ala Ala Ala
465                 470                 475                 480

Gly Pro Gly Ser Gly Gly Tyr Gly Pro Gly Ala Ser Gly Gly Asn Gly
            485                 490                 495

Pro Gly Ser Gly Gly Tyr Gly Pro Gly Gln Gln Gly Pro Gly Gly Ser
            500                 505                 510

Ala Ala Ala Ala Ala Gly Gly Tyr Gln Gln Pro Gly Gly Gln Gly
        515                 520                 525

Pro Tyr Gly Pro Gly Ala Ser Ala Ala Ala Ala Gly Gly Tyr Gly
    530                 535                 540

Ser Gly Pro Gly Gln Gln Gly Pro Tyr Gly Pro Gly Gly Ser Gly Ser
545                 550                 555                 560

Gly Gln Gln Gly Pro Gly Gln Gln Gly Pro Tyr Ala Ser Ala Ala
            565                 570                 575

Ala Ala Gly Pro Gly Ser Gly Gln Gln Gly Pro Gly Ala Ser
        580                 585                 590

<210> SEQ ID NO 18
<211> LENGTH: 601
<212> TYPE: PRT
<213> ORGANISM: Artificial Sequence
<220> FEATURE:
<223> OTHER INFORMATION: Synthetic sequence, PRT399

<400> SEQUENCE: 18

Met His His His His His Ser Ser Gly Ser Ser Gly Pro Gly Gly
1               5                   10                  15

Gln Gly Pro Tyr Gly Pro Gly Ala Ser Ala Ala Ala Ala Gly Gly
            20                  25                  30

Asn Gly Pro Gly Ser Gly Gln Gln Gly Pro Gly Gly Ser Gly Gly Tyr
            35                  40                  45

Gly Pro Gly Gln Gly Pro Gly Gln Gly Pro Gly Ser Ser Ala
    50                  55                  60

Ala Ala Ala Ala Gly Pro Gly Gly Tyr Gly Pro Gly Gly Gln Gly Pro
65                  70                  75                  80
```

```
Ser Ala Ser Ala Ala Ala Ala Gly Pro Gly Ser Gly Gln Gln Gly
                85                  90                  95

Pro Gly Ala Ser Gly Gly Tyr Gly Pro Gly Gly Gln Gly Pro Gly Gln
            100                 105                 110

Gln Gly Pro Gly Ser Ser Ala Ala Ala Gly Gly Tyr Gly Ser
        115                 120                 125

Gly Pro Gly Gln Gln Gly Pro Tyr Gly Ser Ala Ala Ala Ala Gly
    130                 135                 140

Pro Gly Ser Gly Gly Tyr Gly Gln Pro Tyr Gly Pro Gly Ala Ser
145                 150                 155                 160

Gly Pro Gly Gly Tyr Gly Pro Gly Gly Gln Gly Pro Ser Ala Ser Ala
                165                 170                 175

Ala Ala Ala Ala Gly Ser Gly Gln Gln Gly Pro Gly Gly Tyr Gly Pro
            180                 185                 190

Tyr Ala Ser Ala Ala Ala Ala Gly Gly Tyr Gly Ser Gly Pro Gly
        195                 200                 205

Gln Gln Gly Pro Tyr Gly Pro Gly Ser Gly Ser Gly Gln Gln Gly
        210                 215                 220

Pro Gly Gln Gln Gly Pro Tyr Ala Ser Ala Ala Ala Ala Gly Pro
225                 230                 235                 240

Gly Gly Gln Gly Pro Tyr Gly Pro Gly Ser Ser Ala Ala Ala Ala
            245                 250                 255

Gly Gly Tyr Gly Tyr Gly Pro Gly Gln Gly Pro Tyr Gly Pro Gly
            260                 265                 270

Ala Ser Gly Gly Asn Gly Pro Gly Ser Gly Gly Tyr Gly Pro Gly Gln
            275                 280                 285

Gln Gly Pro Gly Ser Ala Ala Ala Ala Gly Pro Gly Gly Gln
        290                 295                 300

Gly Pro Tyr Gly Pro Gly Ala Ser Ala Ala Ala Ala Gly Gly Tyr
305                 310                 315                 320

Gly Pro Gly Gly Gln Gly Pro Gly Gly Tyr Gly Pro Gly Ser Ser Gly
                325                 330                 335

Pro Gly Gly Gln Gly Pro Tyr Gly Pro Gly Ser Ser Ala Ala Ala
            340                 345                 350

Ala Gly Gly Tyr Gly Pro Gly Gln Gln Gly Pro Tyr Gly Pro Gly Gly
            355                 360                 365

Ser Ala Ala Ala Ala Gly Gly Tyr Gln Gln Gly Pro Gly Gly Gln
        370                 375                 380

Gly Pro Tyr Gly Pro Gly Ala Ser Gly Pro Gly Gly Gln Gly Pro Tyr
385                 390                 395                 400

Gly Pro Gly Ala Ser Ala Ala Ala Ala Gly Pro Gly Gly Tyr Gly
            405                 410                 415

Pro Gly Gly Gln Gly Pro Ser Ala Ser Ala Ala Ala Ala Gly Gly
        420                 425                 430

Tyr Gly Ser Gly Pro Gly Gly Tyr Gly Pro Tyr Gly Pro Gly Gly Ser
    435                 440                 445

Gly Pro Gly Ser Gly Gln Gln Gly Gln Gly Pro Tyr Gly Pro Gly Ala
    450                 455                 460

Ser Ala Ala Ala Ala Ala Gly Gly Tyr Gly Pro Gly Gln Gln Gly Pro
465                 470                 475                 480

Tyr Gly Pro Gly Gly Ser Ala Ala Ala Ala Gly Pro Gly Ser Gly
            485                 490                 495
```

```
Gly Tyr Gly Pro Gly Ala Ser Gly Gly Asn Pro Gly Ser Gly Gly
            500                 505                 510

Tyr Gly Pro Gly Gln Gln Gly Pro Gly Gly Ser Ala Ala Ala Ala
            515                 520                 525

Gly Gly Tyr Gln Gln Gly Pro Gly Gln Gly Pro Tyr Gly Pro Gly
            530                 535                 540

Ala Ser Ala Ala Ala Ala Gly Gly Tyr Gly Ser Gly Pro Gly Gln
545                 550                 555                 560

Gln Gly Pro Tyr Gly Pro Gly Ser Gly Ser Gly Gln Gln Gly Pro
            565                 570                 575

Gly Gln Gln Gly Pro Tyr Ala Ser Ala Ala Ala Ala Gly Pro Gly
            580                 585                 590

Ser Gly Gln Gln Gly Pro Gly Ala Ser
            595                 600

<210> SEQ ID NO 19
<211> LENGTH: 612
<212> TYPE: PRT
<213> ORGANISM: Artificial Sequence
<220> FEATURE:
<223> OTHER INFORMATION: Synthetic sequence, Met-PRT720

<400> SEQUENCE: 19

Met Gly Pro Gly Gln Gln Gly Pro Tyr Gly Pro Gly Ala Ser Ala
1               5                   10                  15

Ala Ala Ala Gly Gln Asn Gly Pro Gly Ser Gly Gln Gln Gly Pro
            20                  25                  30

Gln Ser Gly Gln Tyr Gly Pro Gly Gln Gln Gly Pro Gly Gln Gly
            35                  40                  45

Pro Gly Ser Ser Ala Ala Ala Ala Gly Pro Gly Gln Tyr Val Leu
            50                  55                  60

Ile Gly Pro Gly Gln Gln Val Leu Ile Gly Pro Ser Ala Ser Ala
65                  70                  75                  80

Ala Ala Ala Gly Pro Gly Ser Gly Gln Gln Gly Pro Gly Ala Ser Gly
            85                  90                  95

Gln Tyr Gly Pro Gly Gln Gln Gly Pro Gly Gln Gln Gly Pro Gly Ser
            100                 105                 110

Ser Ala Ala Ala Ala Gly Ser Tyr Gly Ser Val Leu Ile Gly Pro
            115                 120                 125

Gly Gln Gln Val Leu Ile Gly Pro Tyr Gly Ser Ala Ala Ala Ala
            130                 135                 140

Gly Pro Gly Ser Gly Gln Tyr Gly Gln Gly Pro Tyr Gly Pro Gly Ala
145                 150                 155                 160

Ser Gly Pro Gly Gln Tyr Gly Pro Gly Gln Gln Gly Pro Ser Ala Ser
            165                 170                 175

Ala Ala Ala Ala Gly Ser Gly Gln Gln Val Leu Ile Gly Pro Gly
            180                 185                 190

Gln Tyr Val Leu Ile Gly Pro Tyr Ala Ser Ala Ala Ala Ala Gly
            195                 200                 205

Gln Tyr Gly Ser Gly Pro Gly Gln Gln Gly Pro Tyr Gly Pro Gly Gln
            210                 215                 220

Ser Gly Ser Gly Gln Gln Gly Pro Gln Gln Gly Pro Tyr Ala Ser
225                 230                 235                 240

Ala Ala Ala Ala Gly Pro Gly Gln Gln Val Leu Ile Gly Pro Tyr
            245                 250                 255
```

```
Val Leu Ile Gly Pro Gly Ser Ser Ala Ala Ala Ala Gly Gln Tyr
            260                 265                 270
Gly Tyr Gly Pro Gly Gln Gln Gly Pro Tyr Gly Pro Gly Ala Ser Gly
        275                 280                 285
Gln Asn Gly Pro Gly Ser Gly Gln Tyr Gly Pro Gly Gln Gln Gly Pro
        290                 295                 300
Gly Gln Ser Ala Ala Ala Ala Gly Pro Gly Gln Gln Val Leu Ile
305                 310                 315                 320
Gly Pro Tyr Val Leu Ile Gly Pro Gly Ser Ala Ala Ala Ala
                325                 330                 335
Gly Gln Tyr Gly Pro Gly Gln Gln Gly Pro Gly Gln Tyr Gly Pro Gly
            340                 345                 350
Ser Ser Gly Pro Gly Gln Gln Gly Pro Tyr Gly Pro Gly Ser Ser Ala
            355                 360                 365
Ala Ala Ala Ala Gly Ser Tyr Gly Pro Gly Gln Gln Val Leu Ile Gly
        370                 375                 380
Pro Tyr Val Leu Ile Gly Pro Gly Pro Ser Ala Ala Ala Ala Gly
385                 390                 395                 400
Gln Tyr Gln Gln Gly Pro Gly Gln Gln Gly Pro Tyr Gly Pro Gly Ala
            405                 410                 415
Ser Gly Pro Gly Gln Gln Gly Pro Tyr Gly Pro Gly Ala Ser Ala Ala
        420                 425                 430
Ala Ala Ala Gly Pro Gly Gln Tyr Val Leu Ile Gly Pro Gly Gln Gln
        435                 440                 445
Val Leu Ile Gly Pro Ser Ala Ser Ala Ala Ala Ala Gly Gln Tyr
        450                 455                 460
Gly Ser Gly Pro Gly Gln Tyr Gly Pro Tyr Gly Pro Gly Gln Ser Gly
465                 470                 475                 480
Pro Gly Ser Gly Gln Gln Gly Gln Gly Pro Tyr Gly Pro Gly Ala Ser
                485                 490                 495
Ala Ala Ala Ala Ala Gly Ser Tyr Gly Pro Gly Gln Gln Val Leu Ile
            500                 505                 510
Gly Pro Tyr Val Leu Ile Gly Pro Gly Pro Ser Ala Ala Ala Ala
        515                 520                 525
Gly Pro Gly Ser Gly Gln Tyr Gly Pro Gly Ala Ser Gly Gln Asn Gly
        530                 535                 540
Pro Gly Ser Gly Gln Tyr Gly Pro Gly Gln Gln Gly Pro Gly Gln Ser
545                 550                 555                 560
Ala Ala Ala Ala Ala Gly Gln Tyr Gln Gln Val Leu Ile Gly Pro Gly
            565                 570                 575
Gln Gln Gly Pro Tyr Val Leu Ile Gly Pro Gly Ala Ser Ala Ala Ala
            580                 585                 590
Ala Ala Gly Pro Gly Ser Gly Gln Gln Val Leu Ile Gly Pro Gly Ala
        595                 600                 605
Ser Val Leu Ile
    610
```

<210> SEQ ID NO 20
<211> LENGTH: 592
<212> TYPE: PRT
<213> ORGANISM: Artificial Sequence
<220> FEATURE:
<223> OTHER INFORMATION: Synthetic sequence, Met-PRT665

<400> SEQUENCE: 20

```
Met Gly Pro Gly Gln Gly Pro Tyr Gly Pro Gly Ala Ser Ala Ala
1               5                   10                  15

Ala Ala Ala Ala Ala Gly Ser Asn Gly Pro Gly Ser Gly Gln Gln Gly
            20                  25                  30

Pro Gly Gln Ser Gly Gln Tyr Gly Pro Gly Gln Gln Gly Pro Gly Gln
            35                  40                  45

Gln Gly Pro Gly Ser Ser Ala Ala Ala Ala Ala Gly Pro Gly
50                  55                  60

Gln Tyr Val Leu Ile Gly Pro Gly Gln Gln Pro Ser Ala Ser Ala
65                  70                  75                  80

Ala Ala Ala Ala Ala Gly Pro Gly Ser Gly Gln Gln Gly Pro Gly
            85                  90                  95

Ala Ser Gly Gln Tyr Gly Pro Gly Gln Gln Gly Pro Gly Gln Gln Gly
            100                 105                 110

Pro Gly Ser Ser Ala Ala Ala Ala Ala Ala Gly Ser Tyr Gly Ser
            115                 120                 125

Val Leu Ile Gly Pro Gly Gln Gln Gly Pro Tyr Gly Ser Ala Ala Ala
    130                 135                 140

Ala Ala Ala Ala Gly Pro Gly Ser Gly Gln Tyr Gly Gln Gly Pro Tyr
145                 150                 155                 160

Gly Pro Gly Ala Ser Gly Pro Gly Gln Tyr Gly Pro Gly Gln Gln Gly
            165                 170                 175

Pro Ser Ala Ser Ala Ala Ala Ala Ala Ala Gly Ser Gly Gln Gln
            180                 185                 190

Val Leu Ile Gly Pro Gly Gln Tyr Gly Pro Tyr Ala Ser Ala Ala Ala
    195                 200                 205

Ala Ala Ala Gly Ser Tyr Gly Ser Gly Pro Gly Gln Gln Gly Pro
210                 215                 220

Tyr Gly Pro Gly Gln Ser Gly Ser Gly Gln Gln Gly Pro Gly Gln Gln
225                 230                 235                 240

Gly Pro Tyr Ala Ser Ala Ala Ala Ala Ala Gly Pro Gly Gln
            245                 250                 255

Gln Val Leu Ile Gly Pro Tyr Gly Pro Gly Ser Ser Ala Ala Ala Ala
    260                 265                 270

Ala Ala Gly Ser Tyr Gly Tyr Gly Pro Gly Gln Gln Gly Pro Tyr
275                 280                 285

Gly Pro Gly Ala Ser Gly Gln Asn Gly Pro Gly Ser Gly Gln Tyr Gly
    290                 295                 300

Pro Gly Gln Gln Gly Pro Gly Pro Ser Ala Ala Ala Ala Ala Ala
305                 310                 315                 320

Gly Pro Gly Gln Gln Val Leu Ile Gly Pro Tyr Gly Pro Gly Ala Ser
            325                 330                 335

Ala Ala Ala Ala Ala Ala Gly Ser Tyr Gly Pro Gly Gln Gln Gly
            340                 345                 350

Pro Gly Gln Tyr Gly Pro Gly Ser Ser Gly Pro Gly Gln Gln Gly Pro
            355                 360                 365

Tyr Gly Pro Gly Ser Ser Ala Ala Ala Ala Ala Ala Gly Ser Tyr
370                 375                 380

Gly Pro Gly Gln Gln Val Leu Ile Gly Pro Tyr Gly Pro Gly Pro Ser
385                 390                 395                 400

Ala Ala Ala Ala Ala Ala Ala Gly Ser Tyr Gln Gln Gly Pro Gly Gln
            405                 410                 415

Gln Gly Pro Tyr Gly Pro Gly Ala Ser Gly Pro Gly Gln Gln Gly Pro
```

```
                    420                 425                 430
    Tyr Gly Pro Gly Ala Ser Ala Ala Ala Ala Ala Gly Pro Gly
            435                 440                 445

Gln Tyr Val Leu Ile Gly Pro Gly Gln Gln Gly Pro Ser Ala Ser Ala
        450                 455                 460

Ala Ala Ala Ala Ala Gly Ser Tyr Gly Ser Gly Pro Gly Gln Tyr
    465                 470                 475                 480

Gly Pro Tyr Gly Pro Gly Gln Ser Gly Pro Gly Ser Gly Gln Gln Gly
                    485                 490                 495

Gln Gly Pro Tyr Gly Pro Gly Ala Ser Ala Ala Ala Ala Ala Ala
                500                 505                 510

Gly Ser Tyr Gly Pro Gly Gln Gln Val Leu Ile Gly Pro Tyr Gly Pro
                515                 520                 525

Gly Pro Ser Ala Ala Ala Ala Ala Ala Gly Pro Gly Ser Gly Gln
            530                 535                 540

Tyr Gly Pro Gly Ala Ser Gly Gln Asn Gly Pro Gly Ser Gly Gln Tyr
    545                 550                 555                 560

Gly Pro Gly Gln Gln Gly Pro Gly Pro Ser Ala Ala Ala Ala Ala
                    565                 570                 575

Ala Gly Pro Gly Ser Gly Gln Gln Gly Pro Gly Ala Ser Val Leu Ile
                580                 585                 590

<210> SEQ ID NO 21
<211> LENGTH: 619
<212> TYPE: PRT
<213> ORGANISM: Artificial Sequence
<220> FEATURE:
<223> OTHER INFORMATION: Synthetic sequence, Met-PRT666

<400> SEQUENCE: 21

Met Gly Pro Gly Gln Gln Gly Pro Tyr Gly Pro Gly Ala Ser Ala Ala
1               5                   10                  15

Ala Ala Ala Ala Ala Gly Ser Asn Gly Pro Ser Gly Gln Gln Gly
            20                  25                  30

Pro Gly Gln Ser Gly Gln Tyr Gly Pro Gly Gln Gln Gly Pro Gly Gln
            35                  40                  45

Gln Gly Pro Gly Ser Ser Ala Ala Ala Ala Ala Ala Gly Pro Gly
        50                  55                  60

Gln Tyr Val Leu Ile Gly Pro Gly Gln Gln Val Leu Ile Gly Pro Ser
65                  70                  75                  80

Ala Ser Ala Ala Ala Ala Ala Ala Gly Pro Gly Ser Gly Gln Gln
            85                  90                  95

Gly Pro Gly Ala Ser Gly Gln Tyr Gly Pro Gly Gln Gln Gly Pro Gly
                100                 105                 110

Gln Gln Gly Pro Gly Ser Ser Ala Ala Ala Ala Ala Ala Gly Ser
            115                 120                 125

Tyr Gly Ser Val Leu Ile Gly Pro Gly Gln Gln Val Leu Ile Gly Pro
            130                 135                 140

Tyr Gly Ser Ala Ala Ala Ala Ala Ala Gly Pro Gly Ser Gly Gln
145                 150                 155                 160

Tyr Gly Gln Gly Pro Tyr Gly Pro Gly Ala Ser Gly Pro Gly Gln Tyr
                165                 170                 175

Gly Pro Gly Gln Gln Gly Pro Ser Ala Ser Ala Ala Ala Ala Ala
            180                 185                 190

Ala Gly Ser Gly Gln Gln Val Leu Ile Gly Pro Gly Gln Tyr Val Leu
```

```
            195                 200                 205
Ile Gly Pro Tyr Ala Ser Ala Ala Ala Ala Ala Gly Ser Tyr
210                 215                 220
Gly Ser Gly Pro Gly Gln Gly Pro Tyr Gly Pro Gly Gln Ser Gly
225                 230                 235                 240
Ser Gly Gln Gln Gly Pro Gln Gln Gly Pro Tyr Ala Ser Ala Ala
                    245                 250                 255
Ala Ala Ala Ala Ala Gly Pro Gly Gln Gln Val Leu Ile Gly Pro Tyr
                260                 265                 270
Val Leu Ile Gly Pro Gly Ser Ala Ala Ala Ala Ala Ala Gly
            275                 280                 285
Ser Tyr Gly Tyr Gly Pro Gly Gln Gln Gly Pro Tyr Gly Pro Gly Ala
        290                 295                 300
Ser Gly Gln Asn Gly Pro Gly Ser Gly Gln Tyr Gly Pro Gly Gln Gln
305                 310                 315                 320
Gly Pro Gly Pro Ser Ala Ala Ala Ala Ala Ala Gly Pro Gly Gln
                325                 330                 335
Gln Val Leu Ile Gly Pro Tyr Val Leu Ile Gly Pro Gly Ala Ser Ala
            340                 345                 350
Ala Ala Ala Ala Ala Gly Ser Tyr Gly Pro Gly Gln Gln Gly Pro
        355                 360                 365
Gly Gln Tyr Gly Pro Gly Ser Ser Gly Pro Gly Gln Gln Gly Pro Tyr
    370                 375                 380
Gly Pro Gly Ser Ser Ala Ala Ala Ala Ala Ala Gly Ser Tyr Gly
385                 390                 395                 400
Pro Gly Gln Gln Val Leu Ile Gly Pro Tyr Val Leu Ile Gly Pro Gly
                405                 410                 415
Pro Ser Ala Ala Ala Ala Ala Ala Gly Ser Tyr Gln Gln Gly Pro
                420                 425                 430
Gly Gln Gln Gly Pro Tyr Gly Pro Gly Ala Ser Gly Pro Gly Gln Gln
            435                 440                 445
Gly Pro Tyr Gly Pro Gly Ala Ser Ala Ala Ala Ala Ala Ala Gly
            450                 455                 460
Pro Gly Gln Tyr Val Leu Ile Gly Pro Gly Gln Gln Val Leu Ile Gly
465                 470                 475                 480
Pro Ser Ala Ser Ala Ala Ala Ala Ala Gly Ser Tyr Gly Ser
                485                 490                 495
Gly Pro Gly Gln Tyr Gly Pro Tyr Gly Pro Gly Gln Ser Gly Pro Gly
                500                 505                 510
Ser Gly Gln Gln Gly Gln Gly Pro Tyr Gly Pro Gly Ala Ser Ala Ala
            515                 520                 525
Ala Ala Ala Ala Gly Ser Tyr Gly Pro Gly Gln Gln Val Leu Ile
        530                 535                 540
Gly Pro Tyr Val Leu Ile Gly Pro Gly Pro Ser Ala Ala Ala Ala
545                 550                 555                 560
Ala Ala Gly Pro Gly Ser Gly Gln Tyr Gly Pro Gly Ala Ser Gly Gln
                565                 570                 575
Asn Gly Pro Gly Ser Gly Gln Tyr Gly Pro Gly Gln Gln Gly Pro Gly
            580                 585                 590
Pro Ser Ala Ala Ala Ala Ala Ala Gly Pro Gly Ser Gly Gln Gln
            595                 600                 605
Val Leu Ile Gly Pro Gly Ala Ser Val Leu Ile
            610                 615
```

<210> SEQ ID NO 22
<211> LENGTH: 623
<212> TYPE: PRT
<213> ORGANISM: Artificial Sequence
<220> FEATURE:
<223> OTHER INFORMATION: Synthetic sequence, PRT720

<400> SEQUENCE: 22

Met His His His His His Ser Ser Gly Ser Gly Pro Gly Gln
1               5                   10                  15

Gln Gly Pro Tyr Gly Pro Gly Ala Ser Ala Ala Ala Ala Gly Gln
            20                  25                  30

Asn Gly Pro Gly Ser Gly Gln Gln Gly Pro Gly Gln Ser Gly Gln Tyr
            35                  40                  45

Gly Pro Gly Gln Gln Gly Pro Gly Gln Gln Gly Pro Gly Ser Ser Ala
    50                  55                  60

Ala Ala Ala Ala Gly Pro Gly Gln Tyr Val Leu Ile Gly Pro Gly Gln
65                  70                  75                  80

Gln Val Leu Ile Gly Pro Ser Ala Ser Ala Ala Ala Ala Gly Pro
            85                  90                  95

Gly Ser Gly Gln Gln Gly Pro Gly Ala Ser Gly Gln Tyr Gly Pro Gly
            100                 105                 110

Gln Gln Gly Pro Gly Gln Gln Gly Pro Gly Ser Ser Ala Ala Ala
            115                 120                 125

Ala Gly Ser Tyr Gly Ser Val Leu Ile Gly Pro Gly Gln Gln Val Leu
            130                 135                 140

Ile Gly Pro Tyr Gly Ser Ala Ala Ala Ala Gly Pro Gly Ser Gly
145                 150                 155                 160

Gln Tyr Gly Gln Gly Pro Tyr Gly Pro Gly Ala Ser Gly Pro Gly Gln
            165                 170                 175

Tyr Gly Pro Gly Gln Gln Gly Pro Ser Ala Ser Ala Ala Ala Ala
            180                 185                 190

Gly Ser Gly Gln Gln Val Leu Ile Gly Pro Gly Gln Tyr Val Leu Ile
            195                 200                 205

Gly Pro Tyr Ala Ser Ala Ala Ala Ala Gly Gln Tyr Gly Ser Gly
            210                 215                 220

Pro Gly Gln Gln Gly Pro Tyr Gly Pro Gly Gln Ser Gly Ser Gly Gln
225                 230                 235                 240

Gln Gly Pro Gly Gln Gln Gly Pro Tyr Ala Ser Ala Ala Ala Ala
            245                 250                 255

Gly Pro Gly Gln Gln Val Leu Ile Gly Pro Tyr Val Leu Ile Gly Pro
            260                 265                 270

Gly Ser Ser Ala Ala Ala Ala Gly Gln Tyr Gly Tyr Gly Pro Gly
            275                 280                 285

Gln Gln Gly Pro Tyr Gly Pro Gly Ala Ser Gly Gln Asn Gly Pro Gly
            290                 295                 300

Ser Gly Gln Tyr Gly Pro Gly Gln Gly Pro Gly Gln Ser Ala Ala
305                 310                 315                 320

Ala Ala Ala Gly Pro Gly Gln Gln Val Leu Ile Gly Pro Tyr Val Leu
            325                 330                 335

Ile Gly Pro Gly Ala Ser Ala Ala Ala Ala Gly Gln Tyr Gly Pro
            340                 345                 350

Gly Gln Gln Gly Pro Gly Gln Tyr Gly Pro Gly Ser Ser Gly Pro Gly
            355                 360                 365

```
Gln Gly Pro Tyr Gly Pro Gly Ser Ala Ala Ala Ala Gly
    370                 375                 380

Ser Tyr Gly Pro Gly Gln Gln Val Leu Ile Gly Pro Tyr Val Leu Ile
385                 390                 395                 400

Gly Pro Gly Pro Ser Ala Ala Ala Ala Gly Gln Tyr Gln Gln Gly
                405                 410                 415

Pro Gly Gln Gln Gly Pro Tyr Gly Pro Gly Ala Ser Gly Pro Gly Gln
                420                 425                 430

Gln Gly Pro Tyr Gly Pro Gly Ala Ser Ala Ala Ala Ala Gly Pro
        435                 440                 445

Gly Gln Tyr Val Leu Ile Gly Pro Gly Gln Gln Val Leu Ile Gly Pro
        450                 455                 460

Ser Ala Ser Ala Ala Ala Ala Gly Gln Tyr Gly Ser Gly Pro Gly
465                 470                 475                 480

Gln Tyr Gly Pro Tyr Gly Pro Gly Gln Ser Gly Pro Gly Ser Gly Gln
                485                 490                 495

Gln Gly Gln Gly Pro Tyr Gly Pro Gly Ala Ser Ala Ala Ala Ala
                500                 505                 510

Gly Ser Tyr Gly Pro Gly Gln Gln Val Leu Ile Gly Pro Tyr Val Leu
        515                 520                 525

Ile Gly Pro Gly Pro Ser Ala Ala Ala Ala Gly Pro Gly Ser Gly
        530                 535                 540

Gln Tyr Gly Pro Gly Ala Ser Gly Gln Asn Gly Pro Gly Ser Gly Gln
545                 550                 555                 560

Tyr Gly Pro Gly Gln Gln Gly Pro Gly Gln Ser Ala Ala Ala Ala
                565                 570                 575

Gly Gln Tyr Gln Gln Val Leu Ile Gly Pro Gln Gln Gly Pro Tyr
        580                 585                 590

Val Leu Ile Gly Pro Gly Ala Ser Ala Ala Ala Ala Gly Pro Gly
                595                 600                 605

Ser Gly Gln Gln Val Leu Ile Gly Pro Gly Ala Ser Val Leu Ile
        610                 615                 620

<210> SEQ ID NO 23
<211> LENGTH: 603
<212> TYPE: PRT
<213> ORGANISM: Artificial Sequence
<220> FEATURE:
<223> OTHER INFORMATION: Synthetic sequence, PRT665

<400> SEQUENCE: 23

Met His His His His His Ser Ser Gly Ser Ser Gly Pro Gly Gln
1               5                   10                  15

Gln Gly Pro Tyr Gly Pro Gly Ala Ser Ala Ala Ala Ala Ala Ala
                20                  25                  30

Gly Ser Asn Gly Pro Gly Ser Gly Gln Gln Pro Gly Gln Ser Gly
            35                  40                  45

Gln Tyr Gly Pro Gly Gln Gln Gly Pro Gly Gln Gln Gly Pro Gly Ser
        50                  55                  60

Ser Ala Ala Ala Ala Ala Ala Gly Pro Gly Gln Tyr Val Leu Ile
65                  70                  75                  80

Gly Pro Gly Gln Gln Gly Pro Ser Ala Ser Ala Ala Ala Ala Ala
                85                  90                  95

Ala Gly Pro Gly Ser Gly Gln Gln Gly Pro Gly Ala Ser Gly Gln Tyr
                100                 105                 110
```

```
Gly Pro Gly Gln Gln Gly Pro Gly Gln Gln Gly Pro Gly Ser Ser Ala
            115                 120                 125

Ala Ala Ala Ala Ala Ala Gly Ser Tyr Gly Ser Val Leu Ile Gly Pro
            130                 135                 140

Gly Gln Gln Gly Pro Tyr Gly Ser Ala Ala Ala Ala Ala Ala Ala Gly
145                 150                 155                 160

Pro Gly Ser Gly Gln Tyr Gly Gln Gly Pro Tyr Gly Pro Gly Ala Ser
            165                 170                 175

Gly Pro Gly Gln Tyr Gly Pro Gly Gln Gln Gly Pro Ser Ala Ser Ala
            180                 185                 190

Ala Ala Ala Ala Ala Ala Gly Ser Gly Gln Gln Val Leu Ile Gly Pro
            195                 200                 205

Gly Gln Tyr Gly Pro Tyr Ala Ser Ala Ala Ala Ala Ala Ala Ala Gly
            210                 215                 220

Ser Tyr Gly Ser Gly Pro Gly Gln Gln Gly Pro Tyr Gly Pro Gly Gln
225                 230                 235                 240

Ser Gly Ser Gly Gln Gln Gly Pro Gly Gln Gln Gly Pro Tyr Ala Ser
            245                 250                 255

Ala Ala Ala Ala Ala Ala Ala Gly Pro Gly Gln Gln Val Leu Ile Gly
            260                 265                 270

Pro Tyr Gly Pro Gly Ser Ser Ala Ala Ala Ala Ala Ala Ala Gly Ser
            275                 280                 285

Tyr Gly Tyr Gly Pro Gly Gln Gln Gly Pro Tyr Gly Pro Gly Ala Ser
            290                 295                 300

Gly Gln Asn Gly Pro Gly Ser Gly Gln Tyr Gly Pro Gly Gln Gln Gly
305                 310                 315                 320

Pro Gly Pro Ser Ala Ala Ala Ala Ala Ala Gly Pro Gly Gln Gln
            325                 330                 335

Val Leu Ile Gly Pro Tyr Gly Pro Gly Ala Ser Ala Ala Ala Ala Ala
            340                 345                 350

Ala Ala Gly Ser Tyr Gly Pro Gly Gln Gln Gly Pro Gly Gln Tyr Gly
            355                 360                 365

Pro Gly Ser Ser Gly Pro Gly Gln Gln Gly Pro Tyr Gly Pro Gly Ser
            370                 375                 380

Ser Ala Ala Ala Ala Ala Ala Gly Ser Tyr Gly Pro Gly Gln Gln
385                 390                 395                 400

Val Leu Ile Gly Pro Tyr Gly Pro Gly Pro Ser Ala Ala Ala Ala Ala
            405                 410                 415

Ala Ala Gly Ser Tyr Gln Gln Gly Pro Gly Gln Gln Gly Pro Tyr Gly
            420                 425                 430

Pro Gly Ala Ser Gly Pro Gly Gln Gln Gly Pro Tyr Gly Pro Gly Ala
            435                 440                 445

Ser Ala Ala Ala Ala Ala Ala Gly Pro Gly Gln Tyr Val Leu Ile
450                 455                 460

Gly Pro Gly Gln Gln Gly Pro Ser Ala Ser Ala Ala Ala Ala Ala Ala
465                 470                 475                 480

Ala Gly Ser Tyr Gly Ser Gly Pro Gly Gln Tyr Gly Pro Tyr Gly Pro
            485                 490                 495

Gly Gln Ser Gly Pro Gly Ser Gly Gln Gln Gly Gln Gly Pro Tyr Gly
            500                 505                 510

Pro Gly Ala Ser Ala Ala Ala Ala Ala Ala Gly Ser Tyr Gly Pro
            515                 520                 525
```

```
Gly Gln Gln Val Leu Ile Gly Pro Tyr Gly Pro Ser Ala Ala
        530             535             540

Ala Ala Ala Ala Ala Gly Pro Gly Ser Gly Gln Tyr Gly Pro Gly Ala
545                 550                 555                 560

Ser Gly Gln Asn Gly Pro Gly Ser Gly Gln Tyr Gly Pro Gly Gln Gln
                565                 570                 575

Gly Pro Gly Pro Ser Ala Ala Ala Ala Ala Ala Gly Pro Gly Ser
            580                 585                 590

Gly Gln Gln Gly Pro Gly Ala Ser Val Leu Ile
    595                 600
```

<210> SEQ ID NO 24
<211> LENGTH: 630
<212> TYPE: PRT
<213> ORGANISM: Artificial Sequence
<220> FEATURE:
<223> OTHER INFORMATION: Synthetic sequence, PRT666

<400> SEQUENCE: 24

```
Met His His His His His Ser Ser Gly Ser Ser Gly Pro Gly Gln
1               5                   10                  15

Gln Gly Pro Tyr Gly Pro Gly Ala Ser Ala Ala Ala Ala Ala Ala
            20                  25                  30

Gly Ser Asn Gly Pro Gly Ser Gly Gln Gln Gly Pro Gly Gln Ser Gly
    35                  40                  45

Gln Tyr Gly Pro Gly Gln Gln Gly Pro Gly Gln Gln Gly Pro Gly Ser
50                  55                  60

Ser Ala Ala Ala Ala Ala Ala Gly Pro Gly Gln Tyr Val Leu Ile
65                  70                  75                  80

Gly Pro Gly Gln Gln Val Leu Ile Gly Pro Ser Ala Ser Ala Ala Ala
                85                  90                  95

Ala Ala Ala Ala Gly Pro Gly Ser Gly Gln Gln Gly Pro Gly Ala Ser
            100                 105                 110

Gly Gln Tyr Gly Pro Gly Gln Gln Gly Pro Gly Gln Gln Gly Pro Gly
        115                 120                 125

Ser Ser Ala Ala Ala Ala Ala Ala Gly Ser Tyr Gly Ser Val Leu
130                 135                 140

Ile Gly Pro Gly Gln Gln Val Leu Ile Gly Pro Tyr Gly Ser Ala Ala
145                 150                 155                 160

Ala Ala Ala Ala Ala Gly Pro Gly Ser Gly Gln Tyr Gly Gln Gly Pro
            165                 170                 175

Tyr Gly Pro Gly Ala Ser Gly Pro Gly Gln Tyr Gly Pro Gly Gln Gln
        180                 185                 190

Gly Pro Ser Ala Ser Ala Ala Ala Ala Ala Ala Gly Ser Gly Gln
    195                 200                 205

Gln Val Leu Ile Gly Pro Gly Gln Tyr Val Leu Ile Gly Pro Tyr Ala
210                 215                 220

Ser Ala Ala Ala Ala Ala Ala Gly Ser Tyr Gly Ser Gly Pro Gly
225                 230                 235                 240

Gln Gln Gly Pro Tyr Gly Pro Gly Gln Ser Gly Ser Gly Gln Gln Gly
            245                 250                 255

Pro Gly Gln Gln Gly Pro Tyr Ala Ser Ala Ala Ala Ala Ala Ala
        260                 265                 270

Gly Pro Gly Gln Gln Val Leu Ile Gly Pro Tyr Val Leu Ile Gly Pro
    275                 280                 285
```

```
Gly Ser Ser Ala Ala Ala Ala Ala Ala Gly Ser Tyr Gly Tyr Gly
    290                 295                 300

Pro Gly Gln Gln Gly Pro Tyr Gly Pro Gly Ala Ser Gly Gln Asn Gly
305                 310                 315                 320

Pro Gly Ser Gly Gln Tyr Gly Pro Gly Gln Gln Gly Pro Gly Pro Ser
                325                 330                 335

Ala Ala Ala Ala Ala Ala Gly Pro Gly Gln Gln Val Leu Ile Gly
            340                 345                 350

Pro Tyr Val Leu Ile Gly Pro Gly Ala Ser Ala Ala Ala Ala Ala
        355                 360                 365

Ala Gly Ser Tyr Gly Pro Gly Gln Gln Gly Pro Gly Gln Tyr Gly Pro
    370                 375                 380

Gly Ser Ser Gly Pro Gly Gln Gln Gly Pro Tyr Gly Pro Gly Ser Ser
385                 390                 395                 400

Ala Ala Ala Ala Ala Ala Gly Ser Tyr Gly Pro Gly Gln Gln Val
                405                 410                 415

Leu Ile Gly Pro Tyr Val Leu Ile Gly Pro Gly Ser Ala Ala Ala
            420                 425                 430

Ala Ala Ala Ala Gly Ser Tyr Gln Gln Gly Pro Gly Gln Gln Gly Pro
    435                 440                 445

Tyr Gly Pro Gly Ala Ser Gly Pro Gly Gln Gln Gly Pro Tyr Gly Pro
    450                 455                 460

Gly Ala Ser Ala Ala Ala Ala Ala Ala Gly Pro Gly Gln Tyr Val
465                 470                 475                 480

Leu Ile Gly Pro Gly Gln Gln Val Leu Ile Gly Pro Ser Ala Ser Ala
            485                 490                 495

Ala Ala Ala Ala Ala Gly Ser Tyr Gly Ser Gly Pro Gly Gln Tyr
            500                 505                 510

Gly Pro Tyr Gly Pro Gly Gln Ser Gly Pro Gly Ser Gly Gln Gln Gly
        515                 520                 525

Gln Gly Pro Tyr Gly Pro Gly Ala Ser Ala Ala Ala Ala Ala Ala
    530                 535                 540

Gly Ser Tyr Gly Pro Gly Gln Gln Val Leu Ile Gly Pro Tyr Val Leu
545                 550                 555                 560

Ile Gly Pro Gly Pro Ser Ala Ala Ala Ala Ala Ala Gly Pro Gly
            565                 570                 575

Ser Gly Gln Tyr Gly Pro Gly Ala Ser Gly Gln Asn Gly Pro Gly Ser
        580                 585                 590

Gly Gln Tyr Gly Pro Gly Gln Gln Gly Pro Gly Pro Ser Ala Ala Ala
    595                 600                 605

Ala Ala Ala Ala Gly Pro Gly Ser Gly Gln Gln Val Leu Ile Gly Pro
    610                 615                 620

Gly Ala Ser Val Leu Ile
625                 630
```

<210> SEQ ID NO 25
<211> LENGTH: 593
<212> TYPE: PRT
<213> ORGANISM: Artificial Sequence
<220> FEATURE:
<223> OTHER INFORMATION: Synthetic sequence, Met-PRT888

<400> SEQUENCE: 25

```
Met Gly Ser Ser Gly Pro Gly Val Leu Gly Pro Tyr Gly Pro Gly Ala
1               5                   10                  15
```

Ser Ala Ala Ala Ala Ala Gly Gln Asn Gly Pro Gly Ser Gly Val Leu
                20                  25                  30

Gly Pro Gly Gln Ser Gln Tyr Gly Pro Gly Val Leu Gly Pro Gly
            35                  40                  45

Val Leu Gly Pro Gly Ser Ser Ala Ala Ala Ala Gly Pro Gly Gln
 50                  55                  60

Tyr Gly Pro Gly Val Leu Gly Pro Ser Ala Ser Ala Ala Ala Ala
 65                  70                  75                  80

Gly Pro Gly Ser Gly Val Leu Gly Pro Gly Ala Ser Gly Gln Tyr Gly
                85                  90                  95

Pro Gly Val Leu Gly Pro Gly Val Leu Gly Pro Gly Ser Ser Ala Ala
            100                 105                 110

Ala Ala Ala Gly Gln Tyr Gly Ser Gly Pro Gly Val Leu Gly Pro Tyr
        115                 120                 125

Gly Ser Ala Ala Ala Ala Ala Gly Pro Gly Ser Gly Gln Tyr Gly Gln
    130                 135                 140

Gly Pro Tyr Gly Pro Gly Ala Ser Gly Pro Gly Gln Tyr Gly Pro Gly
145                 150                 155                 160

Val Leu Gly Pro Ser Ala Ser Ala Ala Ala Ala Gly Ser Gly Val
                165                 170                 175

Leu Gly Pro Gly Gln Tyr Gly Pro Tyr Ala Ser Ala Ala Ala Ala
            180                 185                 190

Gly Gln Tyr Gly Ser Gly Pro Gly Val Leu Gly Pro Tyr Gly Pro Gly
        195                 200                 205

Gln Ser Gly Ser Gly Val Leu Gly Pro Gly Val Leu Gly Pro Tyr Ala
    210                 215                 220

Ser Ala Ala Ala Ala Ala Gly Pro Gly Val Leu Gly Pro Tyr Gly Pro
225                 230                 235                 240

Gly Ser Ser Ala Ala Ala Ala Gly Gln Tyr Gly Tyr Gly Pro Gly
                245                 250                 255

Val Leu Gly Pro Tyr Gly Pro Gly Ala Ser Gly Gln Asn Gly Pro Gly
            260                 265                 270

Ser Gly Gln Tyr Gly Pro Gly Val Leu Gly Pro Gly Gln Ser Ala Ala
        275                 280                 285

Ala Ala Ala Gly Pro Gly Val Leu Gly Pro Tyr Gly Pro Gly Ala Ser
    290                 295                 300

Ala Ala Ala Ala Gly Gln Tyr Gly Pro Gly Val Leu Gly Pro Gly
305                 310                 315                 320

Gln Tyr Gly Pro Gly Ser Ser Gly Pro Gly Val Leu Gly Pro Tyr Gly
                325                 330                 335

Pro Gly Ser Ser Ala Ala Ala Ala Gly Gln Tyr Gly Pro Gly Val
            340                 345                 350

Leu Gly Pro Tyr Gly Pro Gly Gln Ser Ala Ala Ala Ala Gly Gln
        355                 360                 365

Tyr Val Leu Gly Pro Gly Val Leu Gly Pro Tyr Gly Pro Gly Ala Ser
    370                 375                 380

Gly Pro Gly Val Leu Gly Pro Tyr Gly Pro Gly Ala Ser Ala Ala Ala
385                 390                 395                 400

Ala Ala Gly Pro Gly Gln Tyr Gly Pro Gly Val Leu Gly Pro Ser Ala
                405                 410                 415

Ser Ala Ala Ala Ala Gly Gln Tyr Gly Ser Gly Pro Gly Gln Tyr
            420                 425                 430

Gly Pro Tyr Gly Pro Gly Gln Ser Gly Pro Gly Ser Gly Val Leu Gly

-continued

```
            435                 440                 445
Gln Gly Pro Tyr Gly Pro Gly Ala Ser Ala Ala Ala Ala Gly Gln
        450                 455                 460

Tyr Gly Pro Gly Val Leu Gly Pro Tyr Gly Pro Gly Gln Ser Ala Ala
465                 470                 475                 480

Ala Ala Ala Gly Pro Gly Ser Gly Gln Tyr Gly Pro Gly Ala Ser Gly
                485                 490                 495

Gln Asn Gly Pro Gly Ser Gly Gln Tyr Gly Pro Gly Val Leu Gly Pro
            500                 505                 510

Gly Gln Ser Ala Ala Ala Ala Gly Gln Tyr Val Leu Gly Pro Gly
            515                 520                 525

Val Leu Gly Pro Tyr Gly Pro Gly Ala Ser Ala Ala Ala Ala Gly
        530                 535                 540

Gln Tyr Gly Ser Gly Pro Gly Val Leu Gly Pro Tyr Gly Pro Gly Gln
545                 550                 555                 560

Ser Gly Ser Gly Val Leu Gly Pro Gly Val Leu Gly Pro Tyr Ala Ser
                565                 570                 575

Ala Ala Ala Ala Ala Gly Pro Gly Ser Gly Val Leu Gly Pro Gly Ala
            580                 585                 590

Ser
```

<210> SEQ ID NO 26
<211> LENGTH: 590
<212> TYPE: PRT
<213> ORGANISM: Artificial Sequence
<220> FEATURE:
<223> OTHER INFORMATION: Synthetic sequence, Met-PRT965

<400> SEQUENCE: 26

```
Met Gly Pro Gly Thr Ser Gly Pro Tyr Gly Pro Gly Ala Ser Ala Ala
1               5                   10                  15

Ala Ala Ala Gly Ala Asn Gly Pro Gly Ser Gly Thr Ser Gly Pro Gly
            20                  25                  30

Ala Ser Gly Ala Tyr Gly Pro Gly Thr Ser Gly Pro Gly Thr Ser Gly
        35                  40                  45

Pro Gly Ser Ser Ala Ala Ala Ala Gly Pro Gly Ala Tyr Gly Pro
    50                  55                  60

Gly Thr Ser Gly Pro Ser Ala Ser Ala Ala Ala Ala Gly Pro Gly
65                  70                  75                  80

Ser Gly Thr Ser Gly Pro Gly Ala Ser Gly Ala Tyr Gly Pro Gly Thr
                85                  90                  95

Ser Gly Pro Gly Thr Ser Gly Pro Gly Ser Ser Ala Ala Ala Ala
            100                 105                 110

Gly Ala Tyr Gly Ser Gly Pro Gly Thr Ser Gly Pro Tyr Gly Ser Ala
        115                 120                 125

Ala Ala Ala Gly Pro Gly Ser Gly Ala Tyr Gly Ala Gly Pro Tyr
    130                 135                 140

Gly Pro Gly Ala Ser Gly Pro Gly Ala Tyr Gly Pro Gly Thr Ser Gly
145                 150                 155                 160

Pro Ser Ala Ser Ala Ala Ala Ala Gly Ser Gly Thr Ser Gly Pro
                165                 170                 175

Gly Ala Tyr Gly Pro Tyr Ala Ser Ala Ala Ala Ala Gly Ala Tyr
        180                 185                 190

Gly Ser Gly Pro Gly Thr Ser Gly Pro Tyr Gly Pro Gly Ala Ser Gly
    195                 200                 205
```

```
Ser Gly Thr Ser Gly Pro Thr Ser Gly Pro Tyr Ala Ser Ala Ala
    210                 215                 220

Ala Ala Ala Gly Pro Gly Thr Ser Gly Pro Tyr Gly Pro Gly Ser Ser
225                 230                 235                 240

Ala Ala Ala Ala Ala Gly Ala Tyr Gly Tyr Gly Pro Gly Thr Ser Gly
                245                 250                 255

Pro Tyr Gly Pro Gly Ala Ser Gly Ala Asn Gly Pro Gly Ser Gly Ala
                260                 265                 270

Tyr Gly Pro Gly Thr Ser Gly Pro Gly Ala Ser Ala Ala Ala Ala Ala
            275                 280                 285

Gly Pro Gly Thr Ser Gly Pro Tyr Gly Pro Gly Ala Ser Ala Ala Ala
        290                 295                 300

Ala Ala Gly Ala Tyr Gly Pro Gly Thr Ser Gly Pro Gly Ala Tyr Gly
305                 310                 315                 320

Pro Gly Ser Ser Gly Pro Gly Thr Ser Gly Pro Tyr Gly Pro Gly Ser
                325                 330                 335

Ser Ala Ala Ala Ala Gly Ala Tyr Gly Pro Gly Thr Ser Gly Pro
                340                 345                 350

Tyr Gly Pro Gly Ala Ser Ala Ala Ala Ala Gly Ala Tyr Thr Ser
            355                 360                 365

Gly Pro Gly Thr Ser Gly Pro Tyr Gly Pro Gly Ala Ser Gly Pro Gly
        370                 375                 380

Thr Ser Gly Pro Tyr Gly Pro Gly Ala Ser Ala Ala Ala Ala Gly
385                 390                 395                 400

Pro Gly Ala Tyr Gly Pro Gly Thr Ser Gly Pro Ser Ala Ser Ala Ala
                405                 410                 415

Ala Ala Ala Gly Ala Tyr Gly Ser Gly Pro Gly Ala Tyr Gly Pro Tyr
                420                 425                 430

Gly Pro Gly Ala Ser Gly Pro Gly Ser Gly Thr Ser Gly Ala Gly Pro
            435                 440                 445

Tyr Gly Pro Gly Ala Ser Ala Ala Ala Ala Gly Ala Tyr Gly Pro
    450                 455                 460

Gly Thr Ser Gly Pro Tyr Gly Pro Gly Ala Ser Ala Ala Ala Ala
465                 470                 475                 480

Gly Pro Gly Ser Gly Ala Tyr Gly Pro Gly Ala Ser Gly Ala Asn Gly
                485                 490                 495

Pro Gly Ser Gly Ala Tyr Gly Pro Gly Thr Ser Gly Pro Gly Ala Ser
                500                 505                 510

Ala Ala Ala Ala Gly Ala Tyr Thr Ser Gly Pro Gly Thr Ser Gly
        515                 520                 525

Pro Tyr Gly Pro Gly Ala Ser Ala Ala Ala Ala Gly Ala Tyr Gly
    530                 535                 540

Ser Gly Pro Gly Thr Ser Gly Pro Tyr Gly Pro Gly Ala Ser Gly Ser
545                 550                 555                 560

Gly Thr Ser Gly Pro Gly Thr Ser Gly Pro Tyr Ala Ser Ala Ala Ala
                565                 570                 575

Ala Ala Gly Pro Gly Ser Gly Thr Ser Gly Pro Gly Ala Ser
                580                 585                 590

<210> SEQ ID NO 27
<211> LENGTH: 593
<212> TYPE: PRT
<213> ORGANISM: Artificial Sequence
<220> FEATURE:
```

<223> OTHER INFORMATION: Synthetic sequence, Met-PRT889

<400> SEQUENCE: 27

```
Met Gly Ser Ser Gly Pro Gly Val Leu Gly Pro Tyr Gly Pro Gly Ala
1               5                   10                  15

Ser Ala Ala Ala Ala Gly Ile Asn Gly Pro Gly Ser Gly Val Leu
            20                  25                  30

Gly Pro Gly Ile Ser Gly Ile Tyr Gly Pro Gly Val Leu Pro Gly
            35                  40                  45

Val Leu Gly Pro Gly Ser Ser Ala Ala Ala Ala Gly Pro Gly Ile
        50                  55                  60

Tyr Gly Pro Gly Val Leu Gly Pro Ser Ala Ser Ala Ala Ala Ala
65                  70                  75                  80

Gly Pro Gly Ser Gly Val Leu Gly Pro Gly Ala Ser Gly Ile Tyr Gly
            85                  90                  95

Pro Gly Val Leu Gly Pro Gly Val Leu Gly Pro Gly Ser Ser Ala Ala
                100                 105                 110

Ala Ala Ala Gly Ile Tyr Gly Ser Gly Pro Gly Val Leu Gly Pro Tyr
            115                 120                 125

Gly Ser Ala Ala Ala Ala Gly Pro Gly Ser Gly Ile Tyr Gly Ile
130                 135                 140

Gly Pro Tyr Gly Pro Gly Ala Ser Gly Pro Gly Ile Tyr Gly Pro Gly
145                 150                 155                 160

Val Leu Gly Pro Ser Ala Ser Ala Ala Ala Ala Gly Ser Gly Val
                165                 170                 175

Leu Gly Pro Gly Ile Tyr Gly Pro Tyr Ala Ser Ala Ala Ala Ala
            180                 185                 190

Gly Ile Tyr Gly Ser Gly Pro Gly Val Leu Gly Pro Tyr Gly Pro Gly
            195                 200                 205

Ile Ser Gly Ser Gly Val Leu Gly Pro Gly Val Leu Gly Pro Tyr Ala
    210                 215                 220

Ser Ala Ala Ala Ala Gly Pro Gly Val Leu Gly Pro Tyr Gly Pro
225                 230                 235                 240

Gly Ser Ser Ala Ala Ala Ala Gly Ile Tyr Gly Tyr Gly Pro Gly
                245                 250                 255

Val Leu Gly Pro Tyr Gly Pro Gly Ala Ser Gly Ile Asn Gly Pro Gly
                260                 265                 270

Ser Gly Ile Tyr Gly Pro Gly Val Leu Gly Pro Gly Ile Ser Ala Ala
            275                 280                 285

Ala Ala Ala Gly Pro Gly Val Leu Gly Pro Tyr Gly Pro Gly Ala Ser
            290                 295                 300

Ala Ala Ala Ala Gly Ile Tyr Gly Pro Gly Val Leu Gly Pro Gly
305                 310                 315                 320

Ile Tyr Gly Pro Gly Ser Ser Gly Pro Gly Val Leu Gly Pro Tyr Gly
                325                 330                 335

Pro Gly Ser Ser Ala Ala Ala Ala Gly Ile Tyr Gly Pro Gly Val
            340                 345                 350

Leu Gly Pro Tyr Gly Pro Gly Ile Ser Ala Ala Ala Ala Gly Ile
            355                 360                 365

Tyr Val Leu Gly Pro Gly Val Leu Gly Pro Tyr Gly Pro Gly Ala Ser
    370                 375                 380

Gly Pro Gly Val Leu Gly Pro Tyr Gly Pro Gly Ala Ser Ala Ala Ala
385                 390                 395                 400
```

```
Ala Ala Gly Pro Gly Ile Tyr Gly Pro Gly Val Leu Gly Pro Ser Ala
            405                 410                 415

Ser Ala Ala Ala Ala Gly Ile Tyr Gly Ser Gly Pro Gly Ile Tyr
        420                 425                 430

Gly Pro Tyr Gly Pro Gly Ile Ser Gly Pro Gly Ser Gly Val Leu Gly
            435                 440                 445

Ile Gly Pro Tyr Gly Pro Gly Ala Ser Ala Ala Ala Ala Gly Ile
    450                 455                 460

Tyr Gly Pro Gly Val Leu Gly Pro Tyr Gly Pro Gly Ile Ser Ala Ala
465                 470                 475                 480

Ala Ala Ala Gly Pro Gly Ser Gly Ile Tyr Gly Pro Gly Ala Ser Gly
            485                 490                 495

Ile Asn Gly Pro Gly Ser Gly Ile Tyr Gly Pro Gly Val Leu Gly Pro
            500                 505                 510

Gly Ile Ser Ala Ala Ala Ala Gly Ile Tyr Val Leu Gly Pro Gly
            515                 520                 525

Val Leu Gly Pro Tyr Gly Pro Gly Ala Ser Ala Ala Ala Ala Gly
            530                 535                 540

Ile Tyr Gly Ser Gly Pro Gly Val Leu Gly Pro Tyr Gly Pro Gly Ile
545                 550                 555                 560

Ser Gly Ser Gly Val Leu Gly Pro Gly Val Leu Gly Pro Tyr Ala Ser
                565                 570                 575

Ala Ala Ala Ala Gly Pro Gly Ser Gly Val Leu Gly Pro Gly Ala
            580                 585                 590

Ser

<210> SEQ ID NO 28
<211> LENGTH: 590
<212> TYPE: PRT
<213> ORGANISM: Artificial Sequence
<220> FEATURE:
<223> OTHER INFORMATION: Synthetic sequence, Met-PRT916

<400> SEQUENCE: 28

Met Gly Pro Gly Val Ile Gly Pro Tyr Gly Pro Gly Ala Ser Ala Ala
1               5                   10                  15

Ala Ala Ala Gly Leu Asn Gly Pro Gly Ser Gly Val Ile Gly Pro Gly
            20                  25                  30

Leu Ser Gly Leu Tyr Gly Pro Gly Val Ile Gly Pro Gly Val Ile Gly
            35                  40                  45

Pro Gly Ser Ser Ala Ala Ala Ala Ala Gly Pro Gly Leu Tyr Gly Pro
    50                  55                  60

Gly Val Ile Gly Pro Ser Ala Ser Ala Ala Ala Ala Gly Pro Gly
65                  70                  75                  80

Ser Gly Val Ile Gly Pro Gly Ala Ser Gly Leu Tyr Gly Pro Gly Val
                85                  90                  95

Ile Gly Pro Gly Val Ile Gly Pro Gly Ser Ser Ala Ala Ala Ala
            100                 105                 110

Gly Leu Tyr Gly Ser Gly Pro Gly Val Ile Gly Pro Tyr Gly Ser Ala
            115                 120                 125

Ala Ala Ala Gly Pro Gly Ser Gly Leu Tyr Gly Leu Gly Pro Tyr
            130                 135                 140

Gly Pro Gly Ala Ser Gly Pro Gly Leu Tyr Gly Pro Gly Val Ile Gly
145                 150                 155                 160

Pro Ser Ala Ser Ala Ala Ala Ala Gly Ser Gly Val Ile Gly Pro
```

```
                165                 170                 175
Gly Leu Tyr Gly Pro Tyr Ala Ser Ala Ala Ala Ala Gly Leu Tyr
            180                 185                 190
Gly Ser Gly Pro Gly Val Ile Gly Pro Tyr Gly Pro Gly Leu Ser Gly
            195                 200                 205
Ser Gly Val Ile Gly Pro Val Ile Gly Pro Tyr Ala Ser Ala Ala
        210                 215                 220
Ala Ala Ala Gly Pro Gly Val Ile Gly Pro Tyr Gly Pro Gly Ser Ser
225                 230                 235                 240
Ala Ala Ala Ala Ala Gly Leu Tyr Gly Tyr Gly Pro Gly Val Ile Gly
                245                 250                 255
Pro Tyr Gly Pro Gly Ala Ser Gly Leu Asn Gly Pro Gly Ser Gly Leu
                260                 265                 270
Tyr Gly Pro Gly Val Ile Gly Pro Gly Leu Ser Ala Ala Ala Ala Ala
                275                 280                 285
Gly Pro Gly Val Ile Gly Pro Tyr Gly Pro Gly Ala Ser Ala Ala Ala
                290                 295                 300
Ala Ala Gly Leu Tyr Gly Pro Gly Val Ile Gly Pro Gly Leu Tyr Gly
305                 310                 315                 320
Pro Gly Ser Ser Gly Pro Gly Val Ile Gly Pro Tyr Gly Pro Gly Ser
                325                 330                 335
Ser Ala Ala Ala Ala Ala Gly Leu Tyr Gly Pro Gly Val Ile Gly Pro
                340                 345                 350
Tyr Gly Pro Gly Leu Ser Ala Ala Ala Ala Gly Leu Tyr Val Ile
                355                 360                 365
Gly Pro Gly Val Ile Gly Pro Tyr Gly Pro Gly Ala Ser Gly Pro Gly
                370                 375                 380
Val Ile Gly Pro Tyr Gly Pro Gly Ala Ser Ala Ala Ala Ala Gly
385                 390                 395                 400
Pro Gly Leu Tyr Gly Pro Gly Val Ile Gly Pro Ser Ala Ser Ala Ala
                405                 410                 415
Ala Ala Ala Gly Leu Tyr Gly Ser Gly Pro Gly Leu Tyr Gly Pro Tyr
                420                 425                 430
Gly Pro Gly Leu Ser Gly Pro Gly Ser Gly Val Ile Gly Leu Gly Pro
                435                 440                 445
Tyr Gly Pro Gly Ala Ser Ala Ala Ala Ala Gly Leu Tyr Gly Pro
                450                 455                 460
Gly Val Ile Gly Pro Tyr Gly Pro Gly Leu Ser Ala Ala Ala Ala
465                 470                 475                 480
Gly Pro Gly Ser Gly Leu Tyr Gly Pro Gly Ala Ser Gly Leu Asn Gly
                485                 490                 495
Pro Gly Ser Gly Leu Tyr Gly Pro Gly Val Ile Gly Pro Gly Leu Ser
                500                 505                 510
Ala Ala Ala Ala Ala Gly Leu Tyr Val Ile Gly Pro Gly Val Ile Gly
                515                 520                 525
Pro Tyr Gly Pro Gly Ala Ser Ala Ala Ala Ala Gly Leu Tyr Gly
                530                 535                 540
Ser Gly Pro Gly Val Ile Gly Pro Tyr Gly Pro Gly Leu Ser Gly Ser
545                 550                 555                 560
Gly Val Ile Gly Pro Gly Val Ile Gly Pro Tyr Ala Ser Ala Ala Ala
                565                 570                 575
Ala Ala Gly Pro Gly Ser Gly Val Ile Gly Pro Gly Ala Ser
                580                 585                 590
```

<210> SEQ ID NO 29
<211> LENGTH: 590
<212> TYPE: PRT
<213> ORGANISM: Artificial Sequence
<220> FEATURE:
<223> OTHER INFORMATION: Synthetic sequence, Met-PRT918

<400> SEQUENCE: 29

```
Met Gly Pro Gly Val Phe Gly Pro Tyr Gly Pro Gly Ala Ser Ala Ala
1               5                   10                  15

Ala Ala Ala Gly Ile Asn Gly Pro Gly Ser Gly Val Phe Gly Pro Gly
            20                  25                  30

Ile Ser Gly Ile Tyr Gly Pro Gly Val Phe Gly Pro Gly Val Phe Gly
        35                  40                  45

Pro Gly Ser Ser Ala Ala Ala Ala Gly Pro Gly Ile Tyr Gly Pro
    50                  55                  60

Gly Val Phe Gly Pro Ser Ala Ser Ala Ala Ala Ala Gly Pro Gly
65              70                  75                  80

Ser Gly Val Phe Gly Pro Gly Ala Ser Gly Ile Tyr Gly Pro Gly Val
                85                  90                  95

Phe Gly Pro Gly Val Phe Gly Pro Gly Ser Ser Ala Ala Ala Ala
                100                 105                 110

Gly Ile Tyr Gly Ser Gly Pro Gly Val Phe Gly Pro Tyr Gly Ser Ala
            115                 120                 125

Ala Ala Ala Ala Gly Pro Gly Ser Gly Ile Tyr Gly Ile Gly Pro Tyr
        130                 135                 140

Gly Pro Gly Ala Ser Gly Pro Gly Ile Tyr Gly Pro Gly Val Phe Gly
145                 150                 155                 160

Pro Ser Ala Ser Ala Ala Ala Ala Gly Ser Gly Val Phe Gly Pro
                165                 170                 175

Gly Ile Tyr Gly Pro Tyr Ala Ser Ala Ala Ala Ala Gly Ile Tyr
            180                 185                 190

Gly Ser Gly Pro Gly Val Phe Gly Pro Tyr Gly Pro Gly Ile Ser Gly
            195                 200                 205

Ser Gly Val Phe Gly Pro Gly Val Phe Gly Pro Tyr Ala Ser Ala Ala
        210                 215                 220

Ala Ala Ala Gly Pro Gly Val Phe Gly Pro Tyr Gly Pro Gly Ser Ser
225                 230                 235                 240

Ala Ala Ala Ala Ala Gly Ile Tyr Gly Tyr Gly Pro Gly Val Phe Gly
            245                 250                 255

Pro Tyr Gly Pro Gly Ala Ser Gly Ile Asn Gly Pro Gly Ser Gly Ile
            260                 265                 270

Tyr Gly Pro Gly Val Phe Gly Pro Gly Ile Ser Ala Ala Ala Ala Ala
        275                 280                 285

Gly Pro Gly Val Phe Gly Pro Tyr Gly Pro Gly Ala Ser Ala Ala Ala
        290                 295                 300

Ala Ala Gly Ile Tyr Gly Pro Gly Val Phe Gly Pro Gly Ile Tyr Gly
305                 310                 315                 320

Pro Gly Ser Ser Gly Pro Gly Val Phe Gly Pro Tyr Gly Pro Gly Ser
                325                 330                 335

Ser Ala Ala Ala Ala Gly Ile Tyr Gly Pro Gly Val Phe Gly Pro
            340                 345                 350

Tyr Gly Pro Gly Ile Ser Ala Ala Ala Ala Gly Ile Tyr Val Phe
            355                 360                 365
```

```
Gly Pro Gly Val Phe Gly Pro Tyr Gly Pro Gly Ala Ser Gly Pro Gly
    370                 375                 380

Val Phe Gly Pro Tyr Gly Pro Gly Ala Ser Ala Ala Ala Ala Ala Gly
385                 390                 395                 400

Pro Gly Ile Tyr Gly Pro Gly Val Phe Gly Pro Ser Ala Ser Ala Ala
            405                 410                 415

Ala Ala Ala Gly Ile Tyr Gly Ser Gly Pro Gly Ile Tyr Gly Pro Tyr
        420                 425                 430

Gly Pro Gly Ile Ser Gly Pro Gly Ser Gly Val Phe Gly Ile Gly Pro
            435                 440                 445

Tyr Gly Pro Gly Ala Ser Ala Ala Ala Ala Gly Ile Tyr Gly Pro
        450                 455                 460

Gly Val Phe Gly Pro Tyr Gly Pro Gly Ile Ser Ala Ala Ala Ala
465                 470                 475                 480

Gly Pro Gly Ser Gly Ile Tyr Gly Pro Gly Ala Ser Gly Ile Asn Gly
            485                 490                 495

Pro Gly Ser Gly Ile Tyr Gly Pro Gly Val Phe Gly Pro Gly Ile Ser
            500                 505                 510

Ala Ala Ala Ala Ala Gly Ile Tyr Val Phe Gly Pro Val Phe Gly
            515                 520                 525

Pro Tyr Gly Pro Gly Ala Ser Ala Ala Ala Ala Gly Ile Tyr Gly
        530                 535                 540

Ser Gly Pro Gly Val Phe Gly Pro Tyr Gly Pro Gly Ile Ser Gly Ser
545                 550                 555                 560

Gly Val Phe Gly Pro Gly Val Phe Gly Pro Tyr Ala Ser Ala Ala Ala
                565                 570                 575

Ala Ala Gly Pro Gly Ser Gly Val Phe Gly Pro Gly Ala Ser
        580                 585                 590

<210> SEQ ID NO 30
<211> LENGTH: 565
<212> TYPE: PRT
<213> ORGANISM: Artificial Sequence
<220> FEATURE:
<223> OTHER INFORMATION: Synthetic sequence, Met-PRT699

<400> SEQUENCE: 30

Met Gly Pro Gly Val Leu Gly Pro Tyr Gly Pro Gly Ala Ser Ala Ala
1               5                   10                  15

Ala Ala Ala Ala Gly Ser Asn Gly Pro Gly Ser Gly Val Leu Gly
            20                  25                  30

Pro Gly Gln Ser Gly Gln Tyr Gly Pro Gly Val Leu Gly Pro Gly Val
        35                  40                  45

Leu Gly Pro Gly Ser Ser Ala Ala Ala Ala Ala Gly Pro Gly
    50                  55                  60

Gln Tyr Gly Pro Gly Val Leu Gly Pro Ser Ala Ser Ala Ala Ala
65                  70                  75                  80

Ala Ala Ala Gly Pro Gly Ser Gly Val Leu Gly Pro Gly Ala Ser Gly
            85                  90                  95

Gln Tyr Gly Pro Gly Val Leu Gly Pro Gly Val Leu Gly Pro Gly Ser
            100                 105                 110

Ser Ala Ala Ala Ala Ala Ala Gly Ser Tyr Gly Ser Gly Pro Gly
        115                 120                 125

Val Leu Gly Pro Tyr Gly Ser Ala Ala Ala Ala Ala Ala Gly Pro
            130                 135                 140
```

```
Gly Ser Gly Gln Tyr Gly Gln Gly Pro Tyr Gly Pro Gly Ala Ser Gly
145                 150                 155                 160

Pro Gly Gln Tyr Gly Pro Gly Val Leu Gly Pro Ser Ala Ser Ala Ala
                165                 170                 175

Ala Ala Ala Ala Ala Gly Ser Gly Val Leu Gly Pro Gln Tyr Gly
            180                 185                 190

Pro Tyr Ala Ser Ala Ala Ala Ala Ala Gly Ser Tyr Gly Ser
        195                 200                 205

Gly Pro Gly Val Leu Gly Pro Tyr Gly Pro Gln Ser Gly Ser Gly
        210                 215                 220

Val Leu Gly Pro Gly Val Leu Gly Pro Tyr Ala Ser Ala Ala Ala
225                 230                 235                 240

Ala Ala Ala Gly Pro Gly Val Leu Gly Pro Tyr Gly Pro Gly Ser Ser
            245                 250                 255

Ala Ala Ala Ala Ala Ala Gly Ser Tyr Gly Tyr Gly Pro Gly Val
            260                 265                 270

Leu Gly Pro Tyr Gly Pro Gly Ala Ser Gly Gln Asn Gly Pro Gly Ser
        275                 280                 285

Gly Gln Tyr Gly Pro Gly Val Leu Gly Pro Gly Ser Ala Ala Ala
        290                 295                 300

Ala Ala Ala Ala Gly Pro Gly Val Leu Gly Pro Tyr Gly Pro Gly Ala
305                 310                 315                 320

Ser Ala Ala Ala Ala Ala Ala Gly Ser Tyr Gly Pro Gly Val Leu
            325                 330                 335

Gly Pro Gly Gln Tyr Gly Pro Gly Ser Ser Gly Pro Gly Val Leu Gly
            340                 345                 350

Pro Tyr Gly Pro Gly Ser Ser Ala Ala Ala Ala Ala Ala Gly Ser
        355                 360                 365

Tyr Gly Pro Gly Val Leu Gly Pro Tyr Gly Pro Gly Pro Ser Ala Ala
        370                 375                 380

Ala Ala Ala Ala Gly Ser Tyr Val Leu Gly Pro Gly Val Leu Gly
385                 390                 395                 400

Pro Tyr Gly Pro Gly Ala Ser Gly Pro Gly Val Leu Gly Pro Tyr Gly
            405                 410                 415

Pro Gly Ala Ser Ala Ala Ala Ala Ala Gly Pro Gly Gln Tyr
        420                 425                 430

Gly Pro Gly Val Leu Gly Pro Ser Ala Ser Ala Ala Ala Ala Ala
        435                 440                 445

Ala Gly Ser Tyr Gly Ser Gly Pro Gly Gln Tyr Gly Pro Tyr Gly Pro
    450                 455                 460

Gly Gln Ser Gly Pro Gly Ser Gly Val Leu Gly Gln Gly Pro Tyr Gly
465                 470                 475                 480

Pro Gly Ala Ser Ala Ala Ala Ala Ala Gly Ser Tyr Gly Pro
        485                 490                 495

Gly Val Leu Gly Pro Tyr Gly Pro Gly Pro Ser Ala Ala Ala Ala
        500                 505                 510

Ala Ala Gly Pro Gly Ser Gly Gln Tyr Gly Pro Gly Ala Ser Gly Gln
        515                 520                 525

Asn Gly Pro Gly Ser Gly Gln Tyr Gly Pro Gly Val Leu Gly Pro Gly
        530                 535                 540

Pro Ser Ala Ala Ala Ala Ala Ala Gly Pro Gly Ser Gly Val Leu
545                 550                 555                 560
```

Gly Pro Gly Ala Ser
            565

<210> SEQ ID NO 31
<211> LENGTH: 565
<212> TYPE: PRT
<213> ORGANISM: Artificial Sequence
<220> FEATURE:
<223> OTHER INFORMATION: Synthetic sequence, Met-PRT698

<400> SEQUENCE: 31

Met Gly Pro Gly Val Leu Gly Pro Tyr Gly Pro Gly Ala Ser Ala Ala
1               5                   10                  15

Ala Ala Ala Ala Ala Gly Ser Asn Gly Pro Gly Ser Gly Val Leu Gly
            20                  25                  30

Pro Gly Ile Ser Gly Ile Tyr Gly Pro Gly Val Leu Gly Pro Gly Val
        35                  40                  45

Leu Gly Pro Gly Ser Ser Ala Ala Ala Ala Ala Ala Gly Pro Gly
    50                  55                  60

Ile Tyr Gly Pro Gly Val Leu Gly Pro Ser Ala Ser Ala Ala Ala Ala
65                  70                  75                  80

Ala Ala Ala Gly Pro Gly Ser Gly Val Leu Gly Pro Gly Ala Ser Gly
                85                  90                  95

Ile Tyr Gly Pro Gly Val Leu Gly Pro Gly Val Leu Gly Pro Gly Ser
            100                 105                 110

Ser Ala Ala Ala Ala Ala Ala Gly Ser Tyr Gly Ser Gly Pro Gly
        115                 120                 125

Val Leu Gly Pro Tyr Gly Ser Ala Ala Ala Ala Ala Ala Gly Pro
    130                 135                 140

Gly Ser Gly Ile Tyr Gly Ile Gly Pro Tyr Gly Pro Gly Ala Ser Gly
145                 150                 155                 160

Pro Gly Ile Tyr Gly Pro Gly Val Leu Gly Pro Ser Ala Ser Ala Ala
                165                 170                 175

Ala Ala Ala Ala Ala Gly Ser Gly Val Leu Gly Pro Gly Ile Tyr Gly
            180                 185                 190

Pro Tyr Ala Ser Ala Ala Ala Ala Ala Ala Gly Ser Tyr Gly Ser
        195                 200                 205

Gly Pro Gly Val Leu Gly Pro Tyr Gly Pro Gly Ile Ser Gly Ser Gly
    210                 215                 220

Val Leu Gly Pro Gly Val Leu Gly Pro Tyr Ala Ser Ala Ala Ala Ala
225                 230                 235                 240

Ala Ala Ala Gly Pro Gly Val Leu Gly Pro Tyr Gly Pro Gly Ser Ser
                245                 250                 255

Ala Ala Ala Ala Ala Ala Gly Ser Tyr Gly Tyr Gly Pro Gly Val
            260                 265                 270

Leu Gly Pro Tyr Gly Pro Gly Ala Ser Gly Ile Asn Gly Pro Gly Ser
        275                 280                 285

Gly Ile Tyr Gly Pro Gly Val Leu Gly Pro Gly Pro Ser Ala Ala Ala
    290                 295                 300

Ala Ala Ala Ala Gly Pro Gly Val Leu Gly Pro Tyr Gly Pro Gly Ala
305                 310                 315                 320

Ser Ala Ala Ala Ala Ala Ala Gly Ser Tyr Gly Pro Gly Val Leu
                325                 330                 335

Gly Pro Gly Ile Tyr Gly Pro Gly Ser Ser Gly Pro Gly Val Leu Gly
            340                 345                 350

```
Pro Tyr Gly Pro Gly Ser Ser Ala Ala Ala Ala Ala Ala Gly Ser
        355                 360                 365

Tyr Gly Pro Gly Val Leu Gly Pro Tyr Gly Pro Gly Pro Ser Ala Ala
370                 375                 380

Ala Ala Ala Ala Ala Gly Ser Tyr Val Leu Gly Pro Gly Val Leu Gly
385                 390                 395                 400

Pro Tyr Gly Pro Gly Ala Ser Gly Pro Gly Val Leu Gly Pro Tyr Gly
                405                 410                 415

Pro Gly Ala Ser Ala Ala Ala Ala Ala Ala Gly Pro Gly Ile Tyr
            420                 425                 430

Gly Pro Gly Val Leu Gly Pro Ser Ala Ser Ala Ala Ala Ala Ala
    435                 440                 445

Ala Gly Ser Tyr Gly Ser Gly Pro Gly Ile Tyr Gly Pro Tyr Gly Pro
450                 455                 460

Gly Ile Ser Gly Pro Gly Ser Gly Val Leu Gly Ile Gly Pro Tyr Gly
465                 470                 475                 480

Pro Gly Ala Ser Ala Ala Ala Ala Ala Gly Ser Tyr Gly Pro
                485                 490                 495

Gly Val Leu Gly Pro Tyr Gly Pro Gly Pro Ser Ala Ala Ala Ala
            500                 505                 510

Ala Ala Gly Pro Gly Ser Gly Ile Tyr Gly Pro Gly Ala Ser Gly Ile
        515                 520                 525

Asn Gly Pro Gly Ser Gly Ile Tyr Gly Pro Gly Val Leu Gly Pro Gly
            530                 535                 540

Pro Ser Ala Ala Ala Ala Ala Ala Gly Pro Gly Ser Gly Val Leu
545                 550                 555                 560

Gly Pro Gly Ala Ser
                565

<210> SEQ ID NO 32
<211> LENGTH: 1179
<212> TYPE: PRT
<213> ORGANISM: Artificial Sequence
<220> FEATURE:
<223> OTHER INFORMATION: Synthetic sequence, Met-PRT966

<400> SEQUENCE: 32

Met Gly Pro Gly Val Phe Gly Pro Tyr Gly Pro Gly Ala Ser Ala Ala
1               5                   10                  15

Ala Ala Ala Gly Ile Asn Gly Pro Gly Ser Gly Val Phe Gly Pro Gly
            20                  25                  30

Ile Ser Gly Ile Tyr Gly Pro Gly Val Phe Gly Pro Gly Val Phe Gly
        35                  40                  45

Pro Gly Ser Ser Ala Ala Ala Ala Gly Pro Gly Ile Tyr Gly Pro
    50                  55                  60

Gly Val Phe Gly Pro Ser Ala Ser Ala Ala Ala Ala Gly Pro Gly
65                  70                  75                  80

Ser Gly Val Phe Gly Pro Gly Ala Ser Gly Ile Tyr Gly Pro Gly Val
                85                  90                  95

Phe Gly Pro Gly Val Phe Gly Pro Gly Ser Ser Ala Ala Ala Ala
            100                 105                 110

Gly Ile Tyr Gly Ser Gly Pro Gly Val Phe Gly Pro Tyr Gly Ser Ala
        115                 120                 125

Ala Ala Ala Ala Gly Pro Gly Ser Gly Ile Tyr Gly Ile Gly Pro Tyr
    130                 135                 140
```

```
Gly Pro Gly Ala Ser Gly Pro Gly Ile Tyr Gly Pro Gly Val Phe Gly
145                 150                 155                 160

Pro Ser Ala Ser Ala Ala Ala Ala Gly Ser Gly Val Phe Gly Pro
            165                 170                 175

Gly Ile Tyr Gly Pro Tyr Ala Ser Ala Ala Ala Ala Gly Ile Tyr
            180                 185                 190

Gly Ser Gly Pro Gly Val Phe Gly Pro Tyr Gly Pro Gly Ile Ser Gly
        195                 200                 205

Ser Gly Val Phe Gly Pro Val Phe Gly Pro Tyr Ala Ser Ala Ala
        210                 215                 220

Ala Ala Ala Gly Pro Gly Val Phe Gly Pro Tyr Gly Pro Gly Ser Ser
225                 230                 235                 240

Ala Ala Ala Ala Ala Gly Ile Tyr Gly Tyr Gly Pro Gly Val Phe Gly
                245                 250                 255

Pro Tyr Gly Pro Gly Ala Ser Gly Ile Asn Gly Pro Gly Ser Gly Ile
            260                 265                 270

Tyr Gly Pro Gly Val Phe Gly Pro Gly Ile Ser Ala Ala Ala Ala
        275                 280                 285

Gly Pro Gly Val Phe Gly Pro Tyr Gly Pro Ala Ser Ala Ala Ala
        290                 295                 300

Ala Ala Gly Ile Tyr Gly Pro Gly Val Phe Gly Pro Gly Ile Tyr Gly
305                 310                 315                 320

Pro Gly Ser Ser Gly Pro Gly Val Phe Gly Pro Tyr Gly Pro Gly Ser
                325                 330                 335

Ser Ala Ala Ala Ala Ala Gly Ile Tyr Gly Pro Gly Val Phe Gly Pro
            340                 345                 350

Tyr Gly Pro Gly Ile Ser Ala Ala Ala Ala Gly Ile Tyr Val Phe
        355                 360                 365

Gly Pro Gly Val Phe Gly Pro Tyr Gly Pro Gly Ala Ser Gly Pro Gly
        370                 375                 380

Val Phe Gly Pro Tyr Gly Pro Gly Ala Ser Ala Ala Ala Ala Gly
385                 390                 395                 400

Pro Gly Ile Tyr Gly Pro Gly Val Phe Gly Pro Ser Ala Ser Ala Ala
            405                 410                 415

Ala Ala Ala Gly Ile Tyr Gly Ser Gly Pro Gly Ile Tyr Gly Pro Tyr
            420                 425                 430

Gly Pro Gly Ile Ser Gly Pro Gly Ser Gly Val Phe Gly Ile Gly Pro
            435                 440                 445

Tyr Gly Pro Gly Ala Ser Ala Ala Ala Ala Gly Ile Tyr Gly Pro
        450                 455                 460

Gly Val Phe Gly Pro Tyr Gly Pro Gly Ile Ser Ala Ala Ala Ala
465                 470                 475                 480

Gly Pro Gly Ser Gly Ile Tyr Gly Pro Gly Ala Ser Gly Ile Asn Gly
            485                 490                 495

Pro Gly Ser Gly Ile Tyr Gly Pro Gly Val Phe Gly Pro Gly Ile Ser
            500                 505                 510

Ala Ala Ala Ala Ala Gly Ile Tyr Val Phe Gly Pro Gly Val Phe Gly
                515                 520                 525

Pro Tyr Gly Pro Gly Ala Ser Ala Ala Ala Ala Gly Ile Tyr Gly
        530                 535                 540

Ser Gly Pro Gly Val Phe Gly Pro Tyr Gly Pro Gly Ile Ser Gly Ser
545                 550                 555                 560

Gly Val Phe Gly Pro Gly Val Phe Gly Pro Tyr Ala Ser Ala Ala Ala
```

```
              565                 570                 575
Ala Ala Gly Pro Gly Ser Gly Val Phe Gly Pro Gly Ala Ser Gly Pro
            580                 585                 590
Gly Val Phe Gly Pro Tyr Gly Pro Gly Ala Ser Ala Ala Ala Ala Ala
            595                 600                 605
Gly Ile Asn Gly Pro Gly Ser Gly Val Phe Gly Pro Gly Ile Ser Gly
            610                 615                 620
Ile Tyr Gly Pro Gly Val Phe Gly Pro Gly Val Phe Gly Pro Gly Ser
625                 630                 635                 640
Ser Ala Ala Ala Ala Gly Pro Gly Ile Tyr Gly Pro Gly Val Phe
                645                 650                 655
Gly Pro Ser Ala Ser Ala Ala Ala Ala Gly Pro Gly Ser Gly Val
            660                 665                 670
Phe Gly Pro Gly Ala Ser Gly Ile Tyr Gly Pro Gly Val Phe Gly Pro
            675                 680                 685
Gly Val Phe Gly Pro Gly Ser Ser Ala Ala Ala Ala Gly Ile Tyr
            690                 695                 700
Gly Ser Gly Pro Gly Val Phe Gly Pro Tyr Gly Ser Ala Ala Ala Ala
705                 710                 715                 720
Ala Gly Pro Gly Ser Gly Ile Tyr Gly Ile Gly Pro Tyr Gly Pro Gly
                725                 730                 735
Ala Ser Pro Gly Ile Tyr Gly Pro Gly Val Phe Gly Pro Ser Ala
            740                 745                 750
Ser Ala Ala Ala Ala Gly Ser Gly Val Phe Gly Pro Gly Ile Tyr
            755                 760                 765
Gly Pro Tyr Ala Ser Ala Ala Ala Ala Gly Ile Tyr Gly Ser Gly
            770                 775                 780
Pro Gly Val Phe Gly Pro Tyr Gly Pro Gly Ile Ser Gly Ser Gly Val
785                 790                 795                 800
Phe Gly Pro Gly Val Phe Gly Pro Tyr Ala Ser Ala Ala Ala Ala
            805                 810                 815
Gly Pro Gly Val Phe Gly Pro Tyr Gly Pro Gly Ser Ser Ala Ala Ala
            820                 825                 830
Ala Ala Gly Ile Tyr Gly Tyr Gly Pro Gly Val Phe Gly Pro Tyr Gly
            835                 840                 845
Pro Gly Ala Ser Gly Ile Asn Gly Pro Gly Ser Gly Ile Tyr Gly Pro
            850                 855                 860
Gly Val Phe Gly Pro Gly Ile Ser Ala Ala Ala Ala Gly Pro Gly
865                 870                 875                 880
Val Phe Gly Pro Tyr Gly Pro Gly Ala Ser Ala Ala Ala Ala Ala Gly
            885                 890                 895
Ile Tyr Gly Pro Gly Val Phe Gly Pro Gly Ile Tyr Gly Pro Gly Ser
            900                 905                 910
Ser Gly Pro Gly Val Phe Gly Pro Tyr Gly Pro Gly Ser Ser Ala Ala
            915                 920                 925
Ala Ala Ala Gly Ile Tyr Gly Pro Gly Val Phe Gly Pro Tyr Gly Pro
            930                 935                 940
Gly Ile Ser Ala Ala Ala Ala Gly Ile Tyr Val Phe Gly Pro Gly
945                 950                 955                 960
Val Phe Gly Pro Tyr Gly Pro Gly Ala Ser Gly Pro Gly Val Phe Gly
            965                 970                 975
Pro Tyr Gly Pro Gly Ala Ser Ala Ala Ala Ala Gly Pro Gly Ile
            980                 985                 990
```

-continued

```
Tyr Gly Pro Gly Val Phe Gly Pro Ser Ala Ser Ala Ala  Ala Ala Ala
        995                 1000                1005

Gly Ile  Tyr Gly Ser Gly Pro  Gly Ile Tyr Gly Pro  Tyr Gly Pro
        1010                1015                1020

Gly Ile  Ser Gly Pro Gly Ser  Gly Val Phe Gly Ile  Gly Pro Tyr
        1025                1030                1035

Gly Pro  Gly Ala Ser Ala Ala  Ala Ala Ala Gly Ile  Tyr Gly Pro
        1040                1045                1050

Gly Val  Phe Gly Pro Tyr Gly  Pro Gly Ile Ser Ala  Ala Ala Ala
        1055                1060                1065

Ala Gly  Pro Gly Ser Gly Ile  Tyr Gly Pro Gly Ala  Ser Gly Ile
        1070                1075                1080

Asn Gly  Pro Gly Ser Gly Ile  Tyr Gly Pro Gly Val  Phe Gly Pro
        1085                1090                1095

Gly Ile  Ser Ala Ala Ala Ala  Gly Ile Tyr Val Phe  Gly Pro
        1100                1105                1110

Gly Val  Phe Gly Pro Tyr Gly  Pro Gly Ala Ser Ala  Ala Ala Ala
        1115                1120                1125

Ala Gly  Ile Tyr Gly Ser Gly  Pro Gly Val Phe Gly  Pro Tyr Gly
        1130                1135                1140

Pro Gly  Ile Ser Gly Ser Gly  Val Phe Gly Pro Gly  Val Phe Gly
        1145                1150                1155

Pro Tyr  Ala Ser Ala Ala Ala  Ala Gly Pro Gly Ser  Gly Val
        1160                1165                1170

Phe Gly  Pro Gly Ala Ser
        1175

<210> SEQ ID NO 33
<211> LENGTH: 601
<212> TYPE: PRT
<213> ORGANISM: Artificial Sequence
<220> FEATURE:
<223> OTHER INFORMATION: Synthetic sequence, PRT888

<400> SEQUENCE: 33

Met His His His His His His Ser Ser Gly Ser Ser Gly Pro Gly Val
1               5                   10                  15

Leu Gly Pro Tyr Gly Pro Gly Ala Ser Ala Ala Ala Ala Gly Gln
            20                  25                  30

Asn Gly Pro Gly Ser Gly Val Leu Gly Pro Gly Gln Ser Gly Gln Tyr
        35                  40                  45

Gly Pro Gly Val Leu Gly Pro Gly Val Leu Gly Pro Gly Ser Ser Ala
    50                  55                  60

Ala Ala Ala Gly Pro Gly Gln Tyr Gly Pro Gly Val Leu Gly Pro
65                  70                  75                  80

Ser Ala Ser Ala Ala Ala Ala Gly Pro Gly Ser Gly Val Leu Gly
                85                  90                  95

Pro Gly Ala Ser Gly Gln Tyr Gly Pro Gly Val Leu Gly Pro Gly Val
            100                 105                 110

Leu Gly Pro Gly Ser Ser Ala Ala Ala Ala Gly Gln Tyr Gly Ser
        115                 120                 125

Gly Pro Gly Val Leu Gly Pro Tyr Gly Ser Ala Ala Ala Ala Gly
    130                 135                 140

Pro Gly Ser Gly Gln Tyr Gly Gln Gly Pro Tyr Gly Pro Gly Ala Ser
145                 150                 155                 160
```

```
Gly Pro Gly Gln Tyr Gly Pro Gly Val Leu Gly Pro Ser Ala Ser Ala
                165                 170                 175

Ala Ala Ala Ala Gly Ser Gly Val Leu Gly Pro Gly Gln Tyr Gly Pro
            180                 185                 190

Tyr Ala Ser Ala Ala Ala Ala Gly Gln Tyr Gly Ser Gly Pro Gly
        195                 200                 205

Val Leu Gly Pro Tyr Gly Pro Gly Gln Ser Gly Ser Gly Val Leu Gly
    210                 215                 220

Pro Gly Val Leu Gly Pro Tyr Ala Ser Ala Ala Ala Ala Gly Pro
225                 230                 235                 240

Gly Val Leu Gly Pro Tyr Gly Pro Gly Ser Ser Ala Ala Ala Ala Ala
                245                 250                 255

Gly Gln Tyr Gly Tyr Gly Pro Gly Val Leu Gly Pro Tyr Gly Pro Gly
            260                 265                 270

Ala Ser Gly Gln Asn Gly Pro Gly Ser Gly Gln Tyr Gly Pro Gly Val
        275                 280                 285

Leu Gly Pro Gly Gln Ser Ala Ala Ala Ala Gly Pro Gly Val Leu
    290                 295                 300

Gly Pro Tyr Gly Pro Gly Ala Ser Ala Ala Ala Ala Gly Gln Tyr
305                 310                 315                 320

Gly Pro Gly Val Leu Gly Pro Gly Gln Tyr Gly Pro Gly Ser Ser Gly
                325                 330                 335

Pro Gly Val Leu Gly Pro Tyr Gly Pro Gly Ser Ser Ala Ala Ala Ala
            340                 345                 350

Ala Gly Gln Tyr Gly Pro Gly Val Leu Gly Pro Tyr Gly Pro Gly Gln
        355                 360                 365

Ser Ala Ala Ala Ala Gly Gln Tyr Val Leu Gly Pro Gly Val Leu
    370                 375                 380

Gly Pro Tyr Gly Pro Gly Ala Ser Gly Pro Gly Val Leu Gly Pro Tyr
385                 390                 395                 400

Gly Pro Gly Ala Ser Ala Ala Ala Ala Gly Pro Gly Gln Tyr Gly
                405                 410                 415

Pro Gly Val Leu Gly Pro Ser Ala Ser Ala Ala Ala Ala Gly Gln
            420                 425                 430

Tyr Gly Ser Gly Pro Gly Gln Tyr Gly Pro Tyr Gly Pro Gly Gln Ser
        435                 440                 445

Gly Pro Gly Ser Gly Val Leu Gly Gln Gly Pro Tyr Gly Pro Gly Ala
    450                 455                 460

Ser Ala Ala Ala Ala Ala Gly Gln Tyr Gly Pro Gly Val Leu Gly Pro
465                 470                 475                 480

Tyr Gly Pro Gly Gln Ser Ala Ala Ala Ala Gly Pro Gly Ser Gly
                485                 490                 495

Gln Tyr Gly Pro Gly Ala Ser Gly Gln Asn Gly Pro Gly Ser Gly Gln
            500                 505                 510

Tyr Gly Pro Gly Val Leu Gly Pro Gly Gln Ser Ala Ala Ala Ala
        515                 520                 525

Gly Gln Tyr Val Leu Gly Pro Gly Val Leu Gly Pro Tyr Gly Pro Gly
    530                 535                 540

Ala Ser Ala Ala Ala Ala Gly Gln Tyr Gly Ser Gly Pro Gly Val
545                 550                 555                 560

Leu Gly Pro Tyr Gly Pro Gly Gln Ser Gly Ser Gly Val Leu Gly Pro
                565                 570                 575
```

```
Gly Val Leu Gly Pro Tyr Ala Ser Ala Ala Ala Ala Gly Pro Gly
            580                 585                 590

Ser Gly Val Leu Gly Pro Gly Ala Ser
        595                 600

<210> SEQ ID NO 34
<211> LENGTH: 601
<212> TYPE: PRT
<213> ORGANISM: Artificial Sequence
<220> FEATURE:
<223> OTHER INFORMATION: Synthetic sequence, PRT965

<400> SEQUENCE: 34

Met His His His His His His Ser Ser Gly Ser Ser Gly Pro Gly Thr
1               5                   10                  15

Ser Gly Pro Tyr Gly Pro Gly Ala Ser Ala Ala Ala Ala Gly Ala
            20                  25                  30

Asn Gly Pro Gly Ser Gly Thr Ser Gly Pro Gly Ala Ser Gly Ala Tyr
            35                  40                  45

Gly Pro Gly Thr Ser Gly Pro Gly Thr Ser Gly Pro Gly Ser Ser Ala
            50                  55                  60

Ala Ala Ala Ala Gly Pro Gly Ala Tyr Gly Pro Gly Thr Ser Gly Pro
65                  70                  75                  80

Ser Ala Ser Ala Ala Ala Ala Gly Pro Gly Ser Gly Thr Ser Gly
            85                  90                  95

Pro Gly Ala Ser Gly Ala Tyr Gly Pro Gly Thr Ser Gly Pro Gly Thr
            100                 105                 110

Ser Gly Pro Gly Ser Ser Ala Ala Ala Ala Gly Ala Tyr Gly Ser
            115                 120                 125

Gly Pro Gly Thr Ser Gly Pro Tyr Gly Ser Ala Ala Ala Ala Gly
            130                 135                 140

Pro Gly Ser Gly Ala Tyr Gly Ala Gly Pro Tyr Gly Pro Gly Ala Ser
145                 150                 155                 160

Gly Pro Gly Ala Tyr Gly Pro Gly Thr Ser Gly Pro Ser Ala Ser Ala
            165                 170                 175

Ala Ala Ala Gly Ser Gly Thr Ser Gly Pro Gly Ala Tyr Gly Pro
            180                 185                 190

Tyr Ala Ser Ala Ala Ala Ala Gly Ala Tyr Gly Ser Gly Pro Gly
            195                 200                 205

Thr Ser Gly Pro Tyr Gly Pro Gly Ala Ser Gly Ser Gly Thr Ser Gly
            210                 215                 220

Pro Gly Thr Ser Gly Pro Tyr Ala Ser Ala Ala Ala Ala Gly Pro
225                 230                 235                 240

Gly Thr Ser Gly Pro Tyr Gly Pro Gly Ser Ser Ala Ala Ala Ala
            245                 250                 255

Gly Ala Tyr Gly Tyr Gly Pro Gly Thr Ser Gly Pro Tyr Gly Pro Gly
            260                 265                 270

Ala Ser Gly Ala Asn Gly Pro Gly Ser Gly Ala Tyr Gly Pro Gly Thr
            275                 280                 285

Ser Gly Pro Gly Ala Ser Ala Ala Ala Ala Gly Pro Gly Thr Ser
            290                 295                 300

Gly Pro Tyr Gly Pro Gly Ala Ser Ala Ala Ala Ala Gly Ala Tyr
305                 310                 315                 320

Gly Pro Gly Thr Ser Gly Pro Gly Ala Tyr Gly Pro Gly Ser Ser Gly
            325                 330                 335
```

```
Pro Gly Thr Ser Gly Pro Tyr Gly Pro Gly Ser Ser Ala Ala Ala
            340                 345                 350

Ala Gly Ala Tyr Gly Pro Gly Thr Ser Gly Pro Tyr Gly Pro Gly Ala
        355                 360                 365

Ser Ala Ala Ala Ala Ala Gly Ala Tyr Thr Ser Gly Pro Gly Thr Ser
370                 375                 380

Gly Pro Tyr Gly Pro Gly Ala Ser Gly Pro Gly Thr Ser Gly Pro Tyr
385                 390                 395                 400

Gly Pro Gly Ala Ser Ala Ala Ala Ala Gly Pro Gly Ala Tyr Gly
                405                 410                 415

Pro Gly Thr Ser Gly Pro Ser Ala Ser Ala Ala Ala Ala Gly Ala
            420                 425                 430

Tyr Gly Ser Gly Pro Gly Ala Tyr Gly Pro Tyr Gly Pro Gly Ala Ser
            435                 440                 445

Gly Pro Gly Ser Gly Thr Ser Gly Ala Gly Pro Tyr Gly Pro Gly Ala
            450                 455                 460

Ser Ala Ala Ala Ala Gly Ala Tyr Gly Pro Gly Thr Ser Gly Pro
465                 470                 475                 480

Tyr Gly Pro Gly Ala Ser Ala Ala Ala Ala Gly Pro Gly Ser Gly
            485                 490                 495

Ala Tyr Gly Pro Gly Ala Ser Gly Ala Asn Gly Pro Gly Ser Gly Ala
            500                 505                 510

Tyr Gly Pro Gly Thr Ser Gly Pro Gly Ala Ser Ala Ala Ala Ala
            515                 520                 525

Gly Ala Tyr Thr Ser Gly Pro Gly Thr Ser Gly Pro Tyr Gly Pro Gly
            530                 535                 540

Ala Ser Ala Ala Ala Ala Gly Ala Tyr Gly Ser Gly Pro Gly Thr
545                 550                 555                 560

Ser Gly Pro Tyr Gly Pro Gly Ala Ser Gly Ser Gly Thr Ser Gly Pro
                565                 570                 575

Gly Thr Ser Gly Pro Tyr Ala Ser Ala Ala Ala Ala Gly Pro Gly
            580                 585                 590

Ser Gly Thr Ser Gly Pro Gly Ala Ser
            595                 600
```

```
<210> SEQ ID NO 35
<211> LENGTH: 601
<212> TYPE: PRT
<213> ORGANISM: Artificial Sequence
<220> FEATURE:
<223> OTHER INFORMATION: Synthetic sequence, PRT889

<400> SEQUENCE: 35
```

```
Met His His His His His His Ser Ser Gly Ser Ser Gly Pro Gly Val
1               5                   10                  15

Leu Gly Pro Tyr Gly Pro Gly Ala Ser Ala Ala Ala Ala Gly Ile
            20                  25                  30

Asn Gly Pro Gly Ser Gly Val Leu Gly Pro Gly Ile Ser Gly Ile Tyr
            35                  40                  45

Gly Pro Gly Val Leu Gly Pro Gly Val Leu Gly Pro Gly Ser Ser Ala
        50                  55                  60

Ala Ala Ala Ala Gly Pro Gly Ile Tyr Gly Pro Gly Val Leu Gly Pro
65                  70                  75                  80

Ser Ala Ser Ala Ala Ala Ala Gly Pro Gly Ser Gly Val Leu Gly
            85                  90                  95
```

```
Pro Gly Ala Ser Gly Ile Tyr Gly Pro Gly Val Leu Gly Pro Gly Val
            100                 105                 110
Leu Gly Pro Gly Ser Ser Ala Ala Ala Ala Gly Ile Tyr Gly Ser
        115                 120                 125
Gly Pro Gly Val Leu Gly Pro Tyr Gly Ser Ala Ala Ala Ala Gly
    130                 135                 140
Pro Gly Ser Gly Ile Tyr Gly Ile Gly Pro Tyr Gly Pro Gly Ala Ser
145                 150                 155                 160
Gly Pro Gly Ile Tyr Gly Pro Gly Val Leu Gly Pro Ser Ala Ser Ala
                165                 170                 175
Ala Ala Ala Ala Gly Ser Gly Val Leu Gly Pro Gly Ile Tyr Gly Pro
            180                 185                 190
Tyr Ala Ser Ala Ala Ala Ala Gly Ile Tyr Gly Ser Gly Pro Gly
        195                 200                 205
Val Leu Gly Pro Tyr Gly Pro Gly Ile Ser Gly Ser Gly Val Leu Gly
        210                 215                 220
Pro Gly Val Leu Gly Pro Tyr Ala Ser Ala Ala Ala Ala Gly Pro
225                 230                 235                 240
Gly Val Leu Gly Pro Tyr Gly Pro Gly Ser Ser Ala Ala Ala Ala
                245                 250                 255
Gly Ile Tyr Gly Tyr Gly Pro Gly Val Leu Gly Pro Tyr Gly Pro Gly
            260                 265                 270
Ala Ser Gly Ile Asn Gly Pro Gly Ser Gly Ile Tyr Gly Pro Gly Val
                275                 280                 285
Leu Gly Pro Gly Ile Ser Ala Ala Ala Ala Gly Pro Gly Val Leu
        290                 295                 300
Gly Pro Tyr Gly Pro Gly Ala Ser Ala Ala Ala Ala Gly Ile Tyr
305                 310                 315                 320
Gly Pro Gly Val Leu Gly Pro Gly Ile Tyr Gly Pro Gly Ser Ser Gly
                325                 330                 335
Pro Gly Val Leu Gly Pro Tyr Gly Pro Gly Ser Ser Ala Ala Ala
            340                 345                 350
Ala Gly Ile Tyr Gly Pro Gly Val Leu Gly Pro Tyr Gly Pro Gly Ile
        355                 360                 365
Ser Ala Ala Ala Ala Gly Ile Tyr Val Leu Gly Pro Gly Val Leu
370                 375                 380
Gly Pro Tyr Gly Pro Gly Ala Ser Gly Pro Gly Val Leu Gly Pro Tyr
385                 390                 395                 400
Gly Pro Gly Ala Ser Ala Ala Ala Ala Gly Pro Gly Ile Tyr Gly
                405                 410                 415
Pro Gly Val Leu Gly Pro Ser Ala Ser Ala Ala Ala Ala Gly Ile
            420                 425                 430
Tyr Gly Ser Gly Pro Gly Ile Tyr Gly Pro Tyr Gly Pro Gly Ile Ser
        435                 440                 445
Gly Pro Gly Ser Gly Val Leu Gly Ile Gly Pro Tyr Gly Pro Gly Ala
    450                 455                 460
Ser Ala Ala Ala Ala Gly Ile Tyr Gly Pro Gly Val Leu Gly Pro
465                 470                 475                 480
Tyr Gly Pro Gly Ile Ser Ala Ala Ala Ala Gly Pro Gly Ser Gly
                485                 490                 495
Ile Tyr Gly Pro Gly Ala Ser Gly Ile Asn Gly Pro Gly Ser Gly Ile
            500                 505                 510
Tyr Gly Pro Gly Val Leu Gly Pro Gly Ile Ser Ala Ala Ala Ala Ala
```

```
            515                 520                 525
Gly Ile Tyr Val Leu Gly Pro Gly Val Leu Gly Pro Tyr Gly Pro Gly
            530                 535                 540
Ala Ser Ala Ala Ala Ala Gly Ile Tyr Gly Ser Gly Pro Gly Val
545                 550                 555                 560
Leu Gly Pro Tyr Gly Pro Gly Ile Ser Gly Ser Gly Val Leu Gly Pro
                565                 570                 575
Gly Val Leu Gly Pro Tyr Ala Ser Ala Ala Ala Ala Gly Pro Gly
            580                 585                 590
Ser Gly Val Leu Gly Pro Gly Ala Ser
        595                 600

<210> SEQ ID NO 36
<211> LENGTH: 601
<212> TYPE: PRT
<213> ORGANISM: Artificial Sequence
<220> FEATURE:
<223> OTHER INFORMATION: Synthetic sequence, PRT916

<400> SEQUENCE: 36

Met His His His His His Ser Ser Gly Ser Ser Gly Pro Gly Val
1               5                   10                  15
Ile Gly Pro Tyr Gly Pro Gly Ala Ser Ala Ala Ala Ala Gly Leu
                20                  25                  30
Asn Gly Pro Gly Ser Gly Val Ile Gly Pro Gly Leu Ser Gly Leu Tyr
            35                  40                  45
Gly Pro Gly Val Ile Gly Pro Gly Val Ile Gly Pro Gly Ser Ser Ala
50                  55                  60
Ala Ala Ala Ala Gly Pro Gly Leu Tyr Gly Pro Gly Val Ile Gly Pro
65                  70                  75                  80
Ser Ala Ser Ala Ala Ala Ala Gly Pro Gly Ser Gly Val Ile Gly
                85                  90                  95
Pro Gly Ala Ser Gly Leu Tyr Gly Pro Gly Val Ile Gly Pro Gly Val
            100                 105                 110
Ile Gly Pro Gly Ser Ser Ala Ala Ala Ala Gly Leu Tyr Gly Ser
            115                 120                 125
Gly Pro Gly Val Ile Gly Pro Tyr Gly Ser Ala Ala Ala Ala Gly
            130                 135                 140
Pro Gly Ser Gly Leu Tyr Gly Leu Gly Pro Tyr Gly Pro Gly Ala Ser
145                 150                 155                 160
Gly Pro Gly Leu Tyr Gly Pro Gly Val Ile Gly Pro Ser Ala Ser Ala
                165                 170                 175
Ala Ala Ala Gly Ser Gly Val Ile Gly Pro Gly Leu Tyr Gly Pro
            180                 185                 190
Tyr Ala Ser Ala Ala Ala Ala Gly Leu Tyr Gly Ser Gly Pro Gly
            195                 200                 205
Val Ile Gly Pro Tyr Gly Pro Gly Leu Ser Gly Ser Gly Val Ile Gly
            210                 215                 220
Pro Gly Val Ile Gly Pro Tyr Ala Ser Ala Ala Ala Ala Gly Pro
225                 230                 235                 240
Gly Val Ile Gly Pro Tyr Gly Pro Gly Ser Ser Ala Ala Ala Ala
                245                 250                 255
Gly Leu Tyr Gly Tyr Gly Pro Gly Val Ile Gly Pro Tyr Gly Pro Gly
            260                 265                 270
Ala Ser Gly Leu Asn Gly Pro Gly Ser Gly Leu Tyr Gly Pro Gly Val
```

```
                275                 280                 285
Ile Gly Pro Gly Leu Ser Ala Ala Ala Ala Gly Pro Gly Val Ile
            290                 295                 300
Gly Pro Tyr Gly Pro Gly Ala Ser Ala Ala Ala Ala Gly Leu Tyr
305                 310                 315                 320
Gly Pro Gly Val Ile Gly Pro Gly Leu Tyr Gly Pro Gly Ser Ser Gly
                325                 330                 335
Pro Gly Val Ile Gly Pro Tyr Gly Pro Gly Ser Ser Ala Ala Ala
            340                 345                 350
Ala Gly Leu Tyr Gly Pro Gly Val Ile Gly Pro Tyr Gly Pro Gly Leu
                355                 360                 365
Ser Ala Ala Ala Ala Gly Leu Tyr Val Ile Gly Pro Gly Val Ile
            370                 375                 380
Gly Pro Tyr Gly Pro Gly Ala Ser Gly Pro Gly Val Ile Gly Pro Tyr
385                 390                 395                 400
Gly Pro Gly Ala Ser Ala Ala Ala Ala Gly Pro Gly Leu Tyr Gly
                405                 410                 415
Pro Gly Val Ile Gly Pro Ser Ala Ser Ala Ala Ala Ala Gly Leu
            420                 425                 430
Tyr Gly Ser Gly Pro Gly Leu Tyr Gly Pro Tyr Gly Pro Gly Leu Ser
                435                 440                 445
Gly Pro Gly Ser Gly Val Ile Gly Leu Gly Pro Tyr Gly Pro Gly Ala
450                 455                 460
Ser Ala Ala Ala Ala Gly Leu Tyr Gly Pro Gly Val Ile Gly Pro
465                 470                 475                 480
Tyr Gly Pro Gly Leu Ser Ala Ala Ala Ala Gly Pro Gly Ser Gly
                485                 490                 495
Leu Tyr Gly Pro Gly Ala Ser Gly Leu Asn Gly Pro Gly Ser Gly Leu
                500                 505                 510
Tyr Gly Pro Gly Val Ile Gly Pro Gly Leu Ser Ala Ala Ala Ala
                515                 520                 525
Gly Leu Tyr Val Ile Gly Pro Gly Val Ile Gly Pro Tyr Gly Pro Gly
            530                 535                 540
Ala Ser Ala Ala Ala Ala Gly Leu Tyr Gly Ser Gly Pro Gly Val
545                 550                 555                 560
Ile Gly Pro Tyr Gly Pro Gly Leu Ser Gly Ser Gly Val Ile Gly Pro
                565                 570                 575
Gly Val Ile Gly Pro Tyr Ala Ser Ala Ala Ala Ala Gly Pro Gly
                580                 585                 590
Ser Gly Val Ile Gly Pro Gly Ala Ser
        595                 600

<210> SEQ ID NO 37
<211> LENGTH: 601
<212> TYPE: PRT
<213> ORGANISM: Artificial Sequence
<220> FEATURE:
<223> OTHER INFORMATION: Synthetic sequence, PRT918

<400> SEQUENCE: 37

Met His His His His His Ser Ser Gly Ser Gly Pro Gly Val
1               5                   10                  15

Phe Gly Pro Tyr Gly Pro Gly Ala Ser Ala Ala Ala Ala Gly Ile
                20                  25                  30

Asn Gly Pro Gly Ser Gly Val Phe Gly Pro Gly Ile Ser Gly Ile Tyr
```

```
                35                  40                  45
Gly Pro Gly Val Phe Gly Pro Val Phe Gly Pro Gly Ser Ser Ala
 50                  55                  60
Ala Ala Ala Ala Gly Pro Gly Ile Tyr Gly Pro Gly Val Phe Gly
 65                  70                  75                  80
Ser Ala Ser Ala Ala Ala Ala Gly Pro Gly Ser Gly Val Phe Gly
                 85                  90                  95
Pro Gly Ala Ser Gly Ile Tyr Gly Pro Gly Val Phe Gly Pro Gly Val
                100                 105                 110
Phe Gly Pro Gly Ser Ser Ala Ala Ala Ala Gly Ile Tyr Gly Ser
                115                 120                 125
Gly Pro Gly Val Phe Gly Pro Tyr Gly Ser Ala Ala Ala Ala Gly
                130                 135                 140
Pro Gly Ser Gly Ile Tyr Gly Ile Gly Pro Tyr Gly Pro Gly Ala Ser
                145                 150                 155                 160
Gly Pro Gly Ile Tyr Gly Pro Gly Val Phe Gly Pro Ser Ala Ser Ala
                165                 170                 175
Ala Ala Ala Ala Gly Ser Gly Val Phe Gly Pro Gly Ile Tyr Gly Pro
                180                 185                 190
Tyr Ala Ser Ala Ala Ala Ala Ala Gly Ile Tyr Gly Ser Gly Pro Gly
                195                 200                 205
Val Phe Gly Pro Tyr Gly Pro Gly Ile Ser Gly Ser Gly Val Phe Gly
                210                 215                 220
Pro Gly Val Phe Gly Pro Tyr Ala Ser Ala Ala Ala Ala Gly Pro
225                 230                 235                 240
Gly Val Phe Gly Pro Tyr Gly Pro Gly Ser Ser Ala Ala Ala Ala
                245                 250                 255
Gly Ile Tyr Gly Tyr Gly Pro Gly Val Phe Gly Pro Tyr Gly Pro Gly
                260                 265                 270
Ala Ser Gly Ile Asn Gly Pro Gly Ser Gly Ile Tyr Gly Pro Gly Val
                275                 280                 285
Phe Gly Pro Gly Ile Ser Ala Ala Ala Ala Gly Pro Gly Val Phe
                290                 295                 300
Gly Pro Tyr Gly Pro Gly Ala Ser Ala Ala Ala Ala Gly Ile Tyr
305                 310                 315                 320
Gly Pro Gly Val Phe Gly Pro Gly Ile Tyr Gly Pro Gly Ser Ser Gly
                325                 330                 335
Pro Gly Val Phe Gly Pro Tyr Gly Pro Gly Ser Ser Ala Ala Ala Ala
                340                 345                 350
Ala Gly Ile Tyr Gly Pro Gly Val Phe Gly Pro Tyr Gly Pro Gly Ile
                355                 360                 365
Ser Ala Ala Ala Ala Gly Ile Tyr Val Phe Gly Pro Gly Val Phe
                370                 375                 380
Gly Pro Tyr Gly Pro Gly Ala Ser Gly Pro Gly Val Phe Gly Pro Tyr
385                 390                 395                 400
Gly Pro Gly Ala Ser Ala Ala Ala Ala Gly Pro Gly Ile Tyr Gly
                405                 410                 415
Pro Gly Val Phe Gly Pro Ser Ala Ser Ala Ala Ala Ala Gly Ile
                420                 425                 430
Tyr Gly Ser Gly Pro Gly Ile Tyr Gly Pro Tyr Gly Pro Gly Ile Ser
                435                 440                 445
Gly Pro Gly Ser Gly Val Phe Gly Ile Gly Pro Tyr Gly Pro Gly Ala
                450                 455                 460
```

```
Ser Ala Ala Ala Ala Gly Ile Tyr Gly Pro Gly Val Phe Gly Pro
465                 470                 475                 480

Tyr Gly Pro Gly Ile Ser Ala Ala Ala Gly Pro Gly Ser Gly
                485                 490                 495

Ile Tyr Gly Pro Gly Ala Ser Gly Ile Asn Gly Pro Gly Ser Gly Ile
            500                 505                 510

Tyr Gly Pro Gly Val Phe Gly Pro Gly Ile Ser Ala Ala Ala Ala
            515                 520                 525

Gly Ile Tyr Val Phe Gly Pro Gly Val Phe Gly Pro Tyr Gly Pro Gly
    530                 535                 540

Ala Ser Ala Ala Ala Ala Gly Ile Tyr Gly Ser Gly Pro Gly Val
545                 550                 555                 560

Phe Gly Pro Tyr Gly Pro Gly Ile Ser Gly Ser Gly Val Phe Gly Pro
                565                 570                 575

Gly Val Phe Gly Pro Tyr Ala Ser Ala Ala Ala Ala Gly Pro Gly
            580                 585                 590

Ser Gly Val Phe Gly Pro Gly Ala Ser
            595                 600

<210> SEQ ID NO 38
<211> LENGTH: 576
<212> TYPE: PRT
<213> ORGANISM: Artificial Sequence
<220> FEATURE:
<223> OTHER INFORMATION: Synthetic sequence, PRT699

<400> SEQUENCE: 38

Met His His His His His Ser Ser Gly Ser Ser Gly Pro Gly Val
1               5                   10                  15

Leu Gly Pro Tyr Gly Pro Gly Ala Ser Ala Ala Ala Ala Ala Ala
                20                  25                  30

Gly Ser Asn Gly Pro Gly Ser Gly Val Leu Gly Pro Gly Gln Ser Gly
        35                  40                  45

Gln Tyr Gly Pro Gly Val Leu Gly Pro Gly Val Leu Gly Pro Gly Ser
    50                  55                  60

Ser Ala Ala Ala Ala Ala Ala Gly Pro Gly Gln Tyr Gly Pro Gly
65                  70                  75                  80

Val Leu Gly Pro Ser Ala Ser Ala Ala Ala Ala Ala Gly Pro
                85                  90                  95

Gly Ser Gly Val Leu Gly Pro Gly Ala Ser Gly Gln Tyr Gly Pro Gly
            100                 105                 110

Val Leu Gly Pro Gly Val Leu Gly Pro Gly Ser Ser Ala Ala Ala
            115                 120                 125

Ala Ala Ala Gly Ser Tyr Gly Ser Gly Pro Gly Val Leu Gly Pro Tyr
130                 135                 140

Gly Ser Ala Ala Ala Ala Ala Ala Gly Pro Gly Ser Gly Gln Tyr
145                 150                 155                 160

Gly Gln Gly Pro Tyr Gly Pro Gly Ala Ser Gly Pro Gly Gln Tyr Gly
                165                 170                 175

Pro Gly Val Leu Gly Pro Ser Ala Ser Ala Ala Ala Ala Ala Ala
            180                 185                 190

Gly Ser Gly Val Leu Gly Pro Gly Gln Tyr Gly Pro Tyr Ala Ser Ala
        195                 200                 205

Ala Ala Ala Ala Ala Gly Ser Tyr Gly Ser Gly Pro Gly Val Leu
210                 215                 220
```

Gly Pro Tyr Gly Pro Gly Gln Ser Gly Ser Gly Val Leu Gly Pro Gly
225                 230                 235                 240

Val Leu Gly Pro Tyr Ala Ser Ala Ala Ala Ala Ala Ala Ala Gly Pro
                245                 250                 255

Gly Val Leu Gly Pro Tyr Gly Pro Gly Ser Ser Ala Ala Ala Ala Ala
            260                 265                 270

Ala Ala Gly Ser Tyr Gly Tyr Gly Pro Gly Val Leu Gly Pro Tyr Gly
        275                 280                 285

Pro Gly Ala Ser Gly Gln Asn Gly Pro Gly Ser Gly Gln Tyr Gly Pro
    290                 295                 300

Gly Val Leu Gly Pro Gly Ser Ala Ala Ala Ala Ala Ala Ala Ala Gly
305                 310                 315                 320

Pro Gly Val Leu Gly Pro Tyr Gly Pro Gly Ala Ser Ala Ala Ala Ala
                325                 330                 335

Ala Ala Ala Gly Ser Tyr Gly Pro Gly Val Leu Gly Pro Gly Gln Tyr
            340                 345                 350

Gly Pro Gly Ser Ser Gly Pro Gly Val Leu Gly Pro Tyr Gly Pro Gly
            355                 360                 365

Ser Ser Ala Ala Ala Ala Ala Ala Gly Ser Tyr Gly Pro Gly Val
370                 375                 380

Leu Gly Pro Tyr Gly Pro Gly Pro Ser Ala Ala Ala Ala Ala Ala Ala
385                 390                 395                 400

Gly Ser Tyr Val Leu Gly Pro Gly Val Leu Gly Pro Tyr Gly Pro Gly
                405                 410                 415

Ala Ser Gly Pro Gly Val Leu Gly Pro Tyr Gly Pro Gly Ala Ser Ala
            420                 425                 430

Ala Ala Ala Ala Ala Gly Pro Gly Gln Tyr Gly Pro Gly Val Leu
        435                 440                 445

Gly Pro Ser Ala Ser Ala Ala Ala Ala Ala Ala Gly Ser Tyr Gly
450                 455                 460

Ser Gly Pro Gly Gln Tyr Gly Pro Tyr Gly Pro Gly Gln Ser Gly Pro
465                 470                 475                 480

Gly Ser Gly Val Leu Gly Gln Gly Pro Tyr Pro Gly Ala Ser Ala
                485                 490                 495

Ala Ala Ala Ala Ala Gly Ser Tyr Gly Pro Gly Val Leu Gly Pro
            500                 505                 510

Tyr Gly Pro Gly Pro Ser Ala Ala Ala Ala Ala Ala Gly Pro Gly
            515                 520                 525

Ser Gly Gln Tyr Gly Pro Gly Ala Ser Gly Gln Asn Gly Pro Gly Ser
    530                 535                 540

Gly Gln Tyr Gly Pro Gly Val Leu Gly Pro Gly Pro Ser Ala Ala Ala
545                 550                 555                 560

Ala Ala Ala Ala Gly Pro Gly Ser Gly Val Leu Gly Pro Gly Ala Ser
            565                 570                 575

<210> SEQ ID NO 39
<211> LENGTH: 576
<212> TYPE: PRT
<213> ORGANISM: Artificial Sequence
<220> FEATURE:
<223> OTHER INFORMATION: Synthetic sequence, PRT698

<400> SEQUENCE: 39

Met His His His His His Ser Ser Gly Ser Ser Gly Pro Gly Val
1               5                   10                  15

```
Leu Gly Pro Tyr Gly Pro Gly Ala Ser Ala Ala Ala Ala Ala Ala
            20                  25                  30
Gly Ser Asn Gly Pro Gly Ser Gly Val Leu Gly Pro Gly Ile Ser Gly
        35                  40                  45
Ile Tyr Gly Pro Gly Val Leu Gly Pro Gly Val Leu Gly Pro Gly Ser
 50                  55                  60
Ser Ala Ala Ala Ala Ala Ala Gly Pro Gly Ile Tyr Gly Pro Gly
 65                  70                  75                  80
Val Leu Gly Pro Ser Ala Ser Ala Ala Ala Ala Ala Ala Gly Pro
                85                  90                  95
Gly Ser Gly Val Leu Gly Pro Gly Ala Ser Gly Ile Tyr Gly Pro Gly
            100                 105                 110
Val Leu Gly Pro Gly Val Leu Gly Pro Gly Ser Ser Ala Ala Ala
            115                 120                 125
Ala Ala Ala Gly Ser Tyr Gly Ser Gly Pro Gly Val Leu Gly Pro Tyr
            130                 135                 140
Gly Ser Ala Ala Ala Ala Ala Ala Gly Pro Gly Ser Gly Ile Tyr
145                 150                 155                 160
Gly Ile Gly Pro Tyr Gly Pro Gly Ala Ser Gly Pro Gly Ile Tyr Gly
                165                 170                 175
Pro Gly Val Leu Gly Pro Ser Ala Ser Ala Ala Ala Ala Ala Ala
            180                 185                 190
Gly Ser Gly Val Leu Gly Pro Gly Ile Tyr Gly Pro Tyr Ala Ser Ala
            195                 200                 205
Ala Ala Ala Ala Ala Gly Ser Tyr Gly Ser Gly Pro Gly Val Leu
            210                 215                 220
Gly Pro Tyr Gly Pro Gly Ile Ser Gly Ser Gly Val Leu Gly Pro Gly
225                 230                 235                 240
Val Leu Gly Pro Tyr Ala Ser Ala Ala Ala Ala Ala Ala Gly Pro
                245                 250                 255
Gly Val Leu Gly Pro Tyr Gly Pro Gly Ser Ser Ala Ala Ala Ala
            260                 265                 270
Ala Ala Gly Ser Tyr Gly Tyr Gly Pro Gly Val Leu Gly Pro Tyr Gly
            275                 280                 285
Pro Gly Ala Ser Gly Ile Asn Gly Pro Gly Ser Gly Ile Tyr Gly Pro
            290                 295                 300
Gly Val Leu Gly Pro Gly Pro Ser Ala Ala Ala Ala Ala Ala Gly
305                 310                 315                 320
Pro Gly Val Leu Gly Pro Tyr Gly Pro Gly Ala Ser Ala Ala Ala Ala
                325                 330                 335
Ala Ala Ala Gly Ser Tyr Gly Pro Gly Val Leu Gly Pro Gly Ile Tyr
            340                 345                 350
Gly Pro Gly Ser Ser Gly Pro Gly Val Leu Gly Pro Tyr Gly Pro Gly
            355                 360                 365
Ser Ser Ala Ala Ala Ala Ala Ala Gly Ser Tyr Gly Pro Gly Val
            370                 375                 380
Leu Gly Pro Tyr Gly Pro Gly Pro Ser Ala Ala Ala Ala Ala Ala
385                 390                 395                 400
Gly Ser Tyr Val Leu Gly Pro Gly Val Leu Gly Pro Tyr Gly Pro Gly
                405                 410                 415
Ala Ser Gly Pro Gly Val Leu Gly Pro Tyr Gly Pro Gly Ala Ser Ala
                420                 425                 430
```

```
Ala Ala Ala Ala Ala Gly Pro Gly Ile Tyr Gly Pro Gly Val Leu
            435                 440                 445

Gly Pro Ser Ala Ser Ala Ala Ala Ala Gly Ser Tyr Gly
450                 455                 460

Ser Gly Pro Gly Ile Tyr Gly Pro Tyr Gly Pro Gly Ile Ser Gly Pro
465                 470                 475                 480

Gly Ser Gly Val Leu Gly Ile Gly Pro Tyr Gly Pro Gly Ala Ser Ala
                485                 490                 495

Ala Ala Ala Ala Ala Gly Ser Tyr Gly Pro Gly Val Leu Gly Pro
            500                 505                 510

Tyr Gly Pro Gly Pro Ser Ala Ala Ala Ala Ala Gly Pro Gly
            515                 520                 525

Ser Gly Ile Tyr Gly Pro Gly Ala Ser Gly Ile Asn Gly Pro Gly Ser
530                 535                 540

Gly Ile Tyr Gly Pro Gly Val Leu Gly Pro Gly Pro Ser Ala Ala Ala
545                 550                 555                 560

Ala Ala Ala Ala Gly Pro Gly Ser Gly Val Leu Gly Pro Gly Ala Ser
                565                 570                 575
```

<210> SEQ ID NO 40
<211> LENGTH: 1190
<212> TYPE: PRT
<213> ORGANISM: Artificial Sequence
<220> FEATURE:
<223> OTHER INFORMATION: Synthetic sequence, PRT966

<400> SEQUENCE: 40

```
Met His His His His His Ser Ser Gly Ser Ser Gly Pro Gly Val
1               5                   10                  15

Phe Gly Pro Tyr Gly Pro Gly Ala Ser Ala Ala Ala Ala Gly Ile
                20                  25                  30

Asn Gly Pro Gly Ser Gly Val Phe Gly Pro Gly Ile Ser Gly Ile Tyr
            35                  40                  45

Gly Pro Gly Val Phe Gly Pro Gly Val Phe Gly Pro Gly Ser Ser Ala
50                  55                  60

Ala Ala Ala Ala Gly Pro Gly Ile Tyr Gly Pro Gly Val Phe Gly Pro
65                  70                  75                  80

Ser Ala Ser Ala Ala Ala Ala Gly Pro Gly Ser Gly Val Phe Gly
                85                  90                  95

Pro Gly Ala Ser Gly Ile Tyr Gly Pro Gly Val Phe Gly Pro Gly Val
                100                 105                 110

Phe Gly Pro Gly Ser Ser Ala Ala Ala Ala Ala Gly Ile Tyr Gly Ser
                115                 120                 125

Gly Pro Gly Val Phe Gly Pro Tyr Gly Ser Ala Ala Ala Ala Gly
                130                 135                 140

Pro Gly Ser Gly Ile Tyr Gly Ile Gly Pro Tyr Gly Pro Gly Ala Ser
145                 150                 155                 160

Gly Pro Gly Ile Tyr Gly Pro Gly Val Phe Gly Pro Ser Ala Ser Ala
                165                 170                 175

Ala Ala Ala Gly Ser Gly Val Phe Gly Pro Gly Ile Tyr Gly Pro
            180                 185                 190

Tyr Ala Ser Ala Ala Ala Ala Gly Ile Tyr Gly Ser Gly Pro Gly
            195                 200                 205

Val Phe Gly Pro Tyr Gly Pro Gly Ile Ser Gly Ser Gly Val Phe Gly
                210                 215                 220
```

```
Pro Gly Val Phe Gly Pro Tyr Ala Ser Ala Ala Ala Ala Gly Pro
225                 230                 235                 240

Gly Val Phe Gly Pro Tyr Gly Pro Gly Ser Ser Ala Ala Ala Ala
            245                 250                 255

Gly Ile Tyr Gly Tyr Gly Pro Gly Val Phe Gly Pro Tyr Gly Pro Gly
        260                 265                 270

Ala Ser Gly Ile Asn Gly Pro Gly Ser Gly Ile Tyr Gly Pro Gly Val
        275                 280                 285

Phe Gly Pro Gly Ile Ser Ala Ala Ala Ala Gly Pro Gly Val Phe
290                 295                 300

Gly Pro Tyr Gly Pro Gly Ala Ser Ala Ala Ala Ala Gly Ile Tyr
305                 310                 315                 320

Gly Pro Gly Val Phe Gly Pro Gly Ile Tyr Gly Pro Gly Ser Ser Gly
                325                 330                 335

Pro Gly Val Phe Gly Pro Tyr Gly Pro Gly Ser Ser Ala Ala Ala Ala
            340                 345                 350

Ala Gly Ile Tyr Gly Pro Gly Val Phe Gly Pro Tyr Gly Pro Gly Ile
        355                 360                 365

Ser Ala Ala Ala Ala Gly Ile Tyr Val Phe Gly Pro Gly Val Phe
370                 375                 380

Gly Pro Tyr Gly Pro Gly Ala Ser Gly Pro Gly Val Phe Gly Pro Tyr
385                 390                 395                 400

Gly Pro Gly Ala Ser Ala Ala Ala Ala Gly Pro Gly Ile Tyr Gly
            405                 410                 415

Pro Gly Val Phe Gly Pro Ser Ser Ala Ala Ala Ala Gly Ile
            420                 425                 430

Tyr Gly Ser Gly Pro Gly Ile Tyr Gly Pro Tyr Gly Pro Gly Ile Ser
        435                 440                 445

Gly Pro Gly Ser Gly Val Phe Gly Ile Gly Pro Tyr Gly Pro Gly Ala
450                 455                 460

Ser Ala Ala Ala Ala Gly Ile Tyr Gly Pro Gly Val Phe Gly Pro
465                 470                 475                 480

Tyr Gly Pro Gly Ile Ser Ala Ala Ala Ala Gly Pro Gly Ser Gly
            485                 490                 495

Ile Tyr Gly Pro Gly Ala Ser Gly Ile Asn Gly Pro Gly Ser Gly Ile
            500                 505                 510

Tyr Gly Pro Gly Val Phe Gly Pro Gly Ile Ser Ala Ala Ala Ala
        515                 520                 525

Gly Ile Tyr Val Phe Gly Pro Gly Val Phe Gly Pro Tyr Gly Pro Gly
        530                 535                 540

Ala Ser Ala Ala Ala Ala Gly Ile Tyr Gly Ser Gly Pro Gly Val
545                 550                 555                 560

Phe Gly Pro Tyr Gly Pro Gly Ile Ser Gly Ser Gly Val Phe Gly Pro
            565                 570                 575

Gly Val Phe Gly Pro Tyr Ala Ser Ala Ala Ala Ala Gly Pro Gly
            580                 585                 590

Ser Gly Val Phe Gly Pro Gly Ala Ser Pro Gly Val Phe Gly Pro
            595                 600                 605

Tyr Gly Pro Gly Ala Ser Ala Ala Ala Ala Gly Ile Asn Gly Pro
        610                 615                 620

Gly Ser Gly Val Phe Gly Pro Gly Ile Ser Ile Tyr Gly Pro Gly
625                 630                 635                 640

Val Phe Gly Pro Gly Val Phe Gly Pro Gly Ser Ser Ala Ala Ala Ala
```

-continued

```
                645                 650                 655
Ala Gly Pro Gly Ile Tyr Gly Pro Gly Val Phe Gly Pro Ser Ala Ser
                660                 665                 670
Ala Ala Ala Ala Ala Gly Pro Gly Ser Gly Val Phe Gly Pro Gly Ala
                675                 680                 685
Ser Gly Ile Tyr Gly Pro Gly Val Phe Gly Pro Gly Val Phe Gly Pro
                690                 695                 700
Gly Ser Ser Ala Ala Ala Ala Gly Ile Tyr Gly Ser Gly Pro Gly
705                 710                 715                 720
Val Phe Gly Pro Tyr Gly Ser Ala Ala Ala Ala Gly Pro Gly Ser
                725                 730                 735
Gly Ile Tyr Gly Ile Gly Pro Tyr Gly Pro Gly Ala Ser Gly Pro Gly
                740                 745                 750
Ile Tyr Gly Pro Gly Val Phe Gly Pro Ser Ala Ser Ala Ala Ala
                755                 760                 765
Ala Gly Ser Gly Val Phe Gly Pro Gly Ile Tyr Gly Pro Tyr Ala Ser
                770                 775                 780
Ala Ala Ala Ala Gly Ile Tyr Gly Ser Gly Pro Gly Val Phe Gly
785                 790                 795                 800
Pro Tyr Gly Pro Gly Ile Ser Gly Ser Gly Val Phe Gly Pro Gly Val
                805                 810                 815
Phe Gly Pro Tyr Ala Ser Ala Ala Ala Ala Gly Pro Gly Val Phe
                820                 825                 830
Gly Pro Tyr Gly Pro Gly Ser Ser Ala Ala Ala Ala Gly Ile Tyr
                835                 840                 845
Gly Tyr Gly Pro Gly Val Phe Gly Pro Tyr Gly Pro Gly Ala Ser Gly
                850                 855                 860
Ile Asn Gly Pro Gly Ser Gly Ile Tyr Gly Pro Gly Val Phe Gly Pro
865                 870                 875                 880
Gly Ile Ser Ala Ala Ala Ala Gly Pro Gly Val Phe Gly Pro Tyr
                885                 890                 895
Gly Pro Gly Ala Ser Ala Ala Ala Ala Gly Ile Tyr Gly Pro Gly
                900                 905                 910
Val Phe Gly Pro Gly Ile Tyr Gly Pro Gly Ser Ser Gly Pro Gly Val
                915                 920                 925
Phe Gly Pro Tyr Gly Pro Gly Ser Ser Ala Ala Ala Ala Gly Ile
                930                 935                 940
Tyr Gly Pro Gly Val Phe Gly Pro Tyr Gly Pro Gly Ile Ser Ala Ala
945                 950                 955                 960
Ala Ala Ala Gly Ile Tyr Val Phe Gly Pro Gly Val Phe Gly Pro Tyr
                965                 970                 975
Gly Pro Gly Ala Ser Gly Pro Gly Val Phe Gly Pro Tyr Gly Pro Gly
                980                 985                 990
Ala Ser Ala Ala Ala Ala Ala Gly Pro Gly Ile Tyr Gly Pro Gly Val
                995                1000                1005
Phe Gly Pro Ser Ala Ser Ala Ala Ala Ala Gly Ile Tyr Gly
                1010                1015                1020
Ser Gly Pro Gly Ile Tyr Gly Pro Tyr Gly Pro Gly Ile Ser Gly
                1025                1030                1035
Pro Gly Ser Gly Val Phe Gly Ile Gly Pro Tyr Gly Pro Gly Ala
                1040                1045                1050
Ser Ala Ala Ala Ala Ala Gly Ile Tyr Gly Pro Gly Val Phe Gly
                1055                1060                1065
```

```
Pro Tyr Gly Pro Gly Ile Ser Ala Ala Ala Ala Gly Pro Gly
    1070            1075                1080

Ser Gly Ile Tyr Gly Pro Gly Ala Ser Gly Ile Asn Gly Pro Gly
    1085            1090                1095

Ser Gly Ile Tyr Gly Pro Gly Val Phe Gly Pro Gly Ile Ser Ala
    1100            1105                1110

Ala Ala Ala Ala Gly Ile Tyr Val Phe Gly Pro Gly Val Phe Gly
    1115            1120                1125

Pro Tyr Gly Pro Gly Ala Ser Ala Ala Ala Ala Gly Ile Tyr
    1130            1135                1140

Gly Ser Gly Pro Gly Val Phe Gly Pro Tyr Gly Pro Gly Ile Ser
    1145            1150                1155

Gly Ser Gly Val Phe Gly Pro Gly Val Phe Gly Pro Tyr Ala Ser
    1160            1165                1170

Ala Ala Ala Ala Ala Gly Pro Gly Ser Gly Val Phe Gly Pro Gly
    1175            1180                1185

Ala Ser
    1190

<210> SEQ ID NO 41
<211> LENGTH: 590
<212> TYPE: PRT
<213> ORGANISM: Artificial Sequence
<220> FEATURE:
<223> OTHER INFORMATION: Synthetic sequence, Met_PRT917

<400> SEQUENCE: 41

Met Gly Pro Gly Leu Ile Gly Pro Tyr Gly Pro Gly Ala Ser Ala Ala
1               5                   10                  15

Ala Ala Ala Gly Val Asn Gly Pro Gly Ser Gly Leu Ile Gly Pro Gly
            20                  25                  30

Val Ser Gly Val Tyr Gly Pro Gly Leu Ile Gly Pro Gly Leu Ile Gly
        35                  40                  45

Pro Gly Ser Ser Ala Ala Ala Ala Gly Pro Gly Val Tyr Gly Pro
    50                  55                  60

Gly Leu Ile Gly Pro Ser Ala Ser Ala Ala Ala Ala Gly Pro Gly
65                  70                  75                  80

Ser Gly Leu Ile Gly Pro Gly Ala Ser Gly Val Tyr Gly Pro Gly Leu
                85                  90                  95

Ile Gly Pro Gly Leu Ile Gly Pro Gly Ser Ser Ala Ala Ala Ala
            100                 105                 110

Gly Val Tyr Gly Ser Gly Pro Gly Leu Ile Gly Pro Tyr Gly Ser Ala
        115                 120                 125

Ala Ala Ala Ala Gly Pro Gly Ser Gly Val Tyr Gly Val Gly Pro Tyr
    130                 135                 140

Gly Pro Gly Ala Ser Gly Pro Gly Val Tyr Gly Pro Gly Leu Ile Gly
145                 150                 155                 160

Pro Ser Ala Ser Ala Ala Ala Ala Gly Ser Gly Leu Ile Gly Pro
                165                 170                 175

Gly Val Tyr Gly Pro Tyr Ala Ser Ala Ala Ala Ala Gly Val Tyr
        180                 185                 190

Gly Ser Gly Pro Gly Leu Ile Gly Pro Tyr Gly Pro Gly Val Ser Gly
        195                 200                 205

Ser Gly Leu Ile Gly Pro Gly Leu Ile Gly Pro Tyr Ala Ser Ala Ala
        210                 215                 220
```

Ala Ala Ala Gly Pro Gly Leu Ile Gly Pro Tyr Gly Pro Gly Ser Ser
225                 230                 235                 240

Ala Ala Ala Ala Gly Val Tyr Gly Tyr Gly Pro Gly Leu Ile Gly
            245                 250                 255

Pro Tyr Gly Pro Gly Ala Ser Gly Val Asn Gly Pro Gly Ser Gly Val
            260                 265                 270

Tyr Gly Pro Gly Leu Ile Gly Pro Gly Val Ser Ala Ala Ala Ala
        275                 280                 285

Gly Pro Gly Leu Ile Gly Pro Tyr Gly Pro Gly Ala Ser Ala Ala Ala
        290                 295                 300

Ala Ala Gly Val Tyr Gly Pro Gly Leu Ile Gly Pro Val Tyr Gly
305                 310                 315                 320

Pro Gly Ser Ser Gly Pro Gly Leu Ile Gly Pro Tyr Gly Pro Gly Ser
            325                 330                 335

Ser Ala Ala Ala Ala Gly Val Tyr Gly Pro Gly Leu Ile Gly Pro
            340                 345                 350

Tyr Gly Pro Gly Val Ser Ala Ala Ala Ala Gly Val Tyr Leu Ile
            355                 360                 365

Gly Pro Gly Leu Ile Gly Pro Tyr Gly Pro Gly Ala Ser Gly Pro Gly
370                 375                 380

Leu Ile Gly Pro Tyr Gly Pro Gly Ala Ser Ala Ala Ala Ala Gly
385                 390                 395                 400

Pro Gly Val Tyr Gly Pro Gly Leu Ile Gly Pro Ser Ala Ser Ala Ala
            405                 410                 415

Ala Ala Ala Gly Val Tyr Gly Ser Gly Pro Gly Val Tyr Gly Pro Tyr
            420                 425                 430

Gly Pro Gly Val Ser Gly Pro Gly Ser Gly Leu Ile Gly Val Gly Pro
            435                 440                 445

Tyr Gly Pro Gly Ala Ser Ala Ala Ala Ala Gly Val Tyr Gly Pro
450                 455                 460

Gly Leu Ile Gly Pro Tyr Gly Pro Gly Val Ser Ala Ala Ala Ala
465                 470                 475                 480

Gly Pro Gly Ser Gly Val Tyr Gly Pro Gly Ala Ser Gly Val Asn Gly
            485                 490                 495

Pro Gly Ser Gly Val Tyr Gly Pro Gly Leu Ile Gly Pro Gly Val Ser
            500                 505                 510

Ala Ala Ala Ala Gly Val Tyr Leu Ile Gly Pro Gly Leu Ile Gly
            515                 520                 525

Pro Tyr Gly Pro Gly Ala Ser Ala Ala Ala Ala Gly Val Tyr Gly
            530                 535                 540

Ser Gly Pro Gly Leu Ile Gly Pro Tyr Gly Pro Gly Val Ser Gly Ser
545                 550                 555                 560

Gly Leu Ile Gly Pro Gly Leu Ile Gly Pro Tyr Ala Ser Ala Ala Ala
                565                 570                 575

Ala Ala Gly Pro Gly Ser Gly Leu Ile Gly Pro Gly Ala Ser
            580                 585                 590

<210> SEQ ID NO 42
<211> LENGTH: 587
<212> TYPE: PRT
<213> ORGANISM: Artificial Sequence
<220> FEATURE:
<223> OTHER INFORMATION: Synthetic sequence, Met_PRT1028

<400> SEQUENCE: 42

```
Met Gly Pro Gly Ile Phe Gly Pro Tyr Gly Pro Gly Ala Ser Ala Ala
1               5                   10                  15

Ala Ala Ala Gly Thr Gly Pro Gly Ser Gly Ile Phe Gly Pro Gly Thr
            20                  25                  30

Ser Gly Thr Tyr Gly Pro Gly Ile Phe Gly Pro Gly Ile Phe Gly Pro
            35                  40                  45

Gly Ser Ser Ala Ala Ala Ala Gly Pro Gly Thr Tyr Gly Pro Gly
        50                  55                  60

Ile Phe Gly Pro Ser Ala Ser Ala Ala Ala Ala Gly Pro Gly Ser
65              70                  75                  80

Gly Ile Phe Gly Pro Gly Ala Ser Gly Thr Tyr Gly Pro Gly Ile Phe
                85                  90                  95

Gly Pro Gly Ile Phe Gly Pro Gly Ser Ser Ala Ala Ala Ala Gly
                100                 105                 110

Thr Tyr Gly Ser Gly Pro Gly Ile Phe Gly Pro Tyr Gly Ser Ala Ala
            115                 120                 125

Ala Ala Ala Gly Pro Gly Ser Gly Thr Tyr Gly Thr Gly Pro Tyr Gly
            130                 135                 140

Pro Gly Ala Ser Gly Pro Gly Thr Tyr Gly Pro Gly Ile Phe Gly Pro
145                 150                 155                 160

Ser Ala Ser Ala Ala Ala Ala Gly Ser Gly Ile Phe Gly Pro Gly
                165                 170                 175

Thr Tyr Gly Pro Tyr Ala Ser Ala Ala Ala Ala Gly Thr Tyr Gly
            180                 185                 190

Ser Gly Pro Gly Ile Phe Gly Pro Tyr Gly Pro Gly Thr Ser Gly Ser
            195                 200                 205

Gly Ile Phe Gly Pro Gly Ile Phe Gly Pro Tyr Ala Ser Ala Ala Ala
            210                 215                 220

Ala Ala Gly Pro Gly Ile Phe Gly Pro Tyr Gly Pro Gly Ser Ser Ala
225                 230                 235                 240

Ala Ala Ala Gly Thr Tyr Gly Tyr Gly Pro Gly Ile Phe Gly Pro
            245                 250                 255

Tyr Gly Pro Gly Ala Ser Gly Thr Gly Pro Gly Ser Gly Thr Tyr Gly
            260                 265                 270

Pro Gly Ile Phe Gly Pro Gly Thr Ser Ala Ala Ala Ala Gly Pro
            275                 280                 285

Gly Ile Phe Gly Pro Tyr Gly Pro Gly Ala Ser Ala Ala Ala Ala
            290                 295                 300

Gly Thr Tyr Gly Pro Gly Ile Phe Gly Pro Gly Thr Tyr Gly Pro Gly
305                 310                 315                 320

Ser Ser Gly Pro Gly Ile Phe Gly Pro Tyr Gly Pro Gly Ser Ser Ala
                325                 330                 335

Ala Ala Ala Gly Thr Tyr Gly Pro Gly Ile Phe Gly Pro Tyr Gly
            340                 345                 350

Pro Gly Thr Ser Ala Ala Ala Ala Gly Thr Tyr Ile Phe Gly Pro
            355                 360                 365

Gly Ile Phe Gly Pro Tyr Gly Pro Gly Ala Ser Gly Pro Gly Ile Phe
            370                 375                 380

Gly Pro Tyr Gly Pro Gly Ala Ser Ala Ala Ala Gly Pro Gly
385                 390                 395                 400

Thr Tyr Gly Pro Gly Ile Phe Gly Pro Ser Ala Ser Ala Ala Ala
            405                 410                 415
```

```
Ala Gly Thr Tyr Gly Ser Gly Pro Gly Thr Tyr Gly Pro Tyr Gly Pro
                420                 425                 430

Gly Thr Ser Gly Pro Gly Ser Gly Ile Phe Gly Thr Gly Pro Tyr Gly
            435                 440                 445

Pro Gly Ala Ser Ala Ala Ala Ala Gly Thr Tyr Gly Pro Gly Ile
450                 455                 460

Phe Gly Pro Tyr Gly Pro Gly Thr Ser Ala Ala Ala Ala Gly Pro
465                 470                 475                 480

Gly Ser Gly Thr Tyr Gly Pro Gly Ala Ser Gly Thr Gly Pro Ser
                485                 490                 495

Gly Thr Tyr Gly Pro Gly Ile Phe Gly Pro Gly Thr Ser Ala Ala Ala
            500                 505                 510

Ala Ala Gly Thr Tyr Ile Phe Gly Pro Gly Ile Phe Gly Pro Tyr Gly
            515                 520                 525

Pro Gly Ala Ser Ala Ala Ala Ala Gly Thr Tyr Gly Ser Gly Pro
530                 535                 540

Gly Ile Phe Gly Pro Tyr Gly Pro Gly Thr Ser Gly Ser Gly Ile Phe
545                 550                 555                 560

Gly Pro Gly Ile Phe Gly Pro Tyr Ala Ser Ala Ala Ala Ala Gly
                565                 570                 575

Pro Gly Ser Gly Ile Phe Gly Pro Gly Ala Ser
            580                 585

<210> SEQ ID NO 43
<211> LENGTH: 601
<212> TYPE: PRT
<213> ORGANISM: Artificial Sequence
<220> FEATURE:
<223> OTHER INFORMATION: Synthetic sequence, PRT917

<400> SEQUENCE: 43

Met His His His His His Ser Ser Gly Ser Ser Gly Pro Gly Leu
1               5                   10                  15

Ile Gly Pro Tyr Gly Pro Gly Ala Ser Ala Ala Ala Ala Gly Val
                20                  25                  30

Asn Gly Pro Gly Ser Gly Leu Ile Gly Pro Gly Val Ser Gly Val Tyr
            35                  40                  45

Gly Pro Gly Leu Ile Gly Pro Gly Leu Ile Gly Pro Gly Ser Ser Ala
            50                  55                  60

Ala Ala Ala Ala Gly Pro Gly Val Tyr Gly Pro Gly Leu Ile Gly Pro
65                  70                  75                  80

Ser Ala Ser Ala Ala Ala Ala Gly Pro Gly Ser Gly Leu Ile Gly
                85                  90                  95

Pro Gly Ala Ser Gly Val Tyr Gly Pro Gly Leu Ile Gly Pro Gly Leu
            100                 105                 110

Ile Gly Pro Gly Ser Ser Ala Ala Ala Ala Gly Val Tyr Gly Ser
                115                 120                 125

Gly Pro Gly Leu Ile Gly Pro Tyr Gly Ser Ala Ala Ala Ala Gly
            130                 135                 140

Pro Gly Ser Gly Val Tyr Gly Val Gly Pro Tyr Gly Pro Gly Ala Ser
145                 150                 155                 160

Gly Pro Gly Val Tyr Gly Pro Gly Leu Ile Gly Pro Ser Ala Ser Ala
                165                 170                 175

Ala Ala Ala Gly Ser Gly Leu Ile Gly Pro Gly Val Tyr Gly Pro
            180                 185                 190
```

```
Tyr Ala Ser Ala Ala Ala Ala Gly Val Tyr Ser Gly Pro Gly
            195                 200                 205

Leu Ile Gly Pro Tyr Gly Pro Gly Val Ser Ser Gly Leu Ile Gly
210                 215                 220

Pro Gly Leu Ile Gly Pro Tyr Ala Ser Ala Ala Ala Ala Gly Pro
225                 230                 235                 240

Gly Leu Ile Gly Pro Tyr Gly Pro Gly Ser Ser Ala Ala Ala Ala
                245                 250                 255

Gly Val Tyr Gly Tyr Gly Pro Gly Leu Ile Gly Pro Tyr Gly Pro Gly
            260                 265                 270

Ala Ser Gly Val Asn Gly Pro Gly Ser Gly Val Tyr Gly Pro Gly Leu
        275                 280                 285

Ile Gly Pro Gly Val Ser Ala Ala Ala Ala Gly Pro Gly Leu Ile
        290                 295                 300

Gly Pro Tyr Gly Pro Gly Ala Ser Ala Ala Ala Ala Gly Val Tyr
305                 310                 315                 320

Gly Pro Gly Leu Ile Gly Pro Gly Val Tyr Gly Pro Gly Ser Ser Gly
                325                 330                 335

Pro Gly Leu Ile Gly Pro Tyr Gly Pro Gly Ser Ser Ala Ala Ala Ala
            340                 345                 350

Ala Gly Val Tyr Gly Pro Gly Leu Ile Gly Pro Tyr Gly Pro Gly Val
        355                 360                 365

Ser Ala Ala Ala Ala Gly Val Tyr Leu Ile Gly Pro Gly Leu Ile
        370                 375                 380

Gly Pro Tyr Gly Pro Gly Ala Ser Gly Pro Gly Leu Ile Gly Pro Tyr
385                 390                 395                 400

Gly Pro Gly Ala Ser Ala Ala Ala Ala Gly Pro Gly Val Tyr Gly
                405                 410                 415

Pro Gly Leu Ile Gly Pro Ser Ala Ser Ala Ala Ala Ala Gly Val
            420                 425                 430

Tyr Gly Ser Gly Pro Gly Val Tyr Gly Pro Tyr Gly Pro Gly Val Ser
        435                 440                 445

Gly Pro Gly Ser Gly Leu Ile Gly Val Gly Pro Tyr Gly Pro Gly Ala
        450                 455                 460

Ser Ala Ala Ala Ala Gly Val Tyr Gly Pro Gly Leu Ile Gly Pro
465                 470                 475                 480

Tyr Gly Pro Gly Val Ser Ala Ala Ala Ala Gly Pro Gly Ser Gly
                485                 490                 495

Val Tyr Gly Pro Gly Ala Ser Gly Val Asn Gly Pro Gly Ser Gly Val
            500                 505                 510

Tyr Gly Pro Gly Leu Ile Gly Pro Gly Val Ser Ala Ala Ala Ala
        515                 520                 525

Gly Val Tyr Leu Ile Gly Pro Gly Leu Ile Gly Pro Tyr Gly Pro Gly
        530                 535                 540

Ala Ser Ala Ala Ala Ala Gly Val Tyr Gly Ser Gly Pro Gly Leu
545                 550                 555                 560

Ile Gly Pro Tyr Gly Pro Gly Val Ser Gly Ser Gly Leu Ile Gly Pro
                565                 570                 575

Gly Leu Ile Gly Pro Tyr Ala Ser Ala Ala Ala Ala Gly Pro Gly
            580                 585                 590

Ser Gly Leu Ile Gly Pro Gly Ala Ser
        595                 600
```

-continued

<210> SEQ ID NO 44
<211> LENGTH: 598
<212> TYPE: PRT
<213> ORGANISM: Artificial Sequence
<220> FEATURE:
<223> OTHER INFORMATION: Synthetic sequence, PRT1028

<400> SEQUENCE: 44

Met His His His His His Ser Ser Gly Ser Ser Gly Pro Gly Ile
1               5                   10                  15

Phe Gly Pro Tyr Gly Pro Gly Ala Ser Ala Ala Ala Ala Gly Thr
                20                  25                  30

Gly Pro Gly Ser Gly Ile Phe Gly Pro Gly Thr Ser Gly Thr Tyr Gly
            35                  40                  45

Pro Gly Ile Phe Gly Pro Gly Ile Phe Gly Pro Gly Ser Ser Ala Ala
50                  55                  60

Ala Ala Ala Gly Pro Gly Thr Tyr Gly Pro Gly Ile Phe Gly Pro Ser
65                  70                  75                  80

Ala Ser Ala Ala Ala Ala Gly Pro Gly Ser Gly Ile Phe Gly Pro
                85                  90                  95

Gly Ala Ser Gly Thr Tyr Gly Pro Gly Ile Phe Gly Pro Gly Ile Phe
            100                 105                 110

Gly Pro Gly Ser Ser Ala Ala Ala Ala Gly Thr Tyr Gly Ser Gly
            115                 120                 125

Pro Gly Ile Phe Gly Pro Tyr Gly Ser Ala Ala Ala Ala Gly Pro
            130                 135                 140

Gly Ser Gly Thr Tyr Gly Thr Gly Pro Tyr Gly Pro Gly Ala Ser Gly
145                 150                 155                 160

Pro Gly Thr Tyr Gly Pro Gly Ile Phe Gly Pro Ser Ala Ser Ala Ala
                165                 170                 175

Ala Ala Ala Gly Ser Gly Ile Phe Gly Pro Gly Thr Tyr Gly Pro Tyr
            180                 185                 190

Ala Ser Ala Ala Ala Ala Gly Thr Tyr Gly Ser Gly Pro Gly Ile
            195                 200                 205

Phe Gly Pro Tyr Gly Pro Gly Thr Ser Gly Ser Gly Ile Phe Gly Pro
210                 215                 220

Gly Ile Phe Gly Pro Tyr Ala Ser Ala Ala Ala Ala Gly Pro Gly
225                 230                 235                 240

Ile Phe Gly Pro Tyr Gly Pro Gly Ser Ser Ala Ala Ala Ala Gly
                245                 250                 255

Thr Tyr Gly Tyr Gly Pro Gly Ile Phe Gly Pro Tyr Gly Pro Gly Ala
            260                 265                 270

Ser Gly Thr Gly Pro Gly Ser Gly Thr Tyr Gly Pro Gly Ile Phe Gly
            275                 280                 285

Pro Gly Thr Ser Ala Ala Ala Ala Gly Pro Gly Ile Phe Gly Pro
            290                 295                 300

Tyr Gly Pro Gly Ala Ser Ala Ala Ala Ala Gly Thr Tyr Gly Pro
305                 310                 315                 320

Gly Ile Phe Gly Pro Gly Thr Tyr Gly Pro Gly Ser Ser Gly Pro Gly
                325                 330                 335

Ile Phe Gly Pro Tyr Gly Pro Gly Ser Ser Ala Ala Ala Ala Gly
            340                 345                 350

Thr Tyr Gly Pro Gly Ile Phe Gly Pro Tyr Gly Pro Gly Thr Ser Ala
            355                 360                 365

Ala Ala Ala Ala Gly Thr Tyr Ile Phe Gly Pro Gly Ile Phe Gly Pro

```
            370             375             380
Tyr Gly Pro Gly Ala Ser Gly Pro Gly Ile Phe Gly Pro Tyr Gly Pro
385                 390                 395                 400

Gly Ala Ser Ala Ala Ala Ala Gly Pro Gly Thr Tyr Gly Pro Gly
                405                 410                 415

Ile Phe Gly Pro Ser Ala Ser Ala Ala Ala Ala Gly Thr Tyr Gly
                420                 425                 430

Ser Gly Pro Gly Thr Tyr Gly Pro Tyr Gly Pro Gly Thr Ser Gly Pro
                435                 440                 445

Gly Ser Gly Ile Phe Gly Thr Gly Pro Tyr Gly Pro Gly Ala Ser Ala
                450                 455                 460

Ala Ala Ala Ala Gly Thr Tyr Gly Pro Gly Ile Phe Gly Pro Tyr Gly
465                 470                 475                 480

Pro Gly Thr Ser Ala Ala Ala Ala Gly Pro Gly Ser Gly Thr Tyr
                485                 490                 495

Gly Pro Gly Ala Ser Gly Thr Gly Pro Gly Ser Gly Thr Tyr Gly Pro
                500                 505                 510

Gly Ile Phe Gly Pro Gly Thr Ser Ala Ala Ala Ala Gly Thr Tyr
                515                 520                 525

Ile Phe Gly Pro Gly Ile Phe Gly Pro Tyr Gly Pro Gly Ala Ser Ala
                530                 535                 540

Ala Ala Ala Ala Gly Thr Tyr Gly Ser Gly Pro Gly Ile Phe Gly Pro
545                 550                 555                 560

Tyr Gly Pro Gly Thr Ser Gly Ser Gly Ile Phe Gly Pro Gly Ile Phe
                565                 570                 575

Gly Pro Tyr Ala Ser Ala Ala Ala Ala Gly Pro Gly Ser Gly Ile
                580                 585                 590

Phe Gly Pro Gly Ala Ser
                595

<210> SEQ ID NO 45
<211> LENGTH: 252
<212> TYPE: PRT
<213> ORGANISM: Artificial Sequence
<220> FEATURE:
<223> OTHER INFORMATION: Synthetic sequence, Collagen-type4-Kai

<400> SEQUENCE: 45

Met His His His His His Ser Ser Gly Ser Ser Lys Asp Gly Val
1               5                   10                  15

Pro Gly Phe Pro Gly Ser Glu Gly Val Lys Gly Asn Arg Gly Phe Pro
                20                  25                  30

Gly Leu Met Gly Glu Asp Gly Ile Lys Gly Gln Lys Gly Asp Ile Gly
                35                  40                  45

Pro Pro Gly Phe Arg Gly Pro Thr Glu Tyr Tyr Asp Thr Tyr Gln Glu
                50                  55                  60

Lys Gly Asp Glu Gly Thr Pro Gly Pro Pro Gly Pro Arg Gly Ala Arg
65                  70                  75                  80

Gly Pro Gln Gly Pro Ser Gly Pro Pro Gly Val Pro Gly Ser Pro Gly
                85                  90                  95

Ser Ser Arg Pro Gly Leu Arg Gly Ala Pro Gly Trp Pro Gly Leu Lys
                100                 105                 110

Gly Ser Lys Gly Glu Arg Gly Arg Pro Gly Lys Asp Ala Met Gly Thr
                115                 120                 125

Pro Gly Ser Pro Gly Cys Ala Gly Ser Pro Gly Leu Pro Gly Ser Pro
```

```
                 130                 135                 140
Gly Pro Pro Gly Pro Pro Gly Asp Ile Val Phe Arg Lys Gly Pro Pro
145                 150                 155                 160

Gly Asp His Gly Leu Pro Gly Tyr Leu Gly Ser Pro Gly Ile Pro Gly
                165                 170                 175

Val Asp Gly Pro Lys Gly Glu Pro Gly Leu Leu Cys Thr Gln Cys Pro
            180                 185                 190

Tyr Ile Pro Gly Pro Pro Gly Leu Pro Gly Leu Pro Gly Leu His Gly
            195                 200                 205

Val Lys Gly Ile Pro Gly Arg Gln Gly Ala Ala Gly Leu Lys Gly Ser
            210                 215                 220

Pro Gly Ser Pro Gly Asn Thr Gly Leu Pro Gly Phe Pro Gly Phe Pro
225                 230                 235                 240

Gly Ala Gln Gly Asp Pro Gly Leu Lys Gly Glu Lys
            245                 250

<210> SEQ ID NO 46
<211> LENGTH: 310
<212> TYPE: PRT
<213> ORGANISM: Artificial Sequence
<220> FEATURE:
<223> OTHER INFORMATION: Synthetic sequence, Resilin-Kai

<400> SEQUENCE: 46

Met His His His His His Pro Glu Pro Pro Val Asn Ser Tyr Leu
1               5                   10                  15

Pro Pro Ser Asp Ser Tyr Gly Ala Pro Gly Gln Ser Gly Pro Gly Gly
            20                  25                  30

Arg Pro Ser Asp Ser Tyr Gly Ala Pro Gly Gly Gly Asn Gly Gly Arg
            35                  40                  45

Pro Ser Asp Ser Tyr Gly Ala Pro Gly Gln Gly Gln Gly Gln Gly Gln
        50                  55                  60

Gly Gln Gly Gly Tyr Ala Gly Lys Pro Ser Asp Ser Tyr Gly Ala Pro
65                  70                  75                  80

Gly Gly Gly Asp Gly Asn Gly Gly Arg Pro Ser Ser Ser Tyr Gly Ala
                85                  90                  95

Pro Gly Gly Gly Asn Gly Gly Arg Pro Ser Asp Thr Tyr Gly Ala Pro
            100                 105                 110

Gly Gly Gly Asn Gly Gly Arg Pro Ser Asp Thr Tyr Gly Ala Pro Gly
            115                 120                 125

Gly Gly Asn Gly Asn Gly Gly Arg Pro Ser Ser Ser Tyr Gly Ala
            130                 135                 140

Pro Gly Gln Gly Gln Gly Asn Gly Asn Gly Gly Arg Pro Ser Ser Ser
145                 150                 155                 160

Tyr Gly Ala Pro Gly Gly Gly Asn Gly Gly Arg Pro Ser Asp Thr Tyr
            165                 170                 175

Gly Ala Pro Gly Gly Gly Asn Gly Asn Gly Gly Arg Pro Ser Asp Tyr
            180                 185                 190

Ala Pro Gly Gly Gly Asn Asn Gly Gly Arg Pro Ser Ser Ser Tyr Gly
            195                 200                 205

Ala Pro Gly Gly Gly Asn Gly Arg Pro Ser Asp Thr Tyr Gly Ala
            210                 215                 220

Pro Gly Gly Gly Asn Gly Asn Gly Ser Gly Arg Pro Ser Ser Ser
225                 230                 235                 240

Tyr Gly Ala Pro Gly Gln Gly Gln Gly Gly Phe Gly Gly Arg Pro Ser
```

```
                        245                 250                 255
Asp Ser Tyr Gly Ala Pro Gly Gln Asn Gln Lys Pro Ser Asp Ser Tyr
            260                 265                 270

Gly Ala Pro Gly Ser Gly Asn Gly Asn Gly Gly Arg Pro Ser Ser Ser
            275                 280                 285

Tyr Gly Ala Pro Gly Ser Gly Pro Gly Gly Arg Pro Ser Asp Ser Tyr
            290                 295                 300

Gly Pro Pro Ala Ser Gly
305                 310

<210> SEQ ID NO 47
<211> LENGTH: 282
<212> TYPE: PRT
<213> ORGANISM: Artificial Sequence
<220> FEATURE:
<223> OTHER INFORMATION: Synthetic sequence, elastin short

<400> SEQUENCE: 47

Met His His His His His Ser Ser Gly Ser Ser Leu Gly Val Ser
1               5                   10                  15

Ala Gly Ala Val Val Pro Gln Pro Gly Ala Gly Val Lys Pro Gly Lys
            20                  25                  30

Val Pro Gly Val Gly Leu Pro Gly Val Tyr Pro Gly Gly Val Leu Pro
            35                  40                  45

Gly Ala Arg Phe Pro Gly Val Gly Val Leu Pro Gly Val Pro Thr Gly
        50                  55                  60

Ala Gly Val Lys Pro Lys Ala Pro Gly Val Gly Gly Ala Phe Ala Gly
65                  70                  75                  80

Ile Pro Gly Val Gly Pro Phe Gly Gly Pro Gln Pro Gly Val Pro Leu
                85                  90                  95

Gly Tyr Pro Ile Lys Ala Pro Lys Leu Pro Gly Gly Tyr Gly Leu Pro
            100                 105                 110

Tyr Thr Thr Gly Lys Leu Pro Tyr Gly Tyr Gly Pro Gly Gly Val Ala
            115                 120                 125

Gly Ala Ala Gly Lys Ala Gly Tyr Pro Thr Gly Thr Gly Val Gly Pro
        130                 135                 140

Gln Ala Ala Ala Ala Ala Ala Lys Ala Ala Lys Phe Gly Ala
145                 150                 155                 160

Gly Ala Ala Gly Val Leu Pro Gly Val Gly Gly Ala Gly Val Pro Gly
                165                 170                 175

Val Pro Gly Ala Ile Pro Gly Ile Gly Gly Ile Ala Gly Val Gly Thr
            180                 185                 190

Pro Ala Ala Ala Ala Ala Ala Ala Ala Lys Ala Ala Lys Tyr
            195                 200                 205

Gly Ala Ala Gly Leu Val Pro Gly Pro Gly Phe Gly Pro Gly
        210                 215                 220

Val Val Gly Val Pro Gly Ala Gly Val Pro Gly Val Gly Val Pro Gly
225                 230                 235                 240

Ala Gly Ile Pro Val Val Pro Gly Ala Gly Ile Pro Gly Ala Ala Val
                245                 250                 255

Pro Gly Val Val Ser Pro Glu Ala Ala Lys Ala Ala Ala Lys Ala
            260                 265                 270

Ala Lys Tyr Gly Ala Arg Pro Gly Val Gly
            275                 280
```

```
<210> SEQ ID NO 48
<211> LENGTH: 468
<212> TYPE: PRT
<213> ORGANISM: Artificial Sequence
<220> FEATURE:
<223> OTHER INFORMATION: Synthetic sequence, type I keratin 26

<400> SEQUENCE: 48

Met Ser Phe Arg Leu Ser Gly Val Ser Arg Arg Leu Cys Ser Gln Ala
1               5                   10                  15

Gly Thr Gly Arg Leu Thr Gly Gly Arg Thr Gly Phe Arg Ala Gly Asn
                20                  25                  30

Val Cys Ser Gly Leu Gly Ala Gly Ser Ser Phe Ser Gly Pro Leu Gly
            35                  40                  45

Ser Val Ser Ser Lys Gly Ser Phe Ser His Gly Gly Gly Leu Gly
        50                  55                  60

Ser Gly Val Cys Thr Gly Phe Leu Glu Asn Glu His Gly Leu Leu Pro
65                  70                  75                  80

Gly Asn Glu Lys Val Thr Leu Gln Asn Leu Asn Asp Arg Leu Ala Ser
                85                  90                  95

Tyr Leu Asp His Val Cys Thr Leu Glu Glu Ala Asn Ala Asp Leu Glu
            100                 105                 110

Gln Lys Ile Lys Gly Trp Tyr Glu Lys Tyr Gly Pro Gly Ser Gly Arg
        115                 120                 125

Gln Leu Ala His Asp Tyr Ser Lys Tyr Phe Ser Val Thr Glu Asp Leu
    130                 135                 140

Lys Arg Gln Ile Ile Ser Val Thr Thr Cys Asn Ala Ser Ile Val Leu
145                 150                 155                 160

Gln Asn Glu Asn Ala Arg Leu Thr Ala Asp Asp Phe Arg Leu Lys Cys
                165                 170                 175

Glu Asn Glu Leu Ala Leu His Gln Ser Val Glu Ala Asp Ile Asn Gly
            180                 185                 190

Leu His Arg Val Met Asp Glu Leu Thr Leu Cys Thr Ser Asp Leu Glu
        195                 200                 205

Met Gln Cys Glu Ala Leu Ser Glu Glu Leu Thr Tyr Leu Lys Lys Asn
    210                 215                 220

His Gln Glu Glu Met Lys Val Met Gln Gly Ala Ala Arg Gly Asn Val
225                 230                 235                 240

Asn Val Glu Ile Asn Ala Ala Pro Gly Val Asp Leu Thr Val Leu Leu
                245                 250                 255

Asn Asn Met Arg Ala Glu Tyr Glu Asp Leu Ala Glu Gln Asn His Glu
            260                 265                 270

Asp Ala Glu Ala Trp Phe Ser Glu Lys Ser Thr Ser Leu His Gln Gln
        275                 280                 285

Ile Ser Asp Asp Ala Gly Ala Ala Met Ala Ala Arg Asn Glu Leu Met
    290                 295                 300

Glu Leu Lys Arg Asn Leu Gln Thr Leu Glu Ile Glu Leu Gln Ser Leu
305                 310                 315                 320

Leu Ala Met Lys His Ser Tyr Glu Cys Ser Leu Ala Glu Thr Glu Ser
                325                 330                 335

Asn Tyr Cys His Gln Leu Gln Gln Ile Gln Glu Gln Ile Gly Ala Met
            340                 345                 350

Glu Asp Gln Leu Gln Gln Ile Arg Met Glu Thr Glu Gly Gln Lys Leu
        355                 360                 365

Glu His Glu Arg Leu Leu Asp Val Lys Ile Phe Leu Glu Lys Glu Ile
```

```
                  370                 375                 380
Glu Met Tyr Cys Lys Leu Ile Asp Gly Glu Gly Arg Lys Ser Lys Ser
385                 390                 395                 400

Thr Cys Tyr Lys Ser Glu Gly Arg Gly Pro Lys Asn Ser Glu Asn Gln
                405                 410                 415

Val Lys Asp Ser Lys Glu Glu Ala Val Val Lys Thr Val Val Gly Glu
                420                 425                 430

Leu Asp Gln Leu Gly Ser Val Leu Ser Leu Arg Val His Ser Val Glu
                435                 440                 445

Glu Lys Ser Ser Lys Ile Ser Asn Ile Thr Met Glu Gln Arg Leu Pro
                450                 455                 460

Ser Lys Val Pro
465

<210> SEQ ID NO 49
<211> LENGTH: 5
<212> TYPE: PRT
<213> ORGANISM: Artificial Sequence
<220> FEATURE:
<223> OTHER INFORMATION: Synthetic sequence
<220> FEATURE:
<221> NAME/KEY: misc_feature
<222> LOCATION: (4)..(5)
<223> OTHER INFORMATION: Xaa can be any naturally occurring amino acid

<400> SEQUENCE: 49

Gly Pro Gly Xaa Xaa
1               5

<210> SEQ ID NO 50
<211> LENGTH: 5
<212> TYPE: PRT
<213> ORGANISM: Artificial Sequence
<220> FEATURE:
<223> OTHER INFORMATION: Synthetic sequence
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid

<400> SEQUENCE: 50

Xaa Gly Xaa Gly Xaa
1               5

<210> SEQ ID NO 51
<211> LENGTH: 7
<212> TYPE: PRT
<213> ORGANISM: Artificial Sequence
<220> FEATURE:
<223> OTHER INFORMATION: Synthetic sequence
<220> FEATURE:
<221> NAME/KEY: misc_feature
<222> LOCATION: (2)..(3)
<223> OTHER INFORMATION: Xaa can be any naturally occurring amino acid
<220> FEATURE:
<221> NAME/KEY: misc_feature
<222> LOCATION: (6)..(6)
<223> OTHER INFORMATION: Xaa can be any naturally occurring amino acid

<400> SEQUENCE: 51
```

```
Ser Xaa Xaa Tyr Gly Xaa Pro
1               5

<210> SEQ ID NO 52
<211> LENGTH: 4
<212> TYPE: PRT
<213> ORGANISM: Artificial Sequence
<220> FEATURE:
<223> OTHER INFORMATION: Synthetic sequence

<400> SEQUENCE: 52

Ala Ala Ala Ala
1
```

US 12,084,574 B2

FLEXIBLE POLYURETHANE FOAM, AUTOMOBILE SEAT PAD, AND FLEXIBLE POLYURETHANE FOAM PRODUCTION METHOD

CROSS REFERENCE TO RELATED APPLICATIONS

This application is a National Stage of International Application No. PCT/JP2019/026899 filed on Jul. 5, 2019, claiming priority based on Japanese Patent Application No. 2018-129437 filed on Jul. 6, 2018 and Japanese Patent Application No. 2019-020096 filed on Feb. 6, 2019.

TECHNICAL FIELD

The present disclosure relates to a flexible polyurethane foam, an automobile seat pad, and a flexible polyurethane foam production method.

BACKGROUND

Flexible polyurethane foam has excellent cushioning property, and therefore is widely used in seat pads of automobiles and the like.

Automobile members in particular are increasingly required to be lighter and thinner, to improve fuel efficiency and secure vehicle interior space. Seat pads are no exception, and there is a need to further reduce the weights of seat pads.

When reducing the weights of members, it is important to increase their hardness. For flexible polyurethane foam, conventionally a styrene/acrylonitrile copolymer is blended to increase hardness (JP 2008-024773 A (PTL 1)).

CITATION LIST

Patent Literature

PTL 1: JP 2008-024773 A

SUMMARY

Technical Problem

However, blending a styrene/acrylonitrile copolymer to increase the hardness of flexible polyurethane foam causes deterioration (i.e. increase) of stress relaxation. Stress relaxation is important for the comfort to sit on seat pads. Conventional flexible polyurethane foam has room for improvement in achieving both high hardness and low stress relaxation.

It could therefore be helpful to provide a flexible polyurethane foam having high hardness required for weight reduction of members and having low stress relaxation. It could also be helpful to provide a flexible polyurethane foam production method by which the flexible polyurethane foam can be produced while suppressing coarsening of cells. It could also be helpful to provide an automobile seat pad having high hardness and low stress relaxation.

Solution to Problem

As a result of conducting diligent study, we discovered that, by using a structural protein fiber having a predetermined length in flexible polyurethane foam, flexible polyurethane foam having both high hardness and low stress relaxation can be obtained.

That is, a flexible polyurethane foam according to the present disclosure comprises a structural protein fiber having a length of 0.1 mm to 5 mm.

An automobile seat pad according to the present disclosure comprises the foregoing flexible polyurethane foam.

A flexible polyurethane foam production method according to the present disclosure comprises obtaining the foregoing flexible polyurethane foam by molding.

Advantageous Effect

It is therefore possible to provide a flexible polyurethane foam having high hardness required for weight reduction of members and having low stress relaxation. It is also possible to provide a flexible polyurethane foam production method by which the flexible polyurethane foam can be produced while suppressing coarsening of cells. It is also possible to provide an automobile seat pad having high hardness and low stress relaxation.

DETAILED DESCRIPTION

Figure 1:
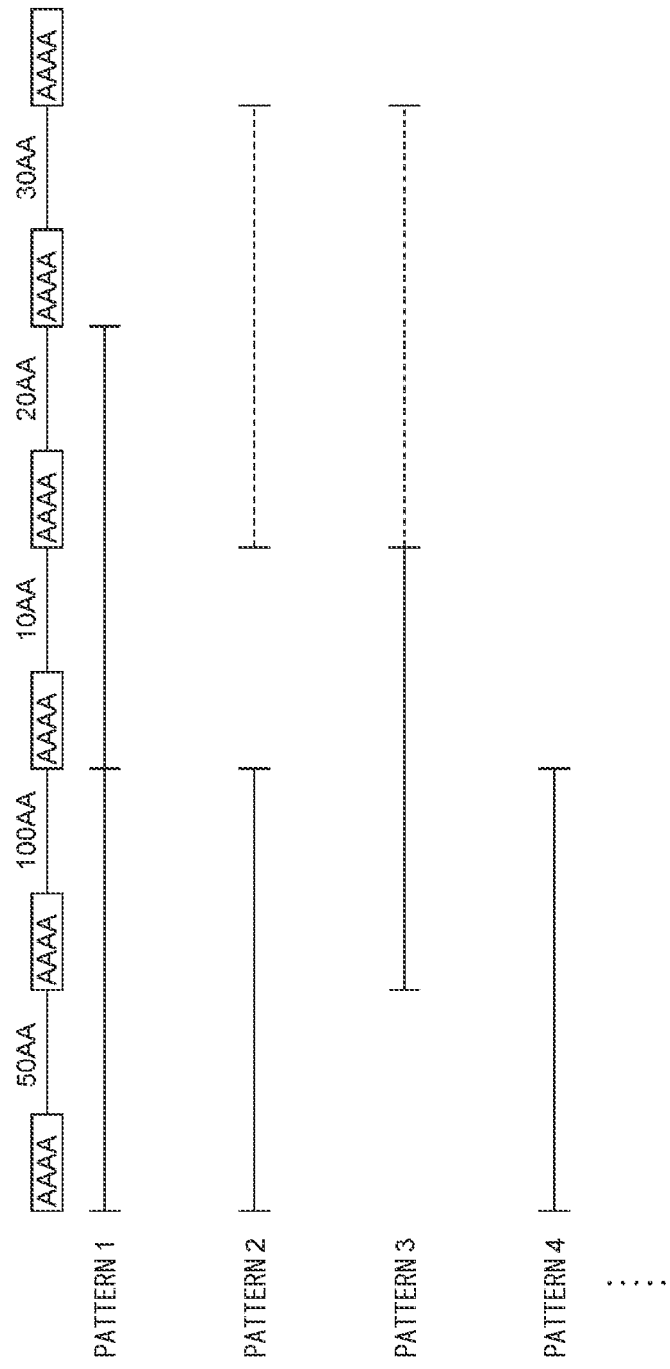
FIG. 1 is a schematic diagram illustrating an example of a domain sequence of modified fibroin ("AAAA" is SEQ ID NO: 52)

One of the disclosed embodiments will be described in detail below.

(Flexible Polyurethane Foam)

A flexible polyurethane foam according to one of the disclosed embodiments (hereafter also referred to as "flexible polyurethane foam according to this embodiment") comprises a structural protein fiber having a length of 0.1 mm to 5 mm. As a result of the structural protein fiber having the foregoing predetermined length being contained in the flexible polyurethane foam, the structural protein fiber functions as a reinforcer, so that the hardness can be improved. Moreover, as a result of the structural protein fiber having the foregoing predetermined length being used in the flexible polyurethane foam, the hardness immediately after the production of the flexible polyurethane foam (for example, during demolding after molding) can be improved, and problems in production and work, such as a pattern of hands remaining on the flexible polyurethane foam after removal, can be reduced. In addition, as a result of the structural protein fiber having the foregoing predetermined length being blended in the flexible polyurethane foam, the stress relaxation can be reduced while maintaining high hardness, unlike the conventional technique of blending a styrene/ acrylonitrile copolymer. Although the reason why the stress relaxation is reduced is not clear, the reason is presumed to be that the structural protein fiber has many functional groups which react with the raw material of the polyurethane foam.

Moreover, since there is no need to use a styrene/acrylonitrile copolymer for the flexible polyurethane foam according to this embodiment, VOCs such as styrene in the vehicle interior can be reduced as compared with the conventional technique.

The term "structural protein fiber" as used herein denotes a product resulting from spinning a structural protein. The same applies to the definition of the term "modified fibroin fiber" and the like.

The term "flexible polyurethane foam" as used herein denotes a polyurethane foam having open cells and restorable against loads, and is different from "rigid polyurethane foam" used as heat insulators and the like.

Structural Protein

A structural protein refers to a protein that forms a biological structure or a protein derived therefrom. The structural protein according to this embodiment may be produced by purifying a naturally occurring structural protein, produced using a microorganism and the like by gene recombination, or produced by synthesis. That is, the structural protein may be a naturally occurring structural protein, or a modified protein, i.e. a protein whose amino acid sequence has been partly (for example, at most 10% of the amino acid sequence) modified based on the amino acid sequence of the naturally occurring structural protein.

Examples of the naturally occurring structural protein include fibroin, collagen, resilin, elastin, and keratin.

Fibroin (naturally occurring fibroin) is a structural protein including a domain sequence represented by Formula 1: [(A)n motif-REP]m or Formula 2: [(A)n motif-REP]m-(A)n motif, specifically, for example, a fibroin produced by insects or a fibroin produced by spiders (spider silk fibroin). The structural protein in the flexible polyurethane foam according to this embodiment may be a spider silk fibroin.

Examples of the fibroin produced by insects include Hornet silk fibroin discharged by larvae of *Vespa simillima xanthoptera*.

Examples of the fibroin produced by spiders (spider silk fibroin) include spider silk proteins produced by spiders belonging to the genus Araneus such as *Araneus ventricosus, Araneus diadematus, Araneus pinguis, Araneus pentagrammicus*, and *Araneus nojimai*, spiders belonging to the genus Neoscona such as *Neoscona scylla, Neoscona nautica, Neoscona adianta*, and *Neoscona scylloides*, spiders belonging to the genus Pronus such as *Pronous minutes*, spiders belonging to the genus Cyrtarachne such as *Cyrtarachne bufo* and *Cyrtarachne inaequalis*, spiders belonging to the genus Gasteracantha such as *Gasteracantha kuhli* and *Gasteracantha mammosa*, spiders belonging to the genus Ordgarius such as *Ordgarius hobsoni* and *Ordgarius sexspinosus*, spiders belonging to the genus Argiope such as *Argiope amoena, Argiope minuta*, and *Argiope bruennich*, spiders belonging to the genus Arachnura such as *Arachnura logio*, spiders belonging to the genus Acusilas such as *Acusilas coccineus*, spiders belonging to the genus Cytophora such as *Cyrtophora moluccensis, Cyrtophora exanthematica*, and *Cyrtophora unicolor*, spiders belonging to the genus Poltys such as *Poltys illepidus*, spiders belonging to the genus Cyclosa such as *Cyclosa octotuberculata, Cyclosa sedeculata, Cyclosa vallata*, and *Cyclosa atrata*, and spiders belonging to the genus Chorizopes such as *Chorizopes nipponicus*; and spider silk proteins produced by spiders belonging to the genus Tetragnatha such as *Tetragnatha praedonia, Tetragnatha maxillosa, Tetragnatha extensa*, and *Tetragnatha squamata*, spiders belonging to the genus Leucauge such as *Leucauge magnifwca, Leucauge blanda*, and *Leucauge subblanda*, spiders belonging to the genus Nephila such as *Nephila clavata* and *Nephila pilipes*, spiders belonging to the genus Menosira such as *Menosira ornata*, spiders belonging to the genus Dyschiriognatha such as *Dyschiriognatha tenera*, spiders belonging to the genus Latrodectus such as *Latrodectus mactans, Latrodectus hasseltii, Latrodectus geometricus*, and *Latrodectus tredecimguttatus*, and spiders belonging to the family Tetragnathidae such as spiders belonging to the genus Euprosthenops. Examples of spider silk proteins include traction fiber proteins such as MaSp (MaSp1 and MaSp2) and ADF (ADF3 and ADF4), and MiSp (MiSp1 and MiSp2).

More specific examples of the spider silk protein produced by spiders include fibroin-3 (adf-3) [derived from *Araneus diadematus*] (GenBank Accession Number AAC47010 (amino acid sequence), U47855 (nucleotide sequence)), fibroin-4 (adf-4) [derived from *Araneus diadematus*] (GenBank Accession Number AAC47011 (amino acid sequence), U47856 (nucleotide sequence)), dragline silk protein spidroin 1 [derived from *Nephila clavipes*] (GenBank Accession Number AAC04504 (amino acid sequence), U37520 (nucleotide sequence)), major ampullate spidroin 1 [derived from *Latrodectus hesperus*] (GenBank Accession Number ABR68856 (amino acid sequence)), EF595246 (nucleotide sequence)), dragline silk protein spidroin 2 [derived from *Nephila clavata*] (GenBank Accession Number AAL32472 (amino acid sequence), AF441245 (nucleotide sequence)), major ampullate spidroin 1 [derived from *Euprosthenops australis*] (GenBank Accession Number CAJ00428 (amino acid sequence), AJ973155 (nucleotide sequence)), major ampullate spidroin 2 [*Euprosthenops australis*] (GenBank Accession Number CAM32249.1 (amino acid sequence), AM490169 (nucleotide sequence)), minor ampullate silk protein 1 [*Nephila clavipes*] (GenBank Accession Number AAC14589.1 (amino acid sequence)), minor ampullate silk protein 2 [*Nephila clavipes*] (GenBank Accession Number AAC14591.1 (amino acid sequence)), and minor ampullate spidroin-like protein [*Nephilengys cruentata*] (GenBank Accession Number ABR37278.1 (amino acid sequence)).

A more specific example of naturally occurring fibroin is fibroin in which sequence information is registered in NCBI GenBank. For example, confirmation can be made by extracting, from among sequences containing INV as DIVISION among sequence information registered in NCBI GenBank, sequences in which spidroin, ampullate, fibroin, "silk and polypeptide", or "silk and protein" is described as a keyword in DEFINITION, or sequences in which a specific character string of products is described from CDS and a specific character string is described from SOURCE to TISSUE TYPE.

In the flexible polyurethane foam according to this embodiment, artificially produced protein ("modified protein") may be used as the structural protein forming the structural protein fiber. Examples of the modified protein include modified fibroin, modified collagen, modified resilin, modified elastin, and modified keratin.

In particular, the structural protein forming the structural protein fiber is preferably modified fibroin, from the viewpoint of heat resistance, water resistance, and the like.

Modified Fibroin

The modified fibroin is a protein including a domain sequence represented by Formula 1: [(A)n motif-REP]m or Formula 2: [(A)n motif-REP]m-(A)n motif. In the modified fibroin, an amino acid sequence (N-terminal sequence and C-terminal sequence) may be further added to either or both of the N-terminal side and the C-terminal side of the domain sequence. The N-terminal sequence and the C-terminal sequence, although not limited thereto, are typically regions that do not have repetitions of amino acid motifs characteristic of fibroin and consist of amino acids of about 100 residues.

The term "modified fibroin" as used herein denotes an artificially produced fibroin (artificial fibroin). The modified fibroin may be a fibroin whose domain sequence is different from the amino acid sequence of naturally occurring fibroin, or a fibroin whose domain sequence is the same as the amino acid sequence of naturally occurring fibroin. The term "naturally occurring fibroin" as used herein is also a protein including a domain sequence represented by Formula 1: [(A)n motif-REP]m or Formula 2: [(A)n motif-REP]m-(A)n motif.

The "modified fibroin" may be a fibroin that uses the amino acid sequence of naturally occurring fibroin itself, a fibroin whose amino acid sequence has been modified based on the amino acid sequence of naturally occurring fibroin (for example, a fibroin whose amino acid sequence has been modified by altering the gene sequence of cloned naturally occurring fibroin), or a fibroin artificially designed and synthesized independently of naturally occurring fibroin (for example, a fibroin having a desired amino acid sequence by chemically synthesizing a nucleic acid encoding the designed amino acid sequence).

The term "domain sequence" as used herein refers to an amino acid sequence which produces a crystalline region (which typically corresponds to (A)n motif of an amino acid sequence) and an amorphous region (which typically corresponds to REP of an amino acid sequence) peculiar to fibroin and means an amino acid sequence represented by Formula 1: [(A)n motif-REP]m or Formula 2: [(A)n motif-REP]m-(A)n motif. Here, the (A)n motif represents an amino acid sequence mainly containing alanine residues, and has 2 to 27 amino acid residues. The number of amino acid residues in the (A)n motif may be an integer of 2 to 20, 4 to 27, 4 to 20, 8 to 20, 10 to 20, 4 to 16, 8 to 16, or 10 to 16. The proportion of the number of alanine residues to the total number of amino acid residues in the (A)n motif is 40% or more, and may be 60% or more, 70% or more, 80% or more, 83% or more, 85% or more, 86% or more, 90% or more, 95% or more, or 100% (which means that the amino acid sequence consists of only alanine residues). Of a plurality of (A)n motifs present in the domain sequence, at least seven (A)n motifs may consist of only alanine residues. The REP represents an amino acid sequence consisting of 2 to 200 amino acid residues. The REP may be an amino acid sequence consisting of 10 to 200 amino acid residues. m represents an integer of 2 to 300, and may be an integer of 10 to 300. A plurality of (A)n motifs may be the same amino acid sequence or different amino acid sequences. A plurality of REPs may be the same amino acid sequence or different amino acid sequences.

The modified fibroin according to this embodiment can be obtained, for example, by subjecting a cloned gene sequence of naturally occurring fibroin to modifications of an amino acid sequence corresponding to substitution, deletion, insertion and/or addition of one or more amino acid residues. Substitution, deletion, insertion and/or addition of amino acid residues can be carried out by methods well known to those skilled in the art, such as site-directed mutagenesis. Specifically, they can be carried out according to a method described in literatures such as Nucleic Acid Res. 10, 6487 (1982), and Methods in Enzymology, 100, 448 (1983).

The modified fibroin according to this embodiment may be a modified spider silk fibroin (obtained by modifying an amino acid sequence of a spider silk fibroin such as a spider silk protein produced by spiders). The modified fibroin is preferably a modified spider silk fibroin.

Specific examples of the modified fibroin include a modified fibroin derived from a large sphincter bookmark silk protein produced in a major ampullate of spider (first modified fibroin), a modified fibroin having a domain sequence with a reduced content of glycine residue (second modified fibroin), a modified fibroin having a domain sequence with a reduced content of (A)n motif (third modified fibroin), a modified fibroin with a reduced content of glycine residue and with a reduced content of (A)n motif (fourth modified fibroin), a modified fibroin having a domain sequence including a region locally having a high hydropathy index (fifth modified fibroin), and a modified fibroin having a domain sequence with a reduced content of glutamine residue (sixth modified fibroin).

The first modified fibroin is, for example, a protein including a domain sequence represented by Formula 1: [(A)n motif-REP]m. In the first modified fibroin, the number of amino acid residues of (A)n motif is preferably an integer of 3 to 20, more preferably an integer of 4 to 20, still more preferably an integer of 8 to 20, even more preferably an integer of 10 to 20, even further more preferably an integer of 4 to 16, particularly preferably an integer of 8 to 16, and most preferably an integer of 10 to 16. In the first modified fibroin, the number of amino acid residues constituting REP in Formula 1 is preferably 10 to 200 residues, more preferably 10 to 150 residues, and still more preferably 20 to 100 residues, and even more preferably 20 to 75 residues. In the first modified fibroin, the total number of glycine residues, serine residues, and alanine residues contained in the amino acid sequence represented by Formula 1: [(A) n motif-REP]m is preferably 40% or more, more preferably 60% or more, and still more preferably 70% or more with respect to the total number of amino acid residues.

The first modified fibroin may be a polypeptide including an amino acid sequence unit represented by Formula 1: [(A)n motif-REP]m, and including a C-terminal sequence which is the amino acid sequence set forth in any of SEQ ID NOs: 1 to 3 or a C-terminal sequence which is an amino acid sequence having 90% or more homology with the amino acid sequence set forth in any of SEQ ID NOs: 1 to 3.

The amino acid sequence set forth in SEQ ID NO: 1 is identical to the amino acid sequence consisting of 50 amino acid residues at the C-terminal of the amino acid sequence of ADF3 (GI: 1263287, NCBI). The amino acid sequence set forth in SEQ ID NO: 2 is identical to the amino acid sequence obtained by removing 20 residues from the C-terminal of the amino acid sequence set forth in SEQ ID NO: 1. The amino acid sequence set forth in SEQ ID NO: 3 is identical to the amino acid sequence obtained by removing 29 residues from the C-terminal of the amino acid sequence set forth in SEQ ID NO: 1.

A more specific example of the first modified fibroin is a modified fibroin including (1-i) the amino acid sequence set forth in SEQ ID NO: 4 (recombinant spider silk protein ADF3KaiLargeNRSH1) or (1-ii) an amino acid sequence having 90% or more sequence identity with the amino acid sequence set forth in SEQ ID NO: 4. The sequence identity is preferably 95% or more.

The amino acid sequence set forth in SEQ ID NO: 4 is an amino acid sequence obtained by approximately doubling repeating regions from the first repeating region to the 13th repeating region and performing mutation such that translation is terminated at the 1154th amino acid residue in an amino acid sequence obtained by adding the amino acid sequence (SEQ ID NO: 5) consisting of a start codon, a His10 tag, and a recognition site for HRV3C protease (human rhinovirus 3C protease) to the N-terminal of ADF3. The C-terminal amino acid sequence of the amino acid sequence set forth in SEQ ID NO: 4 is identical to the amino acid sequence set forth in SEQ ID NO: 3.

The modified fibroin of (1-i) may consist of the amino acid sequence set forth in SEQ ID NO: 4.

The domain sequence of the second modified fibroin has an amino acid sequence with a reduced content of glycine residue, as compared with naturally occurring fibroin. In other words, the second modified fibroin has an amino acid sequence equivalent to an amino acid sequence in which at least one or more glycine residues in REP are substituted with other amino acid residues, as compared with naturally occurring fibroin.

The domain sequence of the second modified fibroin may have an amino acid sequence equivalent to an amino acid sequence in which one glycine residue in at least one motif sequence selected from GGX and GPGXX (SEQ ID NO: 49) (where G represents a glycine residue, P represents a proline residue, and X represents an amino acid residue other than glycine) in REP is substituted with other amino acid residue, as compared with naturally occurring fibroin.

In the second modified fibroin, the proportion of the motif sequences in which the glycine residue is substituted with other amino acid residue may be 10% or more with respect to the entire motif sequences.

The second modified fibroin may include a domain sequence represented by Formula 1: [(A)n motif-REP]m and have an amino acid sequence in which z/w is 30% or more, 40% or more, 50% or more, or 50.9% or more, where z is the total number of amino acid residues in the amino acid sequence consisting of XGX (where X represents an amino acid residue other than glycine) in all REPs in a sequence excluding the sequence from the (A)n motif located at the most C-terminal side to the C-terminal of the domain sequence from the domain sequence, and w is the total number of amino acid residues in the sequence excluding the sequence from the (A)n motif located at the most C-terminal side to the C-terminal of the domain sequence from the domain sequence. The number of alanine residues with respect to the total number of amino acid residues in the (A)n motif is 83% or more, preferably 86% or more, more preferably 90% or more, still more preferably 95% or more, and even more preferably 100% (which means that the (A)n motif consists of only alanine residues).

In the second modified fibroin, the content proportion of an amino acid sequence consisting of XGX is preferably increased by substituting one glycine residue in GGX motif with other amino acid residue. In the second modified fibroin, the content proportion of an amino acid sequence consisting of GGX in the domain sequence is preferably 30% or less, more preferably 20% or less, still more preferably 10% or less, even more preferably 6% or less, still further preferably 4% or less, and particularly preferably 2% or less. The content proportion of the amino acid sequence consisting of GGX in the domain sequence can be calculated by the same method as the method for calculating the content ratio (z/w) of the amino acid sequence consisting of XGX described below.

The calculation method of z/w will be described in more detail. First, in fibroin (modified fibroin or naturally occurring fibroin) including a domain sequence represented by Formula 1: [(A)n motif-REP]m, an amino acid sequence consisting of XGX is extracted from all the REPs contained in the sequence excluding the sequence from the (A)n motif located at the most C-terminal side to the C-terminal of the domain sequence from the domain sequence. The total number of amino acid residues constituting XGX is z. For example, in the case where 50 amino acid sequences consisting of XGX are extracted (there is no overlap), z is 50×3=150. For example, in the case where X (central X) contained in two XGX exists as in the case of the amino acid sequence consisting of XGXGX (SEQ ID NO: 50), it is calculated by subtracting the overlapping portion (in the case of XGXGX (SEQ ID NO: 50), it is 5 amino acid residues). w is the total number of amino acid residues contained in the sequence excluding the sequence from the (A)n motif located at the most C-terminal side to the C-terminal of the domain sequence from the domain sequence. For example, in the case of the domain sequence illustrated in FIG. 1, w is 4+50+4+100+4+10+4+20+4+30=230 (excluding the (A)n motif located at the most C-terminal side). Then, z/w (%) can be calculated by dividing z by w.

Figure 2:
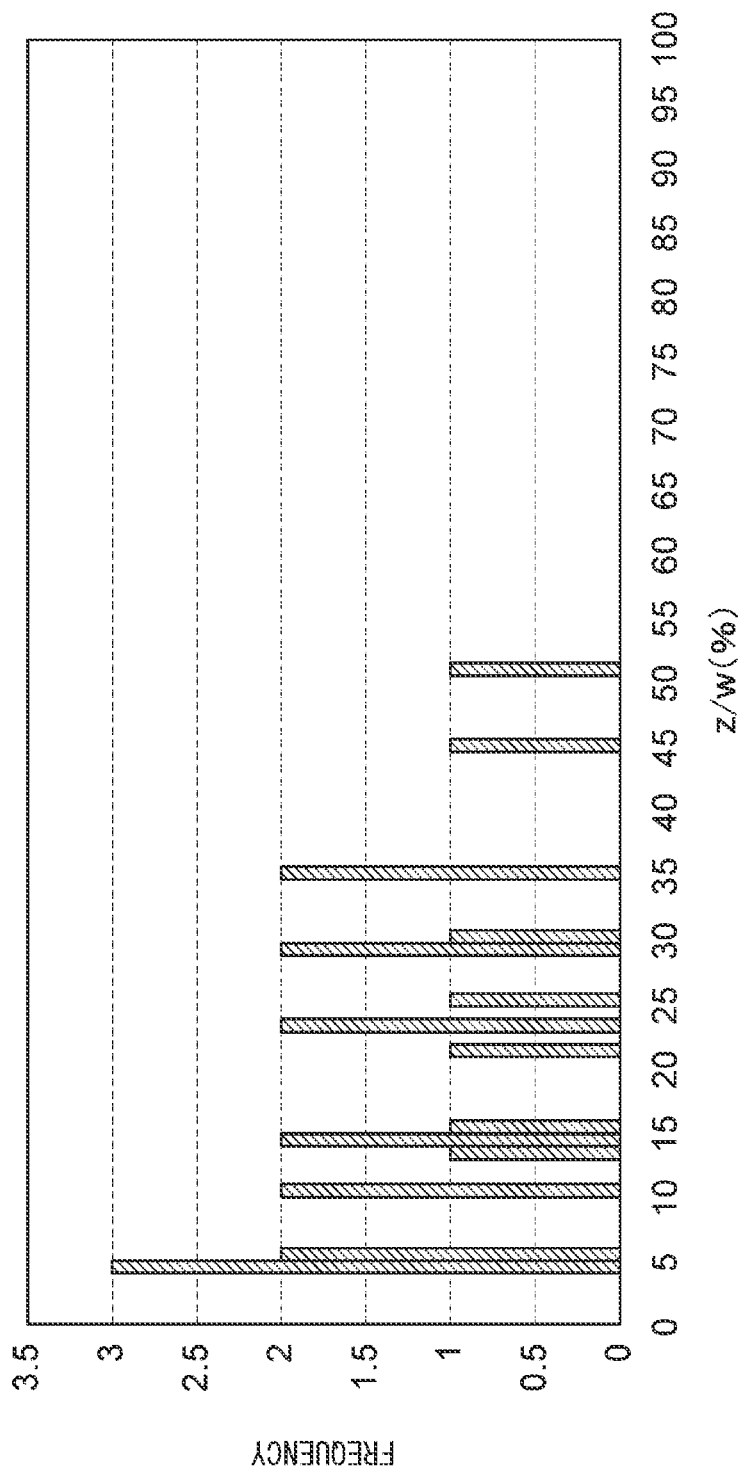
FIG. 2 is a diagram illustrating a distribution of a value of z/w (%) of naturally occurring fibroin.

Here, z/w in naturally occurring fibroin will be described. First, 663 types of fibroins (415 types of fibroins derived from spiders among them) were extracted as a result of confirming fibroins with amino acid sequence information registered in NCBI GenBank by the exemplary method as described above. z/w was calculated by the above-described calculation method from the amino acid sequences of naturally occurring fibroins which include a domain sequence represented by Formula 1: [(A)n motif-REP]m and in which the content ratio of the amino acid sequence consisting of GGX in the fibroin is 6% or less, among all the extracted fibroins. The results are illustrated in FIG. 2. In FIG. 2, the horizontal axis represents z/w (%), and the vertical axis represents frequency. As is apparent from FIG. 2, z/w in naturally occurring fibroin is less than 50.9% (highest, 50.86%).

In the second modified fibroin, z/w is preferably 50.9% or more, more preferably 56.1% or more, still more preferably 58.7% or more, even more preferably 70% or more, and still further preferably 80% or more. The upper limit of z/w is not particularly limited, but z/w may be 95% or less, for example.

The second modified fibroin can be obtained by, for example, modifying a cloned naturally occurring fibroin gene sequence such that at least a part of a base sequence encoding a glycine residue is substituted with other amino acid residue to encode the other amino acid residue. At this time, one glycine residue in GGX motif and GPGXX (SEQ ID NO: 49) motif may be selected as the glycine residue to be modified, or may be substituted so that z/w is 50.9% or more. Alternatively, the second modified fibroin may also be obtained, for example, by designing an amino acid sequence satisfying the above-described aspect based on the amino acid sequence of naturally occurring fibroin and chemically synthesizing a nucleic acid encoding the designed amino acid sequence. In any case, with respect to the amino acid sequence of naturally occurring fibroin, in addition to the modification equivalent to substitution of glycine residue in REP with other amino acid residue, further modification of amino acid sequence equivalent to substitution, deletion, insertion and/or addition of one or more amino acid residues may be carried out.

The other amino acid residue described above is not particularly limited as long as it is an amino acid residue other than glycine residue, but is preferably a hydrophobic amino acid residue such as valine (V) residue, leucine (L) residue, isoleucine (I) residue, methionine (M) residue, proline (P) residue, phenylalanine (F) residue, and tryptophan (W) residue, or a hydrophilic amino acid residues such glutamine (Q) residue, asparagine (N) residue, serine (S) residue, lysine (K) residue, and glutamic acid (E) residue, more preferably valine (V) residue, leucine (L) residue, isoleucine (I) residue, phenylalanine (F) residue, and glutamine (Q) residue, and still more preferably glutamine (Q) residue.

A more specific example of the second modified fibroin is a modified fibroin including (2-i) the amino acid sequence set forth in SEQ ID NO: 6 (Met-PRT380), SEQ ID NO: 7 (Met-PRT410), SEQ ID NO: 8 (Met-PRT525), or SEQ ID NO: 9 (Met-PRT799) or (2-ii) an amino acid sequence having 90% or more sequence identity with the amino acid sequence set forth in SEQ ID NO: 6, SEQ ID NO: 7, SEQ ID NO: 8, or SEQ ID NO: 9.

The modified fibroin of (2-i) will be described. The amino acid sequence set forth in SEQ ID NO: 6 is obtained by substituting all GGX in REP of the amino acid sequence set forth in SEQ ID NO: 10 (Met-PRT313) equivalent to naturally occurring fibroin with GQX. The amino acid sequence set forth in SEQ ID NO: 7 is obtained by deleting one of every two (A)n motifs from the N-terminal side to the C-terminal side in the amino acid sequence set forth in SEQ ID NO: 6 and further inserting one [(A)n motif-REP] just before the C-terminal sequence. The amino acid sequence set forth in SEQ ID NO: 8 is obtained by inserting two alanine residues at the C-terminal side of each (A)n motif of the amino acid sequence set forth in SEQ ID NO: 7, and further substituting a part of glutamine (Q) residues with serine (S) residues and deleting a part of amino acids on the C-terminal side such that the molecular weight thereof becomes approximately the same as that of SEQ ID NO: 7. The amino acid sequence set forth in SEQ ID NO: 9 is an amino acid sequence obtained by adding a predetermined hinge sequence and a His tag sequence to the C-terminal of a sequence obtained by repeating a region of 20 domain sequences (where several amino acid residues on the C-terminal side of the region are substituted) present in the amino acid sequence set forth in SEQ ID NO: 7 four times.

The value of z/w in the amino acid sequence set forth SEQ ID NO: 10 (equivalent to naturally occurring fibroin) is 46.8%. The values of z/w in the amino acid sequence set forth in SEQ ID NO: 6, the amino acid sequence set forth in SEQ ID NO: 7, the amino acid sequence set forth in SEQ ID NO: 8, and the amino acid sequence set forth in SEQ ID NO: 9 are respectively 58.7%, 70.1%, 66.1%, and 70.0%. In addition, the values of x/y with a Giza ratio (described later) of 1:1.8 to 11.3 in the amino acid sequences set forth in SEQ ID NO: 10, SEQ ID NO: 6, SEQ ID NO: 7, SEQ ID NO: 8 and SEQ ID NO: 9 are respectively 15.0%, 15.0%, 93.4%, 92.7%, and 89.8%.

The modified fibroin of (2-i) may consist of the amino acid sequence set forth in SEQ ID NO: 6, SEQ ID NO: 7, SEQ ID NO: 8, or SEQ ID NO: 9.

The modified fibroin of (2-ii) includes an amino acid sequence having 90% or more sequence identity with the amino acid sequence set forth in SEQ ID NO: 6, SEQ ID NO: 7, SEQ ID NO: 8, or SEQ ID NO: 9. The modified fibroin of (2-ii) is also a protein including a domain sequence represented by Formula 1: [(A)n motif-REP]m. The sequence identity is preferably 95% or more.

The modified fibroin of (2-ii) preferably has 90% or more sequence identity with the amino acid sequence set forth in SEQ ID NO: 6, SEQ ID NO: 7, SEQ ID NO: 8, or SEQ ID NO: 9, and in the case where the total number of amino acid residues in the amino acid sequence consisting of XGX (where X represents an amino acid residue other than glycine) included in REP is z, and the total number of amino acid residues in REP in the domain sequence is w, z/w is preferably 50.9% or more.

The second modified fibroin may include a tag sequence at either or both of the N-terminal and C-terminal. This makes it possible to isolate, immobilize, detect, and visualize the modified fibroin.

The tag sequence may be, for example, an affinity tag utilizing specific affinity (binding property, affinity) with another molecule. As a specific example of the affinity tag, a histidine tag (His tag) can be mentioned. The His tag is a short peptide in which about 4 to 10 histidine residues are arranged and has a property of specifically binding to a metal ion such as nickel, so it can be used for isolation of modified fibroin by chelating metal chromatography. A specific example of the tag sequence may include the amino acid sequence set forth in SEQ ID NO: 11 (amino acid sequence including a His tag sequence and a hinge sequence).

In addition, a tag sequence such as glutathione-S-transferase (GST) that specifically binds to glutathione or a maltose binding protein (MBP) that specifically binds to maltose can also be used.

Further, an "epitope tag" utilizing an antigen-antibody reaction can also be used. By adding a peptide (epitope) showing antigenicity as a tag sequence, an antibody against the epitope can be bound. Examples of the epitope tag include an HA (peptide sequence of hemagglutinin of influenza virus) tag, a myc tag, and a FLAG tag. The modified fibroin can easily be purified with high specificity by utilizing an epitope tag.

It is also possible to use a tag sequence which can be cleaved with a specific protease. By treating a protein adsorbed through the tag sequence with protease, it is also possible to recover the modified fibroin cleaved from the tag sequence.

A more specific example of the modified fibroin including a tag sequence is a modified fibroin including (2-iii) the amino acid sequence set forth in SEQ ID NO: 12 (PRT380), SEQ ID NO: 13 (PRT410), SEQ ID NO: 14 (PRT525), or SEQ ID NO: 15 (PRT799) or (2-iv) an amino acid sequence having 90% or more sequence identity with the amino acid sequence set forth in SEQ ID NO: 12, SEQ ID NO: 13, SEQ ID NO: 14, or SEQ ID NO: 15.

The amino acid sequences set forth in SEQ ID NO: 16 (PRT313), SEQ ID NO: 12, SEQ ID NO: 13, SEQ ID NO: 14, and SEQ ID NO: 15 are respectively amino acid sequences obtained by adding the amino acid sequence (including a His tag sequence and a hinge sequence) set forth in SEQ ID NO: 11 to the N-terminal of the amino acid sequences set forth in SEQ ID NO: 10, SEQ ID NO: 6, SEQ ID NO: 7, SEQ ID NO: 8, and SEQ ID NO: 9.

The modified fibroin of (2-iii) may consist of the amino acid sequence set forth in SEQ ID NO: 12, SEQ ID NO: 13, SEQ ID NO: 14, or SEQ ID NO: 15.

The modified fibroin of (2-iv) includes an amino acid sequence having 90% or more sequence identity with the amino acid sequence set forth in SEQ ID NO: 12, SEQ ID NO: 13, SEQ ID NO: 14, or SEQ ID NO: 15. The modified fibroin of (2-iv) is also a protein including a domain sequence represented by Formula 1: [(A)n motif-REP]m. The sequence identity is preferably 95% or more.

The modified fibroin of (2-iv) preferably has 90% or more sequence identity with the amino acid sequence set forth in SEQ ID NO: 12, SEQ ID NO: 13, SEQ ID NO: 14, or SEQ ID NO: 15, and in the case where the total number of amino acid residues in the amino acid sequence consisting of XGX (where X represents an amino acid residue other than glycine) included in REP is z, and the total number of amino acid residues in REP in the domain sequence is w, z/w is preferably 50.9% or more.

The second modified fibroin may include a secretory signal for releasing the protein produced in the recombinant protein production system to the outside of a host. The sequence of the secretory signal can be appropriately set depending on the type of the host.

The domain sequence of the third modified fibroin has an amino acid sequence in which the content of (A)1, motif is reduced, as compared with naturally occurring fibroin. It can be said that the domain sequence of the third modified fibroin has an amino acid sequence equivalent to an amino acid sequence in which at least one or more (A)n motifs are deleted, as compared with naturally occurring fibroin.

The third modified fibroin may have an amino acid sequence equivalent to an amino acid sequence in which 10% to 40% of (A)n motifs is deleted from naturally occurring fibroin.

The domain sequence of the third modified fibroin may have an amino acid sequence equivalent to an amino acid sequence obtained by deleting one of every one to three (A)n motifs at least from the N-terminal side to the C-terminal side, as compared with naturally occurring fibroin.

The domain sequence of the third modified fibroin may have an amino acid sequence equivalent to an amino acid sequence obtained by repeating deletion of at least two consecutive (A)n motifs and deletion of one (A)n motif in this order from the N-terminal side to the C-terminal side, as compared with naturally occurring fibroin.

The domain sequence of the third modified fibroin may have an amino acid sequence equivalent to an amino acid sequence obtained by deleting one of every two (A)n motifs at least from the N-terminal side to the C-terminal side.

The third modified fibroin may include a domain sequence represented by Formula 1: [(A)n motif-REP]m, and have an amino acid sequence in the case where the number of amino acid residues of two [(A)n motif-REP] units adjacent to each other is sequentially compared from the N-terminal side to the C-terminal side, then the number of amino acid residues of REP having a small number of amino acid residues is set as 1, the maximum total value of the number of amino acid residues of two [(A)n motif-REP] units adjacent to each other, in which the ratio of the number of amino acid residues of the other REP is 1.8 to 11.3, is set as x, and the total number of amino acid residues in the domain sequence is set as y, x/y may be 20% or more, 30% or more, 40% or more, or 50% or more. The number of alanine residues is 83% or more with respect to the total number of amino acid residues in the (A)n motif, preferably 86% or more, more preferably 90% or more, still more preferably 95% or more, and even more preferably 100% (which means that the (A)n motif consists of only alanine residues).

A method of calculating x/y will be described in more detail with reference to FIG. 1. FIG. 1 illustrates a domain sequence excluding N-terminal sequence and C-terminal sequence from modified fibroin. This domain sequence has a sequence of (A)n motif-first REP (50 amino acid residues)-(A)n motif-second REP (100 amino acid residues)-(A)n motif-third REP (10 amino acid residues)-(A)n motif-fourth REP (20 amino acid residues)-(A)n motif-fifth REP (30 amino acid residues)-(A)n motif from the N-terminal side (left side).

The two adjacent [(A)n motif-REP] units are sequentially selected from the N-terminal side to the C-terminal side so as not to overlap. At this time, an unselected [(A)n motif-REP] unit may exist. FIG. 1 illustrates a pattern 1 (a comparison between first REP and second REP and a comparison between third REP and fourth REP), a pattern 2 (a comparison between first REP and second REP and a comparison between fourth REP and fifth REP), a pattern 3 (a comparison between second REP and third REP and a comparison between fourth REP and fifth REP), and a pattern 4 (a comparison between first REP and second REP). There are other selection methods besides this.

Next, for each pattern, the number of amino acid residues of each REP in the selected two adjacent [(A)n motif-REP] units is compared. The comparison is carried out by obtaining the ratio of the number of amino acid residues of the other REP in the case where one REP having a smaller number of amino acid residues is 1. For example, in the case of comparing the first REP (50 amino acid residues) and the second REP (100 amino acid residues), the ratio of the number of amino acid residues of the second REP is 100/50=2 in the case where the first REP having a smaller number of amino acid residues is 1. Similarly, in the case of comparing the fourth REP (20 amino acid residues) and the fifth REP (30 amino acid residues), the ratio of the number of amino acid residues of the fifth REP is 30/20=1.5 in the case where the fourth REP having a smaller number of amino acid residues is 1.

In FIG. 1, a set of [(A)n motif-REP] units in which the ratio of the number of amino acid residues of the other REP is 1.8 to 11.3 in the case where one REP having a smaller number of amino acid residues is 1 is indicated by a solid line. Herein, such a ratio is referred to as a Giza ratio. A set of [(A)n motif-REP] units in which the ratio of the number of amino acid residues of the other REP is less than 1.8 or more than 11.3 in the case where one REP having a smaller number of amino acid residues is 1 is indicated by a broken line.

In each pattern, the number of all amino acid residues of two adjacent [(A)n motif-REP] units indicated by solid lines (including not only the number of amino acid residues of REP but also the number of amino acid residues of (A)n motif) is combined. Then, the total values thus combined are compared and the total value of the pattern whose total value is the maximum (the maximum value of the total value) is defined as x. In the example illustrated in FIG. 1, the total value of the pattern 1 is the maximum.

Next, x/y (%) can be calculated by dividing x by the total amino acid residue number y of the domain sequence.

In the third modified fibroin, x/y is preferably 50% or more, more preferably 60% or more, still more preferably 65% or more, even more preferably 70% or more, still further preferably 75% or more, and particularly preferably 80% or more. The upper limit of x/y is not particularly limited, but x/y may be 100% or less, for example. In the case where the Giza ratio is 1:1.9 to 11.3, x/y is preferably 89.6% or more. In the case where the Giza ratio is 1:1.8 to 3.4, x/y is more preferably 77.1% or more. In the case where the Giza ratio is 1:1.9 to 8.4, x/y is still more preferably 75.9% or more. In the case where the Giza ratio is 1:1.9 to 4.1, x/y is even more preferably 64.2% or more.

In the case where the third modified fibroin is a modified fibroin in which at least seven of multiple (A)n motifs present in the domain sequence are composed of only alanine residues, x/y is preferably 46.4% or more, more preferably 50% or more, still more preferably 55% or more, even more preferably 60% or more, still further preferably 70% or more, and particularly preferably 80% or more. The upper limit of x/y is not particularly limited as long as it is 100% or less.

Figure 3:
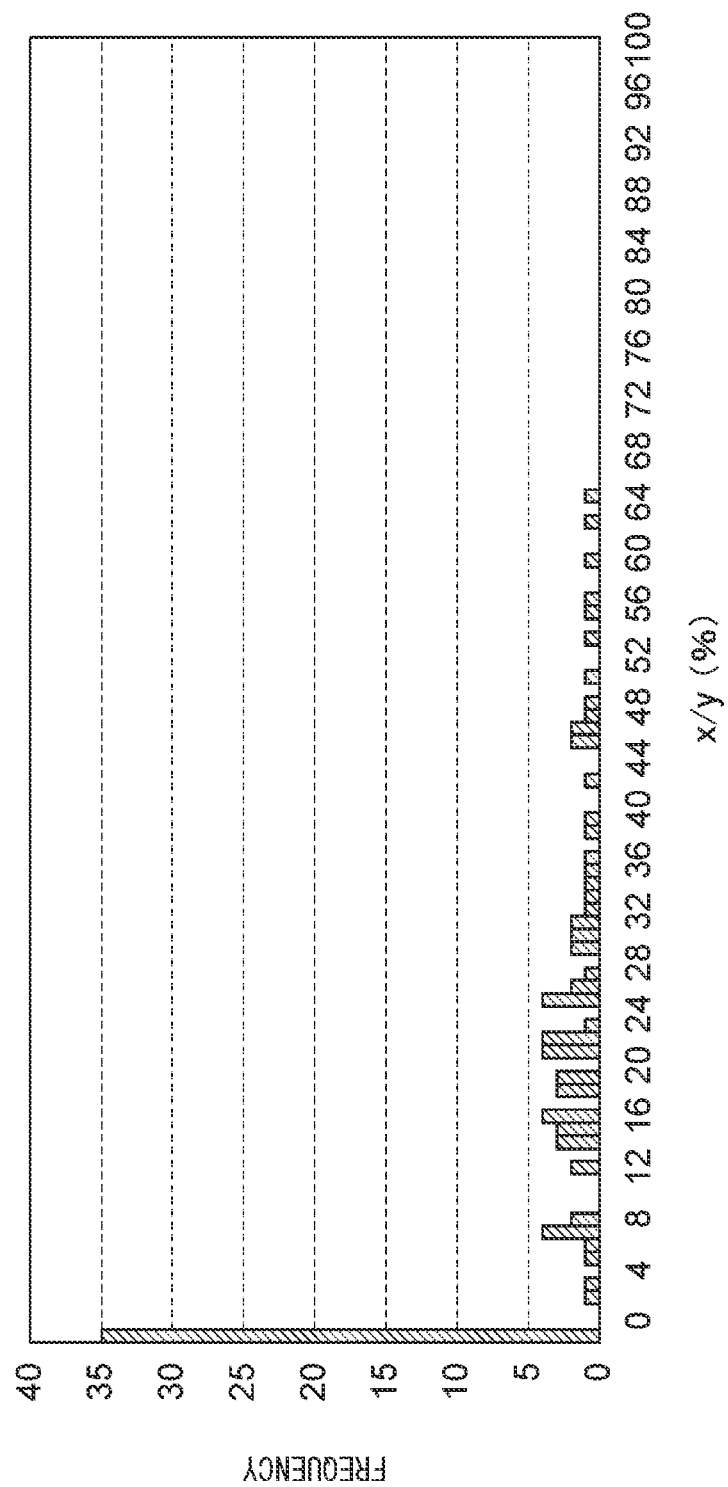
FIG. 3 is a diagram illustrating a distribution of a value of x/y (%) of naturally occurring fibroin.

Here, x/y in naturally occurring fibroin will be described. First, as described above, 663 types of fibroins (415 types of fibroins derived from spiders among them) were extracted by confirming fibroins with amino acid sequence information registered in NCBI GenBank by a method exemplified. x/y was calculated by the above-described calculation method from the amino acid sequences of naturally occurring fibroins which include a domain sequence represented by Formula 1: [(A)n motif-REP]m, among all the extracted fibroins. FIG. 3 illustrates the results in the case where the Giza ratio is 1:1.9 to 4.1.

In FIG. 3, the horizontal axis represents x/y (%) and the vertical axis represents frequency. As is clear from FIG. 3, x/y in all naturally occurring fibroins was less than 64.2% (highest, 64.14%).

The third modified fibroin, for example, can be obtained by deleting one or a plurality sequences encoding (A)n motif from a cloned gene sequence of naturally occurring fibroin such that x/y is 64.2% or more. Alternatively, the third modified fibroin may also be obtained, for example, by designing an amino acid sequence equivalent to an amino acid sequence obtained by deleting one or a plurality (A)n motifs such that x/y is 64.2% or more based on the amino acid sequence of naturally occurring fibroin and chemically synthesizing a nucleic acid encoding the designed amino acid sequence. In any case, with respect to the amino acid sequence of naturally occurring fibroin, in addition to the modification equivalent to deletion of (A)n motif, further modification of amino acid sequence equivalent to substitution, deletion, insertion and/or addition of one or more amino acid residues may be carried out.

A more specific example of the third modified fibroin is a modified fibroin including (3-i) the amino acid sequence set forth in SEQ ID NO: 17 (Met-PRT399), SEQ ID NO: 7 (Met-PRT410), SEQ ID NO: 8 (Met-PRT525), or SEQ ID NO: 9 (Met-PRT799) or (3-ii) an amino acid sequence having 90% or more sequence identity with the amino acid sequence set forth in SEQ ID NO: 17, SEQ ID NO: 7, SEQ ID NO: 8, or SEQ ID NO: 9.

The modified fibroin of (3-i) will be described. The amino acid sequence set forth in SEQ ID NO: 17 is obtained by deleting one of every two (A)n motifs from the N-terminal side to the C-terminal side in the amino acid sequence set forth in SEQ ID NO: 10 (Met-PRT313) equivalent to naturally occurring fibroin and by further inserting one [(A)n motif-REP] just before the C-terminal sequence. The amino acid sequence set forth in SEQ ID NO: 7, SEQ ID NO: 8, or SEQ ID NO: 9 is as described in the second modified fibroin.

The value of x/y with a Giza ratio of 1:1.8 to 11.3 in the amino acid sequence set forth in SEQ ID NO: 10 (equivalent to naturally occurring fibroin) is 15.0%. Both the value of x/y in the amino acid sequence set forth in SEQ ID NO: 17 and the value of x/y in the amino acid sequence set forth in SEQ ID NO: 7 are 93.4%. The value of x/y in the amino acid sequence set forth in SEQ ID NO: 8 is 92.7%. The value of x/y in the amino acid sequence set forth in SEQ ID NO: 9 is 89.8%. The values of z/w in the amino acid sequences set forth in SEQ ID NO: 10, SEQ ID NO: 17, SEQ ID NO: 7, SEQ ID NO: 8, and SEQ ID NO: 9 are respectively 46.8%, 56.2%, 70.1%, 66.1%, and 70.0%.

The modified fibroin of (3-i) may consist of the amino acid sequence set forth in SEQ ID NO: 17, SEQ ID NO: 7, SEQ ID NO: 8, or SEQ ID NO: 9.

The modified fibroin of (3-ii) includes an amino acid sequence having 90% or more sequence identity with the amino acid sequence set forth in SEQ ID NO: 17, SEQ ID NO: 7, SEQ ID NO: 8, or SEQ ID NO: 9. The modified fibroin of (340 is also a protein including a domain sequence represented by Formula 1: [(A)n motif-REP]m. The sequence identity is preferably 95% or more.

The modified fibroin of (340 preferably has 90% or more sequence identity with the amino acid sequence set forth in SEQ ID NO: 17, SEQ ID NO: 7, SEQ ID NO: 8, or SEQ ID NO: 9, and in the case where the number of amino acid residues of two [(A)n motif-REP] units adjacent to each other is sequentially compared from the N-terminal side to the C-terminal side, then the number of amino acid residues of one REP having a small number of amino acid residues is set as 1, the maximum total value of the number of amino acid residues of two [(A)n motif-REP] units adjacent to each other, in which the ratio (1:1.8 to 11.3 as a Giza ratio) of the number of amino acid residues of the other REP is 1.8 to 11.3, is set as x, and the total number of amino acid residues in the domain sequence is set as y, x/y is preferably 64.2% or more.

The third modified fibroin may include a tag sequence described above at either or both of the N-terminal and C-terminal.

A more specific example of the modified fibroin including a tag sequence is a modified fibroin including (3-iii) the amino acid sequence set forth in SEQ ID NO: 18 (PRT399), SEQ ID NO: 13 (PRT410), SEQ ID NO: 14 (PRT525), or SEQ ID NO: 15 (PRT799) or (3-iv) an amino acid sequence having 90% or more sequence identity with the amino acid sequence set forth in SEQ ID NO: 18, SEQ ID NO: 13, SEQ ID NO: 14, or SEQ ID NO: 15.

The amino acid sequences set forth in SEQ ID NO: 18, SEQ ID NO: 13, SEQ ID NO: 14, and SEQ ID NO: 15 are respectively amino acid sequences obtained by adding the amino acid sequence (including a His tag sequence and a hinge sequence) set forth in SEQ ID NO: 11 to the N-terminal of the amino acid sequences set forth in SEQ ID NO: 17, SEQ ID NO: 7, SEQ ID NO: 8, and SEQ ID NO: 9.

The modified fibroin of (3-iii) may consist of the amino acid sequence set forth in SEQ ID NO: 18, SEQ ID NO: 13, SEQ ID NO: 14, or SEQ ID NO: 15.

The modified fibroin of (3-iv) includes an amino acid sequence having 90% or more sequence identity with the amino acid sequence set forth in SEQ ID NO: 18, SEQ ID NO: 13, SEQ ID NO: 14, or SEQ ID NO: 15. The modified fibroin of (3-iv) is also a protein including a domain sequence represented by Formula 1: [(A)n motif-REP]m. The sequence identity is preferably 95% or more.

The modified fibroin of (3-iv) preferably has 90% or more sequence identity with the amino acid sequence set forth in SEQ ID NO: 18, SEQ ID NO: 13, SEQ ID NO: 14, or SEQ ID NO: 15, and in the case where the number of amino acid residues of two [(A)n motif-REP] units adjacent to each other is sequentially compared from the N-terminal side to the C-terminal side, then the number of amino acid residues of one REP having a small number of amino acid residues is set as 1, the maximum total value of the number of amino acid residues of two [(A)n motif-REP] units adjacent to each other, in which the ratio of the number of amino acid residues of the other REP is 1.8 to 11.3, is set as x, and the total number of amino acid residues in the domain sequence is set as y, is preferably 64.2% or more.

The third modified fibroin may include a secretory signal for releasing the protein produced in the recombinant protein production system to the outside of a host. The sequence of the secretory signal can be appropriately set depending on the type of the host.

The domain sequence of the fourth modified fibroin has an amino acid sequence with not only a reduced content of (A)n motif but also a reduced content of glycine residue, as compared with naturally occurring fibroin. It can be said that the domain sequence of the fourth modified fibroin has an amino acid sequence equivalent to an amino acid sequence in which at least one or more (A)n motifs are deleted and at least one or more glycine residues in REP are further substituted with other amino acid residues, as compared with naturally occurring fibroin. That is, the fourth modified fibroin is a modified fibroin having the characteristics of the second modified fibroin and the third modified fibroin described above. Specific aspects and the like of the fourth modified fibroin are as described in the second modified fibroin and the third modified fibroin.

A more specific example of the fourth modified fibroin is a modified fibroin including (4-i) the amino acid sequence set forth in SEQ ID NO: 7 (Met-PRT410), SEQ ID NO: 8 (Met-PRT525), SEQ ID NO: 9 (Met-PRT799), SEQ ID NO: 13 (PRT410), SEQ ID NO: 14 (PRT525), or SEQ ID NO: 15 (PRT799) or (4-ii) an amino acid sequence having 90% or more sequence identity with the amino acid sequence set forth in SEQ ID NO: 7, SEQ ID NO: 8, SEQ ID NO: 9, SEQ ID NO: 13, SEQ ID NO: 14, or SEQ ID NO: 15. Specific aspects of the modified fibroin including the amino acid sequence set forth SEQ ID NO: 7, SEQ ID NO: 8, SEQ ID NO: 9, SEQ ID NO: 13, SEQ ID NO: 14, or SEQ ID NO: 15 are as described above.

The domain sequence of the fifth modified fibroin may include a domain sequence having an amino acid sequence locally containing a region with a high hydropathy index equivalent to an amino acid sequence in which one or more amino acid residues in REP are substituted with amino acid residues with a high hydropathy index and/or one or more amino acid residues with a high hydropathy index are inserted into REP, as compared with naturally occurring fibroin.

It is preferable that the region locally having high hydropathy index is composed of two to four consecutive amino acid residues.

It is more preferable that the amino acid residues with a high hydropathy index are selected from isoleucine (I), valine (V), leucine (L), phenylalanine (F), cysteine (C), methionine (M), and alanine (A).

The fifth modified fibroin may further include an amino acid sequence equivalent to an amino acid sequence in which one or more amino acid residues are substituted, deleted, inserted and/or added, as compared with naturally occurring fibroin, in addition to a modification corresponding to the modification in which one or more amino acid residues in REP are substituted with amino acid residues with a high hydropathy index and/or one or more amino acid residues with a high hydropathy index are inserted into REP, as compared with naturally occurring fibroin.

The fifth modified fibroin may be obtained by, with respect to a cloned gene sequence of naturally occurring fibroin, substituting one or more hydrophilic amino acid residues in REP (for example, amino acid residues having a negative hydropathy index) with a hydrophobic amino acid residue (for example, amino acid residues having a positive hydropathy index), and/or inserting one or more hydrophobic amino acid residues into REP. Further, for example, the fifth modified fibroin may also be obtained by designing an amino acid sequence equivalent to an amino acid sequence in which with respect to the amino acid sequence of naturally occurring fibroin, one or more hydrophilic amino acid residues in REP are substituted with hydrophobic amino acid residues and/or one or more hydrophobic amino acid residues are inserted into REP, and chemically synthesizing a nucleic acid encoding the designed amino acid sequence. In any case, with respect to the amino acid sequence naturally occurring fibroin, in addition to the modification equivalent to substitution of one or more hydrophilic amino acid residues in REP with hydrophobic amino acid residues and/or insertion of one or more hydrophobic amino acid residues into REP, further modification of amino acid sequence equivalent to substitution, deletion, insertion and/or addition of one or more amino acid residues may be carried out.

The fifth modified fibroin may include a domain sequence represented by Formula 1: [(A)n motif-REP]m and have an amino acid sequence in which p/q is 6.2% or more, in the case where in all REPs included in a sequence excluding a sequence from a (A)n motif located to most C-terminal side to the C-terminal of the domain sequence from the domain sequence, the total number of amino acid residues contained in a region where an average value of hydropathy indices of four consecutive amino acid residues is 2.6 or more is set as p, and the total number of amino acid residues contained in the sequence excluding the sequence from the (A)n motif located at the most C-terminal side to the C-terminal of the domain sequence from the domain sequence is set as q.

Regarding the hydropathy index of amino acid residues, known indices (Hydropathy index: Kyte J, & Doolittle R (1982) from "A simple method for displaying the hydropathic character of a protein", J. Mol. Biol., 157, pp. 105-132) may be used as a reference. Specifically, the hydropathy index (hereinafter also referred to as "HI") of each amino acid is as indicated in Table 1 below.

TABLE 1

| Amino acid | HI | Amino acid | HI |
| --- | --- | --- | --- |
| Isoleucine (Ile) | 4.5 | Tryptophan (Trp) | −0.9 |
| Valine (Val) | 4.2 | Tyrosine (Tyr) | −1.3 |
| Leucine (Leu) | 3.8 | Proline (Pro) | −1.6 |
| Phenylalanine (Phe) | 2.8 | Histidine (His) | −3.2 |
| Cysteine (Cys) | 2.5 | Asparagine (Asn) | −3.5 |
| Methionine (Met) | 1.9 | Aspartic acid (Asp) | −3.5 |
| Alanine (Ala) | 1.8 | Glutamine (Gln) | −3.5 |
| Glycine (Gly) | −0.4 | Glutamic acid (Glu) | −3.5 |
| Threonine (Thr) | −0.7 | Lysine (Lys) | −3.9 |
| Serine (Ser) | −0.8 | Arginine (Arg) | −4.5 |

The calculation method of p/q will be described in more detail. In the calculation, the sequence (hereinafter also referred to as "sequence A") excluding the sequence from the (A)n motif located at the most C-terminal side to the C-terminal of the domain sequence from the domain sequence represented by Formula 1: [(A)n motif-REP]m is used. First, in all REPs included in the sequence A, average values of hydropathy indices of four consecutive amino acid residues are calculated. The average value of the hydropathy indices is obtained by dividing the total sum of HI of each of the amino acid residues contained in the four consecutive amino acid residues by 4 (the number of amino acid residues). The average value of the hydropathy indices is obtained for all of the four consecutive amino acid residues (each of the amino acid residues is used for calculating the average value 1 to 4 times). Next, a region where the average value of the hydropathy indices of the four consecutive amino acid residues is 2.6 or more is specified. Even if a plurality of a certain amino acid residue are determined to correspond to the "four consecutive amino acid residues having an average value of the hydropathy indices of 2.6 or more", the amino acid residue is counted as one amino acid residue in the region. The total number of amino acid residues included in the region is set as p. The total number of amino acid residues included in the sequence A is set as q.

Figure 4:
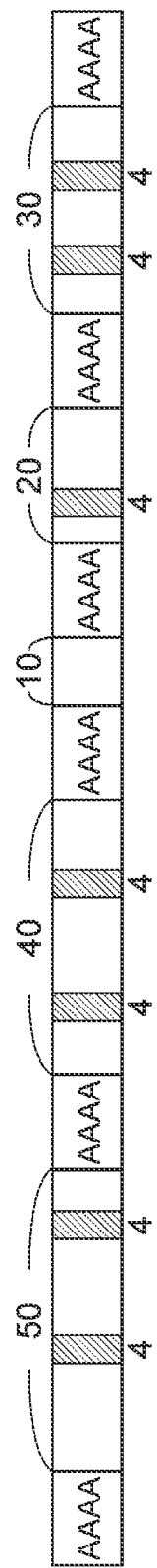
FIG. 4 is a schematic diagram illustrating an example of a domain sequence of modified fibroin ("AAAA" is SEQ ID NO: 52)

For example, in the case where the feature "four consecutive amino acid residues whose average value of the hydropathy indices is 2.6 or more" is extracted from 20 places (no overlap), in the region where the average value of the hydropathy indices of four consecutive amino acid residues is 2.6 or more, the number of the four consecutive amino acid residues (no overlap) is 20, and thus p is 20×4=80. In addition, for example, when two "four consecutive amino acid residues having an average value of the hydropathy indices of 2.6 or more" overlap by one amino acid residue, in the region where the average value of the hydropathy indices of the four consecutive amino acid residues is 2.6 or more, the number of amino acid residues being included is 7(p=2×4−1=7, where "−1" is the deduction of overlap). For example, in the case of a domain sequence illustrated in FIG. 4, there are seven "four consecutive amino acid residues having an average value of the hydropathy indices of 2.6 or more" with no overlap, so that p is 7×4=28. For example, in the case of the domain sequence illustrated in FIG. 4, q is 4+50+4+40+4+10+4+20+4+30=170 (the last (A)n motif on the C-terminal side not included). p/q (%) is then calculated by dividing p by q. In FIG. 4, p/q (%) is 28/170=16.47%.

In the fifth modified fibroin, p/q is preferably 6.2% or more, more preferably 7% or more, still more preferably 10% or more, even more preferably 20% or more, and still further preferably 30% or more. The upper limit of p/q is not particularly limited, but p/q may be 45% or less, for example.

The fifth modified fibroin may be obtained by, for example, modifying an amino acid sequence of cloned naturally occurring fibroin into an amino acid sequence containing a region locally having a high hydropathy index by substituting one or more hydrophilic amino acid residues in REP (for example, amino acid residues having a negative hydropathy index) with hydrophobic amino acid residues (for example, amino acid residues having a positive hydropathy index), and/or inserting one or more hydrophobic amino acid residues into REP, such that the p/q condition is satisfied. Alternatively, the fifth modified fibroin may also be obtained, for example, by designing an amino acid sequence satisfying the p/q condition based on the amino acid sequence of naturally occurring fibroin and chemically synthesizing a nucleic acid encoding the designed amino acid sequence. In any case, in addition to the modification equivalent to substitution of one or more amino acid residues in REP with amino acid residues with a high hydropathy index and/or insertion of one or more amino acid residues with a high hydropathy index into REP, as compared with the naturally occurring fibroin, further modification equivalent to substitution, deletion, insertion, and/or addition of one or more amino acid residues may be carried out.

The amino acid residues with a high hydropathy index is preferably isoleucine (I), valine (V), leucine (L), phenylalanine (F), cysteine (C), methionine (M), and alanine (A), and more preferably valine (V), leucine (L), and isoleucine (I), without being limited thereto.

A more specific example of the fifth modified fibroin is a modified fibroin including (5-i) the amino acid sequence set forth in SEQ ID NO: 19 (Met-PRT720), SEQ ID NO: 20 (Met-PRT665), or SEQ ID NO: 21 (Met-PRT666) or (5-ii) an amino acid sequence having 90% or more sequence identity with the amino acid sequence set forth in SEQ ID NO: 19, SEQ ID NO: 20, or SEQ ID NO: 21.

The modified fibroin of (5-i) will be described. The amino acid sequence set forth in SEQ ID NO: 19 is obtained by inserting an amino acid sequence consisting of three amino acid residues (VLI) at two sites for each REP with respect to the amino acid sequence set forth in SEQ ID NO: 7 (Met-PRT410), except for the domain sequence at the end on the C-terminal side, and further substituting a part of glutamine (Q) residues with serine (S) residues and deleting a part of amino acids on the C-terminal side. The amino acid sequence set forth in SEQ ID NO: 20 is obtained by inserting an amino acid sequence consisting of three amino acid residues (VLI) at one site for each REP with respect to the amino acid sequence set forth in SEQ ID NO: 8 (Met-PRT525). The amino acid sequence set forth in SEQ ID NO: 21 is obtained by inserting an amino acid sequence consisting of three amino acid residues (VLI) at two sites for each REP with respect to the amino acid sequence set forth in SEQ ID NO: 8.

The modified fibroin of (5-i) may consist of the amino acid sequence set forth in SEQ ID NO: 19, SEQ ID NO: 20, or SEQ ID NO: 21.

The modified fibroin of (5-ii) includes an amino acid sequence having 90% or more sequence identity with the amino acid sequence set forth in SEQ ID NO: 19, SEQ ID NO: 20, or SEQ ID NO: 21. The modified fibroin of (5-ii) is also a protein including a domain sequence represented by Formula 1: [(A)n motif-REP]m. The sequence identity is preferably 95% or more.

The modified fibroin of (5-ii) preferably has 90% or more sequence identity with the amino acid sequence set forth in SEQ ID NO: 19, SEQ ID NO: 20, or SEQ ID NO: 21, and preferably has an amino acid sequence in which p/q is 6.2% or more, in the case where in all REPs included in a sequence excluding a sequence from a (A)n motif located at the most C-terminal side to the C-terminal of the domain sequence from the domain sequence, the total number of amino acid residues contained in a region where an average value of hydropathy indices of four consecutive amino acid residues is 2.6 or more is set as p, and the total number of amino acid residues contained in the sequence excluding the sequence from the (A)n motif located at the most C-terminal side to the C-terminal of the domain sequence from the domain sequence is set as q.

The fifth modified fibroin may include a tag sequence at either or both of the N-terminal and C-terminal.

A more specific example of the modified fibroin including a tag sequence is a modified fibroin including (5-iii) the amino acid sequence set forth in SEQ ID NO: 22 (PRT720), SEQ ID NO: 23 (PRT665), or SEQ ID NO: 24 (PRT666) or (5-iv) an amino acid sequence having 90% or more sequence identity with the amino acid sequence set forth in SEQ ID NO: 22, SEQ ID NO: 23, or SEQ ID NO: 24.

The amino acid sequences set forth in SEQ ID NO: 22, SEQ ID NO: 23, and SEQ ID NO: 24 are respectively amino acid sequences obtained by adding the amino acid sequence (including a His tag and a hinge sequence) set forth in SEQ ID NO: 11 to the N-terminal of the amino acid sequences set forth in SEQ ID NO: 19, SEQ ID NO: 20, and SEQ ID NO: 21.

The modified fibroin of (5-iii) may consist of the amino acid sequence set forth in SEQ ID NO: 22, SEQ ID NO: 23, or SEQ ID NO: 24.

The modified fibroin of (5-iv) includes an amino acid sequence having 90% or more sequence identity with the amino acid sequence set forth in SEQ ID NO: 22, SEQ ID NO: 23, or SEQ ID NO: 24. The modified fibroin of (5-iv) is also a protein including a domain sequence represented by Formula 1: [(A)n motif-REP]m. The sequence identity is preferably 95% or more.

The modified fibroin of (5-iv) preferably has 90% or more sequence identity with the amino acid sequence set forth in SEQ ID NO: 22, SEQ ID NO: 23, or SEQ ID NO: 24, and preferably has an amino acid sequence in which p/q is 6.2% or more, in the case where in all REPs included in a sequence excluding a sequence from a (A)1 motif located at the most C-terminal side to the C-terminal of the domain sequence from the domain sequence, the total number of amino acid residues contained in a region where an average value of hydropathy indices of four consecutive amino acid residues is 2.6 or more is set as p, and the total number of amino acid residues contained in the sequence excluding the sequence from the (A)n motif located at the most C-terminal side to the C-terminal of the domain sequence from the domain sequence is set as q.

The fifth modified fibroin may include a secretory signal for releasing the protein produced in the recombinant protein production system to the outside of a host. The sequence of the secretory signal can be appropriately set depending on the type of the host.

The sixth modified fibroin has an amino acid sequence with a reduced content of glutamine residue, as compared with naturally occurring fibroin.

It is preferable that the sixth modified fibroin includes at least one motif selected from GGX motif and GPGXX (SEQ ID NO: 49) motif in the amino acid sequence of REP.

In the case where the sixth modified fibroin includes a GPGXX (SEQ ID NO: 49) motif in REP, a GPGXX (SEQ ID NO: 49) motif content rate is usually 1% or more, may be 5% or more, and is preferably 10% or more. The upper limit of the GPGXX (SEQ ID NO: 49) motif content rate is not particularly limited, and may be 50% or less and may be 30% or less.

Herein, the "GPGXX motif content rate" (GPGXX: SEQ ID NO: 49) is a value calculated by the following method.

In a fibroin (modified fibroin or naturally occurring fibroin) including a domain sequence represented by Formula 1: [(A)n motif-REP]m or Formula 2: [(A)n motif-REP]m-(A)n motif, in the case where the number obtained by tripling the total number of the GPGXX (SEQ ID NO: 49) motifs in all REPs included in a sequence excluding the sequence from the (A)n motif located at the most C-terminal side to the C-terminal of the domain sequence from the domain sequence (that is, equivalent to the total number of G and P in the GPGXX (SEQ ID NO: 49) motifs) is set as s, and the total number of amino acid residues in all REPs excluding the sequence from the (A)n motif located at the most the C-terminal side to the C-terminal of the domain sequence from the domain sequence and further excluding (A)n motifs is set as t, the GPGXX (SEQ ID NO: 49) motif content rate is calculated as s/t.

For the calculation of the GPGXX (SEQ ID NO: 49) motif content rate, the "sequence excluding a sequence from the (A)n motif located at the most C-terminal side to the C-terminal of the domain sequence from the domain sequence" is used to exclude the effect occurring due to the fact that the "sequence from the (A)n motif located at the most C-terminal side to the C-terminal of the domain sequence" (sequence equivalent to REP) may include a sequence that is not correlated with the sequence characteristic of fibroin, which influences the calculation result of the GPGXX (SEQ ID NO: 49) motif content rate in the case where m is small (that is, in the case where the domain sequence is short). In the case where a "GPGXX motif" (SEQ ID NO: 49) is located at the C-terminal of REP, it is treated as the "GPGXX motif" (SEQ ID NO: 49) even if "XX" is, for example, "AA".

Figure 5:
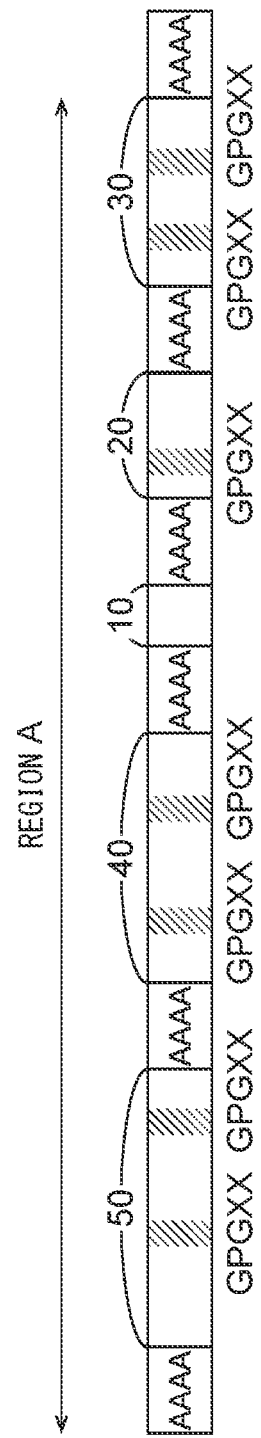
FIG. 5 is a schematic diagram illustrating an example of a domain sequence of modified fibroin ("AAAA" is SEQ ID NO: 52; "GPGXX is SEQ ID NO: 49)

FIG. 5 is a schematic diagram illustrating a domain sequence of a modified fibroin. The calculation method of the GPGXX (SEQ ID NO: 49) motif content rate will be specifically described with reference to FIG. 5. First, in a domain sequence of a modified fibroin illustrated in FIG. 5 ([(A)n motif-REP]m-(A)n motif] type), since all REPs are included in the "sequence excluding a sequence from the (A)n motif located at the most C-terminal side to the C-terminal of the domain sequence from the domain sequence" (indicated as "region A" in FIG. 5), the number of GPGXX (SEQ ID NO: 49) motifs for calculating s is 7, and s is 7×3=21. Similarly, since all REPs are included in the "sequence excluding a sequence from the (A)n motif located at the most C-terminal side to the C-terminal of the domain sequence from the domain sequence" (indicated as "region A" in FIG. 5), t which is the total number of amino acid residues in all REPs excluding the sequence from the (A)n motif located at the most the C-terminal side to the C-terminal of the domain sequence from the domain sequence and further excluding (A)n motifs, is 50+40+10+20+30=150. s/t (%) can then be calculated by dividing s by t. s/t (%) is 21/150=14.0% in the case of the modified fibroin of FIG. 5.

In the sixth modified fibroin, a glutamine residue content rate is preferably 9% or less, more preferably 7% or less, still more preferably 4% or less, and particularly preferably 0%.

Herein, the "glutamine residue content rate" is a value calculated by the following method.

In a fibroin (modified fibroin or naturally occurring fibroin) including a domain sequence represented by Formula 1: [(A)n motif-REP]m or Formula 2: [(A)n motif-REP]m-(A)n motif, in the case where the total number of glutamine residues in all REPs included in a sequence (sequence equivalent to "region A" in FIG. 5) excluding the sequence from the (A)n motif located at the most C-terminal side to the C-terminal of the domain sequence from the domain sequence is set as u, and the total number of amino acid residues in all REPs excluding the sequence from the (A)n motif located at the most the C-terminal side to the C-terminal of the domain sequence from the domain sequence and further excluding (A)n motifs is set as t, the glutamine residue content rate is calculated as u/t. For the calculation of the glutamine residue content rate, the "sequence excluding a sequence from the (A)n motif located at the most C-terminal side to the C-terminal of the domain sequence from the domain sequence" is used for the same reason described above.

The domain sequence of the sixth modified fibroin may include an amino acid sequence equivalent to an amino acid sequence in which one or more glutamine residues in REP are deleted or substituted with other amino acid residues, as compared with naturally occurring fibroin.

The "other amino acid residue" may be an amino acid residue other than a glutamine residue, but is preferably an amino acid residue having a higher hydropathy index than that of a glutamine residue. The hydropathy index of amino acid residues is as indicated in Table 1.

As indicated in Table 1, amino acid residues having a higher hydropathy index than that of a glutamine residue include an amino acid residue selected from isoleucine (I), valine (V), leucine (L), phenylalanine (F), cysteine (C), methionine (M), alanine (A), glycine (G), threonine (T), serine (S), tryptophan (W), tyrosine (Y), proline (P) and histidine (H). Among these, an amino acid residue selected from isoleucine (I), valine (V), leucine (L), phenylalanine (F), cysteine (C), methionine (M) and alanine (A) is more preferable, and an amino acid residue selected from isoleucine (I), valine (V), leucine (L) and phenylalanine (F) is still more preferable.

In the sixth modified fibroin, the hydrophobicity of REP is preferably −0.8 or more, more preferably −0.7 or more, still more preferably 0 or more, even more preferably 0.3 or more, and particularly preferably 0.4 or more. The upper limit of the hydrophobicity of REP is not particularly limited, may be 1.0 or less, and may be 0.7 or less.

Herein, the "hydrophobicity of REP" is a value calculated by the following method.

In a fibroin (modified fibroin or naturally occurring fibroin) including a domain sequence represented by Formula 1: [(A)n motif-REP]m or Formula 2: [(A)n motif-REP]m-(A)n motif, in the case where the sum of the hydropathy indices of each amino acid residue in all REPs included in a sequence (sequence equivalent to "region A" in FIG. 5) excluding the sequence from the (A)n motif located at the most C-terminal side to the C-terminal of the domain sequence from the domain sequence is set as v, and the total number of amino acid residues in all REPs excluding the sequence from the (A)n motif located at the most C-terminal side to the C-terminal of the domain sequence from the domain sequence and further excluding (A)n motifs is set as t, the hydrophobicity of REP is calculated as v/t. For the calculation of the hydrophobicity of REP, the "sequence excluding a sequence from the (A)n motif located at the most C-terminal side to the C-terminal of the domain sequence from the domain sequence" is used for the same reason described above.

The domain sequence of the sixth modified fibroin may further include an amino acid sequence equivalent to an amino acid sequence in which one or more amino acid residues are substituted, deleted, inserted and/or added, in addition to a modification corresponding to the modification in which one or more glutamine residues in REP are deleted and/or one or more glutamine residues in REP are substituted with other amino acid residues, as compared with naturally occurring fibroin.

The sixth modified fibroin can be obtained by, for example, with respect to a cloned gene sequence of naturally occurring fibroin, deleting one or more glutamine residues in REP and/or by substituting one or more glutamine residues in REP with other amino acid residues. Further, for example, the sixth modified fibroin may also be obtained by designing an amino acid sequence equivalent to an amino acid sequence in which with respect to the amino acid sequence of naturally occurring fibroin, one or more glutamine residues in REP are deleted and/or one or more glutamine residues in REP are substituted with other amino acid residues, and chemically synthesizing a nucleic acid encoding the designed amino acid sequence.

A more specific example of the sixth modified fibroin is a modified fibroin including (6-i) the amino acid sequence set forth in SEQ ID NO: 25 (Met-PRT888), SEQ ID NO: 26 (Met-PRT965), SEQ ID NO: 27 (Met-PRT889), SEQ ID NO: 28 (Met-PRT916), SEQ ID NO: 29 (Met-PRT918), SEQ ID NO: 30 (Met-PRT699), SEQ ID NO: 31 (Met-PRT698), SEQ ID NO: 32 (Met-PRT966), SEQ ID NO: 41 (Met-PRT917), or SEQ ID NO: 42 (Met-PRT1028) or (6-ii) an amino acid sequence having 90% or more sequence identity with the amino acid sequence set forth in SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 41, or SEQ ID NO: 42.

The modified fibroin of (6-i) will be described. The amino acid sequence set forth in SEQ ID NO: 25 is obtained by substituting all QQ in the amino acid sequence (Met-PRT410) set forth in SEQ ID NO: 7 with VL. The amino acid sequence set forth in SEQ ID NO: 26 is obtained by substituting all QQ in the amino acid sequence set forth in SEQ ID NO: 7 with TS and substituting the remaining Q with A. The amino acid sequence set forth in SEQ ID NO: 27 is obtained by substituting all QQ in the amino acid sequence set forth in SEQ ID NO: 7 with VL and substituting the remaining Q with I. The amino acid sequence set forth in SEQ ID NO: 28 is obtained by substituting all QQ in the amino acid sequence set forth in SEQ ID NO: 7 with VI and substituting the remaining Q with L. The amino acid sequence set forth in SEQ ID NO: 29 is obtained by substituting all QQ in the amino acid sequence set forth in SEQ ID NO: 7 with VF and substituting the remaining Q with I.

The amino acid sequence set forth in SEQ ID NO: 30 is obtained by substituting all QQ in the amino acid sequence (Met-PRT525) set forth in SEQ ID NO: 8 with VL. The amino acid sequence set forth in SEQ ID NO: 31 is obtained by substituting all QQ in the amino acid sequence set forth in SEQ ID NO: 8 with VL and substituting the remaining Q with I.

The amino acid sequence set forth in SEQ ID NO: 32 is obtained by substituting, with VF, all QQ in a sequence in which a region of twenty domain sequences present in the amino acid sequence (Met-PRT410) set forth in SEQ ID NO: 7 is repeated twice and substituting the remaining Q with I.

The amino acid sequence (Met-PRT917) set forth in SEQ ID NO: 41 is obtained by substituting all QQ in the amino acid sequence set forth in SEQ ID NO: 7 with LI and substituting the remaining Q with V. The amino acid sequence (Met-PRT1028) set forth in SEQ ID NO: 42 is obtained by substituting all QQ in the amino acid sequence set forth in SEQ ID NO: 7 with IF and substituting the remaining Q with T.

The glutamine residue content rate of each of the amino acid sequences set forth in SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 41, and SEQ ID NO: 42 is 9% or less (Table 2).

TABLE 2

| Modified fibroin | Glutamine residue content rate | GPGXX (SEQ ID NO: 49) motif content rate | Hydrophobicity of REP |
|---|---|---|---|
| Met_PRT410 (SEQ ID NO: 7) | 17.7% | 27.9% | −1.52 |
| Met_PRT888 (SEQ ID NO: 25) | 6.3% | 27.9% | −0.07 |

TABLE 2-continued

| Modified fibroin | Glutamine residue content rate | GPGXX (SEQ ID NO: 49) motif content rate | Hydrophobicity of REP |
|---|---|---|---|
| Met_PRT965 (SEQ ID NO: 26) | 0.0% | 27.9% | −0.65 |
| Met_PRT889 (SEQ ID NO: 27) | 0.0% | 27.9% | 0.35 |
| Met_PRT916 (SEQ ID NO: 28) | 0.0% | 27.9% | 0.47 |
| Met_PRT918 (SEQ ID NO: 29) | 0.0% | 27.9% | 0.45 |
| Met_PRT699 (SEQ ID NO: 30) | 3.6% | 26.4% | −0.78 |
| Met_PRT698 (SEQ ID NO: 31) | 0.0% | 26.4% | −0.03 |
| Met_PRT966 (SEQ ID NO: 32) | 0.0% | 28.0% | 0.35 |
| Met_PRT917 (SEQ ID NO: 41) | 0.0% | 27.9% | 0.46 |
| Met_PRT1028 (SEQ ID NO: 42) | 0.0% | 28.1% | 0.05 |

The modified fibroin of (6-i) may consist of the amino acid sequence set forth in SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 41, or SEQ ID NO: 42.

The modified fibroin of (6-ii) includes an amino acid sequence having 90% or more sequence identity with the acid sequence set forth in SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 41, or SEQ ID NO: 42. The modified fibroin of (6-ii) is also a protein including a domain sequence represented by Formula 1: [(A)n motif-REP]m or Formula 2: [(A)n motif-REP]m-(A)n motif. The sequence identity is preferably 95% or more.

The modified fibroin of (6-ii) preferably has a glutamine residue content rate of 9% or less. In addition, the modified fibroin of (6-ii) preferably has the GPGXX (SEQ ID NO: 49) motif content rate of 10% or more.

The sixth modified fibroin may include a tag sequence at either or both of the N-terminal and C-terminal. This makes it possible to isolate, immobilize, detect and visualize the modified fibroin.

A more specific example of the modified fibroin having a tag sequence is a modified fibroin including (6-iii) the amino acid sequence set forth in SEQ ID NO: 33 (PRT888), SEQ ID NO: 34 (PRT965), SEQ ID NO: 35 (PRT889), SEQ ID NO: 36 (PRT916), SEQ ID NO: 37 (PRT918), SEQ ID NO: 38 (PRT699), SEQ ID NO: 39 (PRT698), SEQ ID NO: 40 (PRT966), SEQ ID NO: 43 (PRT917), or SEQ ID NO: 44 (PRT1028) or (6-iv) an amino acid sequence having 90% or more sequence identity with the amino acid sequence set forth in SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 43, or SEQ ID NO: 44.

The amino acid sequences set forth in SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 43, and SEQ ID NO: 44 are respectively amino acid sequences obtained by adding an amino acid sequence (including His tag sequence and hinge sequence) set forth in SEQ ID NO: 11 to the N-terminal of the amino acid sequences set forth in SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 41, and SEQ ID NO: 42. Since only the tag sequence is added to the N-terminal, the glutamine residue content rate is unchanged, and each of the amino acid sequences set forth in SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 43, and SEQ ID NO: 44 has a glutamine residue content rate of 9% or less (Table 3).

TABLE 3

| Modified fibroin | Glutamine residue content rate | GPGXX (SEQ ID NO: 49) motif content rate | Hydrophobicity of REP |
|---|---|---|---|
| PRT888 (SEQ ID NO: 33) | 6.3% | 27.9% | −0.07 |
| PRT965 (SEQ ID NO: 34) | 0.0% | 27.9% | −0.65 |
| PRT889 (SEQ ID NO: 35) | 0.0% | 27.9% | 0.35 |
| PRT916 (SEQ ID NO: 36) | 0.0% | 27.9% | 0.47 |
| PRT918 (SEQ ID NO: 37) | 0.0% | 27.9% | 0.45 |
| PRT699 (SEQ ID NO: 38) | 3.6% | 26.4% | −0.78 |
| PRT698 (SEQ ID NO: 39) | 0.0% | 26.4% | −0.03 |
| PRT966 (SEQ ID NO: 40) | 0.0% | 28.0% | 0.35 |
| PRT917 (SEQ ID NO: 43) | 0.0% | 27.9% | 0.46 |
| PRT1028 (SEQ ID NO: 44) | 0.0% | 28.1% | 0.05 |

The modified fibroin of (6-iii) may consist of the amino acid sequence set forth in SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 43, or SEQ ID NO: 44.

The modified fibroin of (6-iv) includes an amino acid sequence having 90% or more sequence identity with the acid sequence set forth in SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 43, or SEQ ID NO: 44. The modified fibroin of (6-iv) is also a protein including a domain sequence represented by Formula 1: [(A)n motif-REP]m or Formula 2: [(A)n motif-REP]m-(A)n motif. The sequence identity is preferably 95% or more.

The modified fibroin of (6-iv) preferably has the glutamine residue content rate of 9% or less. In addition, the modified fibroin of (6-iv) preferably has the GPGXX (SEQ ID NO: 49) motif content rate of 10% or more.

The sixth modified fibroin may include a secretory signal for releasing the protein produced in the recombinant protein production system to the outside of a host. The sequence of the secretory signal can be appropriately set depending on the type of the host.

The modified fibroin may be a modified fibroin having at least two of the respective features of the first modified fibroin, the second modified fibroin, the third modified fibroin, the fourth modified fibroin, the fifth modified fibroin, and the sixth modified fibroin.

The modified fibroin may be a hydrophilic modified fibroin or a hydrophobic modified fibroin. The term "hydrophobic modified fibroin" as used herein denotes a modified fibroin having an average HI of more than 0, where the average HI is a value obtained by dividing the sum of the hydrophobicity indexes (HI) of all amino acid residues constituting the modified fibroin by the total number of amino acid residues. The hydrophobicity index is as indicated in Table 1. The term "hydrophilic modified fibroin" as used herein denotes a modified fibroin having an average HI of 0 or less. As the modified fibroin, a hydrophilic modified fibroin is preferable from the viewpoint of excellent combustion resistance, and a hydrophobic modified fibroin is preferable from the viewpoint of excellent hygroscopic heat generation.

For example, the hydrophobic modified fibroin is a modified fibroin including the amino acid sequence set forth in SEQ ID NO: 27, SEQ ID NO: 28, SEQ ID NO: 29, SEQ ID NO: 30, SEQ ID NO: 31, SEQ ID NO: 32, SEQ ID NO: 33, or SEQ ID NO: 43, or the amino acid sequence set forth in SEQ ID NO: 35, SEQ ID NO: 37, SEQ ID NO: 38, SEQ ID NO: 39, SEQ ID NO: 40, SEQ ID NO: 41, or SEQ ID NO: 44.

For example, the hydrophilic modified fibroin is a modified fibroin including the amino acid sequence set forth in SEQ ID NO: 4, the amino acid sequence set forth in SEQ ID NO: 6, SEQ ID NO: 7, SEQ ID NO: 8, or SEQ ID NO: 9, the amino acid sequence set forth in SEQ ID NO: 13, SEQ ID NO: 11, SEQ ID NO: 14, or SEQ ID NO: 15, the amino acid sequence set forth in SEQ ID NO: 18, SEQ ID NO: 7, SEQ ID NO: 8, or SEQ ID NO: 9, the amino acid sequence set forth in SEQ ID NO: 17, SEQ ID NO: 11, SEQ ID NO: 14, or SEQ ID NO: 15, or the amino acid sequence set forth in SEQ ID NO: 19, SEQ ID NO: 20, or SEQ ID NO: 21.

<Modified Proteins Other than Modified Fibroin>

Examples of the modified collagen (protein derived from collagen) include proteins containing a domain sequence represented by Formula 3: [REP3]p (where p represents an integer of 5 to 300, REP3 represents an amino acid sequence composed of Gly-X-Y, X and Y represent any amino acid residues other than Gly, and a plurality of REP3 may be the same or different amino acid sequences). Specific examples thereof include proteins including the amino acid sequence set forth in SEQ ID NO: 45. The amino acid sequence set forth in SEQ ID NO: 45 is obtained by adding the amino acid sequence set forth in SEQ ID NO: 11 (tag sequence and hinge sequence) to the N-terminal of an amino acid sequence from the 301st residue to the 540th residue corresponding to the repeated part and motif of a partial sequence of human collagen type 4 obtained from the NCBI database (NCBI GenBank Accession Number: CAA56335.1, GI: 3702452).

Examples of the modified resilin (protein derived from resilin) include proteins containing a domain sequence represented by Formula 4: [REP4]q (where q represents an integer of 4 to 300, REP4 represents an amino acid sequence composed of Ser-J-J-Tyr-Gly-U-Pro (SEQ ID NO: 51), J represents any amino acid residue, and particularly preferably an amino acid residue selected from the group consisting of Asp, Ser, and Thr, U represents any amino acid residue, and particularly preferably an amino acid residue selected from the group consisting of Pro, Ala, Thr, and Ser, and a plurality of REP4 may be the same or different amino acid sequences). Specific examples thereof include proteins including the amino acid sequence set forth in SEQ ID NO: 46. The amino acid sequence set forth in SEQ ID NO: 46 is obtained by adding the amino acid sequence set forth in SEQ ID NO: 11 (tag sequence and hinge sequence) to the N-terminal of an amino acid sequence from the 19th residue to the 321st residue of a sequence obtained by substituting the 87th residue Thr with Ser, and also substituting the 95th residue Asn with Asp in the amino acid sequence of resilin (NCBI GenBank Accession Number: NP 611157, GI: 24654243).

Examples of the modified elastin (protein derived from elastin) include proteins having amino acid sequences such as those of NCBI GenBank Accession Numbers: AAC98395 (human), 147076 (sheep), and NP786966 (cow). Specific examples thereof include proteins including the amino acid sequence set forth in SEQ ID NO: 47. The amino acid sequence set forth in SEQ ID NO: 47 is obtained by adding the amino acid sequence set forth in SEQ ID NO: 11 (tag sequence and hinge sequence) to the N-terminal of an amino acid sequence from the 121st residue to the 390th residue of the amino acid sequence of NCBI GenBank Accession Number: AAC98395.

Examples of the modified keratin (protein derived from keratin) include type I keratin of Capra hircus, etc. Specific examples thereof include proteins including the amino acid sequence set forth in SEQ ID NO: 48 (amino acid sequence of NCBI GenBank Accession Number: ACY30466).

As the structural protein in the flexible polyurethane foam according to this embodiment, one naturally occurring structural protein may be used alone, or two or more naturally occurring structural proteins may be used in combination.

As the structural protein in the flexible polyurethane foam according to this embodiment, one modified protein may be used alone, or two or more modified proteins may be used in combination.

As the structural protein in the flexible polyurethane foam according to this embodiment, naturally occurring structural protein and modified protein may be used in combination.

(Production Method for Structural Protein)

The structural protein according to each of the foregoing embodiments, in particular the modified protein, can be produced, for example, by expressing, using a host transformed with an expression vector having a nucleic acid sequence encoding the structural protein and one or more regulatory sequences operably linked to the nucleic acid sequence, the nucleic acid.

The method of producing the nucleic acid encoding the structural protein is not particularly limited. For example, the nucleic acid can be produced by a method of amplifying a gene encoding a naturally occurring structural protein by polymerase chain reaction (PCR) etc. for cloning and carrying out modification by genetic engineering techniques, or by a chemical synthesis method. The method of chemically synthesizing the nucleic acid is also not particularly limited. For example, a gene can be chemically synthesized by linking oligonucleotides automatically synthesized using AKTA oligopilot plus 10/100 (produced by GE Healthcare Japan), etc., by PCR or the like based on amino acid sequence information of structural proteins obtained from the NCBI web database, etc. In this case, in order to facilitate the purification and/or confirmation of the structural protein, a nucleic acid encoding a structural protein comprising an amino acid sequence obtained by adding an amino acid sequence composed of a start codon and His 10 tags to the N-terminal of the above-described amino acid sequence may be synthesized.

The regulatory sequence is a sequence that regulates the expression of a structural protein in a host (for example, a promoter, an enhancer, a ribosome-binding sequence, a transcriptional termination sequence, etc.). The regulatory sequence can be suitably selected depending on the type of host. The promoter may be an inducible promoter that functions in host cells, and can induce the expression of a target structural protein. The inducible promoter is a promoter that can control transfer by the presence of an inductor (an expression-inducing agent), the absence of repressor molecules, or physical factors such as increase or decrease in temperature, osmotic pressure, or pH value.

The type of expression vector can be suitably selected from plasmid vectors, viral vectors, cosmid vectors, fosmid vectors, artificial chromosome vectors, etc., depending on the type of host. Preferable examples of the expression vector include those that are capable of self-replicating in host cells or of being introduced into the chromosome of the host, and that contain a promoter in a position to which a nucleic acid encoding a target structural protein can be transferred.

As the host, any of prokaryotes, and eukaryotes such as yeast, filamentous fungi, insect cells, animal cells, and plant cells, can be suitably used.

Preferable examples of prokaryotic hosts include bacteria belonging to the genera *Escherichia, Brevibacillus, Serratia, Bacillus, Microbacterium, Brevibacterium, Corynebacterium, Pseudomonas*, and the like. Examples of microorganisms belonging to the genus *Escherichia* include *Escherichia coli*, etc. Examples of microorganisms belonging to the genus *Brevibacillus* include *Brevibacillus agri*, etc. Examples of microorganisms belonging to the genus *Serratia* include *Serratia liquefaciens*, etc. Examples of microorganisms belonging to the genus *Bacillus* include *Bacillus subtilis*, etc. Examples of microorganisms belonging to the genus *Microbacterium* include *Microbacterium ammoniaphilum*, etc. Examples of microorganisms belonging to the genus *Brevibacterium* include *Brevibacterium divaricatum*, etc. Examples of microorganisms belonging to the genus *Corynebacterium* include *Corynebacterium ammoniagenes*, etc. Examples of microorganisms belonging to the genus *Pseudomonas* include *Pseudomonas putida*, etc.

When a prokaryotic host is used, examples of the vector for introducing a nucleic acid encoding a target structural protein include pBTrp2 (produced by Boehringer Mannheim), pGEX (produced by Pharmacia), pUC18, pBluescript II, pSupex, pET22b, pCold, pUB110, and pNCO2 (Japanese Unexamined Patent Publication No. 2002-238569), and the like.

Examples of eukaryotic hosts include yeast and filamentous fungi (mold etc.). Examples of yeast include yeast belonging to the genera *Saccharomyces, Pichia, Schizosaccharomyces*, and the like. Examples of filamentous fungi include filamentous fungi belonging to the genera *Aspergillus, Penicillium*, Trichodenna, and the like.

When a eukaryotic host is used, examples of the vector for introducing a nucleic acid encoding a target structural protein include YEP13 (ATCC37115), YEp24 (ATCC37051), and the like. The method for introducing an expression vector into the above-described host cells may be any method as long as it is a method for introducing DNA into the host cells. Examples of the method include a method using calcium ions (Proc. Natl. Acad. Sci. USA, 69, 2110 (1972)), an electroporation method, a spheroplast method, a protoplast method, a lithium acetate method, a competent method, and the like.

The method for expressing the nucleic acid by a host transformed with an expression vector may be direct expression. In addition, secretory production, fusion protein expression, etc., can be performed according to the method described in the 2nd Edition of Molecular Cloning.

The structural protein can be produced by, for example, culturing a host transformed with an expression vector in a culture medium, allowing the production and accumulation of the structural protein in the culture medium, and harvesting the protein from the culture medium. The method for culturing the host in the culture medium can be performed according to a process generally used for host culture.

When the host is a eukaryote such as *Escherichia coli* or a prokaryote such as yeast, the culture medium may be a natural medium or a synthetic medium as long as it contains a carbon source, a nitrogen source, an inorganic salt, etc. that can be assimilated by the host and the host can be efficiently cultured.

The carbon source may be one that can be assimilated by the above-described transformed microorganisms. Examples thereof include glucose, fructose, sucrose, and molasses containing them; carbohydrates such as starch and starch hydrolysates; organic acids such as acetic acid and propionic acid; and alcohols such as ethanol and propanol. Examples of the nitrogen source include ammonia, ammonium salts of inorganic acids or organic acids such as ammonium chloride, ammonium sulfate, ammonium acetate, and ammonium phosphate; other nitrogen-containing compounds; peptone, meat extract, yeast extract, corn steep liquor, casein hydrolysate, soybean cake, soybean cake hydrolyzate, various fermentative bacteria and digests thereof. Examples of inorganic salts that can be used include monopotassium phosphate, dipotassium phosphate, magnesium phosphate, magnesium sulfate, sodium chloride, ferrous sulfate, manganese sulfate, copper sulfate, and calcium carbonate.

Prokaryotes such as *Escherichia coli* or eukaryotes such as yeast can be cultured under aerobic conditions by shaking culture or aeration agitation submerged culture, for example. The culture temperature is 15 to 40° C., for example. The culture time is generally 16 hours to 7 days. The pH of the culture medium during culture is preferably maintained at 3.0 to 9.0. The pH of the culture medium can be adjusted using inorganic acids, organic acids, alkali solutions, urea, calcium carbonate, ammonia, etc.

Antibiotics, such as ampicillin and tetracycline, may be added to the culture medium during culture, if necessary. When a microorganism transformed with an expression vector using an inducible promoter as a promoter is cultured, an inducer may be added to the medium, if necessary. For example, when a microorganism transformed with an expression vector using a lac promoter is cultured, isopropyl-β-D-thiogalactopyranoside or the like may be added to the medium; and when a microorganism transformed with an expression vector using a trp promoter is cultured, indole acrylate or the like may be added to the medium.

The expressed structural protein can be isolated and purified by a generally used method. For example, when the structural protein is expressed in a soluble state in the cells, the host cells are collected by centrifugal separation after completion of the culture, and suspended in a water-based buffer. Then, the host cells are disrupted by an ultrasonic disruption machine, a French press, a Manton-Gaulin homogenizer, a Dyno-Mill, etc., and a cell-free extract is obtained. The cell-free extract is centrifuged to obtain a supernatant, from which a purified preparation can be obtained by methods generally used for the isolation and purification of proteins, all of which can be used alone or in combination, such as a solvent extraction method, a salting-out method using ammonium sulfate etc., a desalination method, a precipitation method using an organic solvent, an anion-exchange chromatography method using resins such as diethylaminoethyl (DEAE)-sepharose and DIAION HPA-75 (produced by Mitsubishi Kasei Corp.), a cation-exchange chromatography method using resins such as S-Sepharose FF (produced by Pharmacia), a hydrophobic chromatography method using resins such as butyl sepharose and phenyl sepharose, a gel-filtration method using molecular sieving, an affinity chromatography method, a chromatofocusing method, and an electrophoresis method such as isoelectric focusing.

In the case where the structural protein is expressed while forming insoluble fractions in the cells, the insoluble fractions of the structural protein are collected as precipitation fractions by similarly collecting the host cells, followed by disruption and centrifugal separation. The collected insoluble fractions of the structural protein can be solubilized by a protein modifier. After this operation, a purified preparation of the structural protein can be obtained by the same isolation and purification method as described above. In the case where the structural protein is secreted outside the cells, the structural protein can be collected from the culture supernatant. More specifically, the culture is treated by centrifugal separation or like method to obtain a culture supernatant, and a purified preparation can be obtained from the culture supernatant by the same isolation and purification method as described above.

<Structural Protein Fiber>

The length of the structural protein fiber used in this embodiment needs to be 0.1 mm to 5 mm. If the length of the structural protein fiber is less than 0.1 mm, the effect of improving the hardness is insufficient. If the length of the structural protein fiber is more than 5 mm, it is difficult to uniformly disperse the structural protein fiber, so that high-quality flexible polyurethane foam cannot be obtained.

The length of the structural protein fiber used in this embodiment is preferably 0.5 mm or more and more 1 mm or more, from the viewpoint of further improving the hardness of the flexible polyurethane foam. The length of the structural protein fiber used in this embodiment is preferably 4 mm or less and more preferably 2 mm or less, from the viewpoint of suppressing an increase in viscosity increase and facilitating uniform dispersion to obtain a high-quality flexible polyurethane foam.

The fiber diameter of the structural protein fiber used in this embodiment is preferably 1 µm to 50 µm. If the fiber diameter of the structural protein fiber is 1 µm or more, workability is good. If the fiber diameter is excessively small, the viscosity increases when mixed with a polyol component or the like, and mixing is hard when mixed with an isocyanate component, thus tending to cause a decrease in formability. If the fiber diameter is 1 µm or more, such problems can be prevented more reliably. If the fiber diameter of the structural protein fiber is 50 µm or less, the dispersibility of the structural protein fiber in the flexible polyurethane foam increases, with it being possible to further improve the hardness. From the same viewpoint, the fiber diameter of the structural protein fiber is preferably m or more, more preferably 7 µm or more, further preferably 9 µm or more, and particularly preferably 11 µm or more. The fiber diameter of the structural protein fiber is preferably 41 µm or less, more preferably 36 µm or less, further preferably 31 µm or less, still more preferably 26 µm or less, still further preferably 20 µm or less, particularly preferably 17 µm or less, and most preferably 15 µm or less.

The content of the structural protein fiber in the flexible polyurethane foam according to this embodiment is not particularly limited, and may be, for example, 0.5 mass % to 5 mass %. The content of the structural protein fiber in the flexible polyurethane foam according to this embodiment is preferably 1 mass % or more, from the viewpoint of further improving the hardness. The content of the structural protein fiber in the flexible polyurethane foam according to this embodiment is preferably less than 3 mass %, and more preferably 2 mass % or less, from the viewpoint of further reducing the stress relaxation.

The structural protein fiber used in this embodiment is preferably coated with at least one oil selected from mineral oil, animal and vegetable oil and fat, and synthetic oil. Thus, the structural protein fiber can be more uniformly dispersed in the flexible polyurethane foam, so that the hardness of the flexible polyurethane foam can be further improved. From the viewpoint of further improving the uniform dispersibility, the oil more preferably contains mineral oil.

From another viewpoint, the oil may be a water-insoluble oil such as hydrocarbons, or a water-soluble oil such as an ionic activator (ionic oil) and a nonionic activator (nonionic oil).

The coating of the oil may be performed, for example, in the process of producing the structural protein fiber, as in the below-described exemplary method of producing the structural protein fiber.

<Method of Producing Structural Protein Fiber>

The structural protein fiber according to this embodiment is produced by spinning the above-described structural protein, and contains the above-described structural protein as a main component.

The structural protein fiber according to this embodiment can be produced by a well-known spinning method. In detail, for example, the structural protein produced according to the above-described method is first added, together with an inorganic salt as a dissolution promoter, to a solvent such as dimethyl sulfoxide (DMSO), N,N-dimethylformamide (DMF), or hexafluoroisopropanol (HFIP), and dissolved to prepare a dope solution. Subsequently, this dope solution is spun by a well-known spinning method such as wet spinning, dry spinning, dry-wet spinning, or melt spinning to obtain a target structural protein fiber.

Preferable spinning methods include wet spinning and dry-wet spinning.

Figure 6:
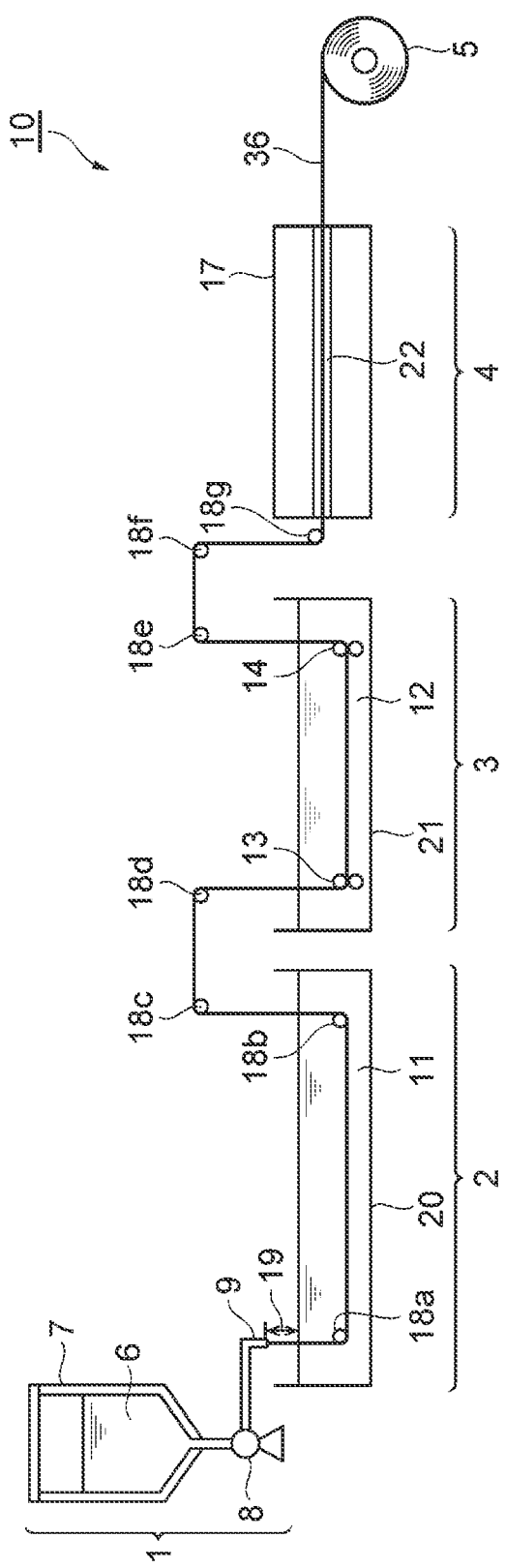
FIG. 6 is a schematic diagram illustrating an example of a spinning device for producing a modified fibroin fiber.

FIG. 6 is an explanatory diagram schematically illustrating an example of a spinning device for producing a structural protein fiber. A spinning device 10 illustrated in FIG. 6 is an example of a spinning device for dry-wet-type spinning, and includes an extrusion device 1, an undrawn yarn production device 2, a wet heat drawing device 3, and a drying device 4.

A spinning method using the spinning device 10 will be described. First, a doping liquid 6 stored in a storage tank 7 is pushed out from a spinneret 9 by a gear pump 8. In the laboratory scale, the doping liquid may be filled in a cylinder and extruded from a nozzle using a syringe pump. Next, the extruded doping liquid 6 is supplied into a coagulation liquid 11 in a coagulation liquid bath 20 via an air gap 19, solvent is removed, the structural protein is coagulated, and a fibrous coagulate is formed. Then, the fibrous coagulate is supplied into a hot water 12 in a drawing bath 21 and is drawn. A drawing ratio is determined according to a speed ratio between a supply nip roller 13 and a withdrawing nip roller 14. Thereafter, the drawn fibrous coagulate is supplied to a drying device 4 and dried in a yarn path 22, and a structural protein fiber 36 is obtained as a wound yarn body 5. Reference signs 18a to 18g indicate yarn guides.

The coagulation liquid 11 may be any solvent that can be desolvated, and examples thereof include lower alcohols having 1 to 5 carbon atoms such as methanol, ethanol, and 2-propanol, and acetone. The coagulation liquid 11 may appropriately contain water. The temperature of the coagulation liquid 11 is preferably 0° C. to 30° C. In the case where a syringe pump having a nozzle with a diameter of 0.1 to 0.6 mm is used as the spinneret 9, the extrusion speed is preferably 0.2 ml/hour to 6.0 ml/hour per hole and more preferably 1.4 ml/hour to 4.0 ml/hour. The distance that the coagulated structural protein passes through the coagulation liquid 11 (substantially, the distance from the yarn guide 18a to the yarn guide 18b) may be a length that allows efficient desolvation, for example, 200 mm to 500 mm. The withdrawing speed of the undrawn yarn may be, for example, 1 to 20 m/min and preferably 1 m/min to 3 m/min. The residence time in the coagulation liquid 11 may be, for example, 0.01 minutes to 3 minutes and preferably 0.05 minutes to 0.15 minutes. In addition, drawing (pre-drawing) may be performed in the coagulation liquid 11. The coagulation liquid bath 20 may be provided in multiple stages, and the drawing may be performed in each stage or in a specific stage as necessary.

As the drawing performed when obtaining the structural protein fiber, for example, a pre-drawing performed in the coagulation liquid bath 20 and a wet heat drawing performed in the drawing bath 21 are employed, and a dry heat drawing is also employed.

The wet heat drawing can be performed in warm water, in a solution obtained by adding an organic solvent or the like to warm water, or in heated steam. The temperature may be, for example, 50° C. to 90° C. and preferably 75° C. to 85° C. In the wet heat drawing, the undrawn yarn (or pre-drawn yarn) can be drawn, for example, by 1 to 10 times and preferably by 2 to 8 times.

The dry heat drawing can be performed using an electric tubular furnace, a dry heat plate, or the like. The temperature may be, for example, 140° C. to 270° C. and preferably 160° C. to 230° C. In the dry heat drawing, the undrawn yarn (or pre-drawn yarn) can be drawn, for example, by 0.5 to 8 times and preferably by 1 to 4 times.

The wet heat drawing and the dry heat drawing may be performed independently or in combination, or may be performed in multiple stages. That is, the wet heat drawing and the dry heat drawing can be performed in suitable combination, for example, in a manner in which a first stage drawing is performed by wet heat drawing and a second stage drawing is performed by dry heat drawing or in a manner in which the first stage drawing is performed by wet heat drawing, the second stage drawing is performed by wet heat drawing, and a third stage drawing is performed by dry heat drawing.

The lower limit value of the final drawing ratio with respect to the undrawn yarn (or pre-drawn yarn) is preferably any of more than 1 time, 2 times or more, 3 times or more, 4 times or more, 5 times or more, 6 times or more, 7 times or more, 8 times or more, or 9 times or more, and the upper limit value is preferably 40 times or less, 30 times or less, 20 times or less, 15 times or less, 14 times or less, 13 times or less 12 times or less, 11 times or less, or 10 times or less. In the case where the structural protein fiber is a fiber spun at a drawing ratio of 2 times or more, the shrinkage rate when the structural protein fiber is wetted by being brought into contact with water becomes higher.

<Production of Flexible Polyurethane Foam>

The flexible polyurethane foam according to this embodiment can be produced, for example, from a foaming stock solution prepared using a polyol component, an isocyanate component, a catalyst, a foaming agent, and the above-described structural protein fiber of the predetermined length and optionally using a crosslinking agent, a foam stabilizer, and/or a crosslinking agent. The structural protein fiber may be added after preparing a foaming stock solution mixture. Alternatively, the foaming stock solution may be prepared after adding the structural protein fiber to the polyol component.

The foaming stock solution is preferably prepared by blending the above-described materials excluding the isocyanate component to obtain a mixture in which the structural protein fiber is sufficiently dispersed and then mixing the isocyanate component into the obtained mixture.

The mixture is preferably prepared by blending the catalyst into the polyol component, then optionally blending the foam stabilizer, the crosslinking agent, etc., and lastly blending the foaming agent, from the viewpoint of keeping the foaming agent and the catalyst from coming into contact with each other as much as possible.

The structural protein fiber is preferably disentangled according to an ordinary method before addition, from the viewpoint of improving the dispersibility.

Examples of the polyol component include polyhydric alcohols of dihydric to hexahydric, etc., polyoxyalkylene polyols (polyether polyols), polyester polyols, and polymer polyols. Of these, as the polyol component, preferably at least one of a polyether polyol and a polyester polyol is used, and more preferably at least a polyether polyol is used. These polyol components may be used alone or in combination of two or more. As the polyol component, it is desirable to use a polyether polyol and a polymer polyol together. Here, the polymer polyol is obtained by dispersing fine particles made of a styrene and/or acrylonitrile copolymer in a polyether polyol. As the polyether polyol component, a polyether polyol that is obtained by ring-opening polymerization of ethylene oxide (denoted by "EO") and propylene oxide (denoted by "PO"), has a molar ratio of repeating units derived from EO and PO of 10/90 to 25/75 (EO/PO), and has a number-average molecular weight of 4,000 to 12,000 is preferable. The number-average molecular weight of the polyether polyol is more preferably 4,700 to 8,000. These polyether polyols may be used alone or in combination of two or more.

From the viewpoint of durability, the average number of functional groups of the polyether polyol is preferably 3 to 5. The number-average molecular weight of the polyol component contained in the polymer polyol is preferably 2,500 to 8,500. If the number-average molecular weight of the polyol component contained in the polymer polyol is low, the stress relaxation of the flexible polyurethane foam is likely to be adversely affected. If the number-average molecular weight is excessively high, the viscosity increases, and the stirring dispersibility and operability are likely to be adversely affected.

Since the polymer polyol contains the styrene and/or acrylonitrile copolymer as mentioned above, the polymer polyol may contain a trace amount of a styrene monomer or the like. This can cause odor or harmful volatile substances in the vehicle interior space.

The number-average molecular weight described above is a value calculated using gel permeation chromatography (GPC) in terms of polystyrene.

Examples of the isocyanate component include tolylene diisocyanate (TDI), diphenylmethane diisocyanate (MDI), dicyclohexylmethane diisocyanate, triphenyl diisocyanate, xylene diisocyanate, polymethylene polyphenylene polyisocyanate, methylene diisocyanate, hexamethylene diisocyanate, isophorone diisocyanate, ortho toluidine diisocyanate, naphthylene diisocyanate, xylylene diisocyanate, lysine diisocyanate, and derivatives thereof. These isocyanate components may be used alone or in combination of two or more. In particular, as the isocyanate component, preferably at least one of TDI and MDI is used, and more preferably TDI and MDI are used together, from the viewpoint of the density of the obtained polyurethane foam.

As the catalyst, those commonly used in the production of polyurethane foams can be used. Examples include tertiary amines such as TEDA[1,4-diazabicyclo[2.2.2]octane], N,N,N',N'-tetramethylhexamethylenediamine, N,N,N',N'-tetramethylpropylenediamine, N,N,N',N',N''-pentamethyldiethylenetriamine, trimethylaminoethylpiperazine, N,N-dimethylcyclohexylamine, N,N-dimethylbenzylamine, N-methylmorpholine, N-ethylmorpholine, triethylamine, tributylamine, bis(dimethylaminoalkyl)piperazine, N,N,N',N'-tetramethylethylenediamine, N,N-diethylbenzylamine, bis(N,N-diethylaminoethyl)adipate, N,N,N',N'-tetramethyl-1,3-butanediamine, N,N-dimethyl-β-phenylethylamine, 1,2-dimethylimidazole, and 2-methylimidazole, and organometallic compounds such as dibutyltin dilaurate, stannous oleate, cobalt naphthenate, and lead naphthenate. These catalysts may be used alone or in combination of two or more.

The amount of the catalyst used is typically 0.1 to 5 parts by mass, and more preferably 0.2 to 1 parts by mass, with respect to 100 parts by mass of the polyol component.

As the foaming agent, water is preferably used. Water reacts with the isocyanate component to generate carbon dioxide gas, and thus acts as a foaming agent. Besides water, a foaming agent generally used for production of polyurethane foams such as a hydrogen atom-containing halogenated hydrocarbon, a liquefied carbon dioxide, or a low-boiling hydrocarbon, may be used.

The amount of the foaming agent used is preferably 0.1 to 10 parts by mass, and more preferably 2 to 7 parts by mass, with respect to 100 parts by mass of the polyol component. If the amount of the foaming agent used is 0.1 parts by mass or more with respect to 100 parts by mass of the polyol component, a sufficient effect of suppressing wobbling can be obtained.

As the foam stabilizer, those commonly used in the production of polyurethane foams can be used. For example, silicone-based foam stabilizers such as various siloxane-polyether block copolymers can be used. Commercially available foam stabilizers include, for example, "SZ1325" produced by Dow Corning Toray and "B8742LF2" produced by EVONIK.

The amount of the foam stabilizer used is typically 0.5 to 5 parts by mass, and more preferably 0.5 to 3 parts by mass, with respect to 100 parts by mass of the polyol component. If the amount of the foam stabilizer used is 0.5 parts by mass or more with respect to 100 parts by mass of the polyol component, the stirring property of the polyol component and the isocyanate component does not decrease and the desired polyurethane foam can be obtained. An amount of the foam stabilizer used of 5 parts by mass or less is preferably in terms of cost.

As the crosslinking agent, those commonly used in the production of polyurethane foams can be used. Examples include low-molecular-weight polyhydric alcohols (for example, polyether polyol, ethylene glycol, 1,3-propanediol, 1,4-butanediol, glycerin, etc. whose number-average molecular weight obtained by ring-opening polymerization of EO or PO singly is 1000 or less), and low-molecular-weight aminepolyols (for example, diethanolamine, triethanolamine, etc., or polyamine, such as ethylenediamine, xylylenediamine, and methylenebisorthochloroaniline). These crosslinking agents may be used alone or in combination of two or more.

The total amount of the crosslinking agent used is preferably 0.5 to 10 parts by mass with respect to 100 parts by mass of the polyol component. If the total amount of the crosslinking agent used is 0.5 parts by mass or more with respect to 100 parts by mass of the polyol component, the effect of the crosslinking agent is sufficient. If the total amount of the crosslinking agent used is 10 parts by mass or less with respect to 100 parts by mass of the polyol component, closed-cell property is moderate and formability can be ensured, and also foam-down can be suppressed.

The flexible polyurethane foam according to this embodiment can be obtained by molding. More specifically, the polyurethane foam according to this embodiment can be obtained by injecting the above-described foaming stock solution into a cavity in a mold and performing molding (foam molding) at a temperature of 50° C. to 70° C. for a curing time 5 min to 7 min according to an ordinary method, without being limited thereto. Here, timed pressure release (TPR) may be used. TPR is an operation of decreasing the pressure in the mold, thereby forming open cells. More specifically, TPR is an operation of, after injecting the foaming stock solution into the cavity in the mold, decreasing the pressure in the mold by 0.15 MPa to 0.25 MPa once 20 sec to 50 sec has elapsed from the gel time (the time when an increase in viscosity occurs and gel strength starts to appear as a result of the polyol component and the isocyanate component being mixed).

The molded polyurethane foam may be subjected to a crushing treatment using rollers or the like. The crushing treatment is a treatment of breaking the cell membrane of bubbles generated at the time of foam molding and forming open cells, for the purpose of stabilizing the shape of the foam and suppressing shrinkage.

(Flexible Polyurethane Foam Production Method)

A flexible polyurethane foam production method according to one of the disclosed embodiments (hereafter also referred to as "production method according to this embodiment") includes obtaining the above-described flexible polyurethane foam by molding. By performing molding in the production method according to this embodiment, the above-described polyurethane foam can be produced while suppressing coarsening of cells. The molding is as described above. The production method according to this embodiment is not particularly limited as long as the polyurethane foam is obtained by molding, and any operations such as the preparation of the foaming stock solution and the crushing treatment may be performed as appropriate.

As a production method for a polyurethane foam, a method of foaming and curing under atmospheric pressure, for example, on a belt conveyor or the like without using a mold is also available. With such a method, however, the structural protein adversely affects the foam molding, and the cells in the obtained polyurethane foam can coarsen (for example, the cell diameter becomes 5 mm or more). It is thus difficult to control the fineness of the cells.

The flexible polyurethane foam according to this embodiment can be used, for example, for members of various sound absorbing materials, vibration damping materials, sealing materials, soundproof flooring materials, pillows, mattresses, bed pads, duvets, Japanese mattresses, etc. The members may be produced by a production method called slab molding.

(Automobile Seat Pad)

An automobile seat pad according to one of the disclosed embodiments (hereafter also referred to as "seat pad according to this embodiment") includes the above-described flexible polyurethane foam. The seat pad according to this embodiment can be produced using the above-described flexible polyurethane foam, and thus has high hardness and low stress relaxation.

EXAMPLES

The presently disclosed techniques will be described in more detail below by way of examples, although these examples are intended for illustrative purposes only and are not intended to limit the scope of the present disclosure in any way.

(1) Production of Modified Fibroin

Synthesis of Nucleic Acid Encoding Modified Fibroin and Construction of Expression Vector A modified fibroin (PRT799) having an amino acid sequence set forth in SEQ ID NO: 15 and a modified fibroin (PRT966) having an amino acid sequence set forth in SEQ ID NO: 40 were designed as structural proteins.

Each of the nucleic acids encoding the designed two kinds of modified fibroins was synthesized. In the nucleic acid, an NdeI site was added to the 5' end and an EcoRI site was added downstream of the stop codon. These two kinds of nucleic acids were each cloned into a cloning vector (pUC118). Thereafter, the same nucleic acid was cleaved by restriction enzyme treatment with NdeI and EcoRI, and then recombined into a protein expression vector pET-22b(+) to obtain an expression vector.

(Expression of Modified Fibroin)

*Escherichia coli* BLR (DE3) was transformed with the obtained expression vector. The transformed *Escherichia coli* was cultured in 2 mL of an LB medium containing ampicillin for 15 hours. The culture solution was added to 100 mL of a seed culture medium (see Table 4) containing ampicillin so that the OD600 was 0.005. The temperature of the culture solution was maintained at 30° C. and the flask culture was carried out (for about 15 hours) until the OD600 reached 5, thereby obtaining a seed culture solution.

TABLE 4

| Seed culture medium | |
|---|---|
| Reagent | Concentration (g/L) |
| Glucose | 5.0 |
| KH$_2$PO$_4$ | 4.0 |
| K$_2$HPO$_4$ | 9.3 |
| Yeast Extract | 6.0 |
| Ampicillin | 0.1 |

The seed culture solution was added to a jar fermenter to which 500 ml of a production medium (see Table 5) had been added so that the OD600 was 0.05. The culture was carried out while maintaining the culture solution temperature at 37° C. and keeping the pH constant at 6.9. Further, the dissolved oxygen concentration in the culture solution was maintained at 20% of the dissolved oxygen saturation concentration.

TABLE 5

| Production medium | |
|---|---|
| Reagent | Concentration (g/L) |
| Glucose | 12.0 |
| KH$_2$PO$_4$ | 9.0 |

TABLE 5-continued

| Production medium | |
|---|---|
| Reagent | Concentration (g/L) |
| MgSO$_4$ · 7H$_2$O | 2.4 |
| Yeast Extract | 15 |
| FeSO$_4$ · 7H$_2$O | 0.04 |
| MnSO$_4$ · 5H$_2$O | 0.04 |
| CaCl$_2$ · 2H$_2$O | 0.04 |
| ADEKANOL (LG-295S, Adeka Corporation) | 0.1 (mL/L) |

Immediately after glucose in the production medium was completely consumed, a feed solution (455 g/1 L of glucose and 120 g/1 L of Yeast Extract) was added at a rate of 1 mL/min. The culture was carried out while maintaining the culture solution temperature at 37° C. and keeping the pH constant at 6.9. Further, the dissolved oxygen concentration in the culture solution was maintained at 20% of the dissolved oxygen saturation concentration, and the culture was carried out for 20 hours. Thereafter, 1 M isopropyl-β-thiogalactopyranoside (IPTG) was added to the culture solution to a final concentration of 1 mM to induce the expression of the target modified fibroin. Twenty hours after addition of IPTG the culture solution was centrifuged to recover the bacterial cells. SDS-PAGE was carried out using the bacterial cells prepared from the culture solution before the addition of IPTG and after the addition of IPTG, and the expression of the target modified fibroin was confirmed by the appearance of a band of a target modified fibroin size depending on the addition of IPTG (Purification of Modified Fibroin)

The bacterial cells recovered 2 hours after the addition of IPTG were washed with 20 mM Tris-HCl buffer solution (pH 7.4). The bacterial cells after washing were suspended in 20 mM Tris-HCl buffer solution (pH 7.4) containing about 1 mM PMSF, and the cells were disrupted with a high-pressure homogenizer (available from GEA Niro Soavi SpA). The disrupted cells were centrifuged to obtain a precipitate. The obtained precipitate was washed with 20 mM Tris-HCl buffer solution (pH 7.4) until high purity. The precipitate after washing was suspended in 8 M guanidine buffer solution (8 M guanidine hydrochloride, 10 mM sodium dihydrogen phosphate, 20 mM NaCl, 1 mM Tris-HCl, pH 7.0) so as to have a concentration of 100 mg/mL, and dissolved by stirring with a stirrer at 60° C. for 30 minutes. After dissolution, dialysis was carried out with water using a dialysis tube (cellulose tube 36/32 produced by Sanko Junyaku Co., Ltd.). The white aggregated protein obtained after dialysis was recovered by centrifugation. The water content was removed from the recovered aggregated protein with a freeze dryer, and the freeze-dried powder of the modified fibroin was obtained.

(2) Production of Modified Fibroin Fiber

Preparation of Doping Liquid

Dimethylsulfoxide (DMSO) in which LiCl was dissolved to be 4.0 mass % was prepared as a solvent. The lyophilized powder of modified fibroin was added to the solvent so that the concentration thereof was 18 mass % or 24 mass %, and dissolved for 3 hours using a shaker. Thereafter, insoluble matters and bubbles were removed to obtain a modified fibroin liquid.

(Spinning)

Using the obtained modified fibroin liquid as a doping liquid (spinning raw liquid), the modified fibroin fiber spun and drawn were produced by dry-wet-type spinning using a spinning device corresponding to the spinning device 10 illustrated in FIG. 6. The spinning device used is a spinning device 10 illustrated in FIG. 6 further provided with a second undrawn yarn production device (second bath) between an undrawn yarn production device 2 (first bath) and a wet heat drawing device 3 (third bath). The dry-wet-type spinning conditions are as follows:

Extrusion nozzle diameter: 0.2 mm
Liquid and temperature in the first bath: methanol, −10° C. to −5° C.
Liquid and temperature in the second bath: methanol, 10° C. to 15° C.
Liquid and temperature in the third bath: water, 15° C. to 20° C.
Drying temperature: 60° C.
Oil applied: mineral oil (Examples 1 to 8), no application (Examples 9 to 11).

Modified fibroin fibers used in Examples 1 to 8 were produced using the modified fibroin (PRT799) having the amino acid sequence set forth in SEQ ID NO: 15. Modified fibroin fibers used in Examples 10 and 11 were produced using the modified fibroin (PRT966) having the amino acid sequence set forth in SEQ ID NO: 40.

In the dry-wet spinning, the discharge amount of the doping liquid and the winding speed were changed as appropriate so that each modified fibroin fiber had the fiber diameter indicated in Table 6 or 7.

(3) Preparation of Flexible Polyurethane Foam

In each of Comparative Examples 1 and 3 and Examples 1 to 10, a fiber of the type, length, and fiber diameter indicated in Table 6 or 7 was added in the amount indicated in Table 7 to 50 parts by mass of polyether polyol ("SANIX KC741" (PPG) produced by Sanyo Chemical Industries, Ltd.), 50 parts by mass of polymer polyol ("SANIX KC855" (POP) produced by Sanyo Chemical Industries, Ltd.), and 0.7 parts by mass of a catalyst (including "TEDA-L33" produced by Tosoh Corporation) as polyol components to mix them, and 0.5 parts by mass of a foam stabilizer ("B8742LF2" produced by EVONIK) and 2.4 parts by mass of a foaming agent (water) were blended to prepare a polyol composition. This polyol composition was blended with 32 parts by mass of a mixture of tolylene diisocyanate (TDI) ("Cosmonate T-80" produced by Mitsui Chemicals, Inc.) and diphenylmethane diisocyanate (MDI) ("MR-200HR" produced by Tosoh Corporation) as isocyanate components (mass of TDI: mass of MDI=80:20), to prepare a foaming stock solution.

Following this, the prepared foaming solution was foamed and cured in a mold, and then demolded to obtain a flexible polyurethane foam. The following evaluations and measurements were performed on the obtained flexible polyurethane foam. The results are indicated in Tables 6 and 7.

Comparative Examples 1 and 3 are examples in which no fiber was added. Comparative Example 2 is an example in which the polymer polyol (POP) was added by 5 parts by mass and the polyether polyol (PPG) was reduced by 5 parts by mass with respect to Comparative Example 1.

Examples 9 and 10 are examples in which a fiber was added with respect to Comparative Example 3.

Comparative Example 4 is an example in which the polymer polyol (POP) was reduced by 5 parts by mass and the polyether polyol (PPG) was added by 5 parts by mass with respect to Comparative Example 3.

Examples 11 is an example in which a fiber was added with respect to Comparative Example 4.

<Density>

The density (kg/m³) was determined from the capacity of the cavity of the mold used and the weight of the obtained flexible polyurethane foam.

<25% Hardness>

Using an Instron-type compression tester, a load (unit: N) required to compress the flexible polyurethane foam by 25% in an environment of 23° C. and a relative humidity of 50% was measured as 25% hardness.

<Stress Relaxation Rate>

The flexible polyurethane foam was compressed by a distance equal to 75% of its initial thickness at a velocity of 50 mm/min with a circular pressure plate having a diameter of 200 mm. Thereafter, the pressure plate was removed, and the flexible polyurethane foam was left for 1 minute. The flexible polyurethane foam was again compressed with the pressure plate at the same velocity, and, at the time when the load reached 196 N (20 kgf), the pressure plate was stopped. After leaving the flexible polyurethane foam for 5 minutes, the load was measured. The stress relaxation rate was calculated according to the following formula. A smaller value indicates lower stress relaxation.

Stress relaxation rate (%)=100×[the load when the pressure plate was stopped(196 N)−the load after leaving for 5 minutes]/the load when the pressure plate was stopped(196 N).

<Styrene Index (Only for Examples in Table 7)>

The styrene index was determined by indexing the parts by mass of the POP in each example, with the parts by mass of the POP in Comparative Example 3 being 100. The POP contains fine particles of a styrene/acrylonitrile copolymer, and is one of the sources of residual styrene in products such as automobile seat pads. Therefore, a smaller styrene index indicates that more VOCs such as styrene in the vehicle interior can be reduced.

TABLE 6

| | Structural protein fiber | | | | Flexible polyurethane foam | | | | |
|---|---|---|---|---|---|---|---|---|---|
| | Type of structural protein | Length [mm] | Fiber diameter [μm] | Addition amount [mass %] | PPG [part by mass] | POP [part by mass] | Density [kg/m³] | 25% hardness [N] | Stress relaxation rate [%] |
| Comparative Example 1 | None | — | — | — | 50 | 50 | 65.4 | 310 | 18.2 |
| Comparative Example 2 | None | — | — | — | 45 | 55 | 66.2 | 339 | 18.8 |
| Example 1 | PRT799 | 1 | 28 | 1 | 50 | 50 | 65.9 | 320 | 18.2 |
| Example 2 | PRT799 | 1 | 28 | 2 | 50 | 50 | 65.4 | 341 | 18.0 |
| Example 3 | PRT799 | 1 | 28 | 3 | 50 | 50 | 66.2 | 366 | 17.7 |
| Example 4 | PRT799 | 1 | 28 | 4 | 50 | 50 | 66.2 | 386 | 17.7 |

TABLE 6-continued

| | Structural protein fiber | | | | Flexible polyurethane foam | | | | |
|---|---|---|---|---|---|---|---|---|---|
| | Type of structural protein | Length [mm] | Fiber diameter [μm] | Addition amount [mass %] | PPG [part by mass] | POP [part by mass] | Density [kg/m³] | 25% hardness [N] | Stress relaxation rate [%] |
| Example 5 | PRT799 | 2 | 28 | 1 | 50 | 50 | 66.1 | 347 | 17.6 |
| Example 6 | PRT799 | 2 | 28 | 2 | 50 | 50 | 65.6 | 356 | 17.3 |
| Example 7 | PRT799 | 4 | 28 | 1 | 50 | 50 | 64.2 | 327 | 18.3 |
| Example 8 | PRT799 | 4 | 28 | 2 | 50 | 50 | 60.6 | 307 | 19.0 |

TABLE 7

| | Structural protein fiber | | | | Flexible polyurethane foam | | | | | |
|---|---|---|---|---|---|---|---|---|---|---|
| | Type of structural protein | Length [mm] | Fiber diameter [μm] | Addition amount [mass %] | PPG [part by mass] | POP [part by mass] | Density [kg/m³] | 25% hardness [N] | Stress relaxation rate [%] | Styrene index |
| Comparative Example 3 | None | — | — | — | 50 | 50 | 65.4 | 310 | 18.2 | 100 |
| Example 9 | PRT966 | 1 | 28 | 1 | 50 | 50 | 65.9 | 320 | 18.2 | 100 |
| Example 10 | PRT966 | 1 | 13 | 1 | 50 | 50 | 65.1 | 330 | 18.5 | 100 |
| Comparative Example 4 | None | — | — | — | 55 | 45 | 65.5 | 302 | 17.2 | 90 |
| Example 11 | PRT966 | 1 | 13 | 1 | 55 | 45 | 65.7 | 315 | 16.9 | 90 |

As can be understood from Tables 6 and 7, the flexible polyurethane foam of each Examples containing the structural protein fiber having the predetermined length had high hardness and low stress relaxation.

In Comparative Example 2, instead of adding the fiber, the polymer polyol was added more to increase the hardness. However, the stress relaxation rate increased. This demonstrates that the stress relaxation deteriorates relatively in the case where a predetermined amount of polymer polyol is added so as to achieve substantially the same 25% hardness as in the Examples containing the structural protein fiber.

Moreover, comparison between Examples 9 and 10 in Table 7 revealed that a modified fibroin fiber having a fiber diameter of 20 m or less can further improve the hardness of the flexible polyurethane foam. Further, in Example 11 in Table 7 in which the polymer polyol was reduced and the modified fibroin fiber was added with respect to Comparative Example 3, the stress relaxation was reduced while maintaining high hardness, and also the styrene index was low. This demonstrates that VOCs in the vehicle interior can be further reduced.

INDUSTRIAL APPLICABILITY

It is therefore possible to provide a flexible polyurethane foam having high hardness required for weight reduction of members and having low stress relaxation. It is also possible to provide a flexible polyurethane foam production method by which the flexible polyurethane foam can be produced while suppressing coarsening of cells. It is also possible to provide an automobile seat pad having high hardness and low stress relaxation.

REFERENCE SIGNS LIST 1 extrusion device
2 undrawn yarn production device
3 wet heat drawing device
4 drying device
5 yarn body
6 doping liquid
7 storage tank
8 gear pump 8
9 spinneret
10 spinning device
11 coagulation liquid
12 hot water
13 nip roller
14 withdrawing nip roller
18a to 18g yarn guide
19 air gap
20 coagulation liquid bath
21 drawing bath
22 yarn path
36 structural protein fiber

The invention claimed is:

1. A flexible polyurethane foam comprising a structural protein fiber having a length of 0.1 mm to 5 mm, wherein a structural protein forming the structural protein fiber is a modified protein, which is a protein whose amino acid sequence has been partly modified based on an amino acid sequence of a naturally occurring structural protein.

2. The flexible polyurethane foam according to claim 1, wherein the structural protein fiber is coated with at least one oil selected from mineral oil, animal and vegetable oil, and synthetic oil.

3. The flexible polyurethane foam according to claim 1, wherein the length of the structural protein fiber is 0.5 mm to 2 mm.

4. The flexible polyurethane foam according to claim 1, wherein a fiber diameter of the structural protein fiber is 1 µm to 50 µm.

5. The flexible polyurethane foam according to claim 4, wherein a fiber diameter of the structural protein fiber is 1 µm to 20 µm.

6. The flexible polyurethane foam according to claim 1, wherein a structural protein forming the structural protein fiber is modified fibroin.

7. An automobile seat pad comprising the flexible polyurethane foam according to claim 1.

8. A flexible polyurethane foam production method comprising obtaining the flexible polyurethane foam according to claim 1 by molding.

9. The flexible polyurethane foam according to claim 2, wherein the length of the structural protein fiber is 0.5 mm to 2 mm.

10. The flexible polyurethane foam according to claim 2, wherein a fiber diameter of the structural protein fiber is 1 µm to 50 µm.

11. The flexible polyurethane foam according to claim 10, wherein a fiber diameter of the structural protein fiber is 1 µm to 20 µm.

12. The flexible polyurethane foam according to claim 2, wherein a structural protein forming the structural protein fiber is modified fibroin.

13. An automobile seat pad comprising the flexible polyurethane foam according to claim 2.

14. A flexible polyurethane foam production method comprising obtaining the flexible polyurethane foam according to claim 2 by molding.

15. A flexible polyurethane foam comprising a structural protein fiber having a length of 0.1 mm to 5 mm dispersed therein, wherein a fiber diameter of the structural protein fiber is 1 µm to 50 µm.

* * * * *